(12) United States Patent
Naoe et al.

(10) Patent No.: US 8,291,273 B2
(45) Date of Patent: Oct. 16, 2012

(54) COMMUNICATION DEVICE, NON-TRANSITORY COMPUTER-READABLE MEDIUM STORING A COMMUNICATION PROGRAM

(75) Inventors: Hitoshi Naoe, Nara (JP); Fumihiro Fukae, Sakurai (JP); Koji Sakai, Osaka (JP); Shohei Ohsawa, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1103 days.

(21) Appl. No.: 11/883,234

(22) PCT Filed: Jan. 26, 2006
(Under 37 CFR 1.47)

(86) PCT No.: PCT/JP2006/301238
§ 371 (c)(1),
(2), (4) Date: Jan. 30, 2008

(87) PCT Pub. No.: WO2006/080403
PCT Pub. Date: Aug. 3, 2006

(65) Prior Publication Data
US 2008/0313518 A1    Dec. 18, 2008

(30) Foreign Application Priority Data

| Jan. 28, 2005 | (JP) | 2005-022209 |
| Jan. 31, 2005 | (JP) | 2005-023901 |
| Jan. 31, 2005 | (JP) | 2005-023929 |
| Apr. 13, 2005 | (JP) | 2005-116096 |
| May 25, 2005 | (JP) | 2005-152910 |
| Jun. 30, 2005 | (JP) | 2005-192903 |
| Aug. 5, 2005 | (WO) | PCT/JP2005/014446 |
| Sep. 16, 2005 | (JP) | 2005-271233 |

(51) Int. Cl.
*H04L 1/18* (2006.01)

(52) U.S. Cl. .......... 714/748; 714/750; 714/758
(58) Field of Classification Search .......... 714/748, 714/750, 754, 751, 758
See application file for complete search history.

(56) References Cited

U.S. PATENT DOCUMENTS
4,957,348 A   9/1990   May
(Continued)

FOREIGN PATENT DOCUMENTS
CN   1167380 A   12/1997
(Continued)

OTHER PUBLICATIONS

Kitazumi e al. A Proposal of next generation proximity infrared communication—Optimization of IrDA protocol by IrSimple—The Institute of Image Electronics Engineers of Japan, with translation.

(Continued)

*Primary Examiner* — Fritz Alphonse
(74) *Attorney, Agent, or Firm* — Birch, Stewart, Kolasch & Birch, LLP

(57) ABSTRACT

In a transmitter (2001), when generating a transmission frame having no limitation to a window size, a batch-transmission-end flag generating circuit (2004) and a sequence number generating circuit (2005) respectively adds a batch-transmission-end flag and a sequence number to the transmission frame. In a receiver, if an omission of a sequence number is detected as a result of analyzing sequence numbers of frames having received from the transmitter (2001), retransmission request is made when receiving a frame whose batch-transmission-end flag indicates the end. In this way, retransmission is possible in data transmission using UI frames, and the communication efficiency can be improved.

12 Claims, 84 Drawing Sheets

U.S. PATENT DOCUMENTS

| | | | |
|---|---|---|---|
| 5,001,471 A * | 3/1991 | Snowden et al. | 340/7.48 |
| 5,448,561 A | 9/1995 | Kaiser et al. | |
| 5,450,412 A | 9/1995 | Takebayashi et al. | |
| 5,509,121 A | 4/1996 | Nakata et al. | |
| 5,515,508 A | 5/1996 | Pettus et al. | |
| 5,557,634 A | 9/1996 | Balasubramanian et al. | |
| 5,563,943 A | 10/1996 | Takebayashi et al. | |
| 5,585,952 A | 12/1996 | Imai et al. | |
| 5,617,083 A * | 4/1997 | Schwendeman et al. | 340/7.43 |
| 5,638,373 A | 6/1997 | Takebayashi et al. | |
| 5,706,110 A | 1/1998 | Nykanen | |
| 5,764,643 A | 6/1998 | Takebayashi et al. | |
| 5,923,443 A | 7/1999 | Nykanen et al. | |
| 6,006,294 A | 12/1999 | Kurihara | |
| 6,034,962 A | 3/2000 | Ohno et al. | |
| 6,088,730 A | 7/2000 | Kato et al. | |
| 6,154,298 A | 11/2000 | Tamagawa et al. | |
| 6,178,181 B1 | 1/2001 | Glitho | |
| 6,188,431 B1 | 2/2001 | Oie | |
| 6,211,797 B1 | 4/2001 | Kimura | |
| 6,256,296 B1 | 7/2001 | Ruziak et al. | |
| 6,297,795 B1 | 10/2001 | Kato et al. | |
| 6,297,802 B1 | 10/2001 | Fujioka | |
| 6,336,142 B1 | 1/2002 | Kato et al. | |
| 6,347,339 B1 | 2/2002 | Morris et al. | |
| 6,411,813 B1 | 6/2002 | Sano | |
| 6,446,127 B1 | 9/2002 | Schuster et al. | |
| 6,499,068 B1 * | 12/2002 | Uchikawa | 710/31 |
| 6,519,644 B1 | 2/2003 | Lindquist et al. | |
| 6,629,373 B1 | 10/2003 | Donaldson | |
| 6,675,203 B1 * | 1/2004 | Herrod et al. | 709/217 |
| 6,728,774 B1 | 4/2004 | Nykanen | |
| 6,735,245 B1 | 5/2004 | Palm et al. | |
| 6,754,451 B1 | 6/2004 | Nakamura | |
| 6,812,881 B1 | 11/2004 | Mullaly et al. | |
| 6,839,564 B2 | 1/2005 | Sutinen et al. | |
| 6,842,433 B2 | 1/2005 | West et al. | |
| 6,865,687 B1 | 3/2005 | Ichimi | |
| 6,907,013 B1 | 6/2005 | Ruziak | |
| 6,944,483 B1 | 9/2005 | Motohashi | |
| 7,069,059 B2 | 6/2006 | Osawa et al. | |
| 7,363,534 B1 | 4/2008 | Krishnamurthy et al. | |
| 7,366,532 B2 | 4/2008 | Khawand et al. | |
| 7,403,543 B2 | 7/2008 | Lee et al. | |
| 7,411,974 B2 | 8/2008 | Attar et al. | |
| 7,461,318 B2 * | 12/2008 | Fukae et al. | 714/749 |
| 7,729,290 B2 | 6/2010 | Saleh et al. | |
| 7,809,358 B2 | 10/2010 | Hashimoto | |
| 2001/0007137 A1 | 7/2001 | Suumaki et al. | |
| 2001/0032326 A1 | 10/2001 | Haneda | |
| 2001/0044914 A1 | 11/2001 | Nakano et al. | |
| 2002/0037711 A1 | 3/2002 | Mizutani | |
| 2002/0041605 A1 | 4/2002 | Benussi et al. | |
| 2002/0065065 A1 | 5/2002 | Lunsford et al. | |
| 2002/0128039 A1 | 9/2002 | Finn | |
| 2002/0196782 A1 | 12/2002 | Furukawa et al. | |
| 2002/0196812 A1 | 12/2002 | Yamaguchi et al. | |
| 2003/0107651 A1 | 6/2003 | Chen et al. | |
| 2003/0114107 A1 | 6/2003 | Aoyagi | |
| 2003/0169744 A1 | 9/2003 | Elzur | |
| 2004/0042487 A1 | 3/2004 | Ossman | |
| 2004/0054796 A1 | 3/2004 | Kikuchi et al. | |
| 2004/0080537 A1 | 4/2004 | Adler | |
| 2004/0081436 A1 | 4/2004 | Tada et al. | |
| 2004/0111535 A1 | 6/2004 | Boucher et al. | |
| 2004/0135671 A1 | 7/2004 | Khoshbin et al. | |
| 2004/0170134 A1 | 9/2004 | Furuyama et al. | |
| 2004/0186928 A1 | 9/2004 | Fukunaga et al. | |
| 2004/0218209 A1 | 11/2004 | Hamaguchi et al. | |
| 2004/0228332 A1 | 11/2004 | Seguin et al. | |
| 2005/0014468 A1 | 1/2005 | Salokannel et al. | |
| 2005/0025188 A1 | 2/2005 | Numakura et al. | |
| 2005/0071733 A1 | 3/2005 | Fukae et al. | |
| 2005/0083885 A1 | 4/2005 | Ikeda et al. | |
| 2005/0091412 A1 | 4/2005 | Pinkerton et al. | |
| 2005/0097191 A1 | 5/2005 | Yamaki et al. | |
| 2005/0138226 A1 | 6/2005 | Tateyama et al. | |
| 2005/0186988 A1 | 8/2005 | Lim et al. | |
| 2005/0254456 A1 | 11/2005 | Sakai et al. | |
| 2005/0271022 A1 | 12/2005 | Osawa et al. | |
| 2006/0250973 A1 | 11/2006 | Trott | |
| 2006/0291502 A1 | 12/2006 | Kalofonos | |
| 2007/0057762 A1 | 3/2007 | Han et al. | |
| 2007/0064733 A1 | 3/2007 | Osawa et al. | |
| 2008/0008165 A1 | 1/2008 | Ikeda et al. | |
| 2008/0126554 A1 | 5/2008 | Sakai et al. | |
| 2008/0145058 A1 | 6/2008 | Fukae et al. | |
| 2008/0189422 A1 | 8/2008 | Naoe et al. | |
| 2008/0279560 A1 | 11/2008 | Osawa et al. | |
| 2008/0279562 A1 | 11/2008 | Naoe et al. | |
| 2008/0291941 A1 | 11/2008 | Sakai et al. | |
| 2008/0313518 A1 | 12/2008 | Naoe et al. | |
| 2009/0190502 A1 | 7/2009 | Mameda et al. | |
| 2009/0262661 A1 | 10/2009 | Ueda et al. | |

FOREIGN PATENT DOCUMENTS

| | | | |
|---|---|---|---|
| CN | 1167380 A | 12/1997 | |
| CN | 1394029 A | 1/2003 | |
| EP | 0 584 464 A1 | 3/1994 | |
| EP | 0 886 410 A2 | 12/1998 | |
| EP | 1 359 724 A1 | 11/2003 | |
| EP | 1 531 646 A1 | 5/2005 | |
| EP | 1 657 924 A1 | 5/2006 | |
| EP | 1 780 984 A1 | 5/2007 | |
| JP | 58-56200 A | 4/1983 | |
| JP | 62-029238 A | 2/1987 | |
| JP | 10-98435 A | 4/1989 | |
| JP | 01-164140 A | 6/1989 | |
| JP | 1-164140 A | 6/1989 | |
| JP | 2-16847 A | 1/1990 | |
| JP | 02-041050 A | 2/1990 | |
| JP | 2-281830 A | 11/1990 | |
| JP | 2281830 A | 11/1990 | |
| JP | 3-70059 A | 3/1991 | |
| JP | 03-070059 A | 3/1991 | |
| JP | 03-098338 A | 4/1991 | |
| JP | 3-98338 A | 4/1991 | |
| JP | 3-139935 A | 6/1991 | |
| JP | 3-139935 A | 6/1991 | |
| JP | 04-000839 A | 1/1992 | |
| JP | 4-839 A | 1/1992 | |
| JP | 4-269031 A | 9/1992 | |
| JP | 4-269031 A | 9/1992 | |
| JP | 4-271567 A | 9/1992 | |
| JP | 04-291556 A | 10/1992 | |
| JP | 4-291556 A | 10/1992 | |
| JP | 5-30150 A | 2/1993 | |
| JP | 05-030150 A | 2/1993 | |
| JP | 5-175985 A | 7/1993 | |
| JP | 05-175985 A | 7/1993 | |
| JP | 05-260124 A | 8/1993 | |
| JP | 5-260124 A | 10/1993 | |
| JP | 06-070383 A | 3/1994 | |
| JP | 6-70383 A | 3/1994 | |
| JP | 6-152687 A | 5/1994 | |
| JP | 6-152691 A | 5/1994 | |
| JP | 07-15485 A | 1/1995 | |
| JP | 7-15485 A | 1/1995 | |
| JP | 7-46292 A | 2/1995 | |
| JP | 07-046292 A | 2/1995 | |
| JP | 8-191271 A | 7/1996 | |
| JP | 8-195785 A | 7/1996 | |
| JP | 8195785 A | 7/1996 | |
| JP | 8314831 A | 11/1996 | |
| JP | 9-135210 A | 5/1997 | |
| JP | 9-154176 A | 6/1997 | |
| JP | 09-224069 A | 8/1997 | |
| JP | 9-224069 A | 8/1997 | |
| JP | 9-284696 A | 10/1997 | |
| JP | 09-312674 A | 12/1997 | |
| JP | 9-312674 A | 12/1997 | |
| JP | 10-098435 A | 4/1998 | |
| JP | 10-107737 A | 4/1998 | |
| JP | 10-126758 A | 5/1998 | |
| JP | 10-145452 A | 5/1998 | |
| JP | 10-290348 A | 10/1998 | |
| JP | 10-308791 A | 11/1998 | |

| | | |
|---|---|---|
| JP | 11-4306 A | 1/1999 |
| JP | 11-154908 A | 6/1999 |
| JP | 11317724 A | 11/1999 |
| JP | 2000-010745 | 1/2000 |
| JP | 2000-31993 A | 1/2000 |
| JP | 2000-032000 | 1/2000 |
| JP | 2000-32000 A | 1/2000 |
| JP | 2000-069403 A | 3/2000 |
| JP | 2000069403 A | 3/2000 |
| JP | 2000-101605 A | 4/2000 |
| JP | 2000-196622 A | 7/2000 |
| JP | 2000-196654 A | 7/2000 |
| JP | 2000-332688 A | 11/2000 |
| JP | 2000-349782 A | 12/2000 |
| JP | 2001-60912 A | 3/2001 |
| JP | 2001-69297 A | 3/2001 |
| JP | 2001-083948 A | 3/2001 |
| JP | 2001-145164 A | 5/2001 |
| JP | 2001-202281 A | 7/2001 |
| JP | 2001-308955 A | 11/2001 |
| JP | 2002-509378 A | 3/2002 |
| JP | 2002-135260 A | 5/2002 |
| JP | 2002-158730 A | 5/2002 |
| JP | 2002-223466 A | 8/2002 |
| JP | 2002-223466 A | 8/2002 |
| JP | 2002-232507 A | 8/2002 |
| JP | 2003-069610 A | 3/2003 |
| JP | 2003-69610 A | 3/2003 |
| JP | 2003-508728 A | 3/2003 |
| JP | 2003-101554 A | 4/2003 |
| JP | 2003-110579 A | 4/2003 |
| JP | 2003-218936 A | 7/2003 |
| JP | 2003-258880 A | 9/2003 |
| JP | 2003-263403 A | 9/2003 |
| JP | 2004-41375 A | 2/2004 |
| JP | 2004-64533 A | 2/2004 |
| JP | 2004-94555 A | 3/2004 |
| JP | 2004-104441 A | 4/2004 |
| JP | 2004-104441 A1 | 4/2004 |
| JP | 2004177586 A | 6/2004 |
| JP | 2004-236108 A | 8/2004 |
| JP | 2004-343246 A | 12/2004 |
| JP | 2004-64533 A | 9/2005 |
| JP | 2005-354652 A | 12/2005 |
| JP | 2006-211425 | 8/2006 |
| JP | 2006-211425 A | 8/2006 |
| JR | 2004-94555 A | 3/2004 |
| WO | WO 99/31814 A1 | 6/1999 |
| WO | WO-0223885 A1 | 3/2002 |
| WO | 03/003767 A1 | 1/2003 |
| WO | WO-2006080357 | 8/2006 |

OTHER PUBLICATIONS

Infrared Data Association Serial Infrared Physical Layer Specification Version 1.4 May 30, 2001.
Office Action for Co-Pending U.S. Appl. No. 12/092,937 dated Oct. 27, 2010.
Office Action dated Jan. 7, 2011 for co-pending U.S. Appl. No. 11/883,253.
Office Action dated Jul. 11, 2011 for U.S. Appl. No. 11/883,253.
H. Naoe et al., IrDA Next Generation High-Speed Infrared Communications Standards 'IrSimple', The Institute of Image Electronics Engineers of Japan, vol. 35, pp. 598-602 (2006).
H. Naoe et al., "Standardization of IrSimple, a High-Speed Infrared Communications Protocol", Sharp Technical Journal, Feb. 2007, vol. 95, pp.63-68, URL: http://www.sharp.co.jp/corporate/rd/30/pdf/95_13.pdf.
Office Action dated Nov. 30, 2010 for U.S. Appl. No. 10/577,337.
Hitoshi Naoe et al., "Standardization of IrSimple, a High-Speed Infrared Communications Protocol", Sharp Technical Journal, vol. 95, pp. 63-68 Feb. 2007 URL: <http://www.sharp.co.jp/corporate/rd/03/pdf/95—13.pdf>.
Hitoshi Naoe et al., "IrDA Next Generation High-Speed Infrared Communications Standards "IrSimple"", Technical Report of IEICE, The Institute of Image Electronics Engineers of Japan, vol. 35, pp. 598-602, 2006.
Mitsuji Matsumoto et al., "An Evaluation of the Optical Wireless System in the Mobile Environment in the Room", Technical Report of IEICE, The Institute of Electronics, Information and Communication Engineers, pp. 1-7, Jan. 28, 2000.
Hitoshi Naoe et al., "Standardization Proposal of High Efficiency Protocols by using Infrared Data Association", B-10-54, Conference Presentation, Institute of Electronics Information and Communication Engineers (IEICE), p. 344, Technical Reports published Sep. 7, 2005; with PowerPoint Presentation, Mar. 2005.
Hitoshi Naoe et al., "High Efficiency Protocols (IrSimple) Using Infrared Communication—IrSimple Profile and Protocols at Infrared Data Association", B-15-14, Conference Presentation, Institute of Electronics, Information and Communication Engineers (IEICE), 1 page. Technical Reports published Sep. 7, 2005; with PowerPoint Presentation, Mar. 2005.
"Infrared Data Association Serial Infrared Physical Layer Specification", Version 1.4, pp. i-iv & 1-60, May 30, 2001.
Timothy Willliams et al., "Infrared Data Association Serial Infrared Link Access Protocol (IrLAP)", Version 1.1, pp. 1-116, Jun. 16, 1996.
Andy Seaborne et al., "Infrared Data Association Link Management Protocol (IrLAP)", Version 1.1, pp. 1-98, Jan. 23, 1996.
Stuart Williams et al., "Infrared Data Association 'Tiny TP': A Flow-Control Mechanism for use with IrLMP" Version 1.1, pp. 1-17, Oct. 20, 1996.
Pat Megowan et al., "Infrared Data Association® (IrDA®) Object Exchange Protocol OBEX™", Version 1.3, pp. 1-95, Jan. 3, 2003.
Hitoshi Naoe et al., "Infrared Data Association IrDA Serial Infrared Sequence Management Protocol for IrSimple", Version 1.00, pp. 1-64, Oct. 14, 2005.
Hitoshi Naoe et al., "Infrared Data Association IrDA Serial Infrared Link Management Protocol Specification for IrSimple Addition—Errata to IrLMP Version 1.1", Version 1.00, pp. 1-27, Oct. 14, 2005.
Hitoshi Naoe et al., Infrared Data Association IrSimple (Infrared Simple) Profile, Version 1.00, pp. 1-30, Oct. 14, 2005.
Hitoshi Naoe et al., "Infrared Data Association IrDA Serial Infrared Link Access Protocol Specification for IrSimple Addition—Errata to IrLAP Version 1.1", Version 1.00, pp. 1-65, Oct. 14, 2005.
Kuniko Yamaguchi et al., "Implementation of IrSimple for Mobile Phones", B-15-15, Paper for Institute of Electronics, Information and Communication Engineers (IEICE), Communication Society Conference, 2005 p. 618.
Hitoshi Naoe et al., "IrSimple Profile and Protocols At Infrared Data Association", B-15-14, IECE Society Conference Abstracts, p. 617, 2005.
Glade Diviney et al., "Infrared Data Association IrLAP Fast Connect (Application Note)" Version 1.0, Nov. 27, 2002, pp. 1-17.
Mitsuji Matsumoto et al., "An evaluation of the Optical Wireless . . . " Technical Report of IEICE, The Institute of Electronics, Information and Communication Engineers, Jan. 28, 2000, pp. 1-7, with translation.
Standardization Proposal of High Efficiency Protocols by using Infrared Data Association (IEICE Communications Society Conference 2005; Technical Reports published on Sep. 7, 2005), with translation.
Naoe et al., High Efficiency Protocols (IrSimple) Using Infrared Communication (IEICE Communications Society Conference 2005; Technical Reports published on Sep. 7, 2005).
Infrared Data Association Serial Infrared Physical Layer Specification Version 1.4 Feb. 6, 2001.
Infrared Data Association Serial Infrared Link access Protocol (IrLAP) Version 1.1 Jun. 16, 1996.
Infrared Data Association Link Management Protocol Version 1.1 Jan. 23, 1996.
Infrared Data Association® (IrDA®) Object Exchange Protocol OBEX™ Version 1.3 Jan. 3, 2003.
IrDA Serial Infrared Sequence Management Protocol for IrSimple Version 1.00 Oct. 14, 2005.
IrDA Serial Infrared Link Management Protocol Specification for IrSimple Addition Errata to IrLMP Version 1.00 Oct. 14, 2005.
IrSimple (Infrared Simple) Profile Version 1.00 Oct. 14, 2005.
IrDA Serial Infrared Link Access Protocol Specification for IrSimple Addition Errata to IrLAP Version 1.1 Version 1.00 Oct. 14, 2005.

Infrared Data Association "Tiny TP": A Flow-Control Mechanism for use with IrLMP Version 1.1, Oct. 20, 1996.

Timothy Williams, Infrared Data Association Serial Infrared Link Access Protocol (IrLAP), Jun. 16, 1996, pp. 1-119.

U.S. Office Action mailed Feb. 14, 2012 for U.S. Appl. No. 11/883,253.

European Search Report for European Patent Application No. 06823304.8 mailed Apr. 5, 2012.

European Search Report for European Patent Application No. 05768854.1 mailed Apr. 27, 2012.

V. Vitsas et al. "Optimization of IrDA IrLAP Link Access Protocol", Sep. 2003, IEEE, vol. 2, pp. 926-938.

Kitazumi e al. A Proposal of next generation proximity infrared communication- Optimization of IrDA protocol by IrSimple- The Institute of Image Electronics Engineers of Japan, with translation.

Gontaro Kitazumi et al., "A Proposal of next generation proximity infrared communication—Optimization of IrDA protocol by IrSimple—" Institute of Image Electronics Engineers of Japan, IIEEJ Technical Report, 2 pages.

* cited by examiner

STATION: COMPUTER, MOBILE PHONE, PORTABLE INFORMATION
TERMINAL (ELECTRONIC NOTEBOOK), TV

FIG. 22
(a)
I FRAME
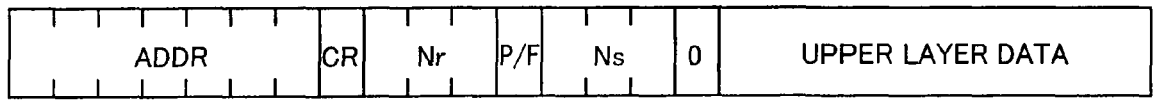
(b)
UI FRAME
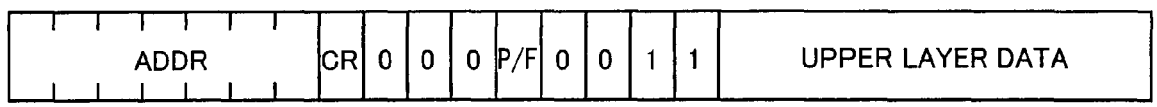
FIG. 23
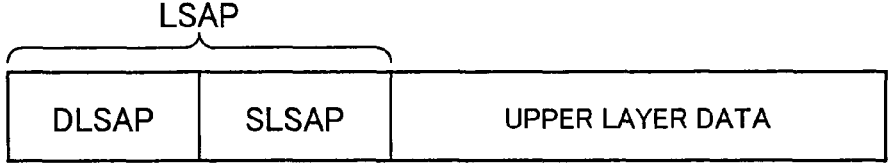
FIG. 24
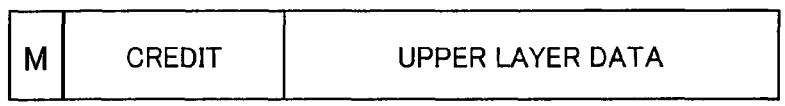

| Put (not Final or Final) | Packet Length | Name | File Length | Body |

(b)

| Continue | Packet Length |

(c)

| Success | Packet Length |

CASE OF TWO-WAY COMMUNICATION

| DL | BL | RS | Sequence Number | UPPER LAYER DATA |
|----|----|----|-----------------|------------------|

(b)

CASE OF ONE-WAY COMMUNICATION

| DL | Sequence Number | UPPER LAYER DATA |
|----|-----------------|------------------|

FIG. 48

(a) MCU (Minimum Coding Unit) 8×8

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

(b) MCU (8×16)

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

(c) MCU (16×8)

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

(d) MCU (16×16)

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

FIG. 64
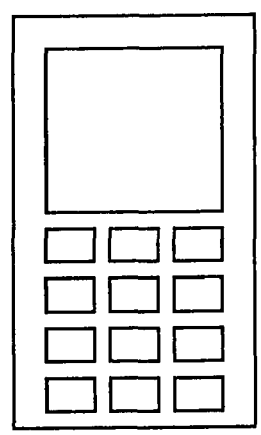
MOBILE PHONE A
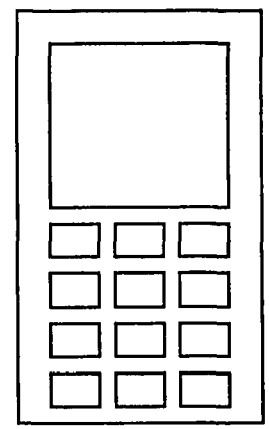
MOBILE PHONE B
FIG. 65
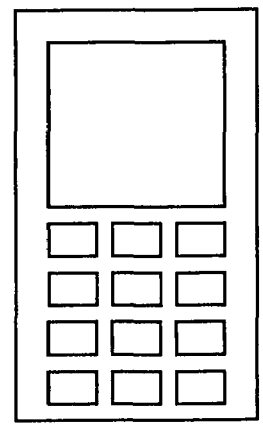
MOBILE PHONE A
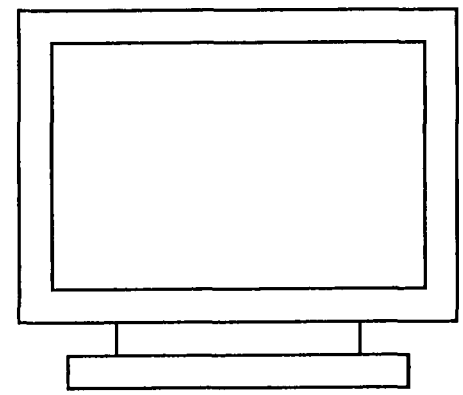
DISPLAY DEVICE B FIG. 66
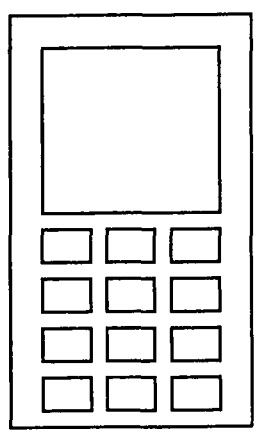
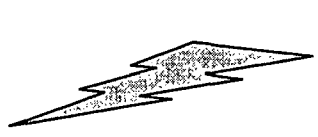
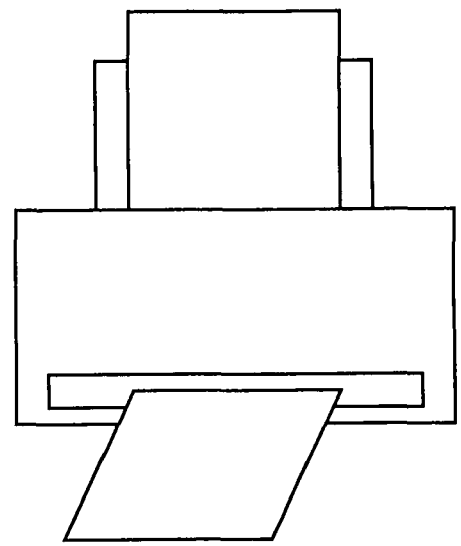
MOBILE PHONE A
PRINTING DEVICE B
FIG. 67
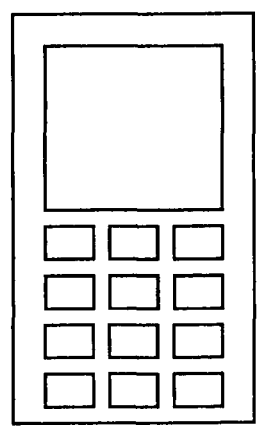
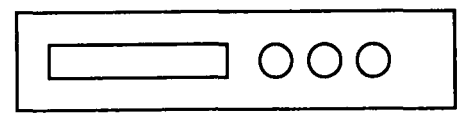
MOBILE PHONE A
RECORDING DEVICE B FIG. 73
(a)
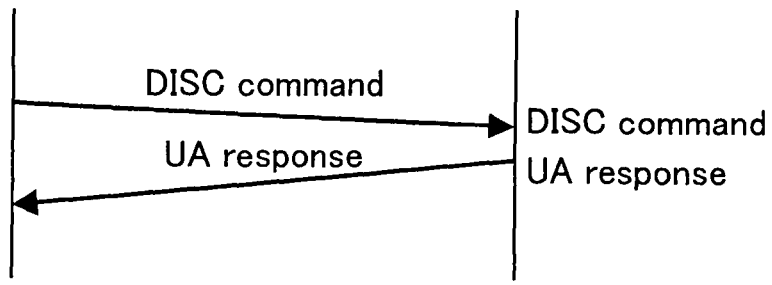
(b)
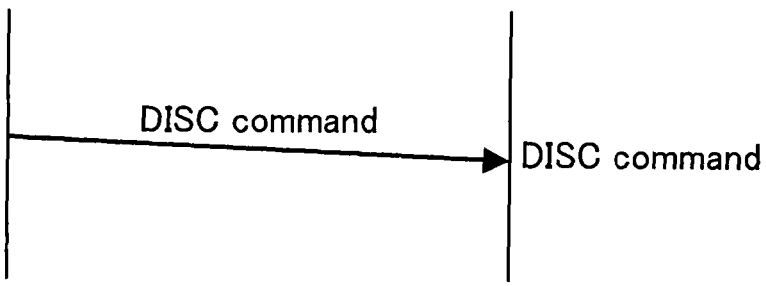
(c)
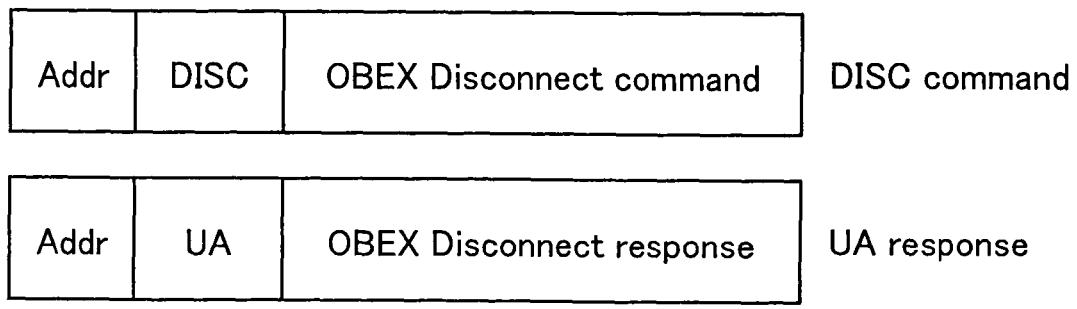

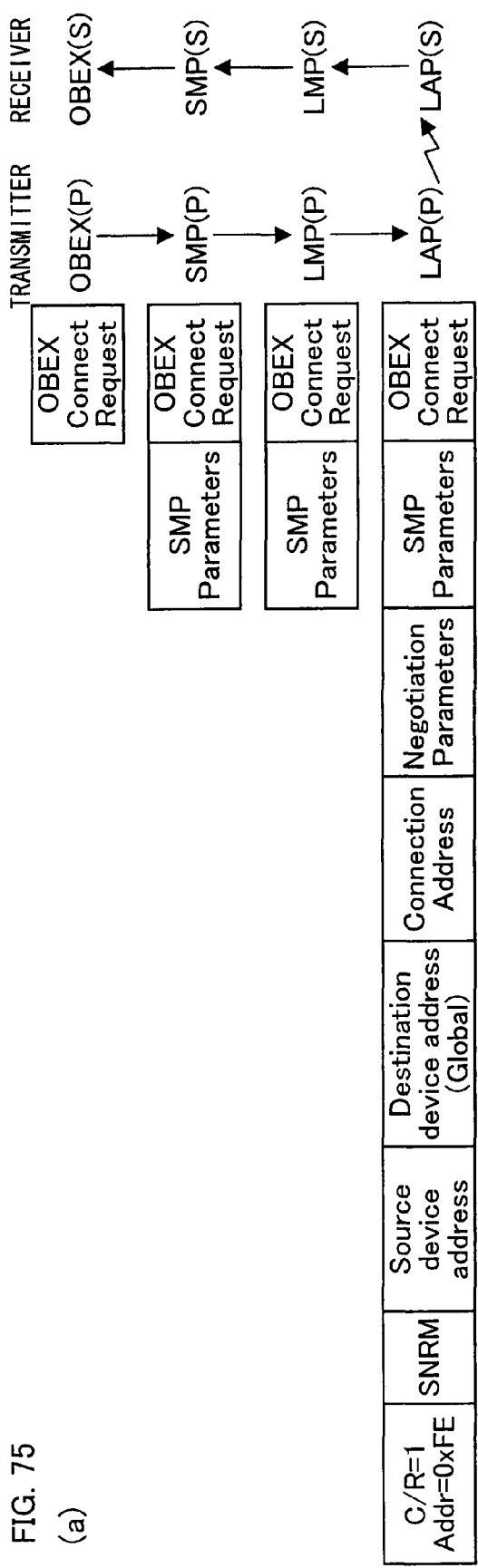
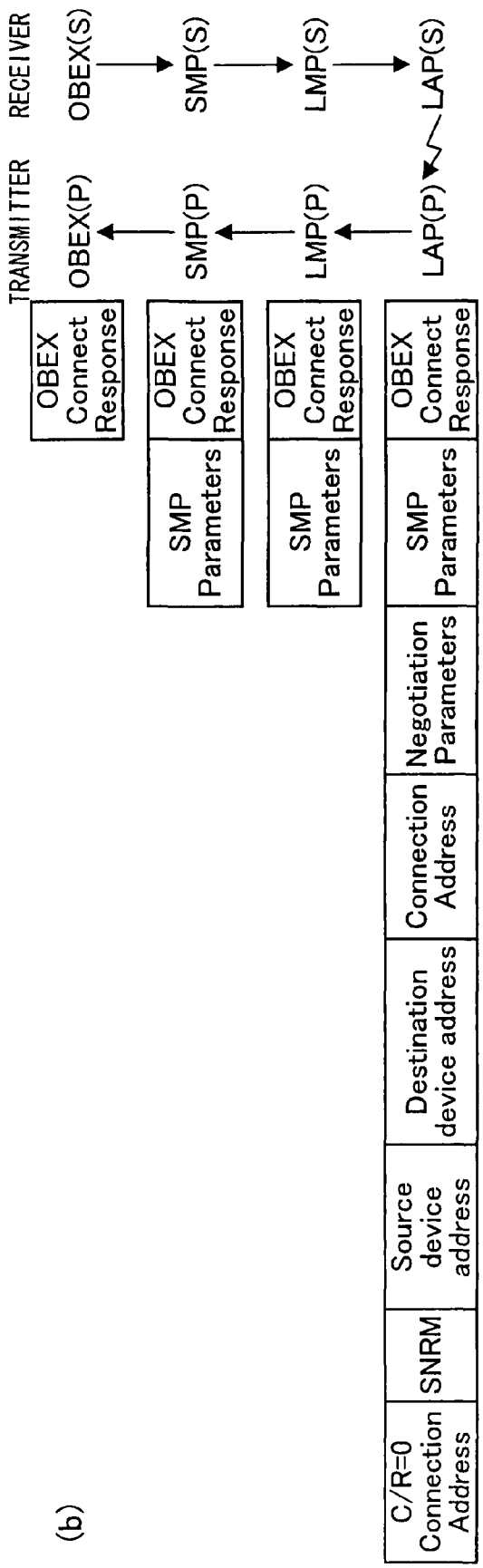
FIG. 75

FIG. 81
(a)
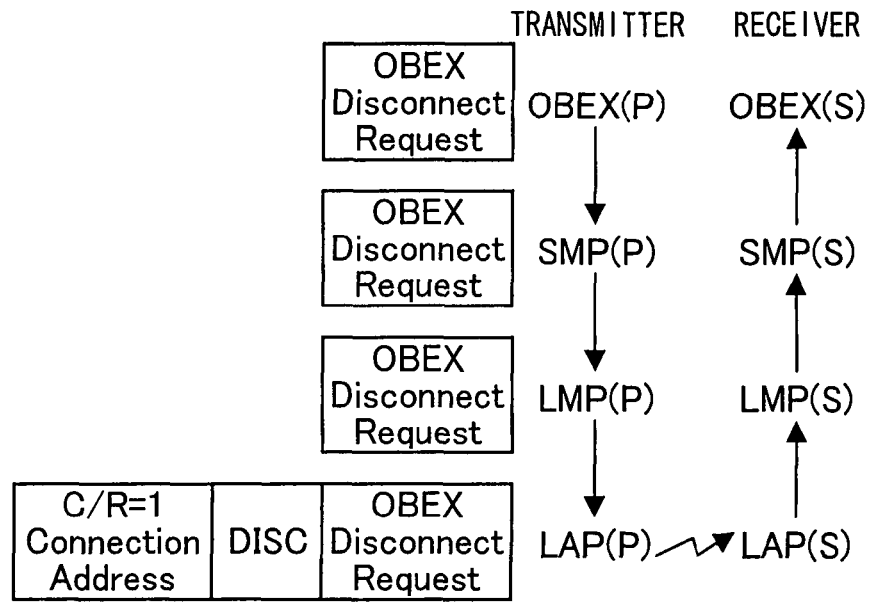
(b)
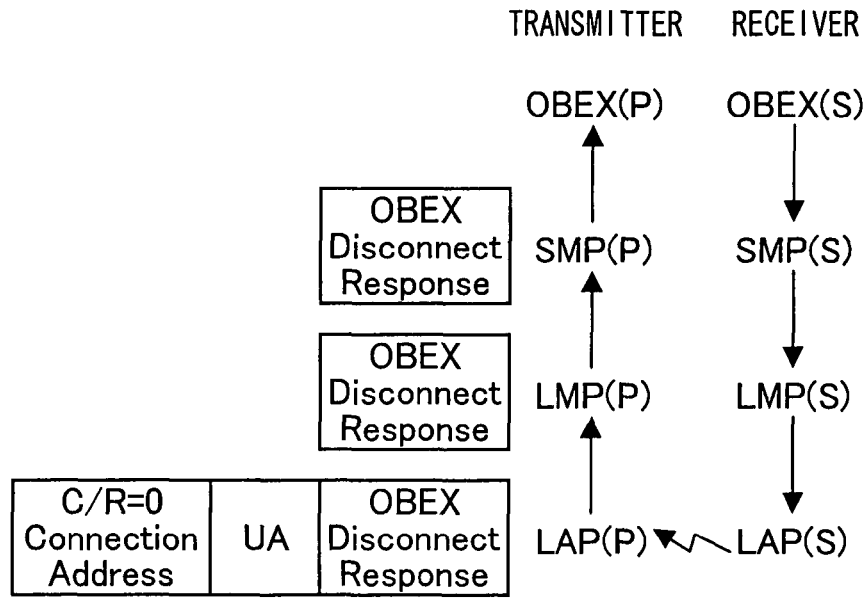

COMMUNICATION DEVICE, NON-TRANSITORY COMPUTER-READABLE MEDIUM STORING A COMMUNICATION PROGRAM

TECHNICAL FIELD

The present invention relates to a communication device, a communication system, a communication method, a communication program, and a communication circuit, each of which allows for transmission/reception of data.

BACKGROUND ART

In recent years, an infrared communication system is widely used for data exchanging amongst portable electronic devices (mainly amongst personal mobile terminals such as mobile phones, laptop personal computers, electronic notebooks, or the like) or data exchanging between these devices and desktop personal computers or infrared-supporting printers.

Examples of communication schemes adopted in an infrared communication system are IrDA (Infrared Data Association), and ASK (Amplitude Shift Keying), or the like. Of these methods, widely spread in general is IrDA which is a communication protocol for infrared communication. This communication protocol was defined on the basis of HDLC (High-Level Data Link Control) communication scheme which is a method for high-speed and highly-efficient data transferring between computers.

Amongst computers, data transmission is generally performed through packet exchanging in which packets each including data of a certain volume, sequence number added prior to and/or subsequent to the data, and information indicating an address or the like is transmitted or received. Each of the packets used in HDLC communication scheme and IrDA communication scheme is referred to as a "frame", and is administrated by an IrLAP layer.

Each frame includes fields of an address (A), control (C), information (I), and a frame control sequence (FCS), and flags added at the head and tail of the frame. There are various kinds of frames, such as an I (Information) frame for information transfer, an S (Supervisory) frame for supervision/control of communication, or a U (Unnumbered) frame for (i) connection or shutdown of communication or (ii) data communication or the like in which no data retransmission is performed.

Since data transmission cannot be completed within one frame in most cases, the data is divided into plural I frames or plural UI frames. Each of I frames contains data to be transmitted in the data field, and is given a sequence number by which any omission of data can be found. With this arrangement, highly-reliable communication is realized. Each of UI frames contains data to be transmitted in an I field, but is not given a sequence number by which any omission of data can be found.

The S frame has no I field for containing data, and is used for transmission of notification of condition, such as establishment of communication, or a busy state, or used for a request for retransmission or the like. The U flame is called a non-numerical frame as it has no sequence number like those of the I frames. The U frame is used for setting of communication mode, report of response and irregular condition, or establishment of data link.

As mentioned before, IrDA communication scheme is based on the HDLC communication scheme. However, a communication scheme in general could be either full-duplex transmission method in which transmission and reception are simultaneously performed, or a half-duplex communication scheme in which transmission and reception are not simultaneously performed. In a case of a half-duplex communication scheme, it is necessary to define a signal for switching transmission and reception.

In HDLC method, a full-duplex method can be adopted. However, in IrDA communication scheme, data transmission is performed by using a base-band modulated infrared ray which propagates in the free space. Therefore, an interference of infrared occurs, when two or more stations within a communication range simultaneously perform transmission. Accordingly, proper communication can not be performed.

For this reason, IrDA communication scheme adopts a semi-duplex method in which transmission before establishment of a communication link is performed only if no infrared exists within a communication range, and after the communication link is established, a transmission right is periodically exchanged between two stations in communication.

FIG. 19 shows how a communication link is established in IrDA. In IrDA, a connection with a link layer (LAP layer) is established as follows. A primary station transmits an SNRM command. Then, in response to the command, a secondary station transmits a UA response. Each of the SNRM command and the UA response contains various parameters (data transmission speed, maximum data length, etc.). With these parameters, the stations in communication is able to know communication parameters of the station on the other side. Thus, data transmission is performed with most efficient communication parameters.

FIG. 9 is a block diagram showing an application of the communication scheme. In HDLC communication scheme or IrDA communication scheme, what performs transmission or reception is referred to as "station". In general, communication between (i) the primary station which performs data link control for controlling communication and (ii) the secondary station which complies with the control of the primary station is performed by transmitting/receiving between these stations the above described frame as a command (Primary Station® secondary station) or a response (Secondary Station® primary station). This is called an unbalanced communication scheme. As shown in the figure, a computer, mobile phone, electronic notebook or the like, or a TV or the like functions as a station during communication, and performs data exchanging by using infrared as a transmission medium.

FIG. 10 is a signal sequence diagram for illustrating a typical process using the I frames in these communication schemes. In this diagram, data which is divided into plural I frames is transmitted from a station A (primary station) to a station B (secondary station). Note that a window size (the number of I frames transmitted at once without interruption) is 3.

First, the station A respectively gives numbers "0", "1", and "2" to the frames corresponding to the data to be transmitted, and transmits the frames as I frames. Frames of with the respective sequence numbers "0" and "1" are transmitted with a P/F (Pole/Final) bit being set to 0, so that the transmission right is not transferred to the secondary station. Further, a frame with the sequence number of "2" is transmitted with the P/F bit set to 1, so that the transmission right is transferred to the secondary station.

The station B receives the frames respectively with the sequence numbers "0", "1", and "2". After the frame with the sequence number "2" and the P/F bit set to 1 is received, and if all the frames are properly received, the station B requests transmission of a third data item by transmitting in reply a response frame with a number "3" which is the subsequent number to "2". This response frame is an S frame called RR frame. When the RR frame is transmitted from the secondary station, the R/F bit of the RR frame is set to 1, so that the transmission right is transferred to the primary station.

When the station A confirms the response from the station B, the station A transmits data items starting from the third data, with sequential numbers "3", "4", and "5" being respectively added to the data items. By repeating these steps as many times as needed, it is possible to improve the accuracy of plural frame communication. If an error or an omission of data item is detected in the station B, retransmission is possible by: (I) the station B transmitting an RR frame including the data number needed to be retransmitted; and (II) the station A retransmitting the frames starting from the data number needed to be retransmitted.

In data transmission using I frames, the number of frames which can be transmitted at once from the primary station is regulated by the window size. This window size is 7 at the maximum in IrLAP (Infrared Link Access Protocol)(Ver 1.1) of IrDA. This may cause deterioration of communication efficiency in the case of transmitting a large volume of data under such a communication condition that no error occurs, because a response frame is transmitted from the secondary station at every window size.

FIG. 11 is a signal sequence diagram showing a general procedure of these communications using UI frames. In this example, shown is a case where data is divided into plural UI frames and transmitted from an station A to a station B. Transmission of data in the form of UI frames is not restricted by the window size, and therefore the station A is able to successively transmit frames for the maximum turn-around period. After the maximum turn-around period of the station A elapses, an RR frame for transferring the transmission right is transmitted to the secondary station.

A maximum turn-around period is a period during which a station is able to retain the transmission right. If the transmission right is transferred to an opposite station, and if no response is received from the opposite station even after the elapse of the maximum turn-around period, the station having transmitted the transmission right is able to know that the frame for transferring transmission right did not reach the opposite station. The maximum turn-around period of the opposite station station can be known by exchanging parameters at the time of establishing the connection. In IrLAP, the maximum turn-around time is defined as to be 500 ms.

If the station B having received the transmission right by the RR frame has no transmission data transmission request within itself, the station B transfers back the transmission right to the primary station by transmitting an RR frame with the P/F bit set to 1.

Unlike data transmission using I frames, retransmission is not performed in data transmission using UI frames. This however is advantageous in terms of communication efficiency, when communication is performed under conditions where the quality of communication path is good and therefore an error hardly occurs. Because, under such conditions, the station A is able to continuously transmit frames for a period of 500 ms at the maximum.

FIG. 18 illustrates the standard IrDA protocol stack. The IrDA protocol stack includes: IrPHY (IrDA Physical Layer), IrLAP (IrDA Link Access Protocol), IrLMP (IrDA Link Management Protocol), TinyTP (Transport Protocol), and OBEX (Object Exchange protocol). IrPHY defines a modulation method, signal intensity, directivity, and the like. IrLAP defines an error control function, transparent transmission, and flow control, each of which is in accordance with the multipurpose HDLC (High level Data Link Control). Moreover, IrLAP defines (i) a function of making negotiations with its counterpart about communication speed and/or a maximum data size before starting communication therebetween; (ii) a procedure of searching and finding an unspecified external device to which the device is to be connected; and the like. IrLMP provides a multiplexing/demultiplexing function corresponding to the port number used in TCP or UDP of TCP/IP protocol (Transmission Control Protocol/Internet Protocol). Tiny TP is used for flow control in an individual logic link. OBEX is a communication protocol for exchanging objects by means of transmission/reception (i.e. data communication).

Generally, examples of such a response command defined by OBEX include: (i) a CONNECT command for connecting the client device to the server device with which the client device is to communicate; (ii) a DISCONNECT command for disconnecting the client device from the server device with which the client device is being communicated; (iii) the PUT command for sending an object such as a file; (iv) the GET command for receiving an object such as a file; (v) a SET-PATH command for changing a path (current path), to which an object is to be sent, of the sever device; and (vi) an ABORT command for forcefully aborting transmission and/or reception of an object.

FIG. 20 illustrates a basic case where the client device sends such a request command to the server device and where the client device sends such a response command to the client device in reply. When the client device receives an object exchange request from a user, the client device sends the CONNECT command to the server device in order to establish a connection with the server device. The CONNECT command represents the connection request.

The server device receives the CONNECT command, and sends a SUCCESS response command to the client device in cases where the server device is connectable to the client device. The client device receives the SUCCESS response command, with the result that connection is established between the client device and the server device.

After the connection is established, the client device starts exchanging objects with the server device. Specifically, the client device sends, to the server device, a PUT command for sending an object. When the server device receives normally the PUT command from the client device, the server device sends a CONTINUE response command to the client device. The client device receives the CONTINUE response command from the server device, and therefore confirms that the server device has received the PUT command normally. Thereafter, the client device sends a next PUT command to the server device. The client device sends PUT commands to the server device until the client device finishes sending all the objects. When the server device has finished receiving these PUT commands normally up to the final PUT command, the server device sends a SUCCESS response command to the client device.

The client device receives the SUCCESS response command from the server device, and then sends the DISCONNECT command to the server device so as to carry out a process for disconnecting the client device from the server device. The DISCONNECT command represents a disconnection request.

When the server device receives the DISCONNECT command, the server device sends, to the client server, a SUCCESS response command, which represents permission for the disconnecting. The client device receives the SUCCESS response command, with the result that the client device is disconnected from the server device. In this way, the series of the object exchange between the client device and the server device are completed.

As such, the object exchange using OBEX is carried out in such a manner that: the client device sends a request command to the server device, and the server device sends a response command to the client device in reply.

Further, as is the case with the aforementioned IrDA protocol stack, communication protocols in a hierarchical structure such as OSI respectively are used in layers, each of which defines header information independent from those respectively defined by the other layers. Therefore, in each of the layers, such header information is rendered to data to be sent from one computer to another. The rendering of the header information is carried out in the layers in order from the uppermost layer to the bottom layer.

On the other hand, received data is passed on one by one from the bottom layer to the uppermost layer, after removing corresponding header information therefrom in each of the layers.

Japanese Unexamined Patent Publication No. 308791/1998 (Tokukaihei 10-308791; Published on Nov. 17, 1998)

However, the above-mentioned conventional configuration has the following problem. Namely, in data transmission using UI frames, frames are continuously transmitted for the maximum of 500 ms and the communication efficiency is therefore improved, provided that the communication is performed under such a condition that the quality of communication path is good and therefore an error hardly occurs. However, if the communication is performed via communication path whose quality is not so good, using of UI frames for data transmission may deteriorate the communication efficiency. This is because, unlike the communication using I frames, no retransmission is performed when using UI frames.

Further, a conventional IrDA does not support data transmission through one-way communication in which no response is required.

DISCLOSURE OF INVENTION

An object of the present invention is to provide a communication device, communication system, communication method, communication program, and communication circuit each of which allows retransmission of a frame in data transmission.

In order to achieve the object, a communication device of the present invention which performs batched data transmission, without transferring a transmission right, according to a communication scheme which does not limit the number of frames transmittable at once, includes: transmission frame generating means for generating transmission frames by dividing batch-transmission data to be transmitted in batch; sequence number generating means for giving a sequence number to each of the transmission frames; batch-transmission-end flag generating means for setting, in a final transmission frame of the batch-transmission data, a batch-transmission-end flag which indicates that the frame is the final transmission frame of the batch-transmission data; and transmission means for transmitting the transmission frames.

Further, a communication method of the present invention which performs batched data transmission, without transferring a transmission right, according to a communication scheme which does not limit the number of frames transmittable at once, said method includes the steps of: (A) generating transmission frames by dividing batch-transmission data to be transmitted in batch; (B) giving a sequence number to each of the transmission frames; (C) setting, in a final transmission frame of the batch-transmission data, a batch-transmission-end flag which indicates that the frame is the final transmission frame of the batch-transmission data; and (D) transmitting the transmission frames.

Further, a communication device of the present invention which performs batched data reception without receiving a transmission right, according to a communication scheme which does not limit the number of frames transmittable at once, includes: sequence number analyzing means for analyzing a sequence number contained in each reception frame, so as to judge whether or not there is an error in the sequence numbers; transmission frame generating means for generating a transmission frame containing a no-error flag set to indicate that an error is found and the sequence number of the error-frame, if (a) the batch-transmission-end flag in a frame having been received indicates that the received frame is the final one of transmission frames into which batched-transmission data has been divided and which have been transmitted in batch from the transmitter, and (b) said sequence number analyzing means has detected an error in any of frames having been received; transmission means for transmitting the transmission frame.

Further, a communication method of the present invention which performs batched data reception, without receiving a transmission right, according to a communication scheme which does not limit the number of frames transmittable at once, said method includes the steps of: (A) analyzing a sequence number contained in each reception frame for judging whether or not there is an error in the sequence numbers; (B) generating a transmission frame containing a no-error flag set to indicate that an error is found and the sequence number of the error-frame, if (a) the batch-transmission-end flag in a frame having been received indicates that the received frame is the final one of transmission frames into which batched-transmission data has been divided and which have been transmitted in batch from the transmitter, and (b) said sequence number analyzing means has detected an error in any of frames having been received; and (C) transmitting the transmission frames.

Further, a communication system of the present invention includes: the above described communication device serving as a transmitter; and the above described communication device serving as a receiver.

In the above described structure and method, the following operations are performed, when transmitting data in batch without transferring the transmission right according to the communication scheme which does not limit the number of frames transmittable at once. Namely, the transmitter generates transmission frames by dividing batch-transmission data, and adds a sequence number to each of the transmission frames. Further, the batch-transmission-end flag which indicates that the frame is the final transmission frame of the batch transmission data is set in the final transmission frame of the batch-transmission data. Then, the transmission frames are transmitted. On the other hand, the receiver analyzes the sequence numbers contained in the reception frames so as to judge whether or not there is an error of the sequence numbers. If an error is found in the reception frames, the receiver generates a transmission frame and transmits the transmission frame to the transmitter. The transmission frame contains a no-error flag set to indicate that an error is found, and the sequence number of ??the error-frame??. When the transmitter receives from the receiver the frame containing the sequence number of ??the error-frame??, the transmitter retransmits the transmission frame which corresponds to the sequence number.

Here, the receiver does not transmit the transmission frame containing the sequence number of ??the error-frame??, until the reception of the final transmission frame amongst the transmission frames which are the transmitter-divided batch-transmission data is confirmed with reference to the batch-transmission-end flag contained in the reception frames. In short, notification of error is performed for each set of batch transmission data.

Thus, since detection of an omitted or missing frame or the like and retransmission are possible even with the communication scheme which does not limit the number of frames that can be received or transmitted at once (window size), highly reliable communication is possible. Further, notification of error performed for each set of batch transmission data allows efficient data transmission.

Note that the communication device may be realized by a computer. In this case, the present invention encompasses (i) a communication program of the communication device, which program realizes the communication device by causing a computer to operate as the sections of the communication device, and (ii) a computer-readable recording medium storing the communication program.

Further, the communication device may be realized by a communication circuit functioning as the sections of the communication device.

The communication device is suitable for application in a mobile phone which incorporates the communication device for communication. According to such a mobile phone, communication can be carried out with high quality and/or high transfer efficiency.

Further, the communication device is suitable for a display device that carries out display in accordance with data received by the communication device. According to such a display device, communication can be carried out with high-quality and/or high transfer efficiency.

The communication device is suitable for application in a printing device which prints from the data received by the communication device. According to such a printing device, communication can be carried out with high-quality and/or high transfer efficiency.

Further, the communication device is suitable for a recording device storing data received by the communication device. According to such a recording device, communication can be carried out with high-quality and/or high transfer efficiency.

Additional objects, features, and strengths of the present invention will be made clear by the description below. Further, the advantages of the present invention will be evident from the following explanation in reference to the drawings.

BRIEF DESCRIPTION OF DRAWINGS

FIG. 16 is a signal sequence diagram illustrating a process of embodiment 3 for transferring data, which process is performed in a case where authentication request is issued by an upper layer at a time of authentication or the like.

FIG. 17 is a signal sequence diagram illustrating another process of embodiment 3 for transferring data, which process is performed in a case where authentication request is issued by an upper layer at a time of authentication or the like.

FIGS. 22 (*a*) and (*b*) are explanatory diagrams illustrating frame formats of I frames and UI frames in IrLAP, respectively.

FIG. 23 is an explanatory diagram illustrating a frame format of IrLMP.

FIG. 24 is an explanatory diagram illustrating a frame format in TinyTP layer.

FIGS. 25 (*a*), (*b*), and (*c*) are explanatory diagrams illustrating frame formats of a PUT command, CONTINUE response, and SUCCESS response of OBEX, respectively.

FIGS. 27 (*a*) and (*b*) are explanatory diagrams illustrating frame formats of an SMP frame, where (a) illustrates a frame format for two-way communication according to IrSimple, and (b) illustrates a frame format for one-way communication according to IrSimple.

FIGS. 48 (a), (b), (c) and (d) are explanatory diagrams of JPEG blocks (mcu), where (a) illustrates a block of 8×8, (b) illustrates a block of 8×16, (c) illustrates a block of 16×8, and (d) illustrates a block of 16×16.

FIG. 64 is an explanatory diagram of a communication system of embodiment 15, which adopts the communication system of the present invention.

FIG. 65 is an explanatory diagram of a communication system of embodiment 16, which adopts the communication system of the present invention.

FIG. 66 is an explanatory diagram of a communication system of embodiment 17, which adopts the communication system of the present invention.

FIG. 67 is an explanatory diagram of a communication system of embodiment 18, which adopts the communication system of the present invention.

FIG. 73(a) is an illustration of a disconnection sequence in accordance with an embodiment of the present invention. FIG. 73(b) is an illustration of a disconnection sequence in accordance with an embodiment of the present invention.

FIG. 73(c) is an illustration of packet formats used in a disconnection sequence in accordance with an embodiment of the present invention.

FIG. 75(a) is an illustration of changes of data in functions indicated by rightward arrows between the layers in FIGS. 74 and 76 for a connection sequence in accordance with an embodiment of the present invention. FIG. 75(b) is an illustration of changes of data in functions between the layers in accordance with an embodiment of the present invention.

FIG. 81(a) is an illustration of changes of data in functions indicated by rightward arrows between the layers in FIGS. 80 and 82 for a disconnection sequence in accordance with an embodiment of the present invention. FIG. 81(b) is an illustration of changes of data in functions between the layers in accordance with an embodiment of the present invention.

REFERENCE NUMERALS

Figure 1:
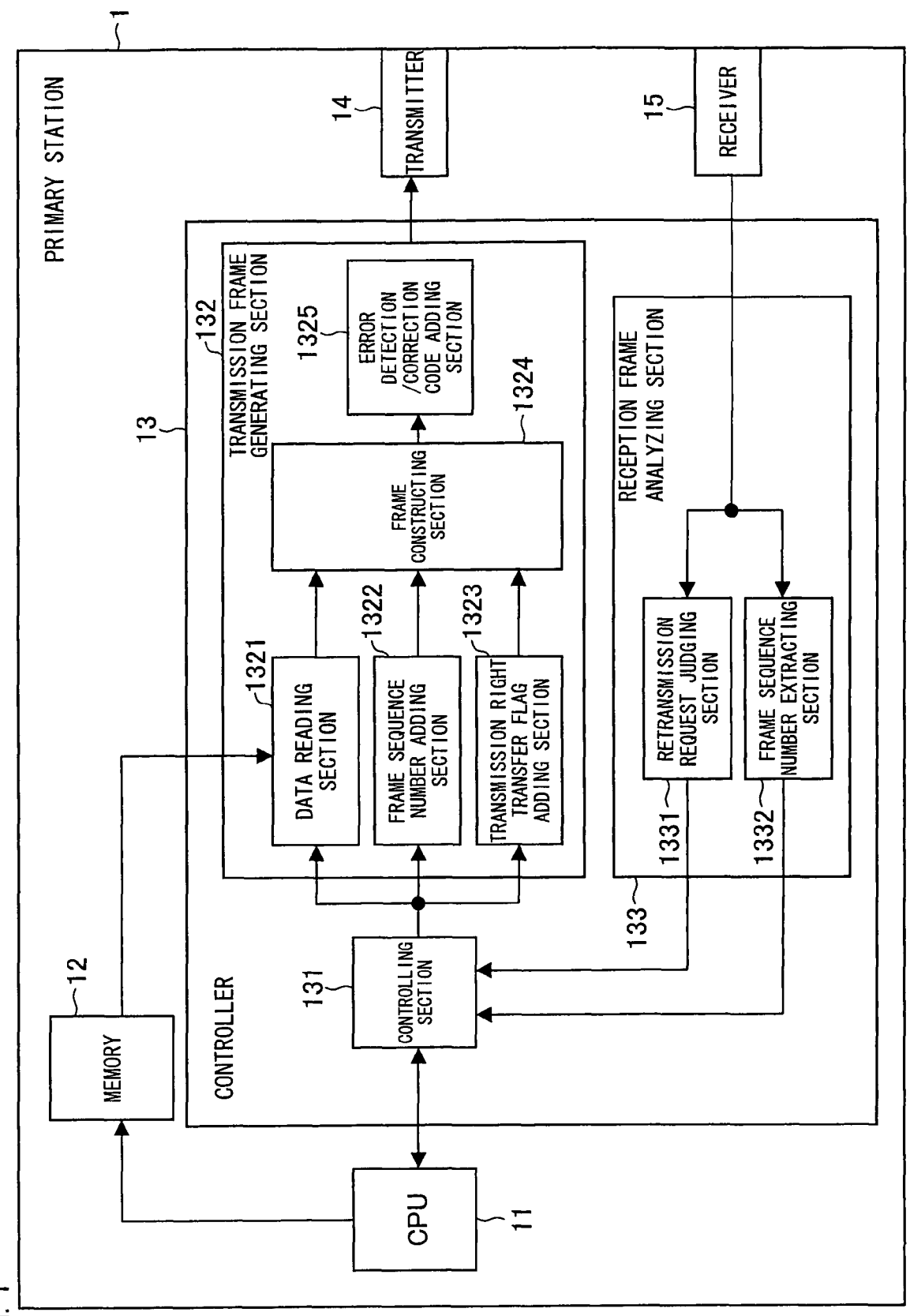
FIG. 1 is a block diagram illustrating a structure of a primary station of embodiment 1, which is for use in a communication system of the present invention.

1 Primary Station
11 CPU
12 Memory
13 Controller
14 Transmitter
15 Receiver
131 Controller
132 Transmission Frame Generation Section
133 Reception Frame Analyzing Section
1321 Data Reading Section
1322 Frame Sequence Number Adding Section
1323 Transmission Right Transfer Flag Adding Section
1324 Frame Constructing Section
1325 Error Detection/Correction Code Adding Section
1331 Retransmission Request Judging Section
1332 Frame Sequence Number Extracting Section
2 Secondary Station
21 CPU
22 Memory
23 Controller
24 Receiver
25 Transmitter
231 Controller
232 Frame Processing Section
233 Error Detection/Correction Circuit
234 Error Frame Number Retaining Section
235 Response Frame Generating Section
236 Error Detection/Correction Code Adding Section
6 Primary Station Or Secondary Station
61 CPU
62 Controller
63 Transmitter
64 Receiver
621 Controller
622 Transmission Frame Generation Section
623 Reception Frame Analyzing Section
6221 Establishing Connection Frame Generation Section
6222 Retransmittable-Frame Number Detecting Section
6231 Frame Analyzing Section
6232 Retransmittable-Frame Number Detecting Section
12 Station (Primary Station Or Secondary Station)
121 Application Layer Processing Section
122 OBEX Layer Processing Section
123 SMP Layer Processing Section
124 IrLMP Layer Processing Section
125 IrLAP Layer Processing Section
126 Transmitter
127 Receiver
1231 Controller
1232 Transmission Frame Generation Section
1233 Reception Frame Generating Section 12321 Response Frame Request Flag Adding Section
12322 Frame Sequence Number Adding Section
12323 Transmission Right Transfer Flag Adding Section
12324 Retransmission Request Flag Adding Section
12325 Frame Constructing Section
12331 Response Frame Request Flag Judging Section
12332 Frame Sequence Number Analyzing Section
12333 Transmission Right Transfer Flag Judging Section
12334 Retransmission Request Judging Section
12335 Upper Layer Data Extracting Section
2001 Transmitter (Primary Station, Client Device)
2002 Controller (Control Means)
2003 Memory (Storage Means)
2004 Batch-Transmission-End Flag Generating Circuit (Batch-Transmission-End Flag Generating Means)
2005 Sequence Number Generating Circuit (Sequence Number Generating Means)
2006 Transmission. Frame Generating Circuit (Transmission Frame Generating Means)
2007 Transmission Section (Transmission Means)
2008 Receiving section (Reception Means)
2009 Reception Frame Analyzing Circuit (Reception Frame Analyzing Means)
2010 No-Error Flag Analyzing Circuit (No-Error Flag Analyzing Means)
2011 Error detecting circuit (Error detecting means)
2012 Sequence Number Analyzing Circuit (Sequence Number Analyzing Means)
2101 Receiver (Secondary Station, Server Device)
2102 Controller (Means)
2103 Memory (Means)
2104 No-Error Flag Generating Circuit (No-Error Flag Generating Means)
2105 Sequence Number Generating Circuit (Sequence Number Generating Means)
2106 Transmission Frame Generating Circuit (Transmission Frame Generating Means)
2107 Transmission Section (Transmission Means)
2108 Receiving section (Reception Means)
2109 Reception Frame Analyzing Circuit (Reception Frame Analyzing Means)
2110 Batch-transmission-end flag Analyzing Circuit (Batch-Transmission-End Flag Analyzing Means)
2111 Error detecting circuit (Error detecting means)
2112 Sequence Number Analyzing Circuit (Sequence Number Analyzing Means)
2201 Transmitter (Primary Station, Client Device)
2213 Timer (Timing Means)
2301 Transmitter (Primary Station, Client Device)
2313 Opposite-Station Buffer Size Analyzing Circuit (Opposite-Station Buffer Size Analyzing Means)
2401 Receiver (Secondary Station, Server Device)
2413 Buffer-Size Generating Circuit (Buffer-Size Generating Means)
2501 Transmitter (Primary Station, Client Device
2513 Data-End Flag Generating Circuit (Data-End Flag Generating Means)
2601 Receiver (Secondary Station, Server Device)
5613 Data-End Flag Analyzing Circuit (Data-End Flag Analyzing Means
2701 Transmitter (Primary Station, Client Device
2702 Controller (Control Means)
2703 Memory (Storage Means)
2705 Sequence Number Generating Circuit (Sequence Number Generating Means
2706 Transmission Frame Generating Circuit (Transmission Frame Generating Means)
2707 Transmission Section (Transmission Means
2713 Data-End Flag Generating Circuit (Data-End Flag Generating Means)
2801 Receiver (Secondary Station, Server Device)
2802 Controller (Means)
2803 Memory (Means)
2808 Receiving section (Reception Means
2809 Reception Frame Analyzing Circuit (Reception Frame Analyzing Means)
2811 Error detecting circuit (Error detecting means)
2812 Sequence Number Analyzing Circuit (Sequence Number Analyzing Means)
2813 Data-End Flag Analyzing Circuit (Data-End Flag Analyzing Means)
3300 Client Device (Communication Device, Primary Station)
3310 Application Layer Processing Section
3320 OBEX Layer Processing Section (Object Exchanging Layer Processing Section)
3321 Controller
3322 Request Notifying Section
3323 Response Receiving section
3324 Communication Direction Selecting Section
3330 Lower Layer Processing Section
3340 Transmission Section
3350 Receiving section
3500 Server Device (Communication Device, Secondary Station
3510 Application Layer Processing Section
3520 OBEX Layer Processing Section (Object Exchanging Layer Processing Section)
3521 Controller
3522 Response Notifying Section
3523 Request Analyzing Section
3530 Lower Layer Processing Section
3540 Transmission Section
3550 Receiving section

BEST MODE FOR CARRYING OUT THE INVENTION

Firstly, the following describes an overview of a communication system of the present invention, with reference to FIG. 21 to FIG. 30.

[Overview]

(1) Communication Layers

Each of embodiments below fully explains respective structures and operations of a transmitter and a receiver of a communication system according to the present invention, in accordance with the OSI 7-layer model. The OSI 7-layer model herein refers to so-called "OSI Reference Model" or "OSI Hierarchical Model".

In the OSI 7-layer model, for realization of data communication between different types of device, a communication function that a computer should have is divided into seven layers, in each of which a standard function module is defined.

Specifically, the first layer (physical layer) serves to perform electrical conversion, mechanical operation etc. required to output data into the communication line. The second layer (data link layer) secures physical communication path, and detects error of data being transmitted in each of the communication paths. The third layer (network layer) selects a communication path, and supervises addresses in the communication path. The fourth layer (transport layer) carries out data compression, error correction, retransmission control etc. The fifth layer (session layer) establishes/releases a virtual path (connection) for carrying out data transmission/reception between plural communication programs. The sixth layer (presentation layer) converts the data received from the fifth layer into a different format suitable for the user and converts the data transmitted from the seventh layer into a format suitable for transmission. The seventh layer (application layer) provides various available services using data communication to a person or to a program.

Each of the communication layers according to the present embodiment has the same function as that of corresponding layer in the OSI 7-layer model. However, it should be noted that the foregoing communication system has a six-layered structure in which the session layer and the presentation layer are unified. The explanation for the application layer is omitted.

The present invention is useful for a wide range of communication system in which the transmitter and the receiver carry out communication through individual connection of plural communication layers. More specifically, the division of communication function is not necessarily have to be based on the OSI 7-layer model. Further, when there are plural communication layers, any one of them may be selected.

Further, in the present invention, each frame is given a sequence number, so that retransmission of frames is possible on a frame-by-frame basis, every time a batch of data items is transmitted. Thus, the communication efficiency is high under a condition an error hardly takes place. Even when an error takes place, the communication reliability is ensured by the retransmission. Thus, the present invention is suitable for communication such as infrared wireless communication in which a large amount of data is transmitted in a short period. Note, however, that the present invention is also effective to other wireless communication and wired communication.

For convenience of explanation, each of the embodiments describes "IrSimple", one application example of the present invention. However, the present invention is not limited to IrSimple. Note that IrSimple is a type of conventional IrDA whose functions are partially improved.

Note that, in each of the embodiments, the data link layer, the network layer, the transport layer, and the session/presentation layer may be referred to as LAP, LMP, SMP, and OBEX, respectively. Further, to distinguish the communication layers of the transmitter from those of the receiver, "P" is given to the layers of the transmitter, and "S" is given for those of the receiver. For example, "LAP(P)" represents the data link layer of the transmitter.

(Comparison of IrSimple and IrDa)

In the following, IrDA which is a conventional technology of the present invention is compared with IrSimple which is an exemplary application of the present invention.

1. Flow of Data Transmission in IrDA

Figure 21:
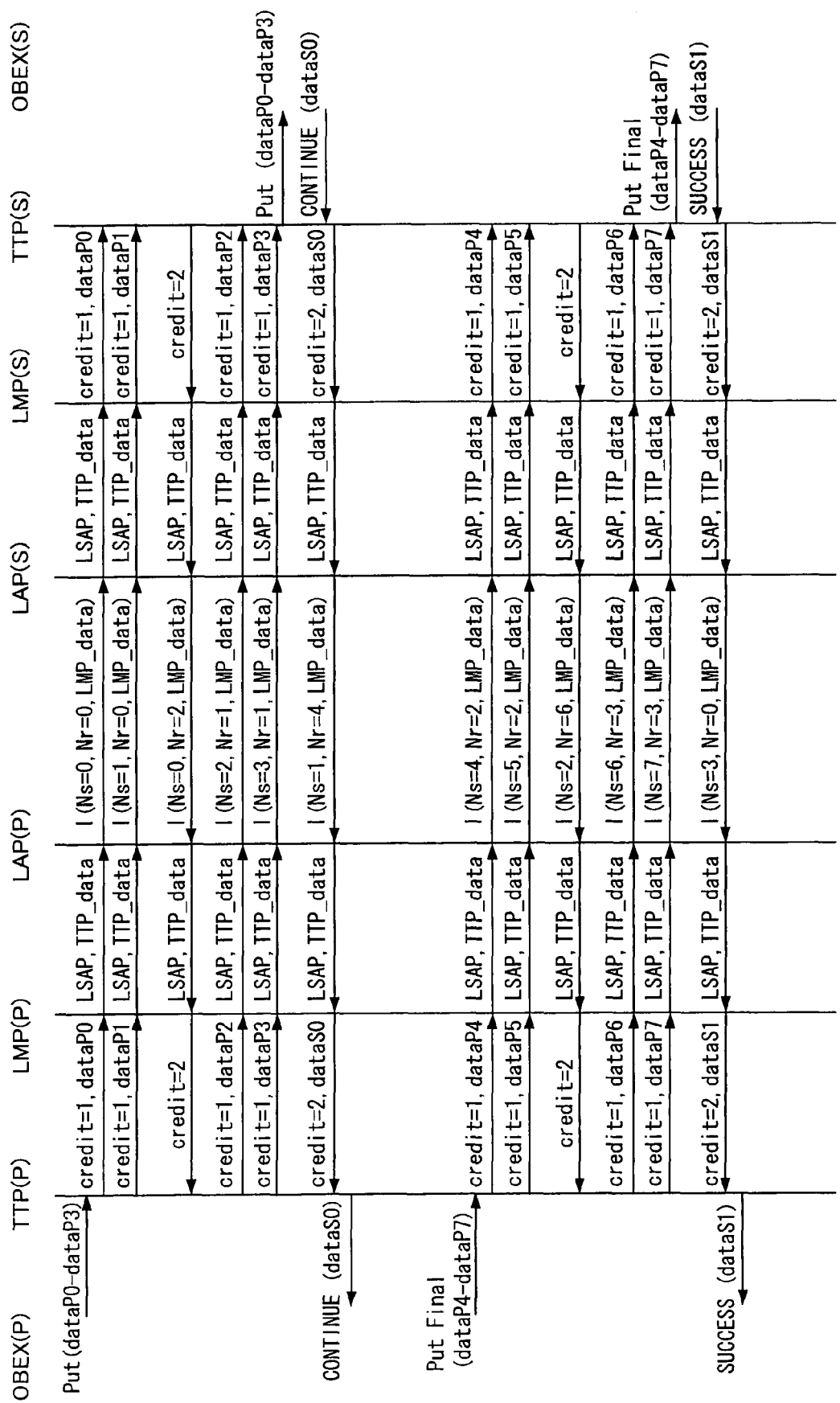
FIG. 21 is a sequence diagram illustrating a flow of data transferring according to IrDA.

FIG. 21 illustrates a flow of data transmission according to the conventional IrDA. In the following explanation, it is assumed that an IrDA protocol stack includes IrLAP, IrLMP, TinyTP (TTP in figure), and OBEX.

(1) In the IrLAP layer, there are following modes as to data transmission: a mode which assures the upper layer the reliability of data; and a mode which does not assure the upper layer the reliability of data. In the present description, it is assumed that data transmission is performed in the former mode which assures the reliability of data. Further, in order to assure the reliability, IrLAP performs data transmission by using I-frames (Information frames).

FIG. 22(a) shows a frame format of an I frame in the IrLAP.

Each I frame is given a sequence number for a purpose of allowing a frame-receiving device to detect an omission of frame. This sequence number is assigned to an Ns field of FIG. 22(a).

Here, the number of frames that can be transmitted at once is called window size, and this window size is limited to 7 at the maximum in IrLAP. When connection is established between a primary station and a secondary station, both stations notifies each other their window sizes as the number of frames that can be received at once. Continuous transmission of frames exceeding the window size of the opposite station is prohibited. In the present description, the window sizes of the primary and the secondary stations are 1 and 2, respectively.

Further, each I frame includes an Nr field for a device having received the frame to notify whether reception of the frame was successful. If frames continuously received are all normal, the Nr field is transmitted with its value being set to the next sequence number desired to be transmitted. For example, when frames with the respective values of their Ns fields set to 1 and 2 are continuously and properly received, the device received the frames transmits the Nr field with its value set to 3.

On the other hand, if there is an error in the received frames, the device transmits the Nr field with its value being set to the sequence number of the frame needed to be retransmitted. For example, when frames with the respective values of their Ns fields set to 1 and 2 are continuously received, but there is an error in the frame whose value of the Ns field is 2, the device received the frames transmits the Nr field with its value set to 2.

After continuous transmission of frames, the device which transmitted the frames monitors the Nr field of a frame received. If the value of the Nr field is 1 plus the value of the Ns field in the last frame amongst the previously transmitted batch of frames, the device recognizes proper completion of transmission of all the frames in the previous batch, and starts transmission of the next frame. On the other hand, if the value of the Nr field of the frame received is a sequence number of any one of frames in the previously transmitted batch of frames, the device performs retransmission of the previously transmitted frames starting from the frame having the sequence number equal to the value of the Nr field. The respective Ns fields are renumbered from the value of the Nr field.

Through the procedure described above, the IrLAP layer is able to perform retransmission using I frames. Here, 8 or more frames cannot be continuously transmitted in the retransmission performed by the IrLAP. This is because the window size is limited to 7 at the maximum according to the standard of the IrLAP.

(2) IrLMP layer provides the upper layer with a logical channel (LSAP: Link Service Access Point) for each application.

FIG. 23 shows a frame format of IrLMP.

In the IrLMP layer of the frame-transmitting side, data from the upper layer (Tiny TP layer) is arranged in the IrLMP frame. The IrLMP header of the IrLMP frame is provided with a DLSAP (Destination Link Service Access Point) and an SLSAP (Source Link Service Access Point). The DLSAP is a logical channel of the transmission destination, and the SLSAP is a logical channel of the transmission origin.

On the other hand, in the IrLMP layer of the frame-receiving side, the DLSAP field of a frame from the lower layer is monitored to discriminate which upper layer application the data is directed to. The data item in the received frame is then transferred to the intended upper layer application.

(3) Tiny TP layer is a layer for dividing/combining data items of the upper layer (OBEX layer), and for performing flow control.

FIG. 24 shows a frame format of the Tiny TP layer.

When data to be transmitted is transferred from the upper layer, the tiny TP layer divides the data into data items in such a manner that the length of each data item does not surpass the maximum frame length allowed in the lower layer (LAP layer). Then, each of the data items is transferred to the lower layer (LMP layer). Further, on the receiving side, the data items from the lower layer (IrLMP layer) are combined, and are transferred to the upper layer (OBEX layer). Further, to prevent overflow of a receive buffer, a receivable number of frames in the receiving side station is notified to the opposite side station in the form of credit. Continuous transmission of frames exceeding the credit of the opposite station is prohibited.

(4) OBEX layer is a protocol for object exchanging.

FIG. 25 shows a frame format of OBEX layer.

FIG. 25(a) is a format of PUT command of OBEX layer. The OBEX layer uses a PUT command for transmitting files. To the PUT command, information of files to be transmitted such as file name and file size or the like is added.

Further, FIGS. 25(b) and (c) are frame formats of a CONTINUE response and a SUCCESS response, respectively. It is necessary that the file-receiving side send in reply a response for each PUT command received. A CONTINUE response is transmitted in response to the reception of a non-final PUT command, and a SUCCESS response is transmitted in response to the reception of the final PUT command.

Next described is a procedure of data transmission using a PUT command of OBEX according to the conventional IrDA.

When a file transmission request is generated in the OBEX of the primary station, the OBEX layer (Hereinafter, OBEX (P)) of the primary station transfers a PUT command as transmission data to Tiny TP layer (Hereinafter, TTP (P)) below OBEX(P). In the present description, it is assumed that the PUT command is constituted of data P0, data P1, data P2, and data P3.

When the TTP (P) receives the PUT command, the TTP (P) divides the transmission data into plural data items in such a manner that the length of each data item is the maximum data length defined in the LAP layer which is one of the lower layers. In the present description, it is assumed that the transmission data is divided into data P0, data P1, data P2, and data P3 in the TTP (P) layer. Since the receivable credit number of the TTP (P) is 1, the credit is set to 1. Using the credit and the divided data items, TTP frames are generated and each of the TTP frames is transferred to IrLMP layer of the primary station (Hereinafter LMP (P)) below the TTP (P).

When the LMP(P) receives the TTP frame, the LMP(P) generates an LMP frame by adding logical channel information (LSAP header), and transfers the LMP frame to IrLAP layer of the primary station (Hereinafter LAP(P)) below the LMP (P).

When the LAP (P) receives the LMP frame, the LAP(P) performs data transmission using an I frame. In the present description, the window size of the secondary station is 2. Therefore, I frames with the respective Ns fields set to 0 and 1 are continuously transmitted.

On the other hand, IrLAP layer of the secondary station (Hereinafter, LAP(S)) continuously receives the I frames. Then, while monitoring the respective Ns fields of the I frames to detect an omission of frame, the LAP (S) transfers the upper-layer data item in each of the I frames to the IrLMP layer of the secondary station (Hereinafter, LMP (S)) above the LAP(S). It is necessary to notify the successful continuous reception of I frames by transmitting an Nr field set to 2. However, In the present description, the notification is not yet performed in this stage.

When the LMP(S) is notified of reception of the frame, the LMP(S) removes the LSAP header, and then transfers the upper-layer data item to TinyTP layer of the secondary station (Hereinafter, TTP (S)) above the LMP(S).

When the TTP (S) receives the upper-layer data items, the TTP (S) combines the upper-layer data items of the received frames. In the present description, a unit of data to be transferred to the OBEX layer is a data size which is equivalent to the size of data P0 to data P3 combined. For this reason, data reception is not notified to the OBEX layer at the point of finishing combining data P0 and data P1. Further, when processing of data items (combining data P0 and data P1) corresponding to the number of receivable credit (i.e. 2) of the TTP(S) is completed, a TinyTP frame with its credit being set to 2 is transferred to the lower layer, for a purpose of notifying the opposite station that the own-side device is capable of receiving two frames.

When the LMP(S) receives the TTP frame, the LMP(S) adds LSAP information as an LMP header, and transfers the frame with the LMP header added thereto to the LAP(S).

When the LAP (S) receives the frame, the LAP(S) performs data transmission using an I frame. Further, at this point, the suspended transmission of a frame from the LAP to notify the success of continuous I-frame reception is performed with the value of its Nr field set to 2 (i.e. the value of Ns field desired to be transmitted next). Meanwhile, the value of the Ns field is set to a sequence number of the transmission frame of the secondary station.

When the LAP (P) receives the notification from the LAP(S), the LAP(P) monitors the Nr field to confirm whether the previous continuous transmission of I frames have been properly finished. The Nr field is set to 2 in the present description. Accordingly, the secondary station recognizes that the previously transmitted I frames with the respective Ns fields set to 0 and 1 have been properly received. Further, since the received I frame contains an upper-layer data item, the upper-layer data item is transferred to the LMP(P).

When the LMP(P) receives the upper-layer data item, the LMP(P) removes the LSAP header, and transfers the upper-layer data item to the TTP (P) above the LMP (P).

When the TTP (P) receives the upper-layer data item, the TTP(P) recognizes that the TTP (S) in the opposite station is able to receive two frames at once, on the ground that the credit contained in the received frame is 2. Then, the TTP (P) adds credit information of the primary station to the remaining divided data items (i.e. data P2 and data P3) from the upper layer, and transfers them to the LMP(P).

When the LMP(P) receives the data items, the LMP(P) adds an LSAP header, and transfers the frame with the LMP header added thereto to the LAP(P).

When the LAP (P) receives the data items, the LAP(P) transmits the two transmission data items, by using two I frames, respectively. At this point, for a purpose of notifying that the I frame from the secondary station have been properly received, the value of the Nr field is set to the value of an Ns field which is to be transmitted from the secondary station next time. Meanwhile, the value of the Ns field is set to a value which is 1 plus the value of the Ns field in the final I frame amongst the previously transmitted I frames from the primary station.

When the LAP(S) receives the frame, the LAP(S) monitors the Nr field, and recognizes that the previously transmitted I frames from the secondary station has been properly received by the primary station. Then, the LAP(S) transfers the upper-layer data items in the received frame to the LMP (S).

When the LMP(S) receives the upper-layer data items, the LMP(S) removes the LSAP header, and transfers the upper-layer data items to TTP (S).

When the TTP (S) receives the upper-layer data items, the TTP (S) combines the upper-layer data items of the received frames. Here, the data P2 and data P3 having received this round are combined with the combined upper-layer data items (i.e., data P0 and data P1) which has been received in the previous round. At this point, the data size of the combined upper-layer data has reached to that of the data to be transferred to the upper layer (OBEX layer), the upper-layer data is transferred to the OBEX layer (Hereinafter, OBEX(S)). Further, since the process of receiving data is completed at this point, the credit set to 2 may be transferred to the lower layer. However, this is suspended in the present invention.

When the OBEX(S) receives the upper-layer data, the OBEX(S) analyzes the upper-layer data from the lower layer. If the data is confirmed to be a PUT command, the OBEX(S) generates a response frame for responding to the OBEX of the primary station, and transfers the response frame to the TTP(S). In the present explanation, the command having been received is not the final PUT command. Therefore, a CONTINUE command is generated.

When the TTP(S) receives the response frame, the TTP (S) generates a TinyTP frame by combining the foregoing credit and the data from the upper layer, and transfers the TinyTP frame to the LMP (S).

When the LMP(S) receives the TinyTP frame, the LMP(S) adds an LSAP header to the frame and transfers the frame to the LAP(S).

When the LAP (S) receives the frame, the LAP(S) performs data transmission using an I frame. Further, at this point, the Nr field is set to notify the success of the reception of the previous I frames, and the Ns field is given a sequence number.

When the LAP (P) receives the frame, the LAP(P) monitors the Nr field, and recognizes that the previously transmitted two I frames have been properly received by the secondary station. Then, the LAP(P) transfers the upper-layer data item in the received frame to the LMP (P).

When the LMP(P) receives the upper-layer data item, the LMP(P) removes the LSAP header, and transfers the upper-layer data item to the TTP (P).

When the TTP(P) receives the upper-layer data item, the TTP(P) transfers the data item in the received frame to the OBEX(P).

When the OBEX(P) receives the data, the OBEX (P) analyzes the received frame. In the present description, it is a CONTINUE response which is received. Accordingly, the OBEX(P) recognizes that the data items (data P0 to data P3) having been previously transmitted in response to the previous PUT command are properly transferred to the secondary station.

Through the above procedure, communication in the case a non-final PUT command is ended.

The flow of communication is basically the same in a case of the final PUT command, except in that a SUCCESS response is replied from the OBEX(S).

As described, the number of frames flowing in a communication path is 12 under the conditions of the present explanation.

2. Flow of Data Transmission in Two-Way Communication of IrSimple

Figure 26:
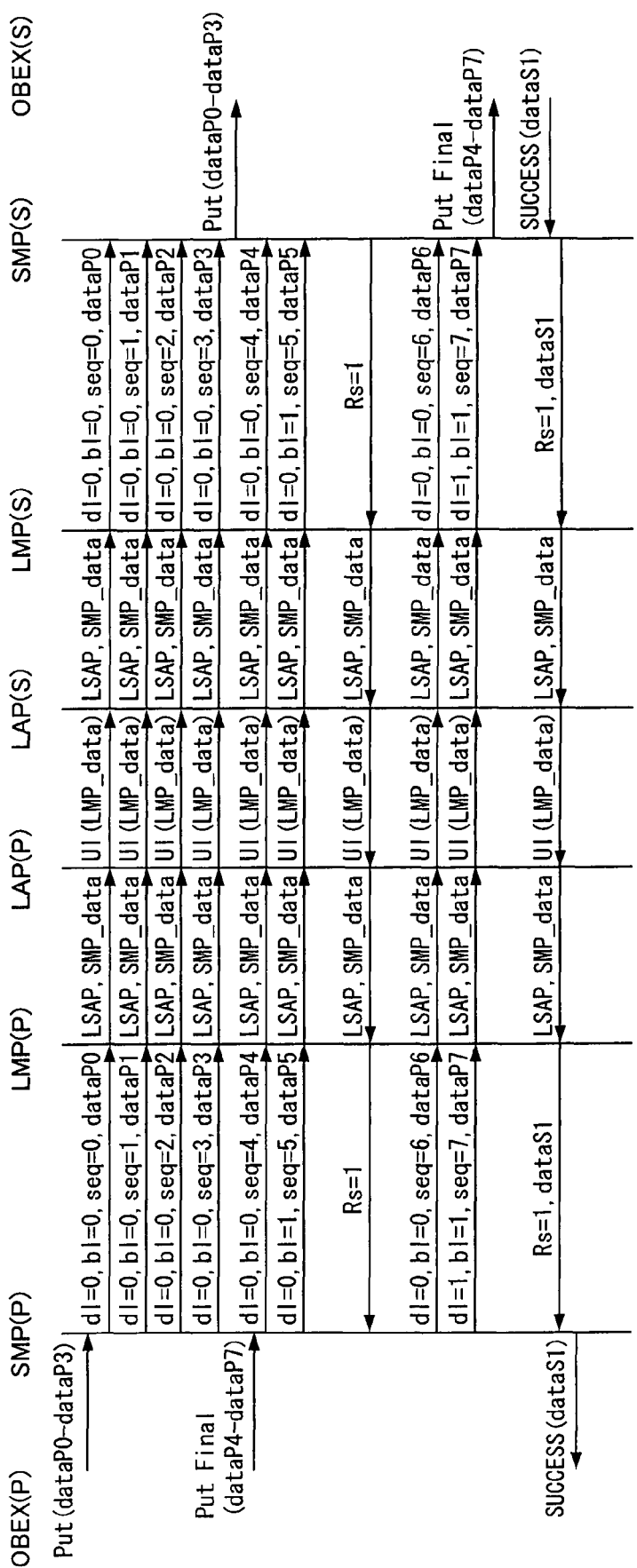
FIG. 26 is a sequence diagram illustrating a flow of data transferring in two-way communication according to IrSimple.

FIG. 26 shows how data transmission is performed in two-way communication of IrSimple which is one application example of the present invention. Note that, in the present description, it is assumed that the primary station and the secondary station support IrLAP layer, IrLMP layer, IrSMP layer (Infrared Sequence Management Protocol), and OBEX layer.

(1) In the IrLAP layer, data transmission is performed by using UI frames. As described before, there is no limitation of window size when using UI frames. Therefore, it is possible to continuously transmit at once a larger number of frames than the number of frames (i.e. 7 frames) that can be continuously transmitted at once in a case of using I frames. Accordingly, it is possible to promote the inefficiency in data transmission due to accumulation of period (Min Turn Around Time) waited before the start of transmission after the reception of frames.

FIG. 22(b) illustrates a frame format of UI frames in LAP layer.

As shown in FIG. 22(b), each UI frame does not include an Nr field or an Ns field contained in an I frame (See FIG. 22(a)). This means that each frame is not given a sequence number, and that an omission of frame can not be detected in the level of the LAP layer. Further, it is not possible to set a sequence number of a frame that needs to be retransmitted. In short, in the case of transmission using UI frames, the reliability of upper-layer data is not assured in the level of the LAP layer.

(2) IrLMP layer provides the upper layer with a logical channel (LSAP: Link Service Access Point) for each application.

As illustrated in FIG. 23, in the IrLMP layer of the frame-transmitting side, data from the upper layer (Tiny TP layer) is arranged in the IrLMP frame. The IrLMP header of the IrLMP frame is provided with a DLSAP (Destination Link Service Access Point) and an SLSAP (Source Link Service Access Point). The DLSAP is a logical channel of the transmission destination, and the SLSAP is a logical channel of the transmission origin.

On the other hand, in the IrLMP layer of the frame-receiving side, the DLSAP field of a frame from the lower layer is monitored to discriminate which upper layer application the data is directed to. The data item in the received frame is then transferred to the intended upper layer application.

(3) IrSMP layer divides upper-layer data or combines upper-layer data items. As mentioned before, the IrLAP layer performs data transmission using UI frames, but does not perform retransmission. Therefore, retransmission control is performed in the IrSMP layer.

Specifically, in the IrSMP layer (hereinafter, SMP(P)) of the primary station, upper-layer data is divided into data items whose respective lengths are not more than the maximum data length of the UI frames in the lower layer. Then, the divided data items are respectively arranged in plural frames, and are transferred to the LMP(P). At this point, a sequence number, a batch-transfer end flag, and a data-end flag are added as an SMP header.

FIG. 27(a) shows a frame format of the SMP frames in a case of two-way communication of IrSimple.

The sequence number increases for each frame in increment of 1. In a case where an error occurs during the communication, the SMP frames are retransmitted with their sequence numbers renumbered from the sequence number of the retransmission request transmitted from the secondary station.

Batch-transmission-end flag (BL: Block Last in figure) is as follows. Namely, when continuously transmitting SMP frames without exceeding the reception buffer size of the secondary station which is notified by the secondary station at the time of establishing connection, the value of the batch-transmission-end flag in the last frame transmitted is set to a value (BL=1 in the figure) which indicates the end of batch transmission. The secondary station monitors the sequence numbers of the received frames, so as to detect an omission of a frame/frames. If the secondary station receives a frame with BL=1, and if no error or omission is detected in the frames received, the secondary station transfers to the lower layer a flag (RS: Receive Status) with its value set to indicate that no error has been found (RS=1 in the figure). Further, if an error occurs, the sequence number is set to the sequence number of the frame desired to be retransmitted.

A data-end flag (DL: Data Last) is a flag indicating whether a frame contains therein the final data item of the upper-layer data. If the final data item is contained, the data-end flag is set to indicate that the final data item is contained (DL=1 in the figure). Further, the IrSMP layer (Hereinafter SMP (S)) of the secondary station combines the received upper-layer data items, and when the data size of the received data items combined reaches the data size agreed by the SMP (S) and its upper layer (OBEX layer; hereinafter OBEX(S)), the SMP(S) transfers the combined data to the upper layer.

(4) OBEX layer is a protocol for object exchanging. File transmission is performed by using PUT commands. As described before, a file is transmitted by using PUT commands.

Further, in the method of the present invention, OBEX(S) on the file-receiving side transmits a SUCCESS response in reply to only the final PUT command, and a CONTINUE response is not transmitted when receiving a non-final PUT command. Further, when a non-final PUT command is transmitted from the OBEX layer of the primary station (Hereinafter, OBEX(P)), the OBEX(P) transmits a subsequent PUT command without waiting for a CONTINUE response from the secondary station. After the transmission of the final PUT command, OBEX(P) waits for a SUCCESS response from the secondary station, so as to judge whether the secondary station properly received the data transmitted by using the PUT commands. As described, by omitting exchanging of CONTINUE response, the number of frames in the LAP layer can be reduced.

Next described is how the data transmission is performed in two-way communication using the method of the present invention.

When a file transmission request is generated in the OBEX of the primary station, the OBEX layer (P) transfers a PUT command as transmission data to TTP (P). In the present description, it is assumed that the PUT command is constituted of data P0, data P1, data P2, and data P3. It is further assumed that the final PUT command is constituted of: data P4, data P5, data P6, and data P7. OBEX (P) does not wait for a CONTINUE response for a non-final PUT command, and continuously transfers PUT commands to SMP(P) while there is a vacancy in the transmission buffer of the SMP (P).

When the TTP (P) receives the PUT command, the TTP (P) divides the transmission data into plural data items in such a manner that the length of each data item is the maximum data length defined in the LAP layer which is one of the lower layers. In the present description, it is assumed that the transmission data is divided into data P0, data P1, data P2, and data P3 in the SMP (P). Further, in the SMP(P), Seq and BL are set for a purpose of performing retransmission control. In the present description, it is assumed that the SMP (P) knows the reception buffer size obtained, at the time of establishing connection, from the SMP (S) of the secondary station is the sum of data P0 to data P5. It is further assumed that transmission is continuously performed up to the frame containing data P5, and that the value of BL is set to 1 at the time of transmitting the frame containing data P5. In the present description, a reception buffer size is equivalent to six frames. However, the reception buffer may be larger. For example, it is possible that a reception buffer size be equivalent to 128 frames (256 KB, supposing the maximum data length of the LAP layer is 2 KB). In the present case, BL is set to 1 and DL is set to 1 only when transmitting the frame of data P7. The SMP (P) transfers therefrom SMP frames to the LMP(P). To each of the SMP frames, an SMP header (DL, BL, SEQ) is added.

When the LMP(P) receives the SMP frames, the LMP(P) adds an LSAP header to each of the SMP frames and transfers the SMP frames to the LAP(P).

When the LAP (P) receives the SMP frames, the LAP(P) performs data transmission using UI frames.

When the LAP(S) receives the UI frames, the LAP(S) transfers the upper-layer data items in the UI frames to the LMP (S).

When the LMP(S) receives the upper-layer data items, the LMP(P) removes the LSAP header, and transfers the upper-layer data items to the SMP (S).

When the SMP (S) receives each of the upper-layer data items, the SMP (S) monitors the sequence number, so as to detect an omission of an SMP frame. The upper-layer data items without an omission of frame are combined in the SMP (S). In the present description, the size of an upper-layer data unit which is determined in advance between the OBEX(S) and the SMP(S) is the data size of data P0 to data P3 combined. As such, SMP(S) transfers the combined data items to the upper layer at the point when the data P3 is combined. Since no error or omission is detected in the frames received at the point of receiving a frame whose DL is 0 and whose BL is 1, the "no-error" flag RS is transferred to the lower layer with its value set to 1.

When the OBEX(S) receives the received data from the SMP(S), the OBEX(S) analyzes the received data. In the present description, the received data is a non-final PUT command. Therefore, no CONTINUE response is transmitted in reply to the primary station.

Further, when the LMP(S) receives the foregoing SMP frame whose RS is 1, the LMP(S) adds an LSAP header to the SMP frame, and transfers the SMP frame to LAP(S).

When the LAP (S) receives the SMP frame, the LAP(S) performs data transmission using an UI frame.

The LAP(P) having received the UI frame transfers the upper-layer data in the UI frame to the LMP(P).

When the LMP(P) receives the upper-layer data item, the LMP(P) removes the LSAP header, and transfers the upper-layer data item to the SMP (P).

The SMP(P) having received the upper-layer data item recognizes that the transmission of previous batch of frames is properly performed, by referring to the RS field set to 1 in the received frame. Then, SMP(P) transmits the rest of divided data items (data P6 and data P7) of the upper layer. When transmitting data P7, BL is set to 1 and DL is set to 1, so that the frame notifies that the frame is the final frame of the upper-layer data.

When the LMP(P) receives the frames adds an LSAP header, and transfers the frames to LAP(P).

When the LAP (P) receives the frames, the LAP(P) performs data transmission using UI frames.

When the LAP(S) receives the UI frames, the LAP(S) transfers the upper-layer data items in the UI frames to the LMP (S).

When the LMP(S) receives the upper-layer data items, the LMP(S) removes the LSAP header, and transfers the upper-layer data items to the SMP (S).

When the SMP (S) receives each of the upper-layer data items, the SMP (S) monitors the sequence number of the frames received, so as to detect an omission of a frame. If not error is found in the frames, the upper-layer data items in the frames are combined and the combined data is transferred to the upper layer. Further, in the present description, the respective values of BL and DL in the frame containing the data P7 is 1. Therefore, a frame (RS containing frame) for notifying the reception result in the SMP layer is not yet transmitted.

The OBEX(S) having received the combined upper-layer data analyzes the received data. If the received data is recognized as to be the final PUT command, and if all the preceding commands are properly received, the OBEX(S) generates a SUCCESS response and transfers the response to the SMP(S).

When the SMP(S) receives the SUCCESS response, the SMP (S) sets the reception result (RS) of the SMP layer to 1, and transmits to the LMP(S) the upper-layer data with the RS.

When the LMP(S) receives the frame, the LMP(S) adds an LSAP header to the frame and transfers the frame to the LAP(S).

When the LAP (S) receives the frame, the LAP(S) performs data transmission using an UI frame.

The LAP(P) having received the UI frame transfers the upper-layer data in the UI frame to the LMP(P).

When the LMP(P) receives the upper-layer data item, the LMP(P) removes the LSAP header, and transfers the upper-layer data item to the SMP (P).

The SMP(P) having received the upper-layer data item recognizes that the transmission of previous batch of frames is properly performed, by referring to the RS field set to 1 in the received frame. Then, SMP(P) transmits the upper-layer data item to the OBEX (P).

The OBEX(P) having received the upper-layer data analyzes the received upper-layer data. If the data is recognized as to be a SUCCESS response, the OBEX(P) recognizes that data transmission by the final PUT command and preceding non-final PUT commands has been properly completed.

As described, even in a case of using UI frames in IrLAP layer, it is possible to perform communication while assuring the reliability by performing retransmission control in the SMP layer. Further, unlike the case of using I frames, there will be no limitation to the window size when using UI frames. Thus, it is possible to perform communication which is optimized for the size of reception buffer of the secondary station.

As described, the number of frames flowing in a communication path under the condition of the present description is 10. Thus, it is possible to perform communication with less frames than a number of frames used in communication using I frames which is mentioned above in the description of the conventional IrDA.

In the present description, the number of frames which is transmitted at once from the SMP layer is 6. This value however can be set to any value within a limit of transmission buffer size of the primary station for retransmission, and within a limit of the reception buffer size of the secondary station. Thus, it is possible to realize communication at the maximum capacity of the communication system. On the contrary, the limitation of the window size (7 in LAP) in the communication using I frames makes it difficult to improve the communication efficiency even if both of the primary and secondary stations have a large size of buffer.

3. Flow of Data Transmission in One-Way Communication of IrSimple

Figure 28:
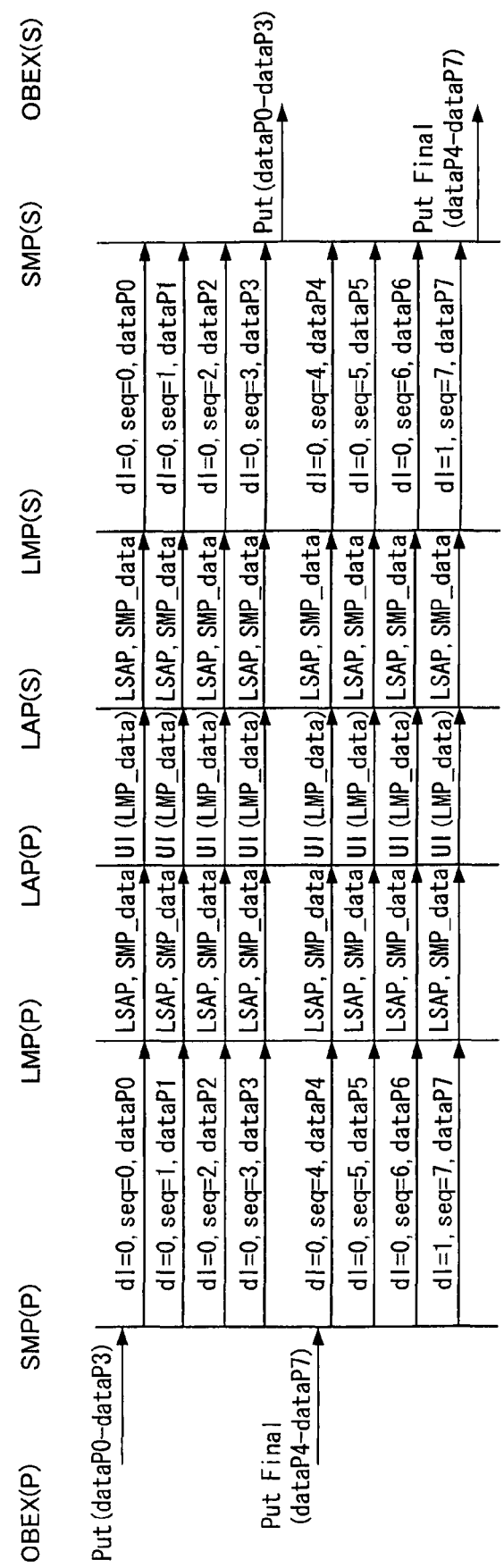
FIG. 28 is a sequence diagram illustrating a flow of data transferring in one-way communication according to IrSimple.

FIG. 28 shows how data transmission is performed in one-way communication of IrSimple which is one application example of the present invention. Note that, in the present description, it is assumed that the primary station and the secondary station support IrLAP layer, IrLMP layer, IrSMP layer (Infrared Sequence Management Protocol), and OBEX layer.

(1) In the IrLAP layer, data transmission is performed by using UI frames (FIG. 22(b).) As described before, there is no limitation of window size when using UI frames. Therefore, it is possible to continuously transmit at once a larger number of frames than the number of frames (i.e. 7 frames) that can be continuously transmitted at once in a case of using I frames. Accordingly, it is possible to promote inefficiency in data transmission due to accumulation of period (Min Turn Around Time) waited before the start of transmission after the reception of frames.

As shown in FIG. 22(b), each UI frame does not include an Nr field or an Ns field contained in an I frame. This means that each frame is not given a sequence number, and that an omission of frame can not be detected in the level of the LAP layer. Further, it is not possible to set a sequence number of a frame that needs to be retransmitted. In short, in the case of transmission using UI frames, the reliability of upper-layer data is not assured in the level of the LAP layer.

(2) IrLMP layer provides the upper layer with a logical channel (LSAP: Link Service Access Point) for each application.

In the IrLMP layer of the frame-transmitting side, data from the upper layer (Tiny TP layer) is arranged in the IrLMP frame. The IrLMP header of the IrLMP frame is provided with a DLSAP (Destination Link Service Access Point) and an SLSAP (Source Link Service Access Point). The DLSAP is a logical channel of the transmission destination, and the SLSAP is a logical channel of the transmission origin.

On the other hand, in the IrLMP layer of the frame-receiving side, the DLSAP field of a frame from the lower layer is monitored to discriminate which upper layer application the data is directed to. The data item in the received frame is then transferred to the intended upper layer application.

(3) IrSMP layer divides upper-layer data or combines upper-layer data items. As mentioned before, the IrLAP layer performs data transmission using UI frames, but no sequence number is given to the frame. Therefore, a sequence number is given in the IrSMP layer.

Specifically, in the IrSMP layer (Hereinafter, SMP(P)) of the primary station, upper-layer data is divided into data items whose respective lengths are not more than the maximum data length of the UI frames in the lower layer. Then, the divided data items are respectively arranged in plural frames, and are transferred to the LMP(P). Meanwhile, a sequence number, and a data-end flag are added as an SMP header.

FIG. 27(b) shows a frame format of the SMP frames in a case of one-way communication of IrSimple.

The sequence number increases for each frame in increment of 1. The secondary station monitors the sequence number of the received frames, so as to detect an omission of a frame. If an omission of a frame or an error is detected, the secondary station notifies OBEX(S) of the detected error or omission.

A data-end flag (DL: Data Last) is a flag indicating whether a frame contains therein the final data item of the upper-layer data. If the data is contained, the data end flag is set to indicate that (DL=1 in the figure). Further, IrSMP layer (Hereinafter SMP (S)) of the secondary station combines the received upper-layer data items, and when the data size of the received data items combined reaches the data size agreed between SMP (S) and its upper layer OBEX layer (Hereinafter OBEX(S)), the SMP(S) transfers the combined data to the upper layer.

(4) OBEX layer is a protocol for object exchanging. File transmission is performed by using PUT commands. As described before, a file is transmitted by using PUT commands.

Further, in the method of the present invention, OBEX(S) on the file-receiving side transmits no response (neither SUCCESS response or CONTINUE response) in reply to PUT commands.

Further, the OBEX layer of the primary station (hereinafter, OBEX(P)) does not need a response from the secondary station in reply to a PUT command transmitted from OBEX (P).

Next described is how the data transmission is performed in one-way communication using the method of the present invention.

When a file transmission request is generated in the OBEX of the primary station, the OBEX layer (P) transfers a PUT command as transmission data to TTP (P). In the present description, it is assumed that the PUT command is constituted of data P0, data P1, data P2, and data P3. It is further assumed that the final PUT command is constituted of: data P4, data P5, data P6, and data P7. OBEX (P) does not wait for a response for a non-final PUT command, and continuously transfers PUT commands to SMP(P) while there is a vacancy in the transmission buffer of the SMP (P). OBEX(P) finishes data transmission by PUT command, at the point when the final PUT command is transferred to the SMP(P).

When the TTP (P) receives the PUT command, the TTP (P) divides the transmission data into plural data items in such a manner that the length of each data item is the maximum data length defined in the LAP layer which is one of the lower layers. In the present description, it is assumed that the transmission data is divided into data P0, data P1, data P2, and data P3 in the SMP (P). Further, in the SMP(P), a sequence number (Seq) is set for a purpose of detecting omission of frame. DL is set to 1 when transmitting the final data items of the upper layer.

The SMP (P) transfers therefrom SMP frames to the LMP (P). To each of the SMP frames, an SMP header (DL, SEQ) is added.

When the LMP(P) receives the SMP frames, the LMP(P) adds an LSAP header to each of the SMP frames and transfers the SMP frames to the LAP(P).

When the LAP (P) receives the SMP frames, the LAP(P) performs data transmission using UI frames.

When the LAP(S) receives the UI frames, the LAP(S) transfers the upper-layer data items in the UI frames to the LMP (S).

When the LMP(S) receives the upper-layer data items, the LMP(P) removes the LSAP header, and transfers the upper-layer data items to the SMP (S).

When the SMP (S) receives each of the upper-layer data items, the SMP (S) monitors the sequence number, so as to detect an omission of an SMP frame. The upper-layer data items without an omission of frame are combined in the SMP (S). In the present description, the size of an upper-layer data unit which is determined in advance between the OBEX(S) and the SMP(S) is the data size of data P0 to data P3 combined. As such, SMP(S) transfers the combined data items to the upper layer at the point when the data P3 is combined. Furthermore, the SMP(S) recognizes that all the transmission data from the OBEX of the primary station, at the point of receiving a frame whose DL is 1, and transfers the data P4 to data P7 as received data to the upper layer.

When the OBEX(S) receives the data, the OBEX (S) analyzes the received data. In the present explanation, since the primary station does not need a response to a PUT command, neither CONTINUE response or SUCCESS response is transmitted to the primary station. At the point of receiving the final PUT command, the data transmission by the PUT command of the OBEX is completed.

As described before, although it is not possible to perform retransmission control in one-way communication according to the communication scheme of the present invention, communication is possible without a problem as long as the primary and the secondary station agrees that a response for a PUT command is not required in the OBEX layer. Further, even in a case of using UI frames having no sequence number, it is possible to detect an omission of frame by adding sequence number in the IrSMP layer, and suitably notify a user of a reception error.

(Processing in Receiver when Receiving Data-End Flag)

The following describes processing performed in a receiver at a time of receiving a data-end flag.

Figure 29:
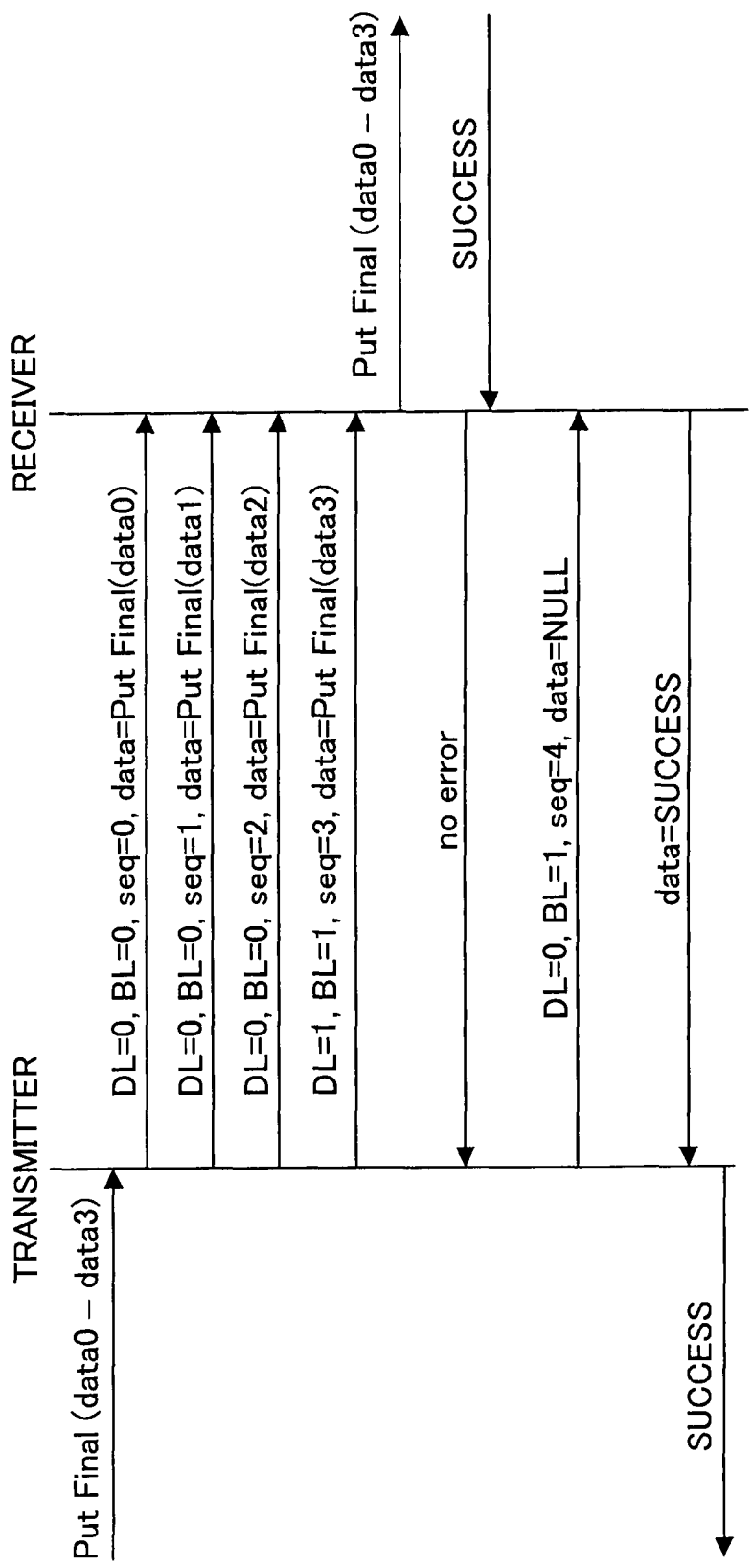
FIG. 29 is a sequence diagram illustrating data transferring by means of PUT command of OBEX which exists as an upper layer.

FIG. 29 is a sequence diagram illustrating data transmission by PUT commands of OBEX, on assumption that OBEX exists as an upper layer.

In FIG. 29, a transmitter transmits data 0 to data 3 in batch by using a PUT final command which indicates that the final data items of OBEX data are contained. Then, at the time of transmitting the data 3 which is the final data item of the PUT final command, a batch-transmission-end flag is set to 1, and a data-end flag is also set to 1.

On the other hand, when a receiver receives a frame whose batch-transmission-end flag and the data-end flag are 1, the receiver transfers the received data to the upper layer. Further, since no error was found in the received data, a no-error flag indicating "No Error" is transmitted in reply. After that, a lower layer of the receiver receives from the upper layer (i.e., OBEX) a notification of SUCCESS response meaning successful reception. However, the transmission of the response is suspended as the receiver has no transmission right at the point of receiving the response.

Next, the transmitter receives a frame whose no-error flag indicates "no error found", and recognizes that communication with the receiver was performed without an error. However, since the transmitter needs to receive a SUCCESS response from the opposite station, the transmitter once again transmits a frame for transferring the transmission right to the receiver. As shown in FIG. 29, there is no data to be transmitted from the transmitter at this point. Accordingly, the transmitted frame is such that the batch-transmission-end flag is set to 1, and no data is arranged in its user region (i.e. data=NULL).

Next, when the receiver receives the frame, the receiver transmits the SUCCESS response which has been suspended from being transmitted.

After that, the transmitter receives the SUCCESS response, and transfers the received data (i.e. SUCCESS response) to the upper layer (to the OBEX), thus completing communication in the upper layer level (OBEX level).

Here, the following describes an exemplary communication where a frame containing the no-error flag and the SUCCESS response are transmitted in one frame.

Figure 30:
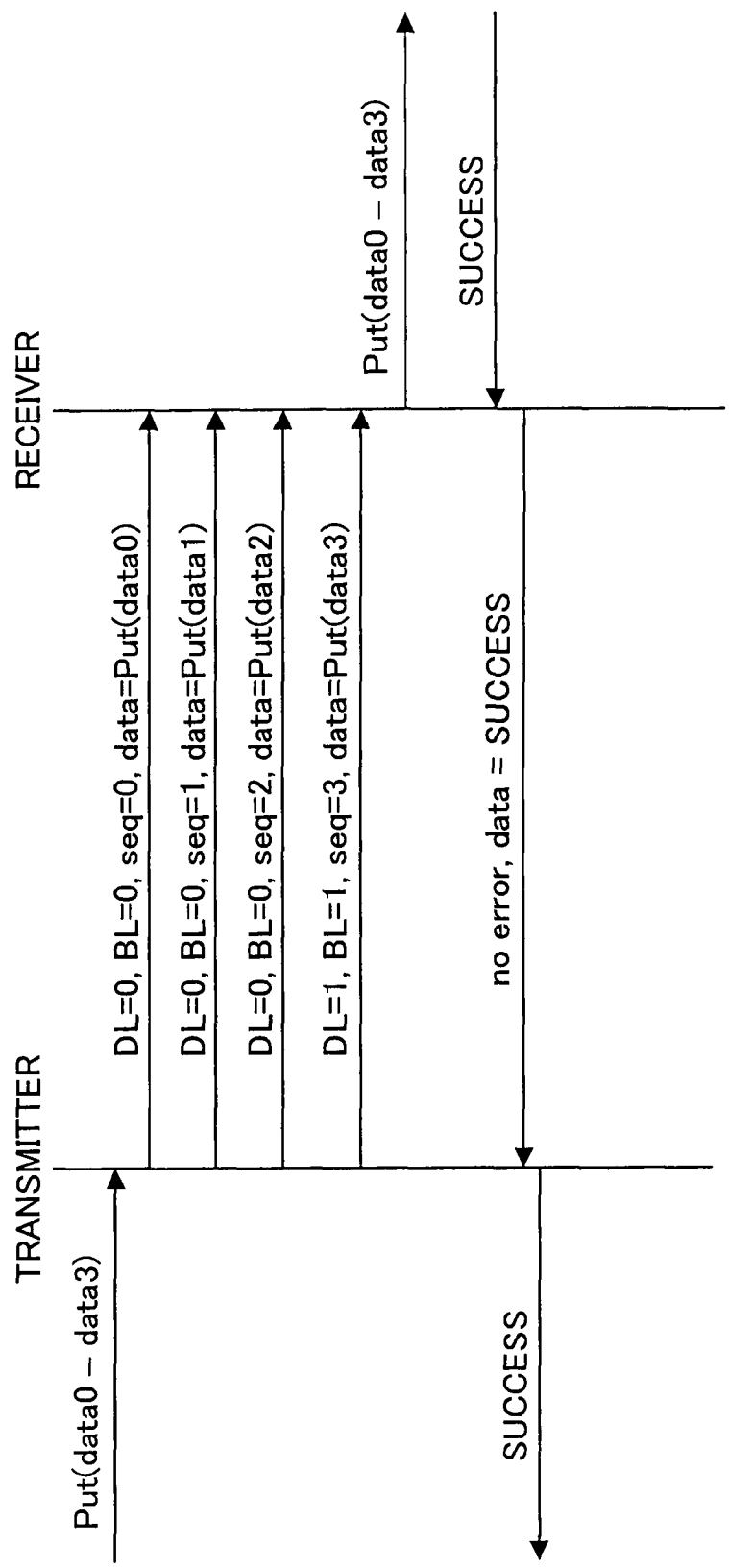
FIG. 30 is a sequence diagram illustrating example of communication by which a receiver is able to transmit, in a single frame, the frame containing a no-error flag and a frame containing a SUCCESS response.

FIG. 30 is a sequence diagram illustrating an exemplary communication where a receiver transmits the no-error flag and the SUCCESS response in a single frame.

As shown in FIG. 30, when the receiver receives a frame whose batch-transmission-end flag and the data-end flag are 1, the lower layer transfers the received data to the upper layer. Immediately after that, the lower layer generates a frame with its no-error flag set to indicate "no error found". At this point the frame is not transmitted, and the lower layer waits for a SUCCESS response from the upper layer. Then, the no-error flag and the SUCCESS response are arranged in one frame, and are transmitted.

In this way, as shown in FIG. 29, the transmitter does not have to transmit a frame for transferring the transmission right, after the receiver transmits a frame only containing a flag indicating "no error found". Further, in the receiver, after the upper layer generates a SUCCESS response transmission request, the lower layer is able to immediately transmit the SUCCESS response. This allows streamlining of communication. Further, since a frame for only transferring the transmission right is not needed, it is not necessary to take into account an error processing or the like for an error which could occur in the frame for transferring the transmission right. Therefore, simplification of process is possible.

In the following, embodiments of a communication system according to the present invention are described with reference to FIG. 1, FIG. 8, FIG. 31 to FIG. 67 (Note however that FIG. 52, FIG. 53, FIG. 58, and FIG. 59 are explanatory diagrams of conventional technology). Namely, the present invention is applicable to a communication system having a primary and a secondary stations for presenting, as a single piece, data (such as image data or document data) of a predetermined volume, and for transmitting/receiving transfer data to be transferred. Here, the predetermined volume of data varies depending on the transmission data.

With reference to the following embodiment, the present invention is explained taking as an example a transferring method (transmission method) in compliance with IrDA, in which method data is transferred by using an infrared ray.

Embodiment 1

Figure 2:
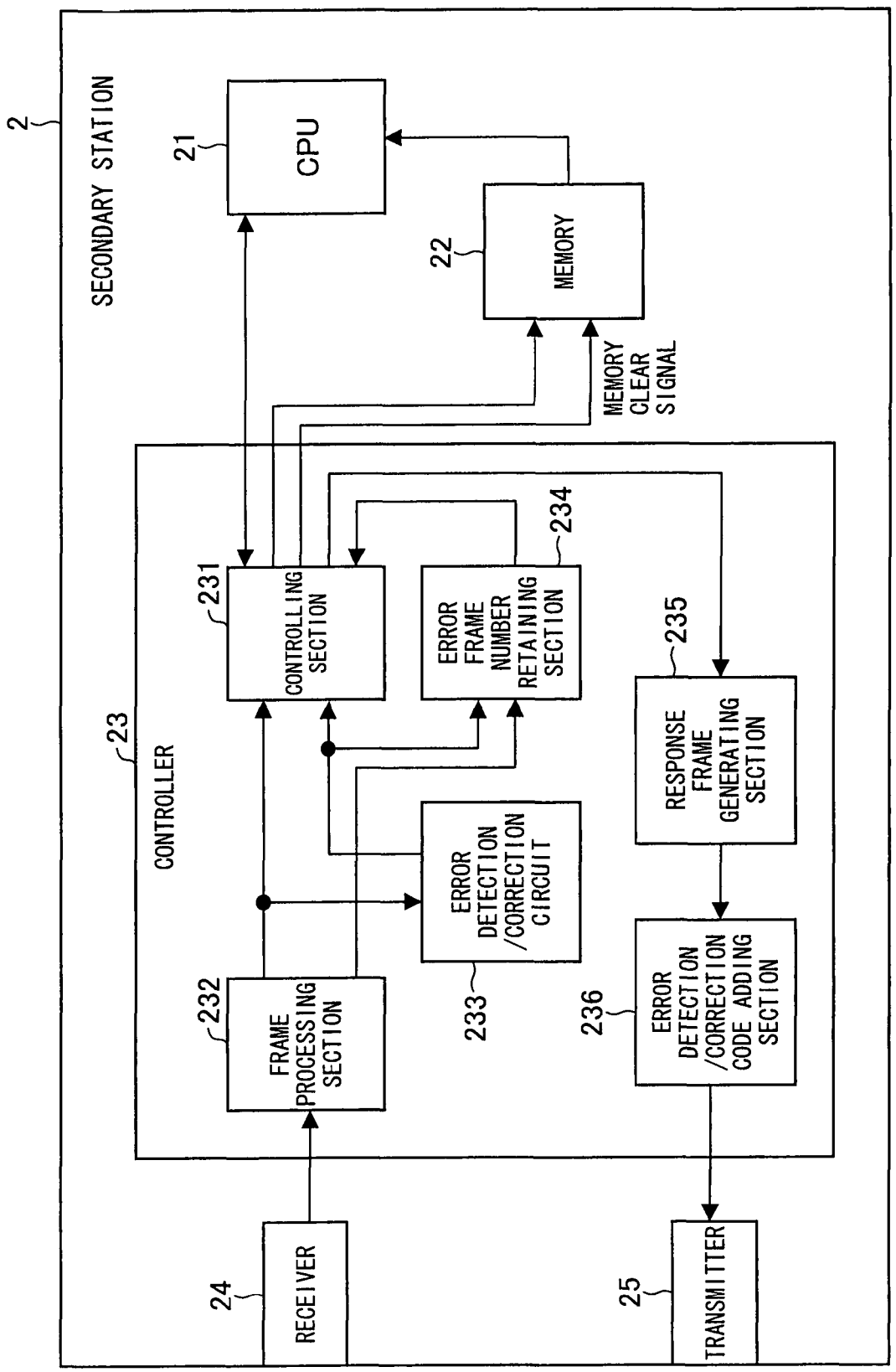
FIG. 2 is a block diagram illustrating a structure of a secondary station of embodiment 1.

The following explains a server device (communication device) of a data transferring system (communication system) according to Embodiment 1 of the present invention, with reference to FIG. 1 and FIG. 2. Note that wordings (inclusive of a member and a function) defined in the other embodiments are used in the same manner in the present embodiment, unless otherwise noted.

FIG. 1 is a block diagram illustrating a structure of a primary station of the present embodiment. As illustrated in FIG. 1, the primary station (transmission device) 1 includes: a CPU 11, a memory 12, a controller 13, a transmitter 14, and a receiver 15.

The CPU 11 performs a predetermined computation according to a user instruction entered via an operating section (not shown). The predetermined computation can be a transferring process for transferring data. When a transfer instruction of transfer-data is received via the operating section, the CPU 11 stores the transfer-data to be transferred in the memory 12, and makes a transfer request to the controller 13. Further, the CPU 11 completes the transferring process when receiving from the controller 13 a transmission-end notification indicating that transmission of transferring data is ended.

The memory 12 temporarily stores target transfer data. This is performed through writing of the transfer data into the memory 12 by the CPU 11. The controller 13 is for controlling transmission of transfer-data in response to transfer request from the CPU 11. The controller 13 is also for notifying CPU 11 of an analysis result of a reception frame. The controller 13 includes a controlling section 131, a transmission frame generating section 132, and a reception frame analyzing section 133.

Furthermore, the transmission frame generating section 132 includes a data reading section 1321, a frame sequence number adding section (sequence number adding means) 1322, a transmission right transferring flag adding section (transmission right transferring flag adding means) 1323, a frame constructing section 1324, and an error detection/correction code adding section 1325.

Further, reception frame analyzing section 133 includes a retransmission request judging section 1331, and a frame sequence number extracting section 1332.

In response to a transfer-request from the CPU 11, the controlling section 131 requests the data reading section 1321 to read out data. Further, the controlling section 131 notifies the frame sequence number adding section 1322 of a sequence number, and notifies the transmission right transferring flag adding section 1323 of whether to transfer the transmission right to the opposite station. At this point, the controlling section 131 controls (i) the length of data being read by the data reading section 1321 and (ii) an interval at which data is read out, so as to control a frame length and an interval between frames. Note that the controlling section 131 controls the frame length so that the length of each frame is not more than the maximum frame length derived from a data volume that can be detected in the error detection/correction code adding section 1325.

Further, the control section 131 detects that all frames for the transfer data read out from the memory 12 have been transmitted from the transmitter 14, and outputs a transmission completion notification indicating the completion of transmission of target data to the CPU 11.

The frame constructing section 1324 generates a frame based on: (I) data received from the data reading section 1321; (II) the sequence number notified by the frame sequence number adding section 1322; and (III) information of whether to transfer the transmission right which information is notified by the transmission right transferring flag adding section 1323. Note that the transfer speed of the frame generated by the frame constructing section 1324 is controlled by the controlling section 131.

Further, the frame constructing section 1324 successively transmits generated frames to the error detection/correction code adding section 1325. At this point, the frame constructing section 1324 adjust the time interval between one frame to another to a frame interval received from the controlling section 131.

The error detection/correction code adding section 1325 adds to each frame generated by the frame constructing section 1324 an error detection code (or a correction code), and transmits the frame to the transmitter 14 in the later stage. The error detection/correction code adding section 1325 arranges the error detection code (or the correction code) in an FCS of each frame.

Note that, the error detection code is a cyclic code, such as a CRC (Cyclic Redundancy Check), while the correction code is a BCH code, such as a parity examination code, a hamming code, or a Reed-Solomon code. Note that the CRC code is set to, for example, 4 bytes. The volume of data is regulated so that an error can be detected using this 4 byte code.

The transmission section 14 outputs a plurality of frames received from the controller 13 at a predetermined time interval via an infrared communication path. Further, the receiver 15 successively transmits response frames received from the secondary station to the reception frame analyzing section 133 in the controller 13.

Based on a frame received via the receiver 15, the retransmission request judging section 1331 of the reception frame analyzing section 133 notifies the controlling section 131 whether a retransmission is requested. Further, the frame sequence number extracting section 1332 of the reception frame analyzing section 133 extracts the sequence number of the frame received via the receiver 15, and notifies the controlling section 131 of a frames in which an error has occurred.

Here, the controlling section 131 notifies the CPU 11 whether frames transmitted contained an error. If an error was contained, the controlling section 131 notifies the CPU 11 of the frame in which the error occurred.

If no error has occurred, the CPU 11 instructs the secondary station to transfer the transmission right from the secondary station to the primary station, so that another batch of a predetermined number of frames can be transmitted to the secondary station. The same steps are repeated until all the data items of the file is transmitted.

Further, if an error is notified, the frames having transmitted are retransmitted before the transmission right is transferred through the above steps. Here, if the CPU 11 is notified of the frame number of the frame in which an error occurred, retransmission of the frames may performed starting from the frame of the notified frame number.

Next, the following describes the receiver 2a according to the present embodiment with reference to FIG. 2. FIG. 2 is a block diagram illustrating a structure of a secondary station. As shown in FIG. 2, a secondary station (receiving device) of the present embodiment includes: a CPU 21, a memory 22, a controller 23, a receiver 24 and a transmitter (transmission means) 25.

The receiver 24 receives frames transmitted from the primary station via an infrared communication path, and sends the received frames to the controller 23. The controller 23 performs a predetermined control process, based on the frames having been received via the receiver 24. This controller 23 includes: a controlling section 231; a frame processing section 232; an error detection/correction circuit 233; an error frame number retaining section 234; a response frame generating section (response frame generation means) 235; and an error detection/correction code adding section 236.

The frame processing section 232 receives the frames via the receiver 24, and extracts a data field, a transmission right transfer flag, a frame sequence number and an FCS portion. In other words, the frame processing section 232 extracts from the frame received via the receiver 24: information contained in the data field; transmission right transfer flag; the sequence number of the frame; and an error detection code (or a correction code) for the information. The frame processing section 232 then transmits the extracted information and the error detection code (or the correction code) to the controlling section 231, the error detection/correction circuit 233, and the error frame number retaining section 234.

For example, when a frame is received, the frame processing section 232 extracts transmission data, transmission right transfer flag, the sequence number of the frame, and an error detection code (or a correction code). Then the frame processing section 232 transmits the extracted transmission data, the transmission right transfer flag, the sequence number of the frame, and the error detection code (or the correction code) to the controlling section 231, the error detection/correction circuit 233, and the error frame number retaining section 234. The error detection/correction circuit 233 performs error detection (or correction) with respect to the received information, and transmits the result to the controlling section 231, and the error frame number retaining section 234.

The controlling section 231 performs a predetermined process according to the result sent from the error detection/correction circuit 233. If the result from the error detection/correction circuit 233 indicates that the received data contains no error, the controlling section 231 writes the received data into the memory 22, and notifies the CPU 21 of the completion of reception.

On the contrary, if the result from the error detection/correction circuit 233 indicates that the received data contains an error, the controlling section 231 abrogates the reception data, reads out from the error frame number retaining section 234 the frame number of the frame in which the error occurred, and notifies the CPU 21 of the reception error, and of the frame number of the frame in which the error occurred. Meanwhile, referring to the transmission right transfer flag extracted by the frame processing section 232, the controlling section 231 notifies whether the transmission right has been transferred.

The memory 22 is for the receiver 24 to store received data. To this memory 22, error-free reception data is written in by the controlling section 231.

The CPU 21 performs a process according to the notification from the controlling section 231. In other words, if the controlling section 231 notifies that the transmission right has been transferred, and if no error has been detected in all the frames received, the CPU 21 performs a predetermined process on the basis of all the pieces of reception data stored in the memory 22, and notifies the controlling section 231 to transmit a response frame in reply to indicate that all the frames have been properly received. Further, if the controlling section 231 notifies that the transmission right has been transferred, and if an error has been detected in a frame received, the CPU 21 notifies the controlling section 231 to request retransmission due to the occurrence of the error. Meanwhile, the frame number of the error-containing frame is also notified.

When the transmission request is received from the CPU 21, the controlling section 231 notifies the response frame generating section 235 to generate a response frame. At this point, information of whether the received frames contained an error is given. If the received frames contained an error, the frame number of the error frame is notified along with the information.

In the response frame generating section 235, a response frame is generated based on the notification from the controlling section 231, and the generated frame is sent to the error detection/correction code adding section 236. In the error detection/correction code adding section 236, an error-detection code or a correction code is added to the frame generated by the response frame generating section 235, and the frame is then transmitted to the transmitter 25. The transmitter 25 transmits to the outside, via an infrared communication path, the frame having been received from the error detection/correction code adding section 236.

Figure 3:
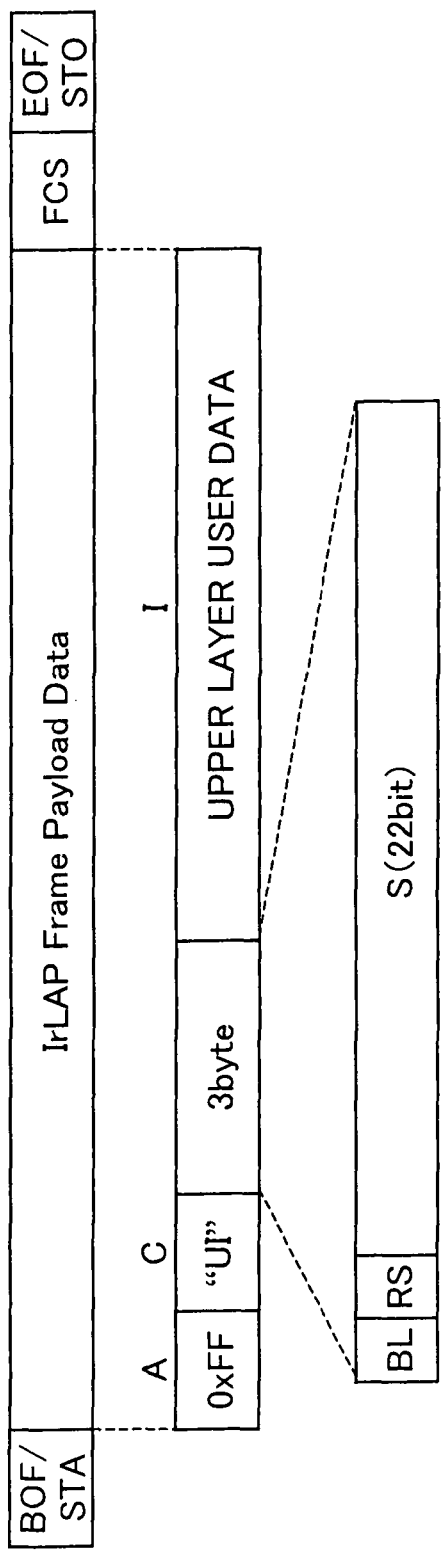
FIG. 3 is a block diagram illustrating a structure of frames of embodiment 1.

FIG. 3 illustrates a structures of an UI frame and a response frame thereto. The response frame is given: a sequence number of the UI frame, a flag indicating whether to transfer the transmission right to the opposite station, and a flag indicating if there is an omission in the received frames. Note however that the frame structure is mere an example, and is not limited to this.

Here, the UI frame and the response frame thereto are given a 3 byte parameter which includes: a flag indicating whether to transfer the transmission right to the opposite station and a flag indicating if there is an error in the received frames to be used in the secondary station. Further, a sequence number of the frame is given in the remaining 22 bits of the 3 bytes.

In the following, BL is the flag indicating whether to transfer the transmission right to the opposite station, RS is a flag indicating if there is an error in the received frames to be used in the secondary station, and S is the sequence number of the frame. The following describes how data transmission is performed between the primary and secondary stations, using frames with the frame structure.

Figure 4:
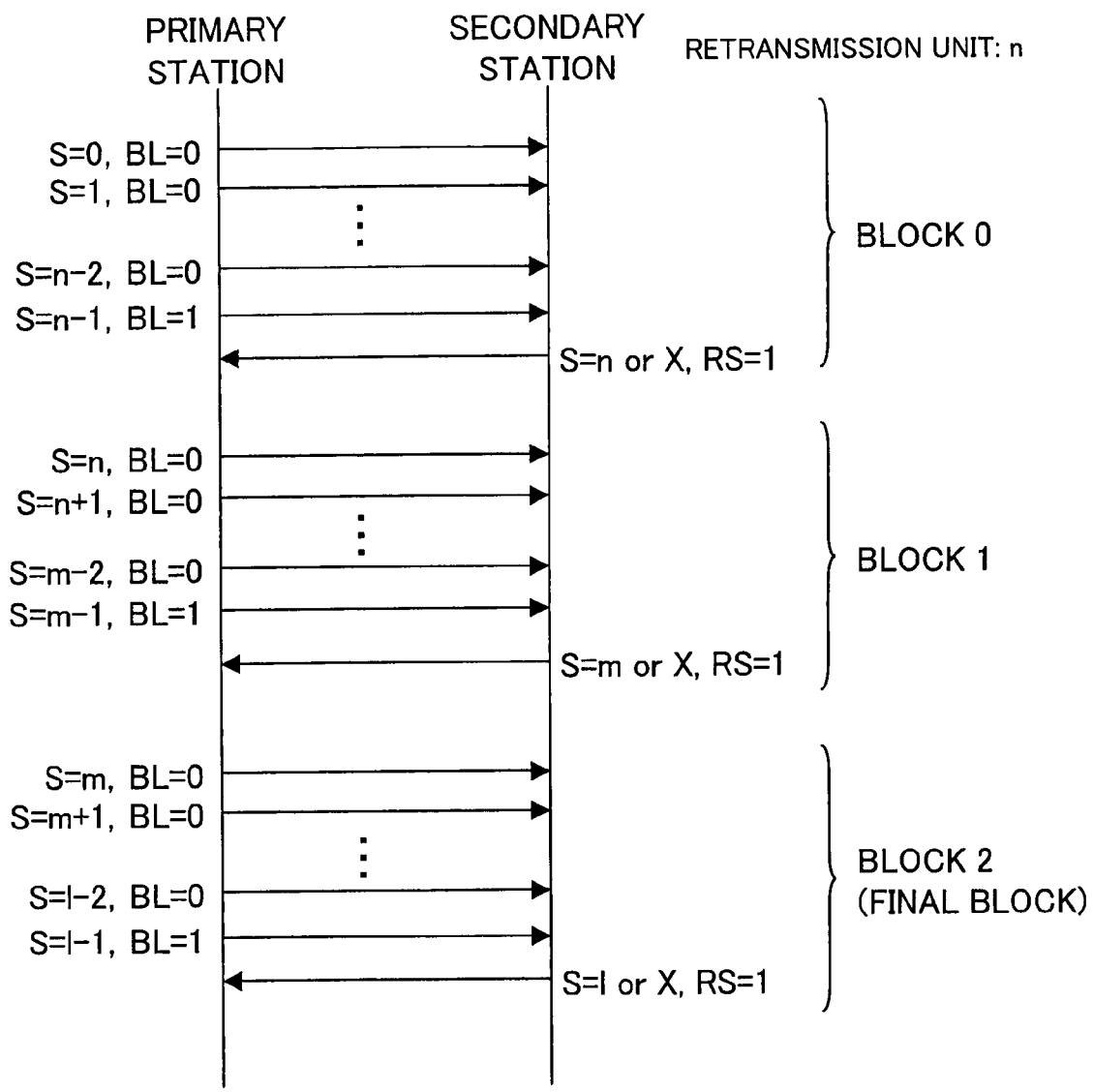
FIG. 4 is a signal sequence diagram illustrating steps of a data transferring process of embodiment 1.
Figure 5:
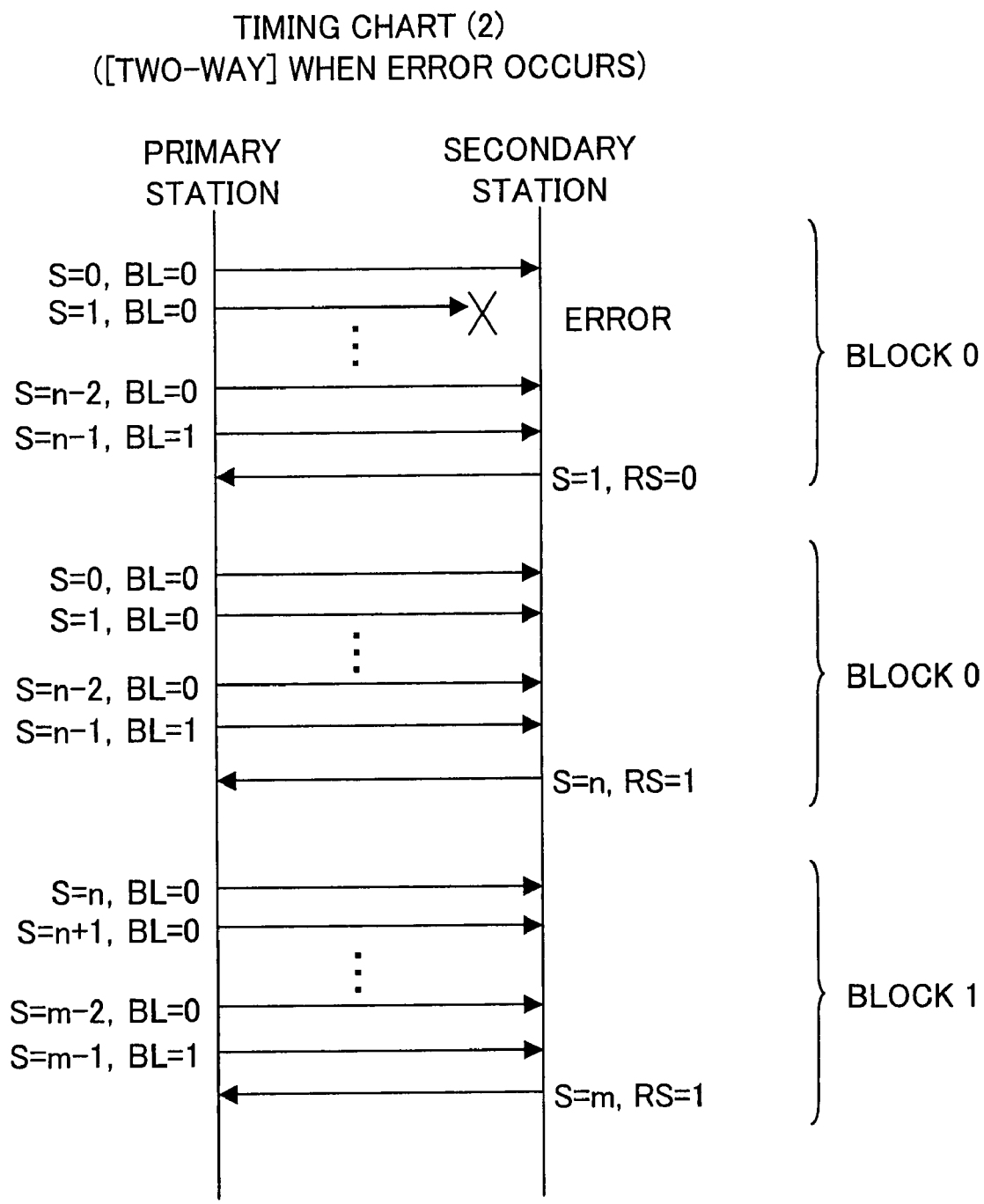
FIG. 5 is a signal sequence diagram illustrating steps of a data transferring process of embodiment 1, which process is performed when an error occurs.

With reference to the signal sequence diagrams of FIG. 4 and FIG. 5, a data transfer procedure between the primary and secondary stations are described. Note that FIG. 4 illustrates a case of two-way communication, where no error occurred in all the reception data.

Firstly, in the primary station, the CPU 11 which received a transfer-instruction via the operating section stores in the memory 12 transfer data to be transferred, and outputs a transfer request to the controller 13. Here, it is assumed that the transmission right is transferred to the secondary station, at every n frames. Further, in FIG. 4 and FIG. 5, S is the sequence number of the frame, BL is a flag indicating whether to transfer the transmission right, and RS is a flag indicating whether retransmission is necessary.

In the primary station, n frames (the sequence number S=0 to n−1) are transmitted to the secondary station via an infrared communication path. Here, since the transmission right is transferred at every n frames, BL is set to 1 in the frame whose S is n−1.

The secondary station successively receives from the primary station the frames of S=0 to S=n−1. Then, if the n frames are all received without an error, a response frame is transmitted to the primary station. The value of RS is set to 1 to mean that the received frames contained no errors and therefore no retransmission is necessary.

The primary station performs the similar process when receiving from the secondary station a response frame indicating the proper reception of the n frames. The similar process is also performed in the secondary station. If the CPU is notified that all the frames have been received without an error, the CPU performs a predetermined received-data-post-process with respect to the received data.

Next, the data transfer procedure between the primary and secondary stations are described with reference to the signal sequence diagram of FIG. 5. Note that FIG. 5 illustrates a case of two-way communication, where an error occurred in the received frames.

Here, it is assumed that the transmission right is transferred to the secondary station, at every n frames. Further, as in FIG. 4, S is the sequence number of the frame, BL is a flag indicating whether to transfer the transmission right, and RS is a flag indicating whether retransmission is necessary.

In the primary station, n frames (the sequence number S=0 to n−1) are transmitted to the secondary station via an infrared communication path. Here, since the transmission right is transferred at every n frames, BL is set to 1 in the frame whose S is n−1.

It is assumed that the secondary station detects an error not in the frame 0, but in the frame 1. In this case, when the secondary station receives from the primary station a frame indicating that the transmission right is transferred, the secondary station transmits to the primary station a frame whose flag is set to indicate occurrence of an error in the received frames. The primary station senses the occurrence of an error by receiving from the secondary station the frame indicating the occurrence of an error. Then, the primary station retransmits the frame in which the error has occurred.

Embodiment 2

The present embodiment deals with an alternative form of the embodiment 1. Note that wordings (inclusive of a member and a function) defined in the other embodiments are used in the same manner in the present embodiment, unless otherwise noted.

In the embodiment 1, the primary station transfers the transmission right to the secondary station at every n frames. However, the present embodiment deals with a case where the transmission right is transferred according to an optimum number of the frames which is calculated at the time of establishing connection according to the IrDA communication scheme. This optimum number of the frames is calculated with reference to the numbers of frames that can be transmitted/received from/by the primary station and the secondary station. These numbers of transmittable/receivable frames are provided in a field of a connection request frame transmitted from the primary station and a field of frame transmitted from the secondary station (opposite station) to the primary station in response to the connection request frame, and are exchanged between the primary and the secondary stations when establishing connection. Note that the number of frames is desirably settable.

In the IrDA communication scheme, the primary station first transmits an SNRM frame to the secondary station, requesting establishment of a state for transferring data. The secondary station having received the frame transmits in reply a DM frame to the primary station, if communication is not possible. If communication is possible, the secondary station transmits in reply to the primary station a UA frame meaning that the request is accepted. All of the SNRM frame, DM frame, and UA frame are respectively forms of U frame. The state for transferring data is established between both stations and transferring of data is possible, if the secondary station transmits the UA frame in reply.

In short, the present embodiment is such that, at the time of establishing connection, the parameter indicating transmittable data size of the frame-transmitting station is given to the SNRM frame or the UA frame.

With this configuration, the transmission right is transferred without an exception at every certain number of frames supported by both of the primary station and the secondary station. Therefore, it is possible to exchange frames according to the respective memory capacities of the both stations.

Figure 6:
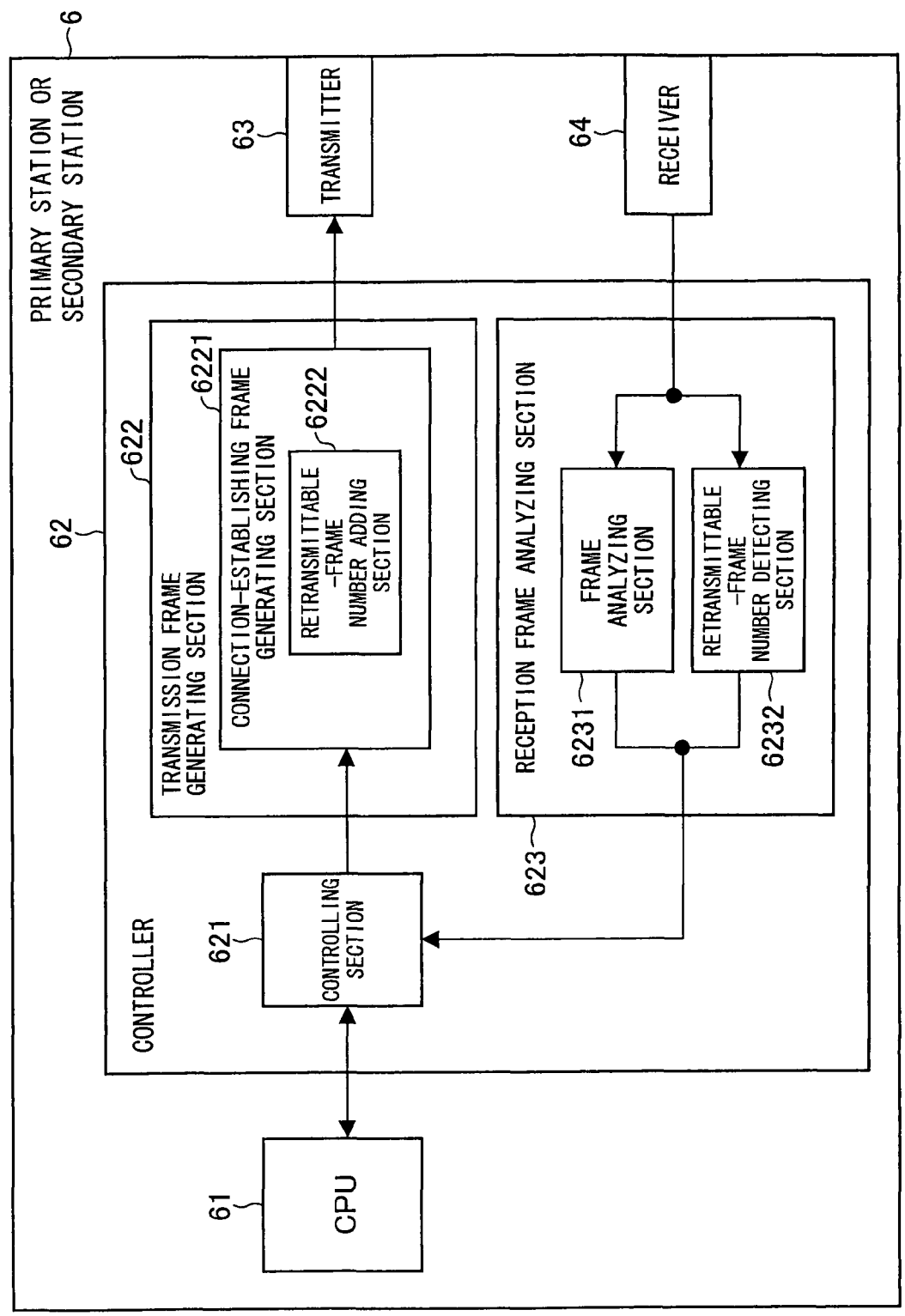
FIG. 6 is a block diagram illustrating respective structures of primary and secondary stations of embodiment 2, which are for use in the communication system of the present invention.

FIG. 6 is a block diagram illustrating a configuration of a transmitting/receiving circuit used in a communication system of the present embodiment. As shown in FIG. 6, the transmitting/receiving circuit of the present embodiment includes: a CPU 61, a controller 62, a transmitter 63, and a receiver 64.

In response to a connection instruction entered by a user via an operating section (not shown), the CPU 61 requests establishment of connection to the controller 62. The controller 62 controls connecting process in response to the connection request from the CPU 61. The controller 62 includes: a controlling section 621; a transmission frame generating section 622; and a reception frame analyzing section 623.

Further, the transmission frame generating section 622 includes: a connection-establishing frame generating section 6221; and a retransmittable-frame number detecting section 6222. In response to the connection request from and the notification of a retransmittable-frame number from the CPU 61, the controlling section 621 requests the connection-establishing frame generating section 6221 to generate a connection request frame, and notifies the retransmittable-frame number detecting section 6222 of the retransmittable-frame number which is notified by the CPU 61.

In the connection-establishing frame generating section 6221, a connection request frame is generated. The retransmittable-frame number detecting section 6222 adds to the generated connection request frame a field indicating a retransmittable frame, and sends the frame to the transmitter 63. The transmitter 63 transmits the frame received from the transmission frame generating section 622, via an infrared communication path.

In the present transmitting/receiving circuit, the receiver 64 receives from the secondary station (opposite station) the connection response frame, after the transmission of the connection request. The receiver 64 having received the connection response frame transmits the frame to the reception frame analyzing section 623 in the controller 62.

The reception frame analyzing section 623 includes: a frame analyzing section 6231; and a retransmittable-frame number detecting section 6232. The frame analyzing section 6231 analyzes the received frame, and notifies the controlling section 621 of the resulting response from the opposite station, in relation to the connection request from the primary station??.

Further, the retransmittable-frame number detecting section 6232 extracts from the received frame the field indicating the retransmittable-frame number, and notifies the controlling section 621 of the retransmittable-frame number.

In the controlling section 621, the notified result from the reception frame analyzing section 623 and the retransmittable-frame number of the primary station?? are compared with each other so as to know the maximum retransmittable-frame number of the both stations. The result is then notified to the CPU 61.

Thus, with the result received, the CPU 61 know that the transferring of the transmission right to the opposite station should be performed following the method described in embodiment 1, at every maximum retransmittable-frame number.

Here, description is provided only in regard to the procedures of how the primary station know the maximum retransmittable-frame number of the both stations are described here. However, the secondary station is also able to know the maximum retransmittable-frame number of the both stations by comparing the retransmittable-frame numbers of the secondary station with that of the primary station. Further description for this is omitted here.

Figure 7:
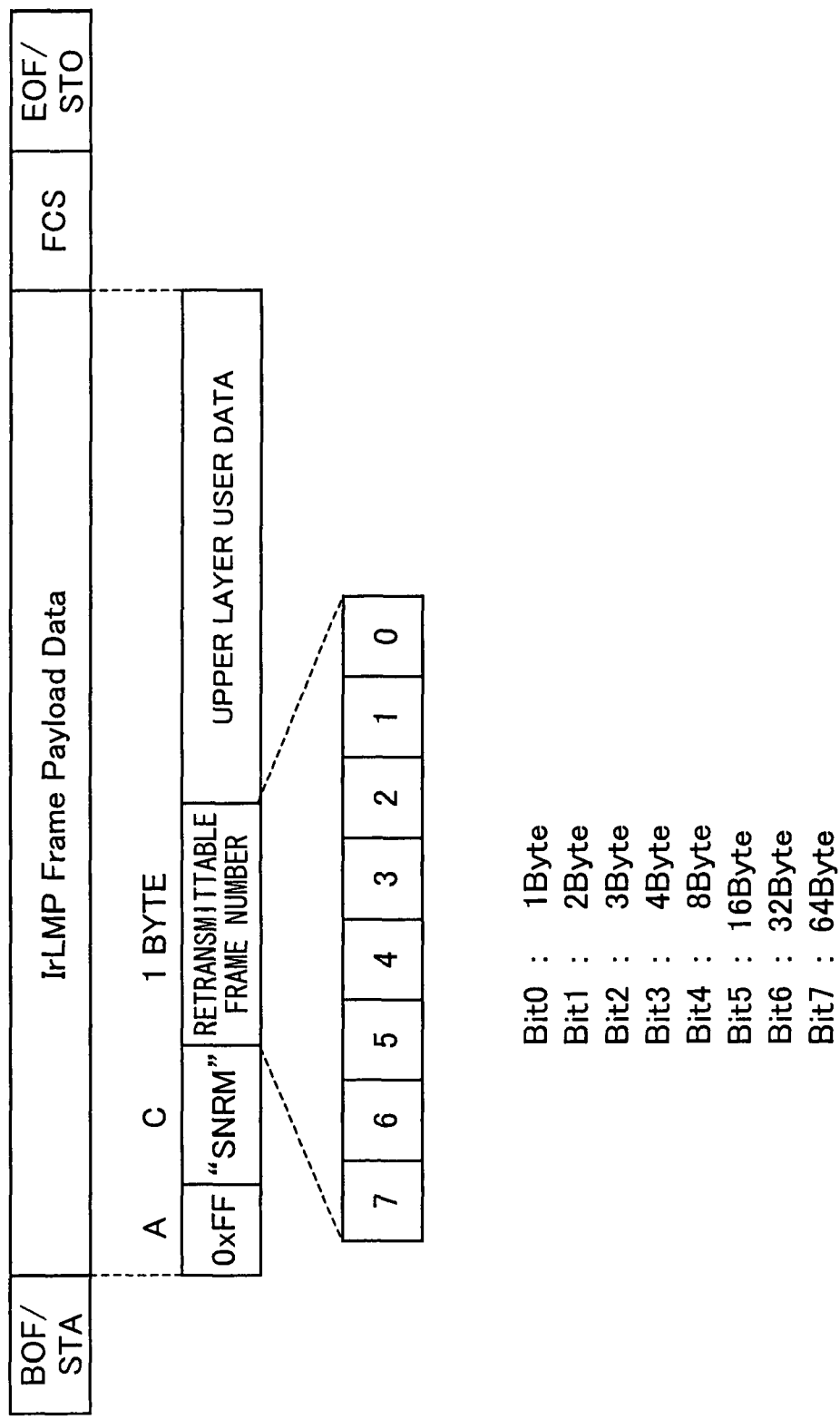
FIG. 7 is a block diagram illustrating a structure of frames of embodiment 2.

FIG. 7 illustrates a frame structure of the SNRM frame or UA frame to which a parameter indicating the retransmittable data size of a station is added. Note however that the frame structure is mere an example, and is not limited to this.

In this case, a parameter of 1 byte is added. Each bit in the byte indicates a data size that the station is able to retransmit. When exchanging the frame, each bit corresponding to a data size supported by the station is set to 1. In this example, a bit-O means 1 byte; a bit-1 means 2 bytes, bit-2 means 3 bytes, bit-3 means 4 bytes, bit-4 means 8 bytes, bit-5 means 16 bytes, bit-6 means 32 bytes, and bit-7 means 64 bytes.

The both stations are able to obtain the receivable data size of the opposite station by referring to the frame received. Then, the transmission right may be transferred within the receivable data size of the opposite station.

Figure 8:
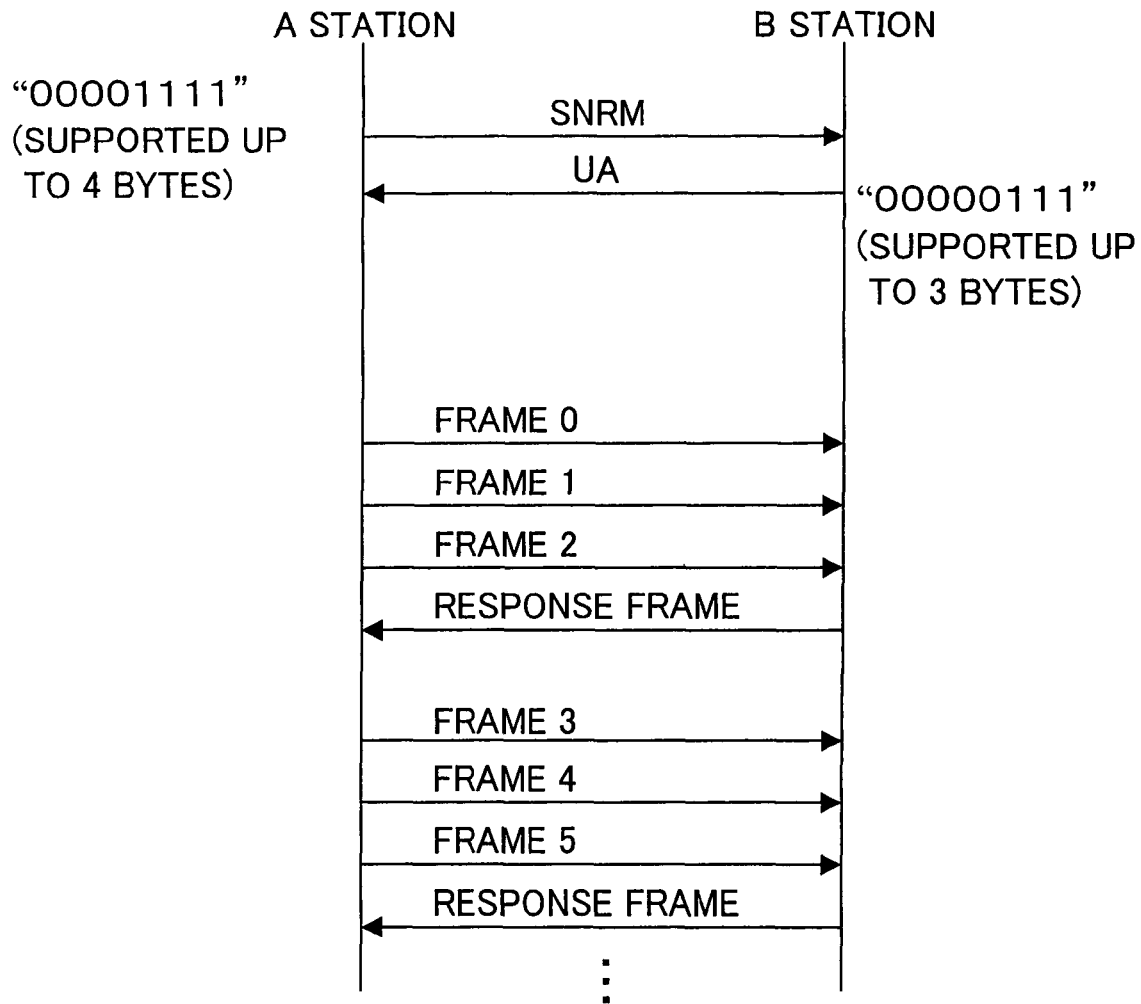
FIG. 8 is a signal sequence diagram illustrating steps of data transferring process of embodiment 2.
Figure 9:
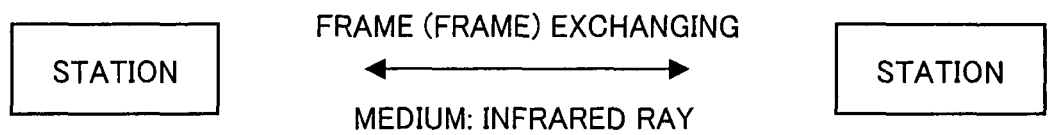
FIG. 9 is a block diagram for explaining an application of conventional HDLC communication scheme and/or IrDA communication scheme.
Figure 10:
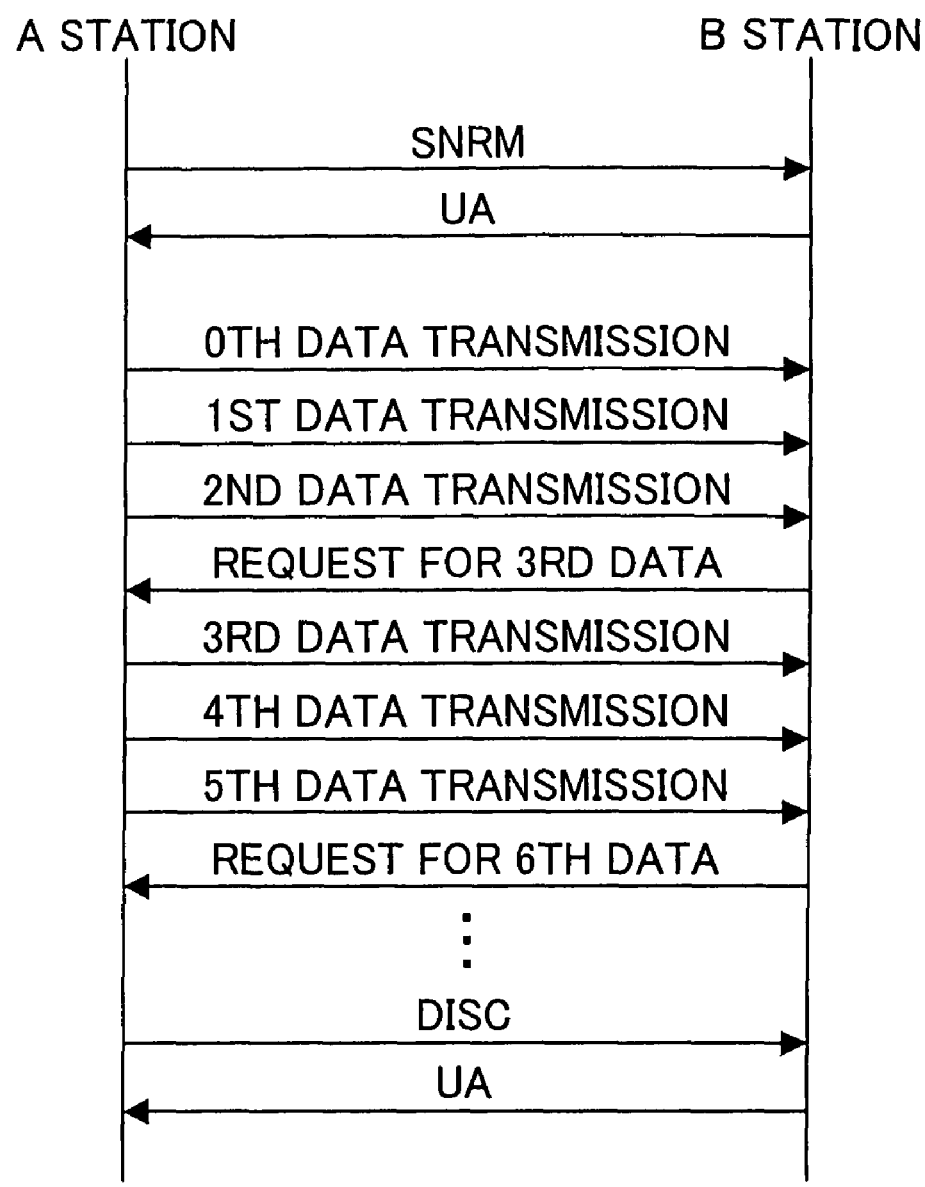
FIG. 10 is a signal sequence diagram for explaining typical steps of data transferring according to IrDA communication standard, using I frames.
Figure 11:
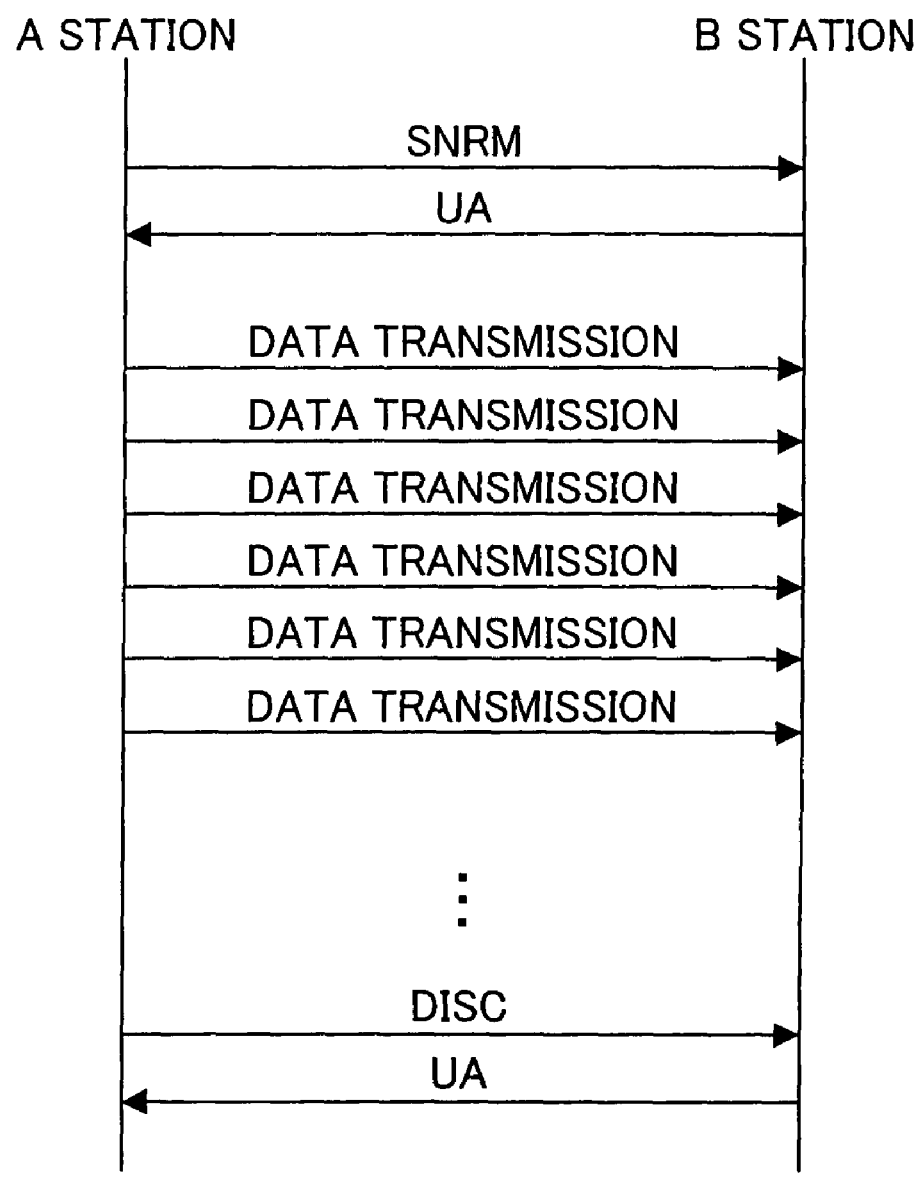
FIG. 11 is a signal sequence diagram for explaining typical steps of data transferring according to IrDA communication standard, using UI frames.

FIG. 8 is a signal sequence diagram showing exchanging of frames in the present embodiment. Here, the re-transmittable data size of the primary station is 4 bytes, and that of the secondary station is 3 bytes. Since the re-transmittable data size of the primary station is 4 bytes, the primary station transmits an SNRM frame with data of "00001111" added according to the frame configuration of FIG. 7.

Since the re-transmittable data size of the secondary station is 3 bytes, the secondary station transmits an UA frame with data of "00000111" added according to the frame configuration of FIG. 7. The primary station is able to know that the maximum receivable data size of the secondary station is 3 bytes. Therefore, the primary station transmits the subsequent frames in such a manner that the transmission right is transferred to the opposite station at every 3 frames, by using the method hereinabove mentioned in embodiment 1.

Embodiment 3

A data transferring system (communication system) of embodiment 3 is related to a system which performs communication according to various communication protocols having a hierarchy structure. Note that wordings (inclusive of a member and a function) defined in the other embodiments are used in the same manner in the present embodiment, unless otherwise noted.

The data transfer system of the present embodiment is described with reference to FIG. 12 to FIG. 17.

Figure 12:
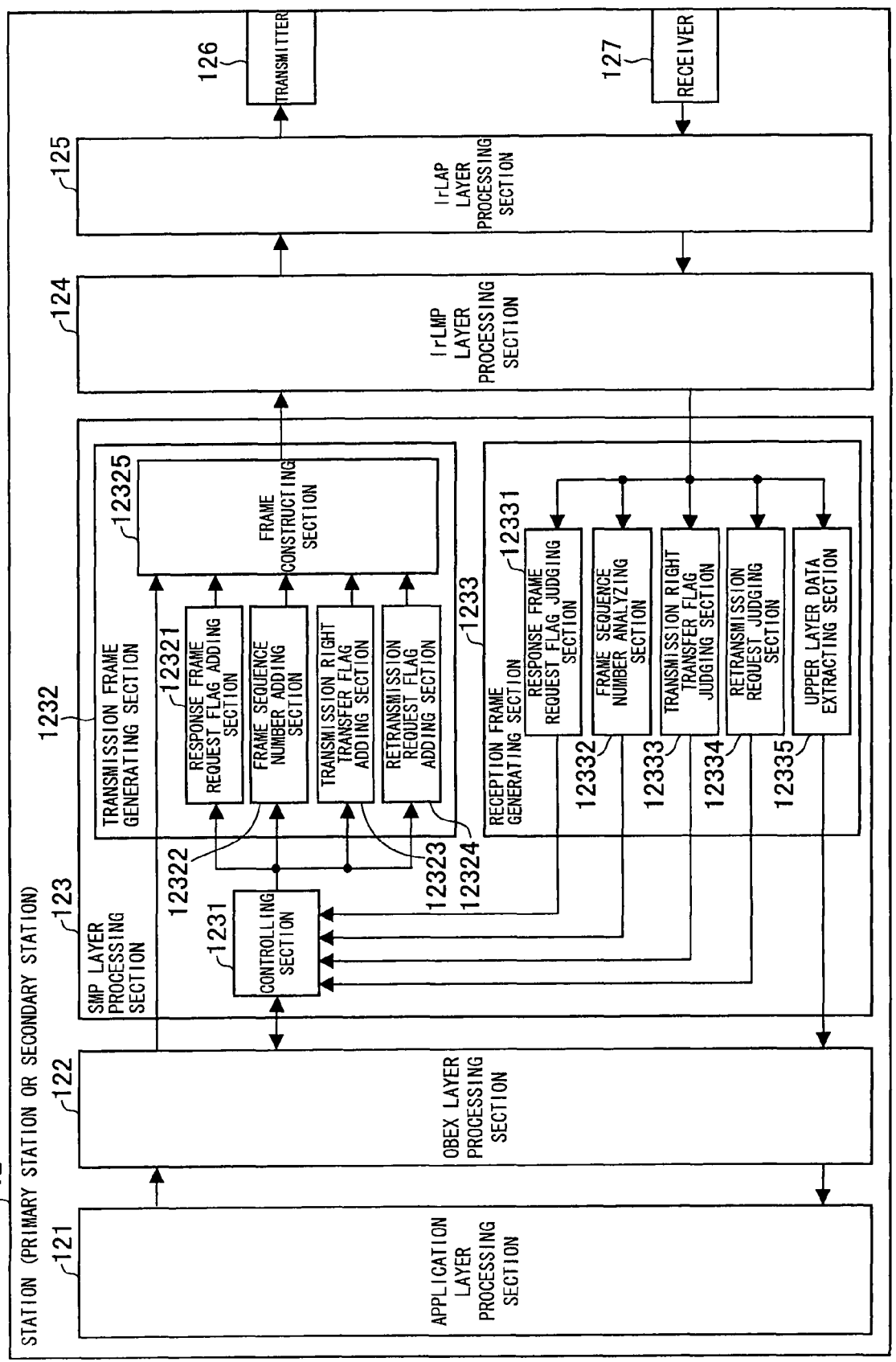
FIG. 12 is a block diagram illustrating respective structures of primary and secondary stations of embodiment 3, which are for use in the communication system of the present invention.
Figure 13:
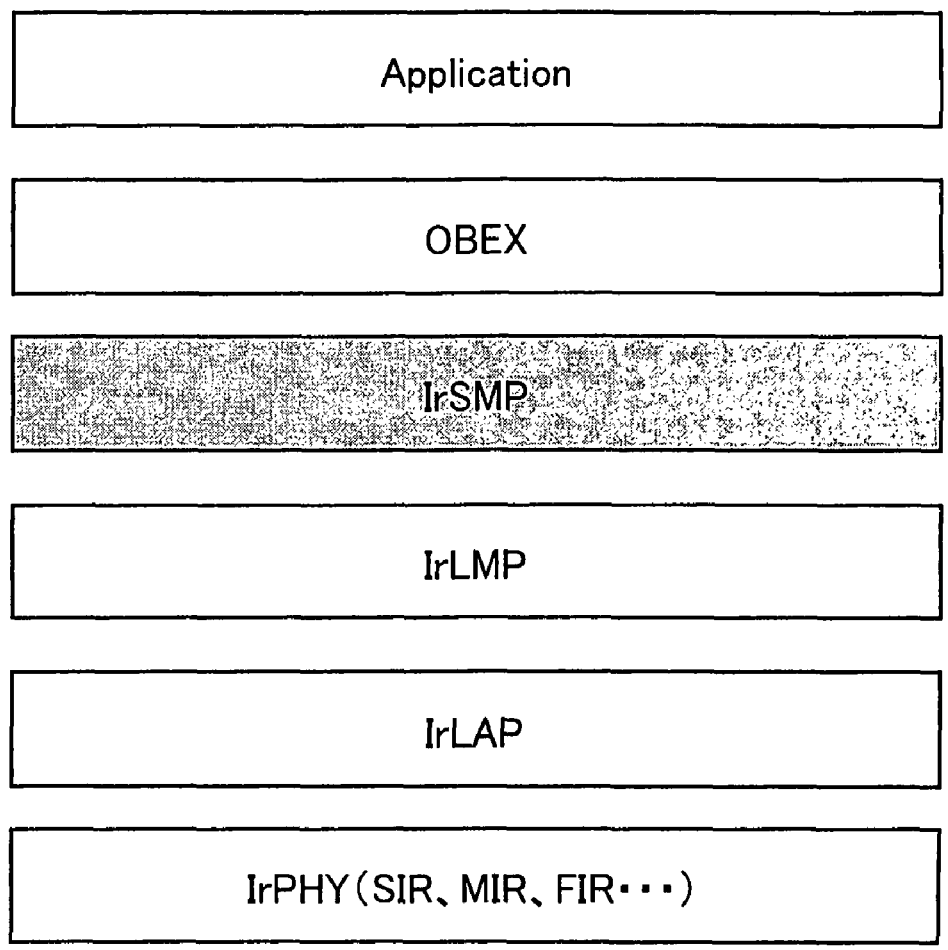
FIG. 13 is a diagram illustrating a protocol stack of a data transferring system of embodiment 3.

FIG. 12 is a block diagram illustrating a structure of station (i.e. a primary station (transmitting device) or a secondary station (receiving device)) of the present embodiment. Further, FIG. 13 illustrates a protocol stack for a data transmission system of the present embodiment. The function of the present embodiment is realized in a communication protocol layer located in the position of TinyTP layer of the IrDA protocol stack. This protocol layer is hereinafter referred to as SMP (Sequence Management Protocol) layer. Needless to say that a protocol stack for realizing the communication system of the present invention is not limited to this.

As illustrated in FIG. 12, a station 12 which is a primary or a secondary station includes: an application layer processing section 121; an OBEX layer processing section 122; an SMP layer processing section 123; an IrLMP layer processing section 124; an IrLAP layer processing section 125; a transmitter 126; and a receiver 127.

The application layer processing section 121, OBEX layer processing section 122, SMP layer processing section 123, IrLMP layer processing section 124, and IrLAP layer processing section 125 are blocks for realizing functions of plural communication protocols respectively. The plural communication protocols are arranged in this order to form a hierarchy structure.

The following describes a function of each block at the time of transmitting a request frame from the primary station to the secondary station.

In response to a user's instruction entered via an operation section (not shown), the application layer processing section 121 requests the OBEX layer processing section 122 to issues a requesting frame for communicating with outside. Further, when the application layer processing section 121 receives from the OBEX layer processing section 122 a notification of reception of a response frame, the application layer processing section 121 performs a predetermined processing according to the received response frame.

In response to the request from the application layer processing section 121, the OBEX layer processing section 122 generates a requesting frame, and notifies to (performs control so as to) issue the requesting frame to the SMP layer processing section 123. Further, the OBEX layer processing section 122 receives a response frame from the SMP layer processing section 123, and notifies the application layer processing section 121 of the reception result.

The SMP layer processing section 123 includes a controlling section 1231; a transmission frame generating section 1232; and a reception frame analyzing section 1233.

Further, transmission frame generating section 1232 includes: a response frame request flag adding section 12321; a frame sequence number adding section (sequence number adding means) 12322; a transmission right transferring flag adding section (transmission right transferring flag adding means) 12323; a retransmission request flag adding section (response frame generating means) 12324; and a frame constructing section 12325.

Further, the reception frame analyzing section 1233 includes: a response frame request flag judging section 12331; a frame sequence number analyzing section 12332; and transmission right transfer flag judging section 12333; a retransmission request judging section 12334; and an upper layer data extracting section 12335.

In response to a transfer-request from the OBEX layer processing section 122, the controlling section 1231 notifies the frame sequence number adding section 12322 of a sequence number, and notifies the transmission right transferring flag adding section 12323 of whether to transfer the transmission right to the opposite station. Further, the controlling section 1231 controls the response frame request flag adding section 12321, according to whether or not the transfer request from the OBEX layer processing section 122 is requesting a response frame. Further, since no retransmission request is performed in the primary station of the present embodiment, no particular control needs to be performed with respect to the retransmission request flag adding section 12324. Note that a retransmission request flag is added in the retransmission request flag adding section 12324, in a case where the primary station requests retransmission.

In the frame constructing section 12325, a frame is constructed by adding header information to the requesting frame received from the OBEX layer processing section 122. The header information is generated based on the following information pieces: (I) information notified by response frame request flag adding section 12321, which information indicates whether an upper layer is requesting a response frame for the transmission frame; (II) the sequence number of the frame notified by the frame sequence number adding section 12322; (III) information notified by the transmission right transferring flag adding section 12323, which information indicates whether to transfer the transmission right; and (IV) information from the retransmission request flag adding section 12324, which information indicates whether to request retransmission (note however that this value is always fixed in the primary station, as it does not request retransmission). Then, the frame constructing section 12325 outputs the constructed frame to its lower layer: i.e., IrLMP layer processing section 124.

In the IrLMP layer processing section 124, a frame is generated by adding a predetermined header information to the requesting frame received. The frame thus generated is output to the lower layer: i.e., IrLAP layer processing section 125.

Similarly, in the IrLAP layer processing section 125, a frame is generated by adding a predetermined header information to the requesting frame received. The frame thus generated is output to the transmitter 126.

The transmitter 126 transmits the plural frames received from the IrLAP layer processing section 125 to the outside via an infrared communication path, at a predetermined time interval.

Next, the following describes the respective operations of the blocks in the primary station at a time of receiving a response frame from the secondary station.

When the receiver 127 receives, via an infrared communication path, a response frame transmitted from the secondary station, the response frame is output to the IrLAP layer processing section 125.

In each of the IrLAP layer processing section 125 and IrLMP layer processing section 124, header information in the response frame having been received is analyzed, and a predetermined process is performed based on the header information. The header information is then removed from the response frame, and the response frame is transferred to the upper layer.

The SMP layer processing section 123 receives the response frame from the lower layer (IrLMP layer processing section 124), and analyzes the frame in the reception frame analyzing section 1233.

In the transmission right transfer flag judging section 12333, whether the transmission right is transferred is judged, by referring to the later-described BL bit of the received frame. The judgment result is notified to the controlling section 1231.

Further, in the retransmission request judging section 12334, whether retransmission is requested is judged by referring to the later-described RS bit of the received frame. The judgment result is notified to the controlling section 1231.

Further, in the frame sequence number analyzing section 12332, the frame number is extracted from the received frame. Then, the frame number is output to the controlling section 1231.

Based on the judgment result from the retransmission request judgment section 12331, if it is found that the opposite station is requesting retransmission, the controlling section 1231 controls the transmission frame generating section 1232 to perform retransmission of frames starting from the sequence number notified by the frame sequence number analyzing section 12332. Further, if the judgment result from the retransmission request judgment section 12331 indicates that the opposite station is not requesting retransmission, frames which are not yet transmitted are successively transmitted.

Further, in the upper layer data extracting section 12335, the header information of the SMP layer is removed from the frame received from the lower layer (IrLMP layer processing section 124 in this case), and the data is output to the upper layer (OBEX layer processing section 122 in this case).

The primary station performs data transmission to the secondary station through the above process until the transmission of transfer data is completed.

Next, the following describes the respective operations of the blocks in the secondary station at a time of receiving a requesting frame from the primary station.

As in the primary station, the receiver 127 in the secondary station receives a request frame transmitted from the primary station. Then, in each of the IrLAP layer processing section 125 and the IrLMP layer processing section 124, the header information of the requesting frame is analyzed and removed, and then is transferred to the upper layer.

The SMP layer processing section 123 receives the requesting frame from the IrLMP layer processing section 124, and analyzes the frame in the reception frame analyzing section 1233.

In the frame sequence number analyzing section 12332, the sequence number of the received frame is extracted. Then, the sequence numbers of the received frames are checked, if the sequence numbers are normal or abnormal (i.e. omission of a frame or the like). The result of the judgment is notified to the controlling section 1231. If the judgment is abnormal, the sequence number of the error frame (i.e. frame number of the frame needed to be retransmitted) is notified to the controlling section 1231 along with the judgment result.

In the transmission right transfer flag judging section 12333, whether the transmission right is transferred is judged by referring to the later-described BL bit of the received frame. The judgment result is notified to the controlling section 1231.

Further, in the response frame request flag judging section 12331, whether the later-described DL bit of the received frame is requesting the response frame of the upper layer is judged by referring to the DL bit of the received frame. The judgment result is notified to the controlling section 1231.

If the judgment result notified by the transmission right transfer flag judging section 12333 indicates that the transmission right is transferred from the opposite station, the controlling section 1231 controls (notifies) the transmission frame generating section 1232 to generate and transmit a response frame.

At this point, if the analysis result from the frame sequence number analyzing section 12332 indicates that an error has occurred in the sequence number of the frames, the controlling section 1231 notifies the retransmission request flag adding section 12324 to set a flag so as to request retransmission. The controlling section 1231 further notifies the frame sequence number adding section 12322 of the sequence number of the frame in which the error occurred, which number is notified by the frame sequence number analyzing section 12332.

If the analysis result from the frame sequence number analyzing section 12332 indicates that no error has occurred, the controlling section 1231 notifies the retransmission flag adding section 12324 to set the flag to indicate that the proper completion of the reception, instead of notifying to request retransmission.

Note however that, if the judgment result of the response frame request flag judging section 12331 indicates that the upper layer is requesting a response frame, the controlling section 1231 does not transmit the response frame until the OBEX layer processing section 122 completes the preparation of the response frame. When the OBEX layer processing section 122 notifies the completion of the preparation of the response frame, the controlling section 1231 notifies the transmission frame generating section 1232 to generate the response frame. In the transmission frame generating section 1232, a frame is constructed by adding predetermined header information to the response frame having been received from the OBEX layer processing section 122. The frame thus generated is output to the lower layer: i.e., IrLMP layer processing section 124.

The response frame may be generated and transmitted in the SMP layer processing section 123, before the OBEX layer processing section 122 completes the preparation of the response frame. In this case, the controlling section 1231 controls the transmission right transferring flag adding section 12323 to generate a transmission frame whereby the transmission right is not transferred to the primary station. Then, the controlling section 1231 notifies the transmission frame generating section 1232 to generate a response frame when the OBEX layer processing section 122 notifies the completion of the preparation of response frame. Further, at this point, the controlling section 1231 controls the transmission right transferring flag adding section 12323 to set the flag so that the transmission right is transferred to the primary station. In the transmission frame generating section 1232, a frame is constructed by adding predetermined header information to the response frame having been received from the OBEX layer processing section 122. The frame thus generated is output to the lower layer: i.e., IrLMP layer processing section 124.

In the transmission frame generating section 1232, a response frame is generated according to the control from the controlling section 1231. The generated response frame is then output to the lower layer (IrLMP layer processing section 124).

Thus, in the secondary station, the response frame for the requesting frame from the primary station is transmitted every time the transmission right is transferred from the primary station.

Figure 14:
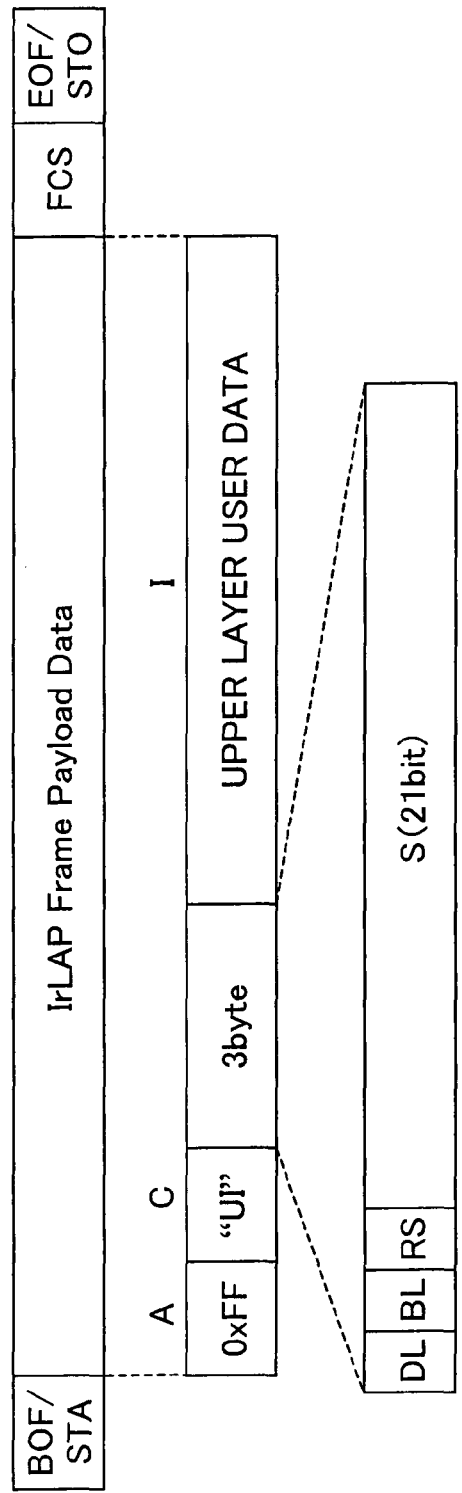
FIG. 14 is a block diagram illustrating a structure of a frame of embodiment 3.

FIG. 14 illustrates a structures of an UI frame and a response frame thereto. The response frame is given: a sequence number of the UI frame; a flag indicating whether to transfer the transmission right to the opposite station; a flag indicating if there is an omission in the received frames; and a flag indicating whether the upper layer of the primary station is requesting a response frame to the request frame. Note however that the frame structure is mere an example, and is not limited to this.

Here, the UI frame and the response frame are given a 3 byte header which includes: a flag indicating whether the transmission right is transferred to the opposite station; a flag indicating whether the upper layer of the primary station is requesting a response frame to the request frame; and a flag indicating whether the received frames used in the secondary station contains an error. The rest of 21 bits in the 3 byte header is the sequence number of the transmission frame.

In the following, DL is a flag indicating whether the upper layer of the primary station is requesting a response frame to the requesting frame, BL is a flag indicating whether the transmission right is transferred to the opposite station, RS is a flag indicating whether the received frames used in the secondary station contains an error, and S is the sequence number of a frame.

Figure 15:
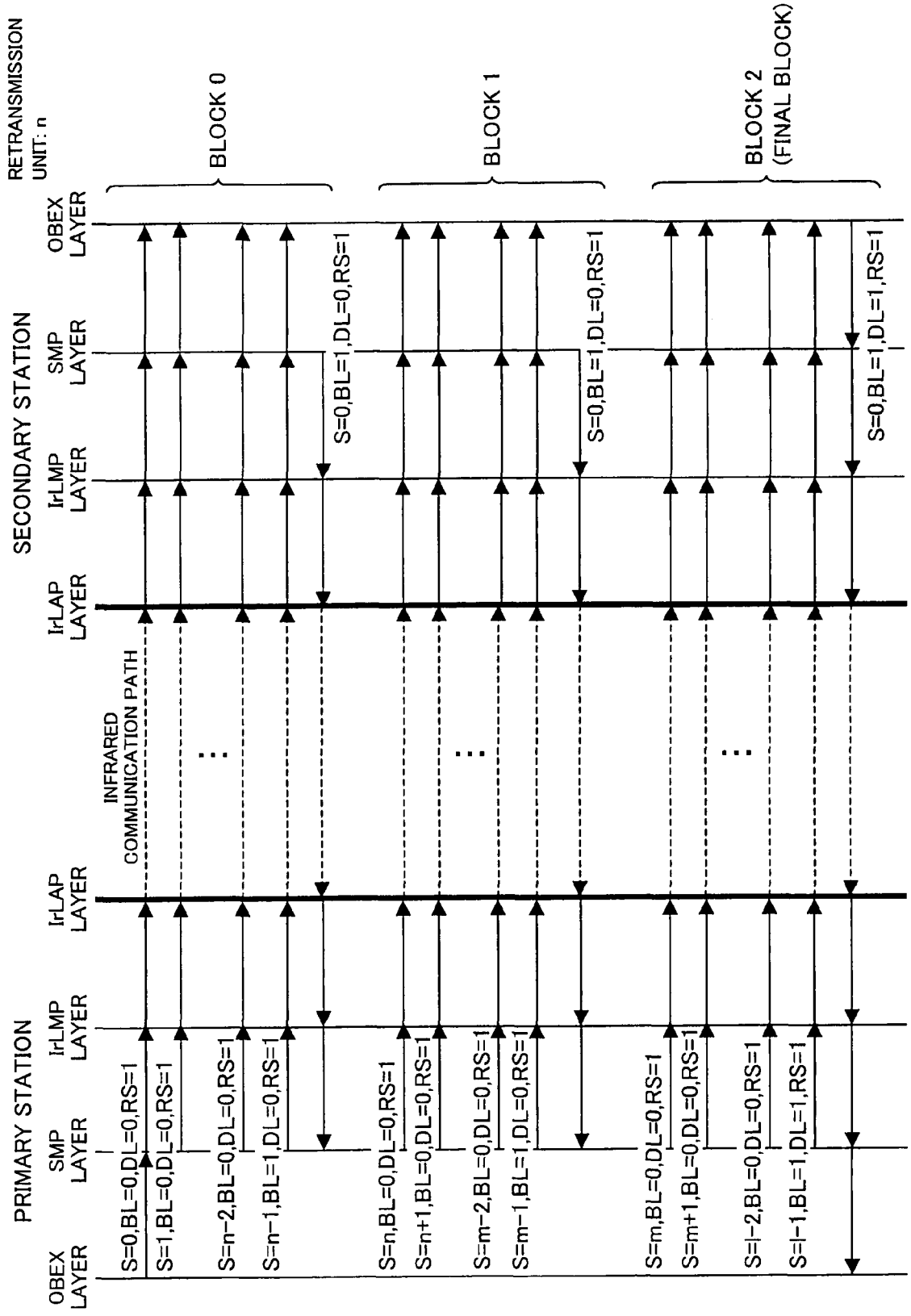
FIG. 15 is a signal sequence diagram illustrating steps of data transferring process of embodiment 3.

The following describes, with reference to FIG. 15, how data transmission is performed between the primary and secondary stations of the present embodiment, using the above-mentioned frame structure.

Note that FIG. 15 illustrates a case where no error occurred in all the data received during two-way communication.

First, in the primary station, the application layer processing section 121 requests transmission of requesting frame, according to a user instruction entered via an operating section (not shown). Then, the OBEX layer processing section 122 outputs a requesting frame to the lower layer: i.e., SMP layer.

Here, it is assumed that the transmission right is transferred to the secondary station at every n frames. Further, the symbols S, DL, BL, RS are respectively: a sequence number of a frame; a flag indicating whether the upper layer of the primary station is requesting a response frame to the request frame; a flag indicating whether the transmission right is transferred to the opposite station; and a flag indicating whether to request retransmission.

The SMP layer divides transfer data from the upper layer (OBEX layer) into data items of a predetermined data size, and outputs the data items to the lower layer (IrLMP layer) with a sequence number added to each of the data items. Here, since the transmission right is transferred at every n frames, the value of BL is set to 1 in the frame with S=n−1, when outputting data to the lower layer.

The frame from the SMP layer is successively given headers in the lower layers of the SMP layer (i.e., IrLMP layer and IrLAP layer). The frame to which the headers are added is transmitted to the secondary station via an infrared communication path.

The secondary station, on the other hand, receives frames from the primary station via an infrared communication path. In the IrLAP and IrLMP layers of the secondary station which layers are lower layers of the SMP layer successively analyze and remove the header information of each of the received frames, and outputs the data to the upper layer.

The SMP layer receives the frames from its lower layer (IrLMP layer), and analyzes the header information (3 bytes in this case). Then, the SMP layer refers to the frame sequence number in the header information to detect an error such as an omission of a frame. If no error is detected, the header information is removed, and the data items are successively transferred to OBEX layer (upper layer). Note however that a frame of S=n–1 is such that BL=1, and DL=0 which means that the transmission right has been transferred from the primary station, and that no response from the OBEX layer (upper layer) is not necessary. The SMP layer therefore transmits a response frame with its RS set to 1 to indicate that the received n frames contained no errors, and that no retransmission is necessary.

The primary station, when receiving from the secondary station the response frame indicating proper reception of the n frames, performs the process similar to the above described process, and transmits the next n frames. Similarly, the secondary station also receives the next n frames. When a frame with BL=1 (S=m–1 in the figure) is received, the secondary station transmits in reply to the primary station a response frame indicating the proper reception of the n frames.

Thus, the primary station successively transmits frames and transfers the transmission right to the secondary station at every n frames. In the final frame of the transfer data, the BL and DL are both set to 1 so as to indicate that the upper layer of the primary station is requesting a response frame to the requesting frame. Here, the DL bit is used as a flag indicating that the upper layer of the primary station is requesting a response frame to the requesting frame; however, the DL bit may be used as a flag also having another meaning. For example, in the case of FIG. 15, the DL bit may be used as a flag indicating the final frame of the transfer data.

The SMP layer of the secondary station having received a frame with its BL=1 and DL=1, notifies the OBEX layer (upper layer) that the DL=1, and therefore a response frame is requested for the requesting frame received. Since all the data items have been properly received, the OBEX layer received the notification from the SMP layer transfers a response frame to the SMP layer, and requests transmission of the response frame. The SMP layer having received the response frame transmission request from the OBEX layer adds header information (in this case RS=1, BL=1, DL=1 to mean that no retransmission is necessary) to the response frame from the OBEX layer, and transfers the response frame to the lower layer (IrLMP layer). The frame from the SMP layer is successively given headers in the lower layers of the SMP layer (i.e., IrLMP layer and IrLAP layer). Then, in the IrLAP layer, the frame to which the headers are added is transmitted to the primary station via an infrared communication path.

The primary station having received the response frame from the secondary station transfers data from the lower layer to the upper layer while analyzing and removing the header information successively. Then, the OBEX layer (upper layer of the SMP layer) receives the OBEX response frame from the secondary station, and the upper layer of the SMP layer of the primary station is able to recognize the proper completion of the data transmission.

Figure 16:
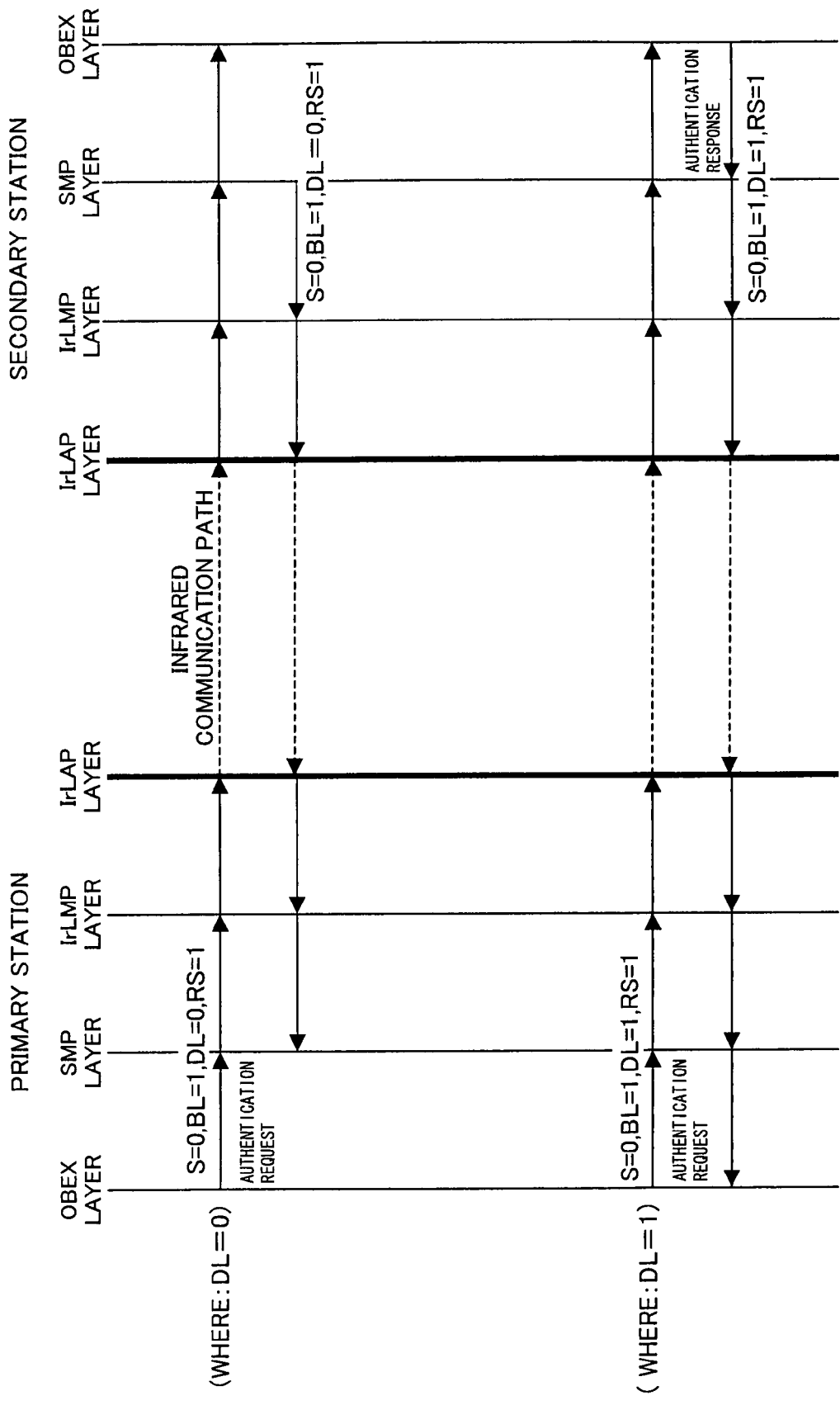
Figure 17:
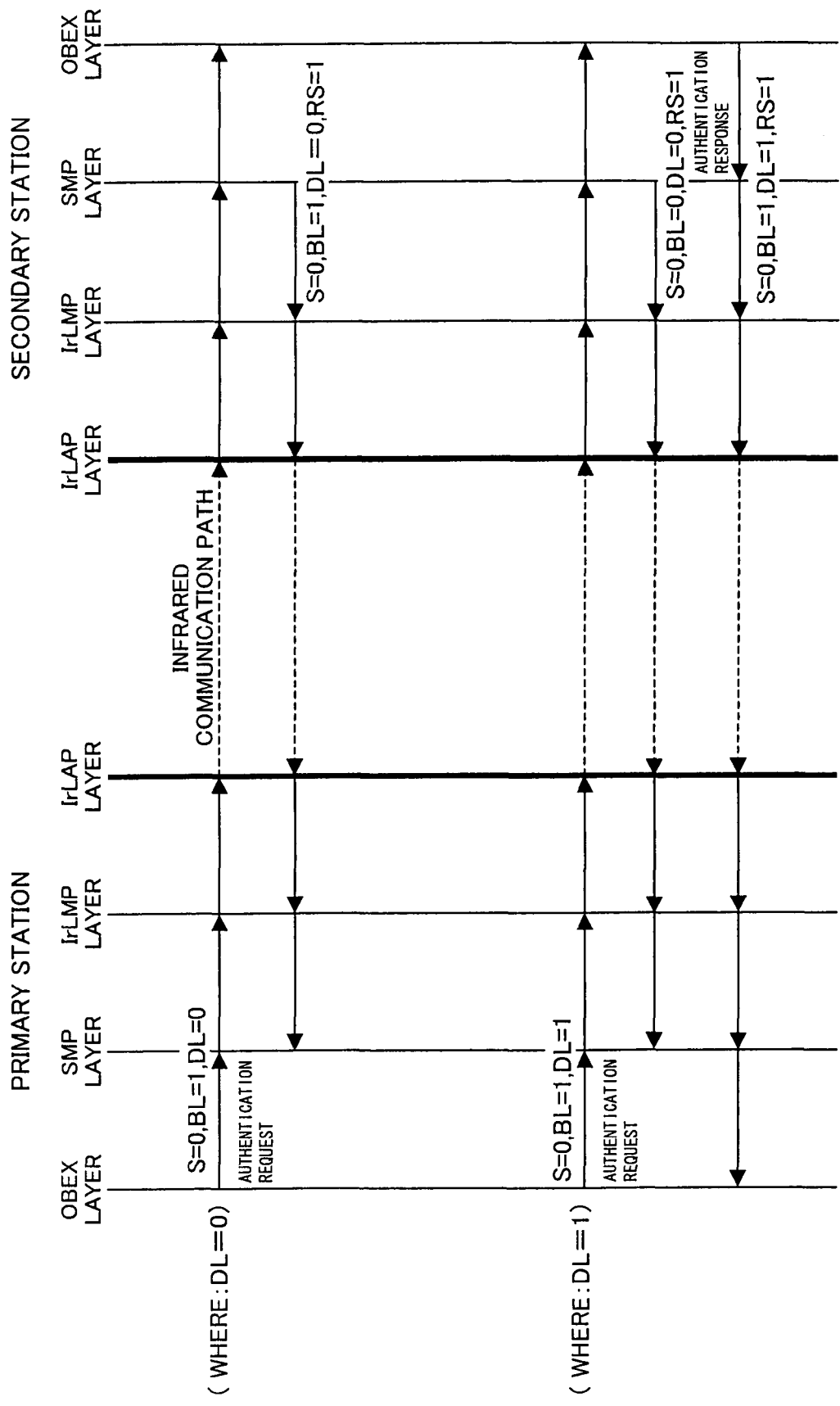
Figure 18:
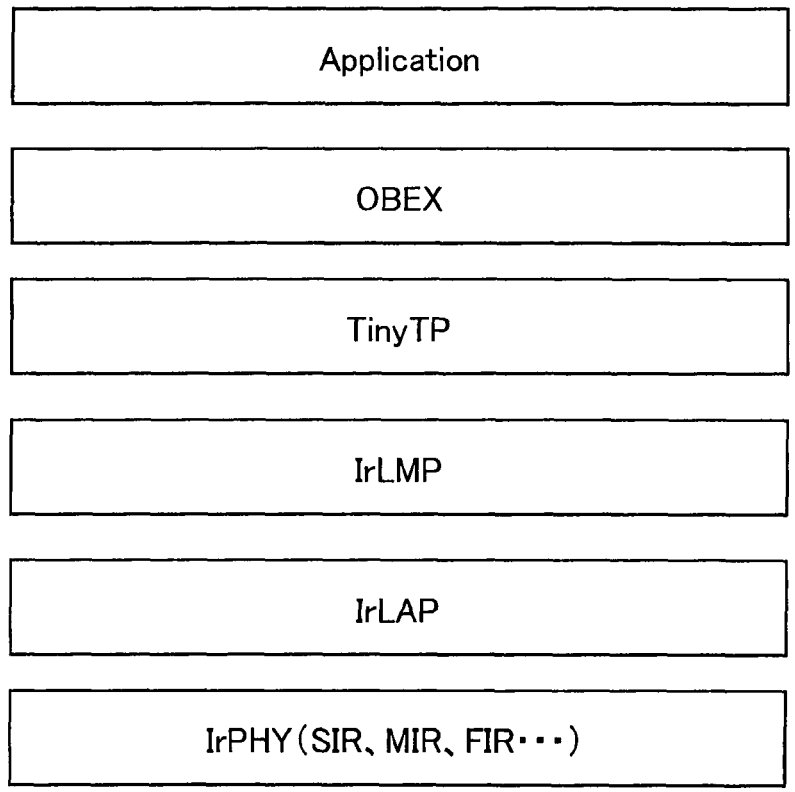
FIG. 18 is a diagram illustrating a protocol stack of conventional IrDA.
Figure 19:
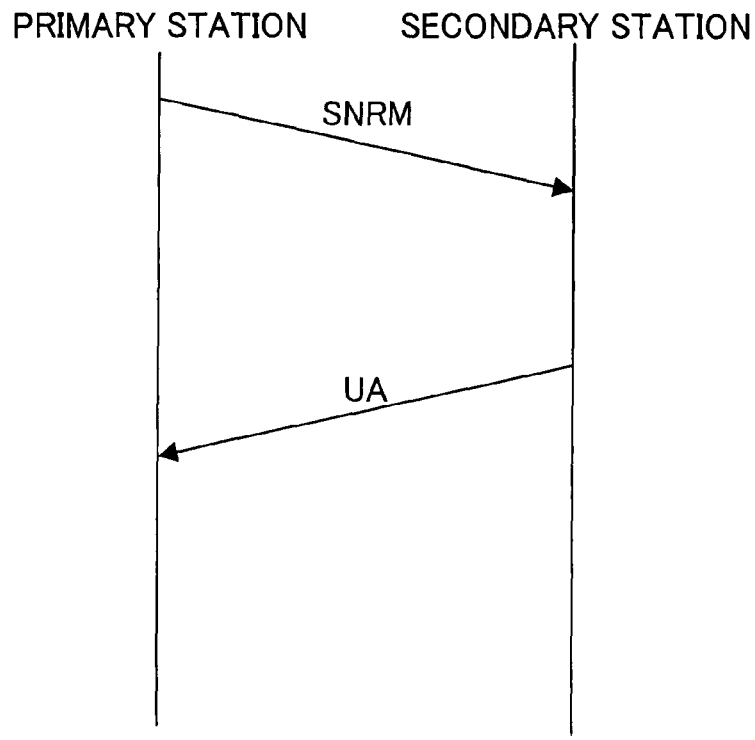
FIG. 19 is a sequence diagram at a time of establishing connection according to conventional IrDA.
Figure 20:
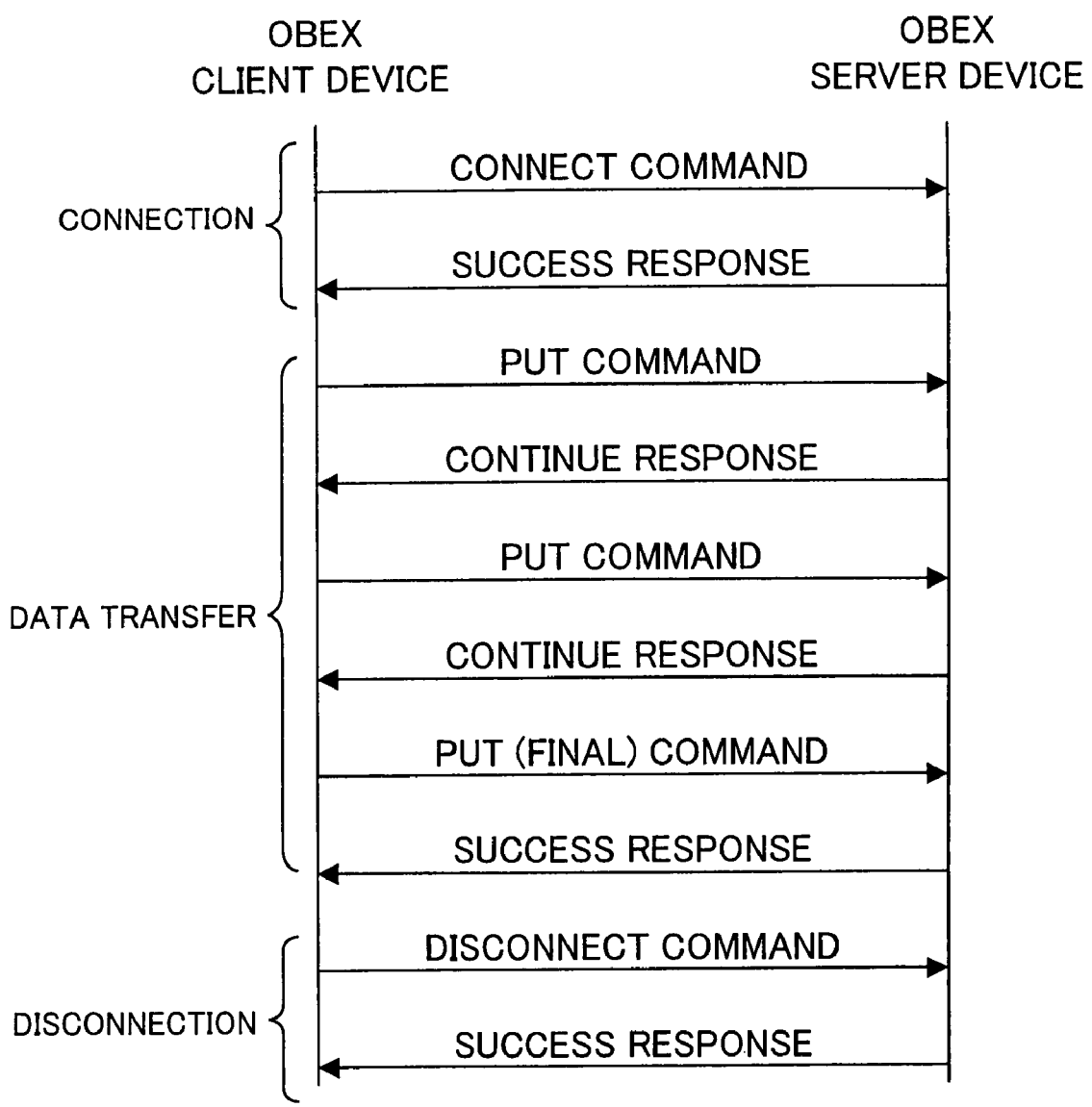
FIG. 20 is a sequence diagram of connecting, transferring data, and disconnection, according to OBEX.

FIG. 16 and FIG. 17 are signal sequence diagram showing the steps of data transmission when an authentication request is issued from the upper layer at the time of authentication or the like.

In FIG. 16, in response to an authentication frame from the upper layer, data transmission is performed to the secondary station. To the data transmitted to the secondary station, header information of DL=0 and BL 1 has been added in the SMP layer. In this case, the value of BL in the frame received by the secondary station is 1, and therefore the transmission right has been transferred from the primary station. Further, since the value of the DL in the frame received is 0, the secondary station sends back a response without waiting for the response from the upper layer. Therefore, in this case, a response frame from the upper layer of the secondary station can not be transmitted in reply to the primary station. As a result, authentication between both stations is not completed.

On the other hand, according to the structure of the present embodiment, the authentication frame is transmitted to the secondary station with its DL set to 1. Since the DL=1, the SMP layer of the secondary station adds header information to a response frame transferred from the upper layer at the point when the upper layer completes preparation of the response frame, and transmits the response frame in reply to the authentication frame. Thus, the authentication between the upper layers of the both stations is completed.

When a packet with DL=1 and BL=1 is received as shown in FIG. 17, the SMP layer may notify the OBEX layer that a response frame to the requesting frame received is requested, and may transmit a response frame of the SMP layer level in advance. Note, however, that the value of BL of the response frame transmitted is set to 0 in this case, so that the transmission right is not transferred to the opposite station. Then, when OBEX layer completes preparation of transmitting the response frame, header information is added to a response frame from the OBEX and the response frame is once again transmitted to the opposite station.

In this way, the SMP layer of the primary station receives the response frame of the SMP layer level (i.e. response frame not including the response frame of the OBEX layer) before the response frame prepared in the OBEX layer of the secondary station is received. This allows the SMP layer of the primary station to know, before the response frame from the OBEX layer is received, whether frames have been properly received by the opposite station. Thus, the primary station is able to, for example, prepare next data transmission or the like.

Note that each of the above-mentioned embodiments deals with a case where both of the transmitter (primary station) and receiver (secondary station) includes a CPU. However, both of the transmitter and receiver may include, instead of a CPU, a member such as a microcomputer having computing function.

Further, each of the above-mentioned embodiments deals with a case where the controller transfers transfer data in response to an instruction from the CPU. However, the controller may transfer the transfer data by DMA (Direct Memory Access), instead of using a CPU. In this case, transfer data is transferred from a memory without an instruction from a CPU. This is advantageous in that the burden on the CPU is reduced.

Embodiment 4

Figure 31:
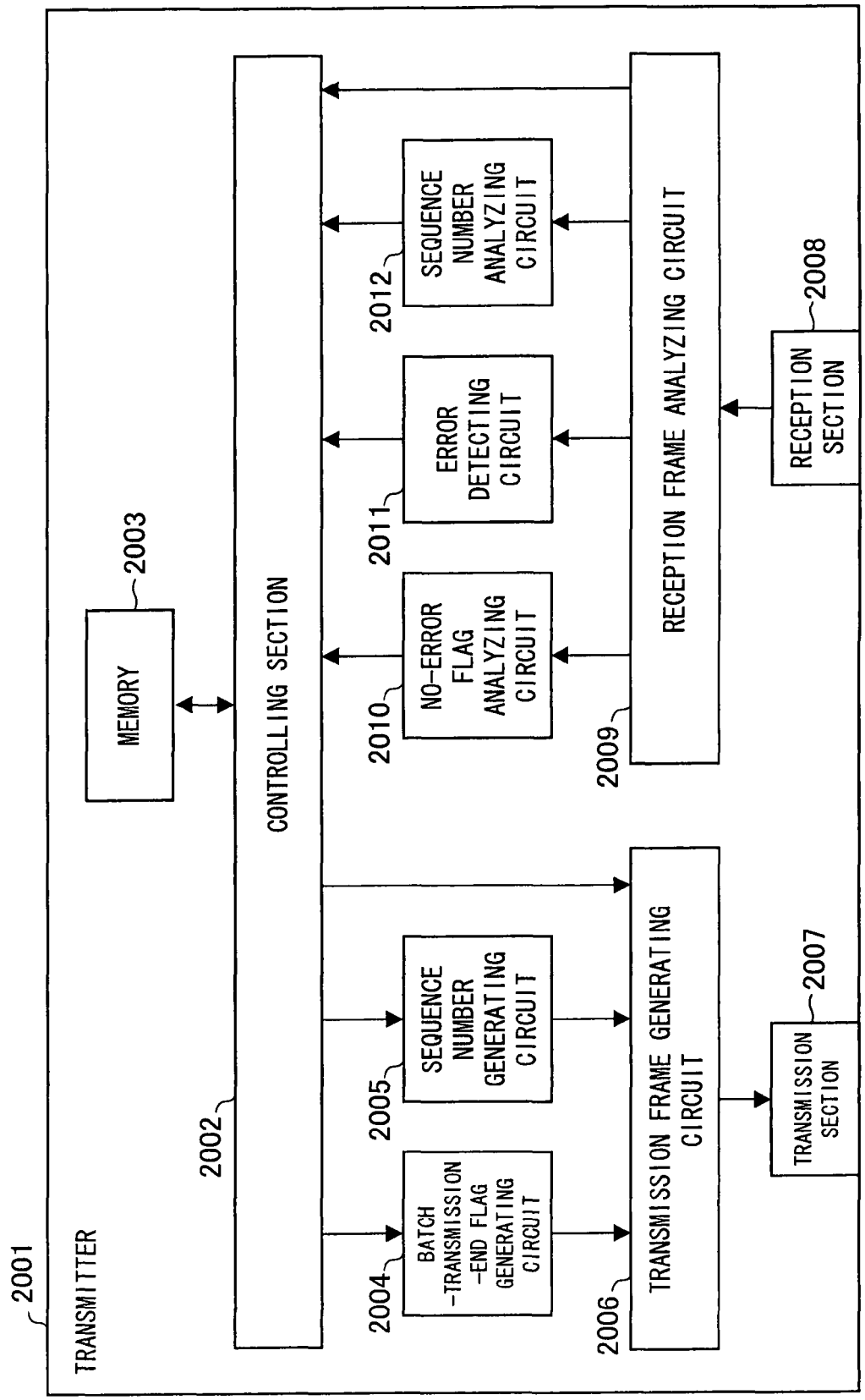
FIG. 31 is a block diagram illustrating a structure of a transmitter of embodiment 4, which is for use in the communication system of the present invention.
Figure 32:
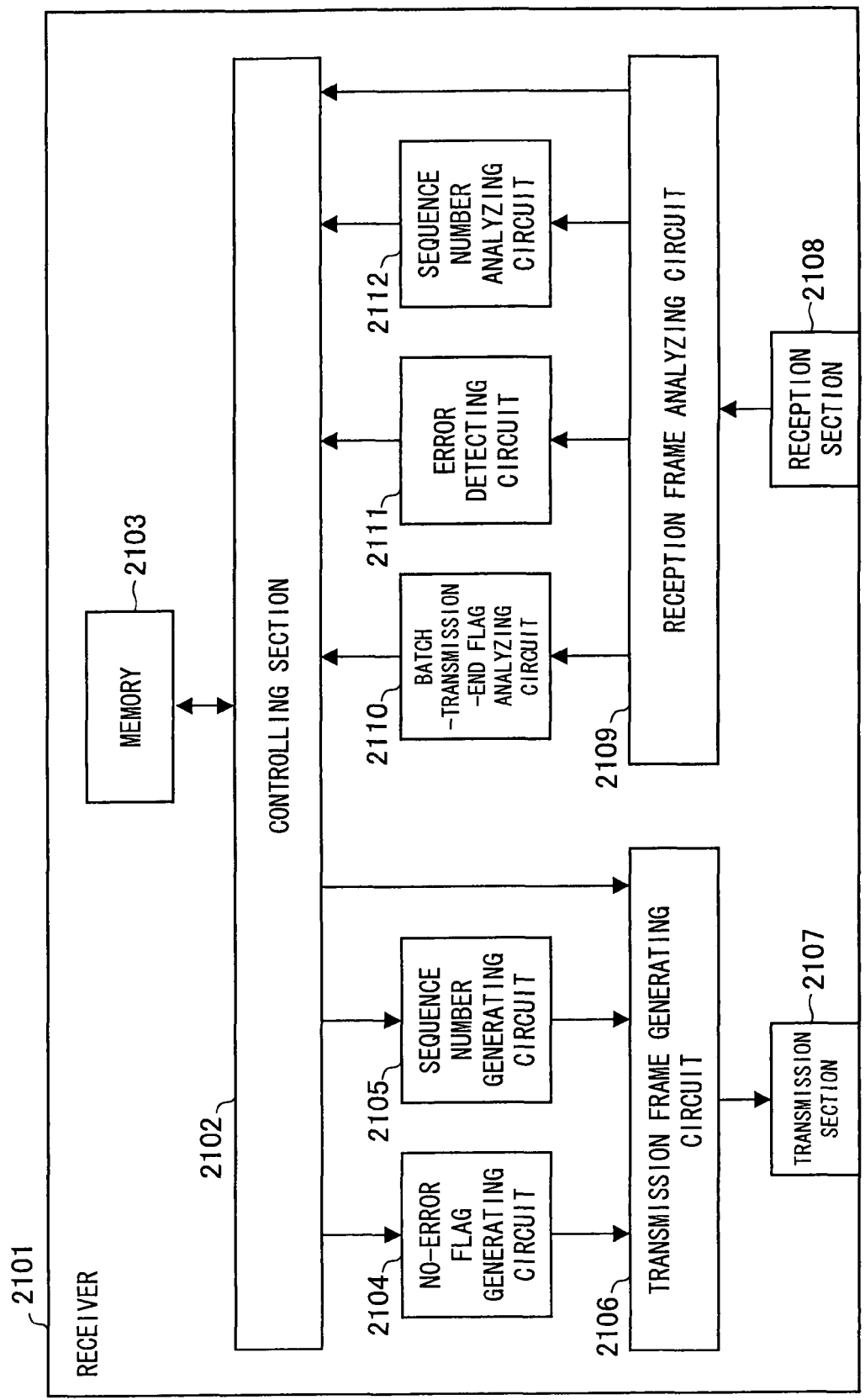
FIG. 32 is a block diagram illustrating a structure of a receiver of embodiments 4 and 5, which is for use in the communication system of the present invention.
Figure 33:
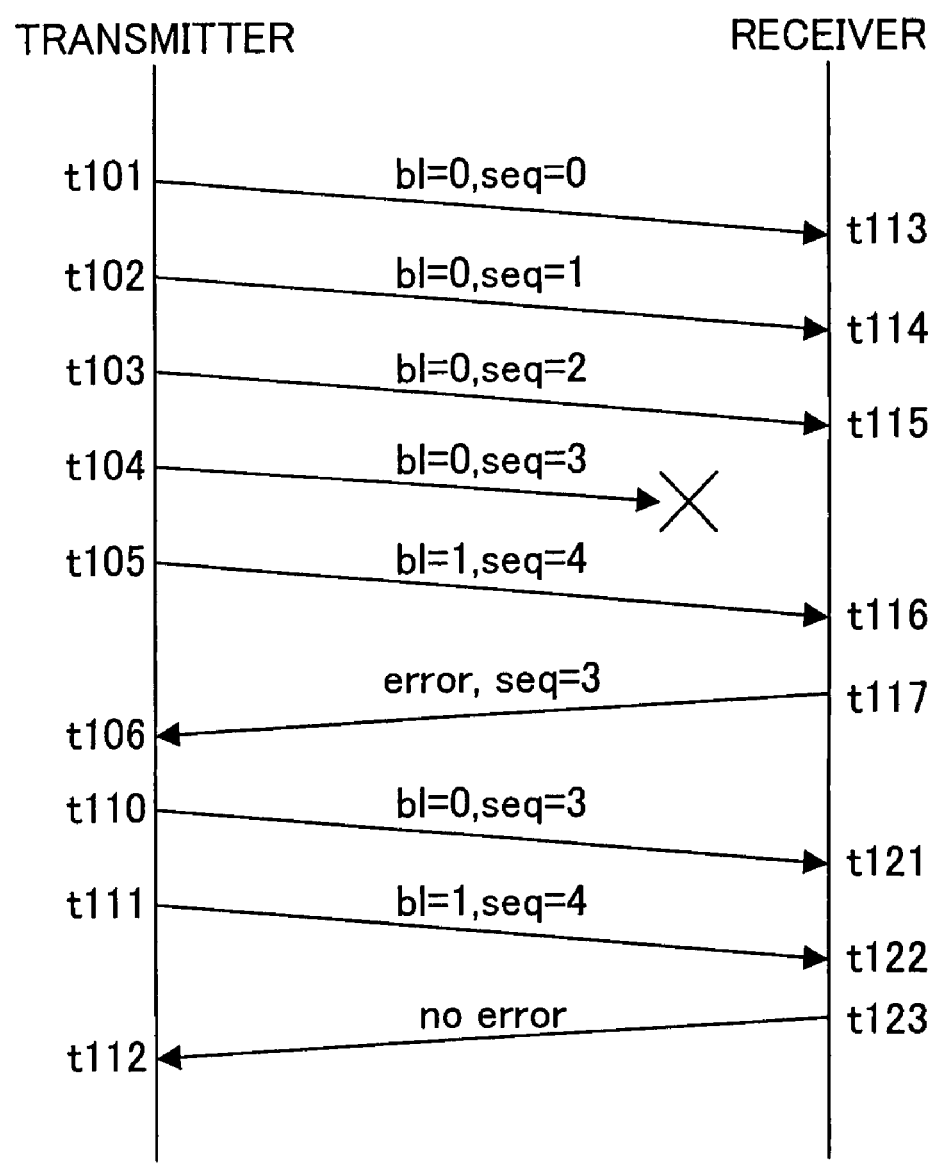
FIG. 33 is a sequence diagram of embodiment 4, in relation to the communication system of the present invention.

The following describes, with reference to FIG. 31 to FIG. 33, a transfer system (communication system) of transfer data according to an embodiment 4. Note that wordings (inclusive of a member and a function) defined in the other embodiments are used in the same manner in the present embodiment, unless otherwise noted.

In the present embodiment, references are made to FIG. 31 which is a block diagram of a transmitter, FIG. 32 which is a block diagram of a receiver, and FIG. 33 which is a sequence diagram of signals.

FIG. 31 is a block diagram of a transmitter 2001 of the present embodiment. Note that the transmitter of FIG. 31 is mere an example, and the transmitter is not limited to this. Further, each of the constituting circuits may be software or hardware. The constituting members are described hereinbelow.

The transmitter 2001 is a device on the side of transmitting transmission data. The wording "transmission data" here may be text data, image data, or the like; however the transmission data is not limited to these.

As shown in FIG. 31, the transmitter (primary station, client device) 2001 includes: a controller (control means) 2002; a memory (storage means) 2003; a batch-transmission-end flag generating circuit (batch-transmission-end flag generating means) 2004; a sequence number generating circuit (sequence number generating means) 2005; a transmission frame generating circuit (transmission frame generating means) 2006; a transmission section (transmission means) 2007; a receiving section (reception means) 2008; a reception frame analyzing circuit (reception frame analyzing means) 2009; a no-error flag analyzing circuit (no-error flag analyzing means) 2010; a error detecting circuit (error detecting means) 2011; a sequence number analyzing circuit (sequence number analyzing means) 2012.

The controlling section 2002 controls each constituting member of the transmitter 2001.

The memory 2003 stores therein transmission data. This memory 2003 may be, for example, a volatile memory (e.g. SDRAM, etc.) or a nonvolatile memory (e.g. Flash Memory® HDD, DVD, etc.). Although the memory 2003 is arranged inside the transmitter 2001 according to FIG. 31, the memory 2003 does not necessarily have to be in the transmitter 2001. For example, the memory 2003 may be an external memory connected to the transmitter 2001.

When the transmitter 2001 transmits a batch of certain number of data items as a unit, the batch-transmission-end flag generating circuit 2004 sets a value of a frame containing the final data item amongst the batch of certain number of data items, when the frame is transmitted, so that the value indicates that the data item in the frame is the final data item amongst the certain number of the data items. In the present embodiment, an abbreviated term BL which stands for Block last is defined. When the value of BL in a frame is 1, it means that the frame contains the final data item amongst the certain number of data items. When the value of BL in a frame is 0, it means that the frame does not contain the final data item of the certain number of data items.

The abbreviation BL is used with the same meaning in the later-described sequence diagram of FIG. 33. Further, in the present embodiment, the expression "batch-transmission-end flag" is used. However, a different expression may be adopted for this flag, in which case the meaning of the different expression does not necessarily have to be identical to that of the "batch-transmission-end flag", provided that the flag by the different expression performs a similar operation to that of the "batch-transmission-end flag". For example, the "batch-transmission-end flag" may be referred to as a "communication confirmation request flag" or the like, because the expression essentially has the same meaning as that of the "batch-transmission-end flag".

The sequence number generating circuit 2005 is a circuit which increases or decreases the sequence number according to a predetermined rule, and which circuit adds the sequence number to the transmission frame. In the present embodiment, an abbreviated term SEQ which stands for Sequence Number is defined. When SEQ is 1, SEQ indicates that the sequence number is 1. This abbreviation SEQ is used with the same meaning in the sequence diagram of FIG. 33.

The transmission frame generating circuit 2006 is a circuit which generates a transmission frame of a predetermined format by arranging the batch-transmission-end flag BL, sequence number SEQ, and data to be transmitted. Note that the present invention adopts a communication scheme which does not limit the window size. Therefore, the transmission frame is generated on a frame format having no limitation to the window format. For example, such a frame format is UI (Unnumbered Information) frame of IrLAP (Infrared Link Access Protocol). However, the frame format is not limited to this. Also added to the transmission frame is an error detection code for the opposite station to perform an error detection. The error detection code may be CRC (Cyclic Redundancy Check). However, the error detection code is not limited to CRC. It is further possible to add an error correction code.

The transmission section 2007 is a circuit for transmitting the transmission frame having been generated by the transmission frame generating circuit 2006. For example, in a case of using an infrared ray as a communication medium, the transmission section 2007 is an LED (Light Emitting Diode) or LD (Laser Diode). However, the transmission section 2007 is not limited to this. Further, in a case of using other communication medium, a suitable transmission section for the communication medium is adopted.

The receiving section 2008 is a circuit which receives a frame transmitted from the opposite station. For example, in a case of using an infrared ray as a communication medium, the receiving section 2008 is a PD (Photo Diode). However, the receiving section 2008 is not limited to this. Further, in a case of using other communication medium, a suitable receiving section for the communication medium is adopted.

The reception frame analyzing circuit 2009 analyzes a reception frame received by the receiving section 2008. Specifically, the reception frame analyzing circuit 2009 extracts a no-error flag in the reception frame, and transfers the no-error flag to the no-error flag analyzing circuit 2010. The reception frame analyzing circuit 2009 further extracts the sequence number in the reception frame, and transfers the sequence number to the sequence number analyzing circuit 2012. Further, in a case where the received frame contains data, the reception frame analyzing circuit 2009 extracts the data and stores the data in the memory 2003 via the controlling section 2002. In a case where the data is stored in the memory 2003, the data may be stored without a use of the controller 2003.

The no-error flag analyzing circuit 2010 analyzes the no-error flag which has been set, according to a predetermined format, by the opposite station. Further, the no-error flag analyzing circuit 2010 notifies the controller of the analysis result. In the present embodiment, the expression "no-error flag" is used. However, this flag may be referred to as, for example, an error-found flag, a retransmission request flag, or no-retransmission-request flag.

The error detecting circuit 2011 analyzes the code for the error detection, which flag is given to the reception frame, so as to judge if there is an error in the reception frame. Then, the error detecting circuit 2011 notifies the controller of the analysis result. The error detection code may be a cyclic code such as CRC (Cyclic Redundancy Check). However, the error detection code is not limited to this. Further, in a case where an error correction code is given, an error correction is performed.

The sequence number analyzing circuit 2012 analyzes a sequence number received and notifies the controlling section 2002 of the analysis result.

FIG. 32 is a block diagram of a transmitter 2101 of the present embodiment. Note that the transmitter of FIG. 32 is mere an example, and the receiver is not limited to this. Further, each of the constituting circuits may be software or hardware. The constituting members are described hereinbelow.

The receiver 2101 is a device on the side of receiving transmission data from the other device. The wording "transmission data" here may be text data, image data, or the like; however the transmission data is not limited to these.

As shown in FIG. 32, a receiver (secondary station, server device) 2101 includes: a controller (control means) 2102; a memory (storage means) 2103; a no-error flag generating circuit (no-error flag generating means) 2104; a sequence number generating circuit (sequence number generating means) 2105; a transmission frame generating circuit (transmission frame generating means) 2106; a transmission section (transmission means) 2107; a receiving section (reception means) 2108; a reception frame analyzing circuit (reception frame analyzing means) 2109; a batch-transmission-end flag analyzing circuit (batch-transmission-end flag analyzing means) 2110; an error detecting circuit (error detecting means) 2111; and a sequence number analyzing circuit (sequence number analyzing means) 2112.

The controlling section 2102 controls each constituting member of the receiver 2101.

The memory 2103 stores therein reception data. This memory 2103 may be, for example, a volatile memory (e.g. SDRAM, etc.) or a nonvolatile memory (e.g. Flash Memory®, HDD, DVD, etc.). Although the memory 2103 is arranged inside the receiver 2101 according to FIG. 32, the memory 2103 does not necessarily have to be in the receiver 2101. For example, the memory 2103 may be an external memory connected to the receiver 2101.

The no-error flag generating circuit 2104 is a circuit which generates a no-error flag on a predetermined format. This flag is for notifying the opposite station if there is an error contained in the frames received from the opposite station. In the present embodiment, the expression "no-error flag" is used. However, a different expression may be adopted for this flag, in which case the meaning of the different expression does not necessarily have to be identical to that of the "no-error flag", provided that the flag by the different expression performs a similar operation to that of the "no-error flag". For example, the "batch-transmission-end flag" may be referred to as an "error-found flag", a "retransmission request flag", or a "no-retransmission-requesting flag", because the expression essentially has the same meaning as that of the "batch-transmission-end flag".

In a case where an error is detected in received frames, the sequence number generating circuit 2105 sets a sequence number which needs to be retransmitted, when requesting retransmission to the opposite station.

The transmission frame generating circuit 2106 is a circuit which arranges the no-error flag and the sequence number according to a predetermined format, thereby generating a transmission frame. For example, such a frame format is UI (Unnumbered Information) frame of IrLAP (Infrared Link Access Protocol). However, the frame format is not limited to this.

The transmission section 2107 is a circuit for transmitting the transmission frame having been generated by the transmission frame generating circuit 2106. For example, in a case of using an infrared ray as a communication medium, the transmission section 2007 is an LED (Light Emitting Diode) or LD (Laser Diode). However, the transmission section 2007 is not limited to this. Further, in a case of using other communication medium, a suitable transmission section for the communication medium is adopted.

The receiving section 2108 is a circuit which receives a frame transmitted from the opposite station. For example, in a case of using an infrared ray as a communication medium, the receiving section 2008 is a PD (Photo Diode). However, the receiving section 2008 is not limited to this. Further, in a case of using other communication medium, a suitable receiving section for the communication medium is adopted.

The reception frame analyzing circuit 2109 analyzes a reception frame received by the receiving section 2108. Specifically, the reception frame analyzing circuit 2109 extracts a batch-transmission-end flag in the reception frame, and transfers the batch-transmission-end flag to the batch-transmission-end flag analyzing circuit. The reception frame analyzing circuit 2109 further extracts the sequence number in the received frame, and transfers the sequence number to the sequence number analyzing circuit. Further, in a case where the received frame contains data, the reception frame analyzing circuit 2109 extracts the data and stores the data in the memory via the controller. When storing the data in the memory, the data does not necessarily have to be stored via the controller.

The batch-transmission-end flag analyzing circuit 2110 analyzes the batch-transmission-end flag transferred from the reception frame analyzing circuit 2109, and notifies the controlling section 2102 of the analysis result.

The error detecting circuit 2111 analyzes the code for the error detection, which flag is given to the reception frame, so as to judge if there is an error in the reception frame. Then, the error detecting circuit 2111 notifies the controlling section 2102 of the analysis result. The error detection code may be a cyclic code such as CRC (Cyclic Redundancy Check). However, the error detection code is not limited to this. Further, in a case where an error correction code is given, an error correction is performed.

The sequence number analyzing circuit 2112 analyzes the received sequence numbers which have been in the received frames so as to judge whether the sequence number is increased or decreased according to a predetermined rule, and notifies the controlling section 2102 of the analysis result. For example, if a frame is omitted on the communication path, the sequence number analyzing circuit 2112 deems the omission as an error.

Specifically, when the error detecting circuit 2111 detects an error of data, the transmission frame generating circuit 2106 generates a transmission frame containing the sequence number of the received frame in which error is detected. The no-error flag is set to "error-found". Further, if the error detecting circuit 2111 detects no error of data, but the sequence number analyzing circuit 2112 detects an error in the sequence number, the transmission frame generating circuit 2106 generates a transmission frame containing the sequence number of the received frame in which the error is detected.

Next, a flow of each signal in the present embodiment is described, with reference to FIG. 31, FIG. 32, and sequence diagrams of FIG. 33.

When a data transmission is requested from the outside or within the transmitter 2001 itself, the controlling section 2002 determines a size of data to be transmitted in batch (hereinafter, batch transmission data size), and notifies the batch-transmission-end flag generating circuit 2003 of the data size.

The batch-transmission-end flag generating circuit 2003 retains therein the batch transmission data size. The total size of data transferred from the controlling section 2002 or the memory 2003 is calculated. When, the total data size reaches the batch transmission data size, the batch-transmission-end flag generating circuit 2003 sets the batch-transmission-end flag to indicate the end (i.e. BL=1), according to the predetermined format. On the other hand, if the total data size did not yet reach the batch transmission data size, the batch-transmission-end flag generating circuit 2003 sets the batch-transmission-end flag to indicate non-end (i.e. BL=0). The flag is then transferred to the transmission frame generating circuit 2005. The controlling section 2002 instructs the sequence number generating circuit 2004 to generate a sequence number every time a frame is generated.

The sequence number generating circuit 2004 having received the instruction increases or decreases the sequence number according to a predetermined rule, and transfers the sequence number to the transmission frame generating circuit 2005.

The transmission frame generating circuit 2005 arranges, according to the predetermined format, the batch-transmission-end flag, the sequence number, and the data, and transmits them via the transmission section 2006.

In FIG. 33, the respective batch-transmission-end flags of frames t 101, t 102, t 103, t 104, and t 110 are set to indicate the non-end, and the respective batch-transmission-end flags of frames t 105 and t 111 are set to indicate the end. Further, in the description of the present embodiment, it is assumed that the respective sequence numbers (SEQs) of t 101, t 102, t 103, t 104, and t 105 are increased in increment of 1.

When the receiver 2101 receives frames from the opposite station via the receiving section 2108, the reception frame analyzing circuit 2109 of the receiver 2101 extracts respective parameters of the received frames. The parameters can be, for example, a batch-transmission-end flag, a sequence number, data or the like. The batch-transmission-end flag is transferred to the batch-transmission-end flag analyzing circuit 2110, the sequence number is transferred to the sequence number analyzing circuit 2112. The data is stored in the memory 2103. If necessary, the data is stored in the memory 2103 via the controlling section 2102.

Further, at the same time, the error detecting circuit 2111 performs error detection to detect for example a CRC error in the received frames. If the error detection code or the error correction code is a code other than a CRC code, a suitable error detection or error correction for the code adopted is performed.

The batch-transmission-end flag analyzing circuit 2110 analyzes the batch-transmission-end flag, and notifies the analysis result.

In the sequence diagram of FIG. 33, the batch-transmission-end flag analyzing circuit 2110 notifies the controlling section 2102 that the batch-transmission-end flag does not indicate the end, when frames of t 113, t 114, t 115, and t 121 are received. When, the frames t 116 and t 122 are received, the batch-transmission-end flag analyzing circuit 2110 notifies the controlling section 2102 that the batch-transmission-end flag indicates the end.

Further, the sequence number analyzing circuit 2112 analyzes whether the sequence numbers of the received frames are increased or decreased according to the predetermined rule, and notifies the controlling section 2102 of the analysis result. In the present embodiment, the predetermined rule is that the sequence number is increased in increment of 1 for each frame.

The sequence diagram of FIG. 33 shows a case where the frame of sequence number 3 from the transmitter 2001 is not recognized by the receiver 2102 due to an error in the communication path, and the next frame with the sequence number 4 is received. In this case, the controlling section 2102 is notified of the frame of the sequence number 3 as the frame in which an error has occurred.

Since the controlling section 2102 is notified that a frame whose batch-transmission-end flag means the end is received, and that the sequence number of the error frame is 3, the controlling section 2102 notifies the no-error flag generating circuit 2140 that an error is found, notifies the sequence number generating circuit 2105 that the sequence number is 3, and notifies the transmission frame generating circuit 2106 to generate a transmission frame.

In response to the notification, the no-error flag generating circuit 2104 generates according to a predetermined format a flag indicating that an error is found, and transfers the generated flag to the transmission frame generating circuit 2106.

Further, the sequence number generating circuit 2105 transfers to the transmission frame generating circuit 2106 the sequence number 3 which is transferred from the controlling section 2102.

The transmission frame generating circuit 2106 having been given the no-error flag and the sequence number arranges these parameters on a predetermined format, and transmits the frame via the transmission section 2107. This frame is t 117 in the sequence diagram of FIG. 33.

The frame t 117 is received as the frame t 106 via the receiving section 2008 of the transmitter 2001. Then, the parameters of the received frame is extracted by the reception frame analyzing circuit 2009. The no-error flag extracted is transferred to the no-error flag analyzing circuit 2010, and the sequence number is transferred to the sequence number analyzing circuit 2012.

In the no-error flag analyzing circuit 2010, the no-error flag transferred is analyzed. In this case, the frame t 117 received from the receiver 2101 indicates that an error is found. Therefore, the analysis result of the no-error flag analyzing circuit 2010 is that an error is found, and notifies the controlling section 2002 of the analysis result.

Further, the sequence number analyzing circuit 2012 analyzes the sequence number, and notifies the controlling section 2002 of the analysis result. In this case, the sequence number 3 is notified to the controlling section 2002.

Further, at the same time, the error detecting circuit 2011 performs error detection to detect for example a CRC error in the received frames. If the error detection code or the error correction code is a code other than a CRC code, a suitable error detection or error correction for the code adopted is performed.

The controlling section 2002 judges whether the batch transmission to the receiver 2101 has been properly performed, based on the analysis result of the no-error flag, the sequence number, and the result of the error detection. Then, the controlling section 2002 judges whether to transmit the data in batch (if there is data yet to be transmitted), or to retransmit data having already been transmitted. In this case, the controlling section 2002 judges that an error has been detected and that the receiver 2101 is requesting retransmission of frames from the frame whose sequence number is 3. Thus, the previously transmitted data is retransmitted starting from the frame of the sequence number 3. Specifically, the controlling section 2002 notifies the batch-transmission-end flag circuit 2004 to perform retransmission, and notifies the sequence number generating circuit 2005 that the starting number is 3.

The batch-transmission-end flag generating circuit 2004 performs re-calculation of the batch transmission data size, if necessary. The batch transmission data size may be the same as that of the previous batch transmission. Alternatively, it is possible to set the batch-transmission-end flag to indicate the end in a frame whose sequence number is that of the previously-transmitted frame whose batch-transmission-end flag indicated the end. Specifically, supposing that (i) frames with the respective sequence numbers 1 to 5 are transmitted in the first batch transmission and (ii) the receiver requested retransmission of the frames of sequence number 3 and thereafter, it is possible to (a) transmit frames of sequence numbers 3 to 7 in batch, or (ii) transmit frames of sequence numbers 3 to 5 in batch.

When the sequence number generating circuit 2005 receives, from the controlling section 2002, the notification to retransmit frames starting from the frame with the sequence number 3, the sequence number generating circuit 2005 sets the starting sequence number to 3, and transfers the number to the transmission frame generating circuit 2006.

The transmission frame generating circuit 2006 generates a transmission frame and transmits the frame via the transmission section 2007.

This retransmission is shown by t 117, t 110, and t 111 of FIG. 33.

The receiver 2101 receives the retransmitted frames. If the error detecting circuit 2111 and the sequence number analyzing circuit 2112 judge that no error is found in all of the received frames, the controlling section 2102 notifies the no-error flag generating circuit 2104 that no error is found, after the reception of frame t 122 whose batch-transmission-end flag indicating the end.

The no-error flag generating circuit 2104 having received the notification sets the no-error flag to indicate "no-error", and transmits the flag to the transmission frame generating circuit 2106.

In response to this, the transmission frame generating circuit 2106 arranges the no-error flag in a frame, and transmits the frame via the transmission section 2107. Explanation in regard to the sequence number at this point is omitted here.

The transmitter 2001 receives the frame whose no-error flag indicates "no-error" as t 112. Then, in the transmitter 2001, the no-error flag analyzing circuit 2010 judges that no error was found, and notifies the controller of the judgment. Then, the controlling section 2002 recognizes the successful completion of the batch transmission. Thus, next batch transmission is possible, if there is a data item of the transmission data yet to be transmitted.

As described, with the transmitter 2001 and the receiver 2101, it is possible to perform a retransmission process when an error occurs, even by a method using frames with which no limitation is imposed on the window size. Thus, highly reliable communication is possible.

When the transmitter 2001 receives from the receiver 2101 a retransmission request with the no-error flag set to mean that an error is found, it is possible to perform the retransmission from the beginning of the transmission data, instead of retransmitting from the sequence number having been received at the same time.

Further, in a case of performing retransmission from the beginning of the transmission data, the sequence number to be given is preferably set to the initial value (e.g. 0 in the present embodiment) according to a predetermined rule.

Further, when retransmitting transmission data, it is possible to set a limit to the number of times the retransmission can be performed. If retransmission is performed more than the limit, and the batch transmission is not yet properly received by the receiver 2101, it is possible to suspend or disconnect the communication. In this way, when the quality of the communication path is extremely poor, the user is notified of that in the form of suspension or the disconnection of the communication. Thus, communication via an improved quality of communication path is possible.

Further, when the number of times of retransmission is limited to once for example, a flag can be used in place of a counter in the processing. This allows simplification of the circuit.

Further, when retransmitting frames from the sequence number requested by the receiver 2101, provision of limitation to the number of times of the retransmission may lead to an improvement of the quality of the communication path. This is because, when the quality of a communication path is bad, the user is notified of that in the form of suspension or disconnection of transmission.

As described before, when the number of times of retransmission is limited to once for example, a flag can be used in place of a counter in the processing. This allows simplification of the circuit.

Further, in the transmitter 2001, the batch transmission data size may be set to a one-frame length, so that the batch-transmission-end flag indicates end in all the frames. Although communication efficiency is lowered in this case because a response is needed from the receiver 2101 to all the frames, the method is effective in a transmitter 2001 in which sufficient memory is not ensured. This is because it is possible to reduce a data retaining region of the transmitter 2001 which region for retaining data to respond to a retransmission request from the receiver 2101.

In the receiver 2101, when the error detecting circuit 2111 and the sequence number detection circuit 2112 detect an error in the frames received, the controlling section 2102 does not necessarily have to store, in the memory 2103, data received between the error detection and the retransmission request. This is because, data to be retransmitted from the transmitter 2001 is the data received between (A) a point of detecting the error and (B) a point of requesting retransmission to the transmitter 2001 after the batch-transmission-end flag analyzing circuit 2110 confirms the reception of a frame whose batch-transmission-end flag indicating the end. In this way, it is possible to reduce the power consumed for saving data to be retransmitted and re-received. Further, it is possible to provide a limitation to the number of times retransmission can be requested when an error is detected in the frames received from the transmitter 2001. If the receiver 2101 is not able to properly receive data in batch even after requesting retransmission more than the predetermined time, the reception may be suspended or disconnected. In this way, when the quality of the communication path is extremely poor, the user is notified of that in the form of suspension or the disconnection of the communication. Thus, communication via an improved quality of communication path is possible.

Further, when the number of times of retransmission is limited to once for example, a flag can be used in place of a counter in the processing. This allows simplification of the circuit.

Further, when the receiver 2101 requests retransmission at the time of detecting an error in the received frame from the transmitter 2001, a retransmission requesting frame may be transmitted to the transmitter 2001 with a predetermined initial value (e.g. 0 in the present embodiment) being always set in the sequence number generating circuit 2105. In this way, it is no longer necessary to retain a sequence number for requesting retransmission, when an error is detected. Thus, simplification of circuit is possible.

Embodiment 5

The following describes, with reference to FIG. 32 and FIG. 34 to FIG. 36, a transfer system (communication system) of transfer data according to an embodiment 5. Note that wordings (inclusive of a member and a function) defined in the other embodiments are used in the same manner in the present embodiment, unless otherwise noted.

Figure 34:
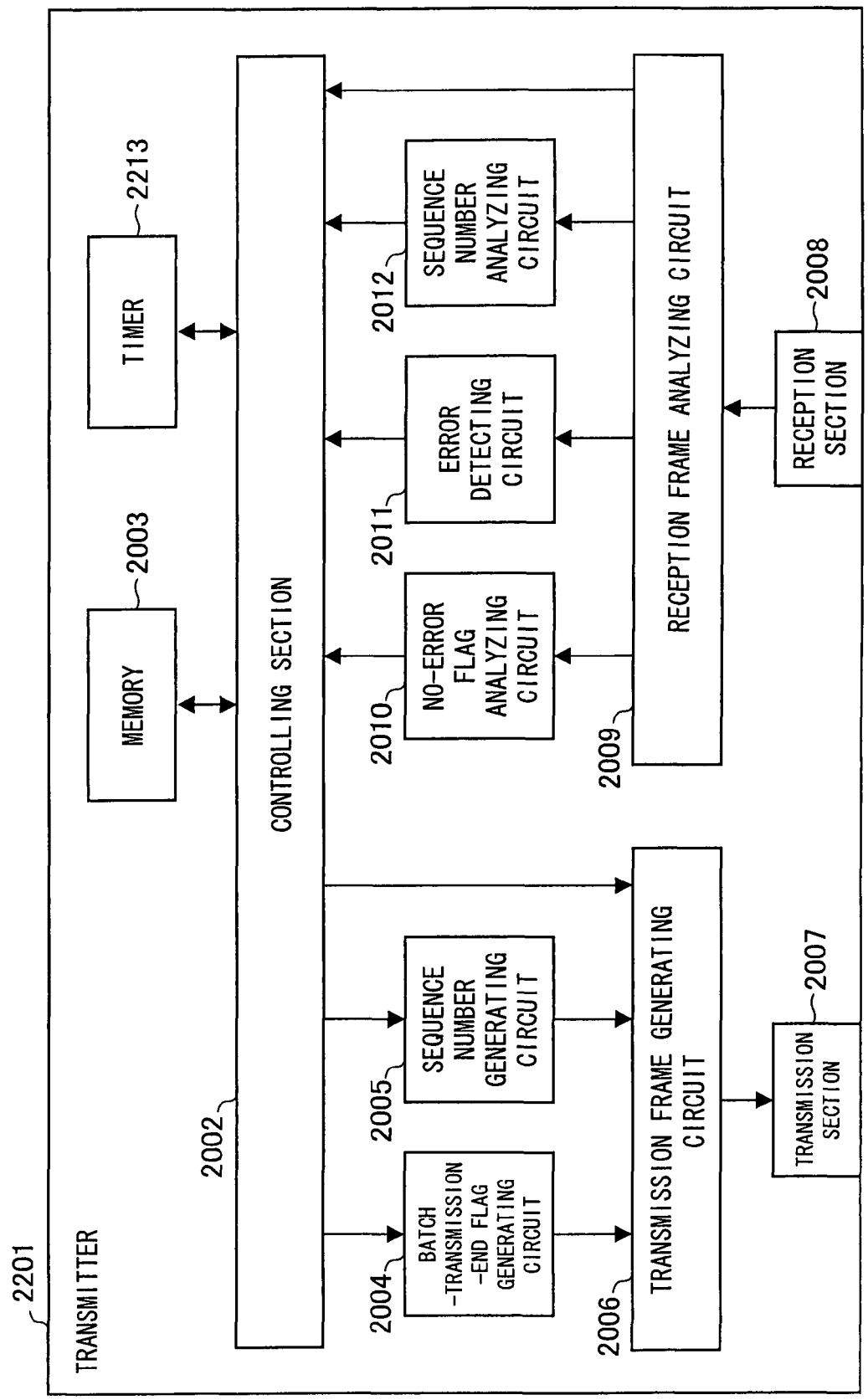
FIG. 34 is a block diagram illustrating a structure of a transmitter of embodiment 5, which is for use in the communication system of the present invention.
Figure 35:
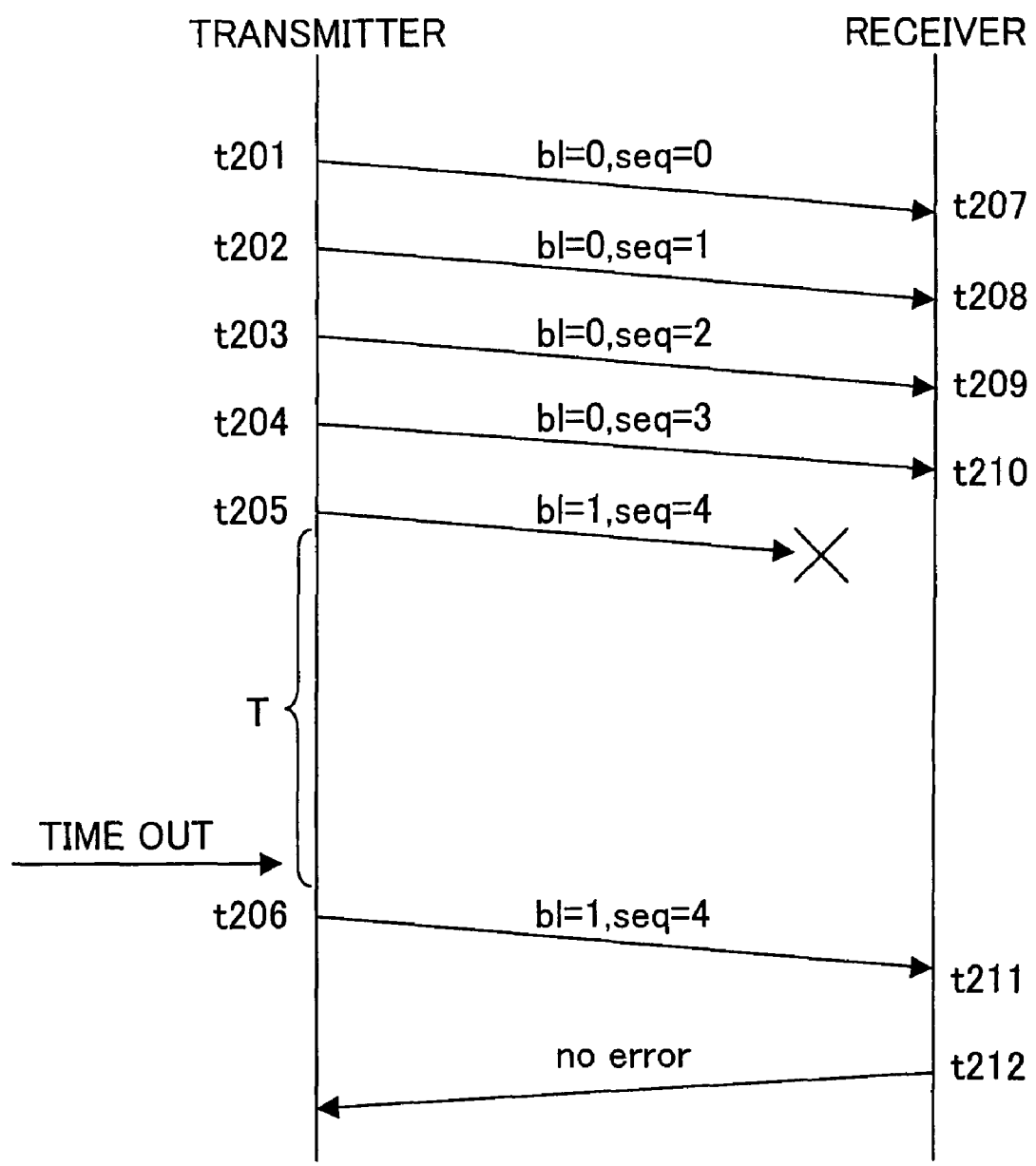
FIG. 35 is a first sequence diagram of embodiment 5, in relation to the communication system of the present invention.
Figure 36:
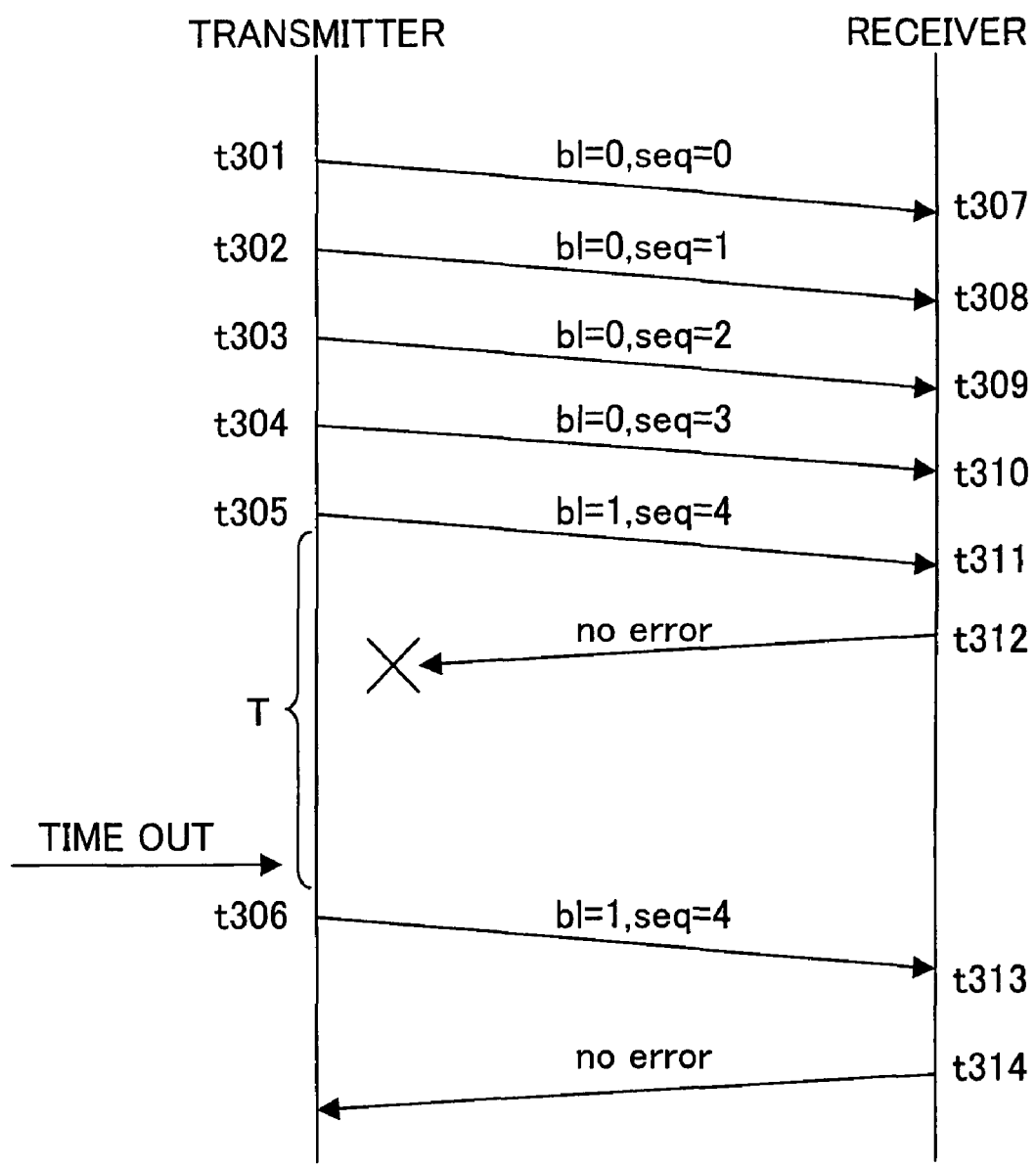
FIG. 36 is a second sequence diagram of embodiment 5, in relation to the communication system of the present invention.

In the present embodiment, references are made to FIG. 34 which is a block diagram of a transmitter, FIG. 32 which is a block diagram of a receiver, and FIG. 35 and FIG. 36 which are sequence diagrams of signals.

FIG. 34 is a block diagram of a transmitter 2201 of the present embodiment. Note that the transmitter of FIG. 34 is mere an example, and the transmitter is not limited to this. Further, each of the constituting circuits may be software or hardware. The constituting members are described hereinbelow.

The transmitter (primary station, client device) 2201 is a transmission side device for transmitting transmission data. The wording "transmission data" here may be text data, image data, or the like; however the transmission data is not limited to these. Further, members other than a timer (timing means) 2213 respectively have identical functions as those in the transmitter 2001 (see FIG. 31) described in the foregoing embodiment 4, and the explanations for these members are therefore omitted here.

The timer 2213 is controlled by a controlling section 2002. Specifically, the timer 2213 is started by the controlling section 2002, after the transmission of a frame with its batch-transmission-end flag set to indicate the end. If a response frame is not properly received by a receiver 2101 within a predetermined period, the timer 2213 notifies the controlling section 2002 of "time-out".

In response to the notification of time-out, the controlling section 2002 judges that (I) the last transmitted frame (t 205 of FIG. 35) whose batch-transmission-end flag indicates the end has not been properly received by the receiver 2101, due to an abnormality in the communication path, or (II) the frame has been properly received, but a frame (t 312 of FIG. 36) from the receiver containing a no-error flag is not properly received by the transmitter due to an abnormality in the communication path. Then, the controller notifies the circumstance to the batch-transmission-end flag generating circuit 2004, the sequence number generating circuit 2005, and the transmission frame generating circuit 2006.

In response to the notification, the batch-transmission-end flag generating circuit 2004 sets the batch-transmission-end flag to indicate the end, and transfers the flag to the transmission frame generating circuit 2006.

Further, in response to the notification, the sequence number generating circuit 2005 sets the sequence number to that of the previous frame again, and transfers the sequence number to the transmission frame generating circuit 2006.

The transmission frame generating circuit 2006 having received these parameters once again sets the data identical to that in the previously transmitted frame, and sets the batch-transmission-end flag and the sequence number. Then, the frame is transmitted via the transmission section 2007.

By structuring the transmitter 2201 as described above, it is possible to retransmit the frame with the batch-transmission-end flag indicating the end. Hence, retransmission process can be performed and highly reliable communication is possible, even if the quality of the communication paths is poor.

Further, when retransmitting transmission data, it is possible to set a limit to the number of times the retransmission can be performed, and to suspend or disconnect the communication, if retransmission is performed more than the limit, and if the batch transmission is not yet properly received by the receiver 2101. In this way, when the quality of the communication path is extremely poor, the user is notified of that in the form of suspension or the disconnection of the communication. Thus, communication via an improved quality of communication path is possible.

Further, as shown in the sequence diagram of FIG. 36, even if the receiver 2101 transmitted a response frame t 312 in response to the frame t 311 with its batch-transmission-end flag set to indicate the end, the receiver 2101 may receive a frame t 313 with its batch-transmission-end flag indicating the end. This is because the response frame t 312 is not properly received by the transmitter.

In this case, the controlling section 2102 in the receiver 2101 retains the very last sequence number. When the batch-transmission-end flag analyzing circuit 2110 notifies reception of the frame with its batch-transmission-end flag indicating the end, if the sequence number from the sequence number analyzing circuit 2112 is the same as the previous sequence number, a process is not performed as an error even if the analysis result of the sequence number analyzing circuit 2112 is an error. The controlling section 2102 notifies the no-error flag generating circuit 2104 to set the same value as that of the previously transmitted frame, and notifies the sequence number generating circuit 2105 to set the sequence number of the previously transmitted frame. The frame thus generated is then transmitted. The sequence number does not have to be set, if the value set in the no-error flag generating circuit 2104 indicates "no error".

In this way, retransmission of a frame from the receiver is possible, and highly reliable communication is possible even if (I) the quality of the communication path is poor, and (II) the frame transmitted from the receiver is not properly received by the transmitter.

Further, if the receiver 2101 receives frames whose respective batch-transmission-end flags indicate the end, and whose respective sequence numbers are the same, the controlling section 2102 does not have to re-store the data in the frame received for the second time and thereafter. This is because the data in the frame is already stored in the memory. In this way, it is possible to reduce the power to be consumed for saving data.

Embodiment 6

Figure 37:
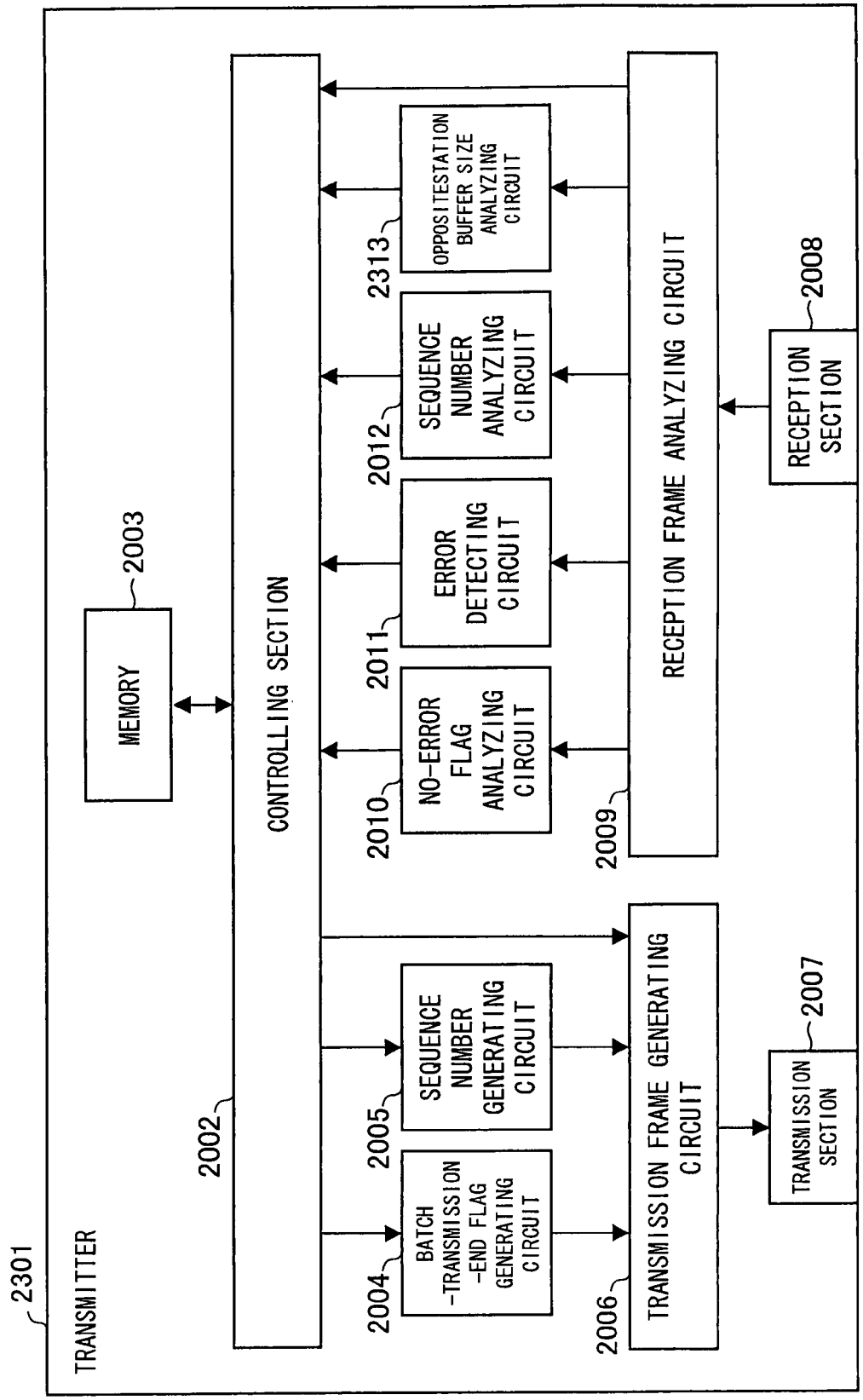
FIG. 37 is a block diagram illustrating a structure of a transmitter of embodiment 6, which is for use in the communication system of the present invention.
Figure 38:
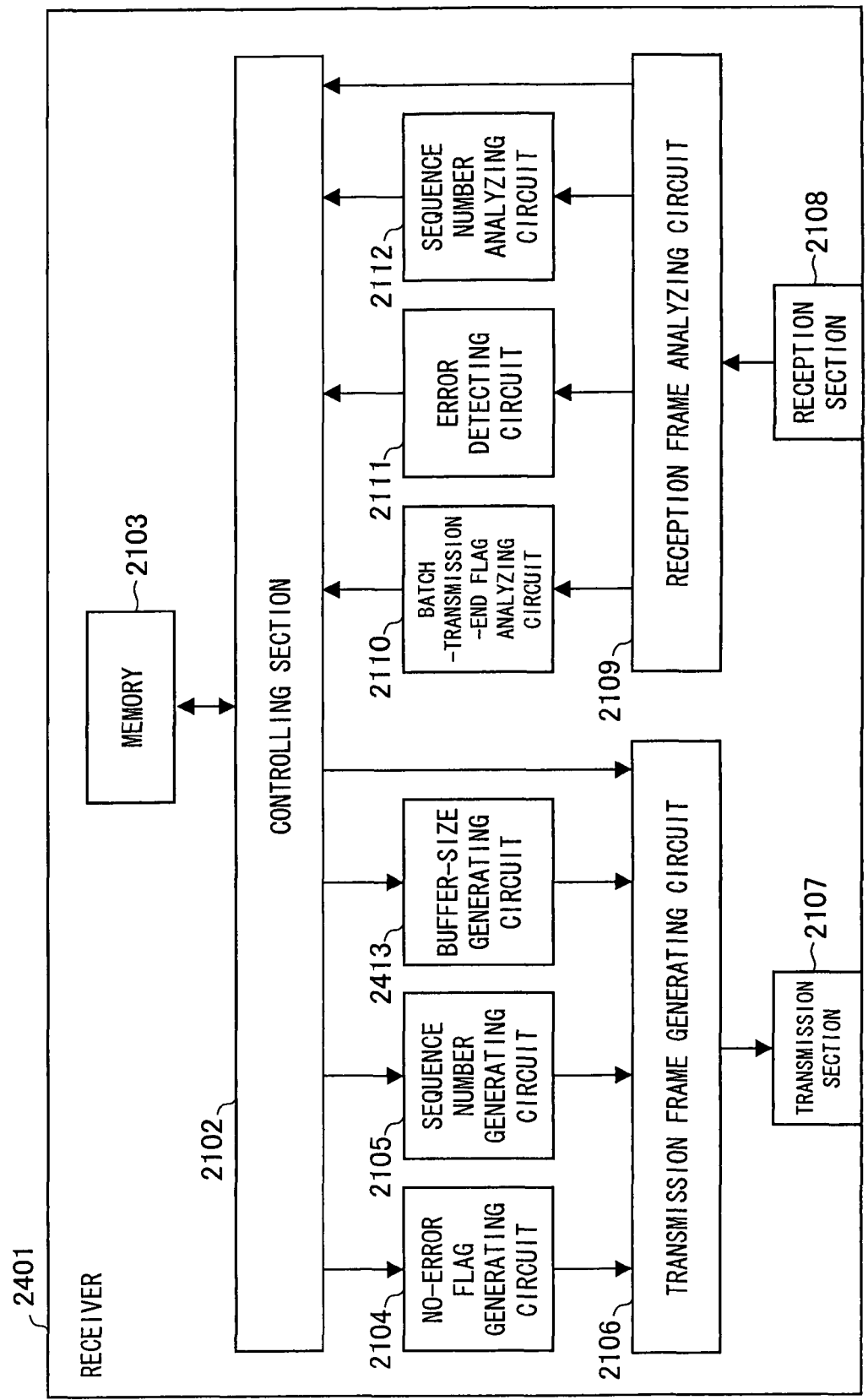
FIG. 38 is a block diagram illustrating a structure of a receiver of embodiment 6, which is for use in the communication system of the present invention.
Figure 39:
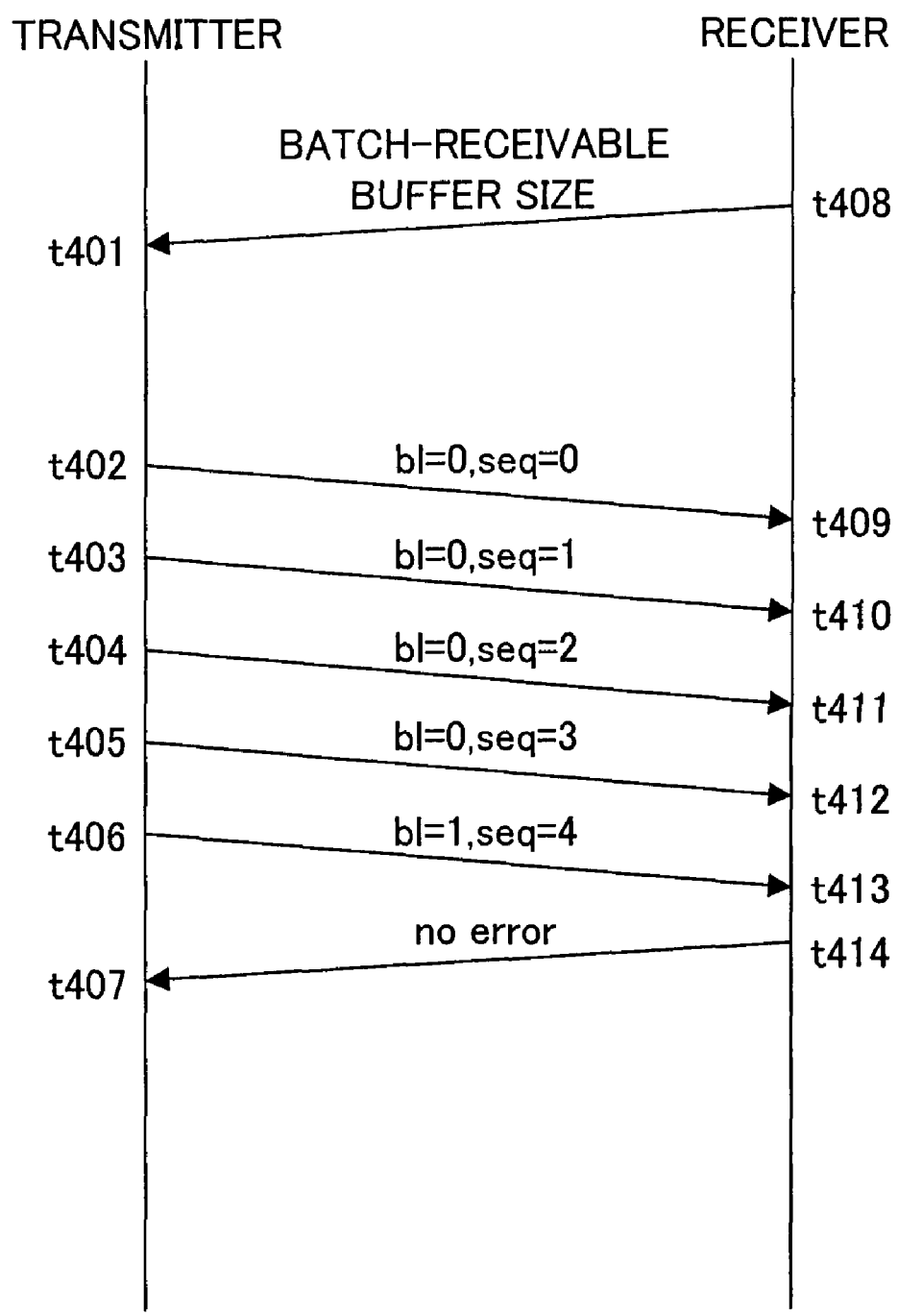
FIG. 39 is a sequence diagram of embodiment 6, in relation to the communication system of the present invention.

The following describes, with reference to FIG. 37 to FIG. 39, a transfer system (communication system) of transfer data according to an embodiment 6. Note that wordings (inclusive of a member and a function) defined in the other embodiments are used in the same manner in the present embodiment, unless otherwise noted.

In the present embodiment, references are made to FIG. 37 which is a block diagram of a transmitter, FIG. 38 which is a block diagram of a receiver, and FIG. 39 which is a sequence diagram of signals.

FIG. 37 is a block diagram of a transmitter 2301 of the present embodiment. Note that the transmitter of FIG. 37 is mere an example, and the transmitter is not limited to this. Further, each of the constituting circuits may be software or hardware. The constituting members are described hereinbelow.

The transmitter (primary station, client device) 2301 is a transmission side device for transmitting transmission data. The wording "transmission data" here may be text data, image data, or the like; however the transmission data is not limited to these. Further, members other than an opposite-station buffer size analyzing circuit (opposite-station buffer size analyzing means) 2313 respectively have identical functions as those in the transmitter 2001 (see FIG. 31) described in the foregoing embodiment 4, and the explanations for these members are omitted here.

The opposite-station buffer size analyzing circuit 2313 analyzes a buffer size parameter contained in a frame received from a receiver 2401 (FIG. 38), and notifies the controlling section 2002 of the analysis result.

The controlling section 2002 having received the analysis result notifies the batch-transmission-end flag generating circuit 2004 to set a batch transmission data size to a value smaller than the buffer size of the receiver 2401, and performs a batch transmission. This buffer size of the receiver is preferably received before the batch transmission is performed.

FIG. 38 is a block diagram of a receiver 2401 of the present embodiment. Note that the transmitter of FIG. 38 is mere an example, and the receiver is not limited to this. Further, each of the constituting circuits may be software or hardware. The constituting members are described hereinbelow.

The receiver (secondary station, server device) 2401 is a receiving side device for receiving transmission data from the opposite station device. The wording "transmission data" here may be text data, image data, or the like; however the transmission data is not limited to these. Further, members other than a buffer-size generating circuit (buffer-size generating means) 2413 respectively have identical functions as those in the receiver 2101 (see FIG. 32) described in the foregoing embodiment 4, and the explanations for these members are omitted here.

The controlling section 2102 transfers, to the buffer-size generating circuit 2413, a size of buffer available for batch reception in the receiver 2401 (Hereinafter, batch reception buffer size).

The buffer-size generating circuit 2413 generates the buffer-size transferred from the controlling section 2102 on a predetermined format, and transfers the buffer-size to the transmission frame generating circuit 2106.

The transmission frame generating circuit 2106 arranges the buffer-size in a transmission frame, and transfers the frame. Note that the frame containing the buffer size is preferably transmitted to the transmitter before the transmitter performs the batch transmission. For example, it is preferable that the buffer-size be arranged and transferred in the frame to be transmitted at the time of establishing connection. However, the present invention is not limited to this.

Next, a flow of each signal in the present embodiment is described, with reference to the sequence diagrams of FIG. 39.

The controlling section 2102 of the receiver 2401 notifies the buffer-size generating circuit 2413 of the batch reception buffer size, when, for example, establishing connection.

The buffer-size generating circuit 2413 having received the buffer size, generates a buffer size parameter according to a predetermined format, and transfers the parameter to the transmission frame generating circuit 2106.

The transmission frame generating circuit 2106 having received the parameter arranges the buffer size parameter in a transmission frame, according to a predetermined format, and transmits the transmission frame. This is the frame t 408 of FIG. 39.

When the transmitter 2301 receives, as a frame t 401, the frame containing the buffer size parameter of the receiver 2401, the reception frame analyzing circuit 2009 extracts the buffer size parameter, and the extracted parameter is transferred to the opposite-station buffer size analyzing circuit 2313.

In the opposite-station buffer size analyzing circuit 2313, the buffer size parameter is analyzed, and the analysis result is notified to the controlling section 2002.

The controlling section 2002 sets the batch transmission data size to a size smaller than the analyzed buffer size, and transfers the batch transmission data size to the batch-transmission-end flag generating circuit 2004.

Based on the batch transmission data size having been transferred from the controlling section 2002, the batch-transmission-end flag generating circuit 2004 sets the batch-transmission-end flag, and performs batch transmission.

Through the above steps, the receiver 2401 is able to notify the transmitter 2301 of the batch reception buffer size of the receiver 2401. Further, by recalculating in the transmitter 2301 the batch transmission data size, based on the batch reception buffer size in the receiver 2401, and by reflecting the recalculated batch transmission data size to the control of the batch-transmission-end flag, it is possible to prevent the transmitter 2301 from performing batch transmission of data whose size is larger than the batch reception buffer size in the receiver 2401.

Further, it is possible to prevent the transmitter from performing batch transmission of data whose size is larger than the batch reception buffer size of the receiver, by (I) agreeing beforehand on a value of a default batch reception buffer size between the transmitter 2301 and the receiver 2401 and (II) determining that the default batch reception buffer size is adopted if (i) the batch reception buffer size is not received by the transmitter 2301 and (ii) the default value batch reception buffer size is smaller than the batch reception buffer size of the receiver 2401, so that the transmitter 2301 performs batch transmission based on the default batch reception buffer size, without notification of the batch reception buffer size. This further allows improvement in the efficiency of the band used, since the receiver 2401 no longer needs to transmit to the transmitter 2301 a frame for notifying the transmitter 2301 of the available buffer size for batch transmission.

Embodiment 7

Figure 40:
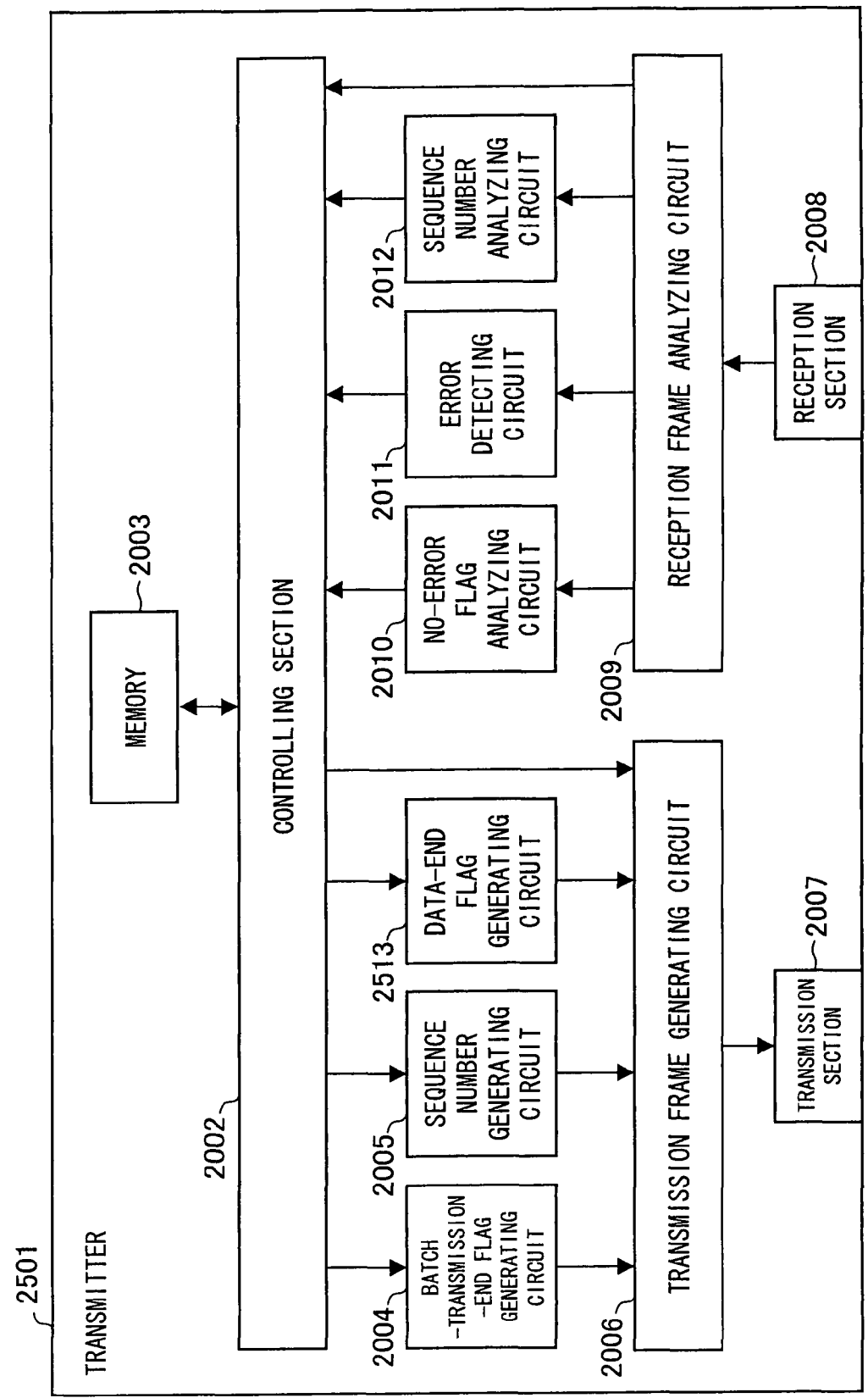
FIG. 40 is a block diagram illustrating a structure of a transmitter of embodiment 7, which is for use in the communication system of the present invention.
Figure 41:
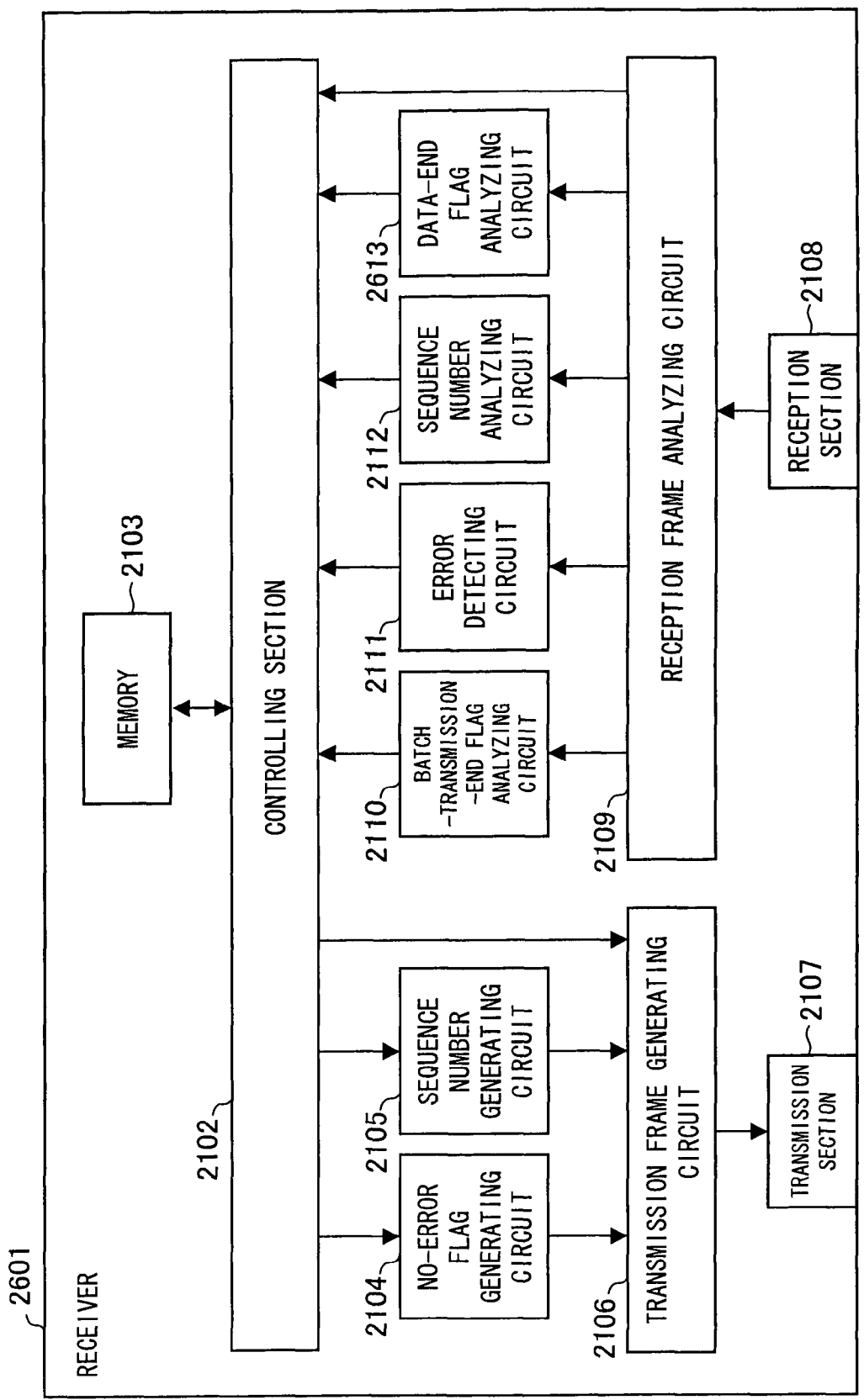
FIG. 41 is a block diagram illustrating a structure of a receiver of embodiment 7, which is for use in the communication system of the present invention.
Figure 42:
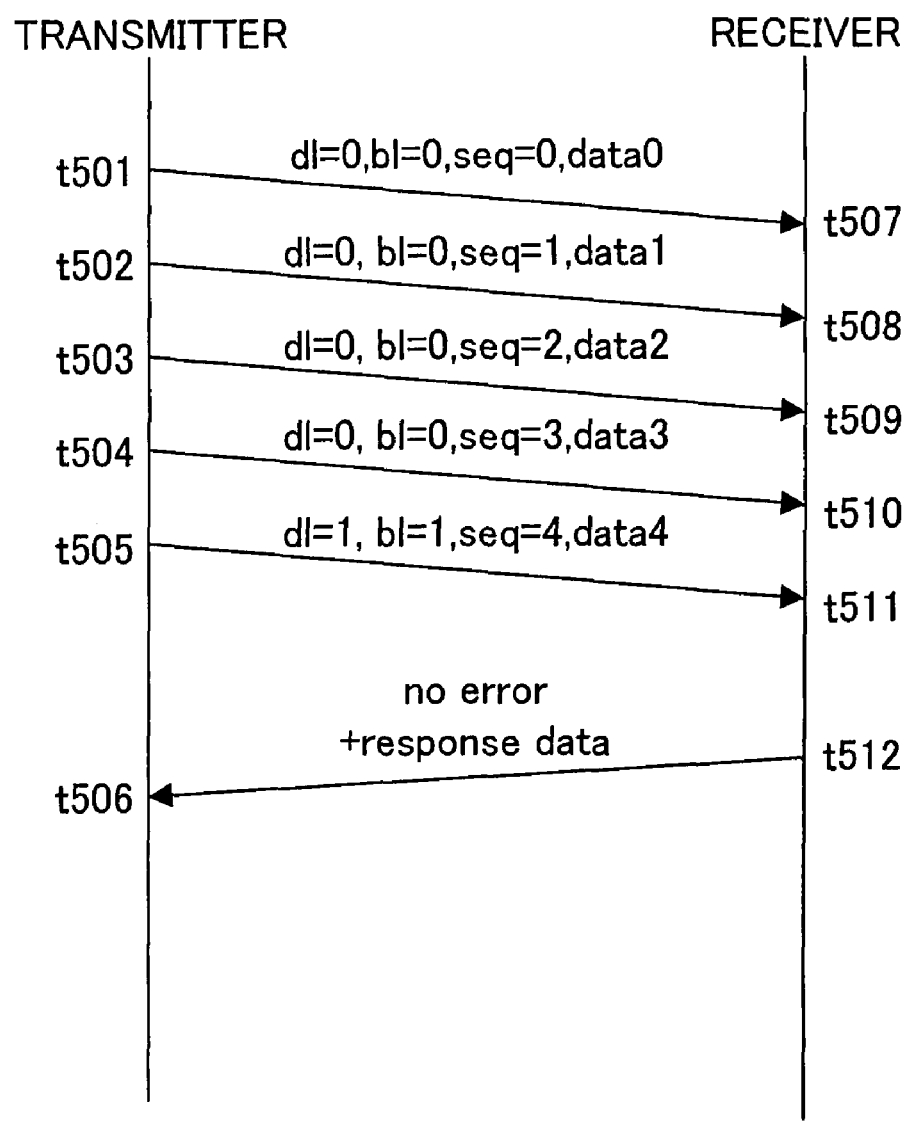
FIG. 42 is a sequence diagram of embodiment 7, in relation to the communication system of the present invention.

The following describes, with reference to FIG. 40 to FIG. 42, a transfer system (communication system) of transfer data according to an embodiment 7. Note that wordings (inclusive of a member and a function) defined in the other embodiments are used in the same manner in the present embodiment, unless otherwise noted.

In the present embodiment, references are made to FIG. 40 which is a block diagram of a transmitter, FIG. 41 which is a block diagram of a receiver, and FIG. 42 which is a sequence diagram of signals.

FIG. 40 is a block diagram of a transmitter 2501 of the present embodiment. Note that the transmitter of FIG. 40 is mere an example, and the transmitter is not limited to this. Further, each of the constituting circuits may be software or hardware. The constituting members are described hereinbelow.

The transmitter (primary station, client device) 2501 is a transmission side device for transmitting transmission data. The wording "transmission data" here may be text data, image data, or the like; however the transmission data is not limited to these. Further, members other than an data-end flag generating circuit (data-end flag generating means) 2513 respectively have identical functions as those in the transmitter 2001 (see FIG. 31) described in the foregoing embodiment 4, and the explanations for these members are omitted here.

If the final data item is contained, the data-end flag generating circuit 2513 generates a data-end flag indicating that the frame contains the final data item, according to a predetermined format. Further, If the final data item is not contained, the data-end flag generating circuit 2513 generates a data-end flag indicating that the frame does not contain the final data item, according to a predetermined format. The generated data-end flag is transferred to the transmission frame generating circuit 2006.

When generating the transmission frame, the controlling section 2002 of the transmitter 2501 notifies the data-end flag generating circuit 2513 whether data to be arranged in a transmission frame by the transmission frame generating circuit 2006 is the final data item of the transmission data.

In response to this, the data-end flag generating circuit 2513 generates a data-end flag and transfers the flag to the transmission frame generating circuit 2006. In the present embodiment, an abbreviated term DL which stands for Data Last is defined. When the value of DL in a frame is 0, it means that the frame does not contain the final data item of the transmission data. When the value of DL in a frame is 1, it means that the frame contains the final data item of the transmission data. The abbreviation DL is used in the present embodiment. However, the term may be a different expression. Further, in the present embodiment, the value of DL is set to 1 when transmitting a frame containing the final data item of the transmission data. However, for example, in a case where a kind of response data is needed as a response from the opposite station, the flag may mean a request of a response, and the flag with such a meaning may be referred to as a response requesting flag, provided that the flag is used in the similar way as that of the DL flag of the present embodiment, which flag indicating that the frame contains the final data item of the transmission data.

The transmission frame generating circuit 2006 having received these parameters once again sets the data identical to that in the previously transmitted frame, and sets the batch-transmission-end flag and the sequence number. Then, the frame is transmitted via the transmission section 2007.

In the sequence diagram of FIG. 42, the data-end flag DL is 0 in the frames of t 501, t 502, t 503, and t 504. These frames do not contain the final data item of the transmission data. The data-end flag DL is set to 1 in the frame of t 505 indicating that the frame contains the final data item of the transmission data.

FIG. 41 is a block diagram of a receiver 2601 of the present embodiment. Note that the transmitter of FIG. 41 is mere an example, and the receiver is not limited to this. Further, each of the constituting circuits may be software or hardware. The constituting members are described hereinbelow.

The receiver (secondary station, server device) 2601 is a receiving side device for receiving transmission data from the opposite station device. The wording "transmission data" here may be text data, image data, or the like; however the transmission data is not limited to these. Further, members other than a data-end flag analyzing circuit (data-end flag analyzing means) 2613 respectively have identical functions as those in the transmitter 2101 (see FIG. 32) described in the foregoing embodiment 4, and the explanations for these members are omitted here.

The data-end flag analyzing circuit 2613 analyzes the data-end flag arranged in the received frame, and notifies the controlling section 2102 whether the received frame contains the last data item of the data to be transmitted from the transmitter.

In the reception frame analyzing circuit 2109 of the receiver 2601, the data-end flag is extracted from the received frame received via the receiving section 2108, and is transferred to the data-end flag analyzing circuit 2613. Further, at the same time, the batch-transmission-end flag and the sequence number are also extracted, and are analyzed in the analyzing circuits, respectively.

The data-end flag analyzing circuit 2613 analyzes whether the received frame contains the final data item of the transmission data of the transmitter 2501, and notifies the controlling section 2102 of the analysis result.

In the controlling section 2102, if the final data item of the transmission data of the transmitter 2501 is contained in the frame, it is possible to start a predetermined operation (e.g. if the reception data is data compressed in the JPEG (Joint Photographic Experts Group) format, decoding of the JPEG data can be started).

Further, if the batch-transmission-end flag in the frame containing the final data item of the transmission data indicates the end, a frame can be transmitted with its no-error flag set to a suitable value.

Further, at this point, if it is necessary to transmit a response data in reply to the transmission data from the transmitter 2501, the efficiency of the used band is improved by arranging, in the transmission frame, the no-error flag along with the data in the transmission frame. Doing so will allow improvement in the efficiency of the used band. This frame is t 512 of FIG. 42.

The transmitter 2501 having received the frame of t 512 as the t 506 is able to receive the response data from the receiver 2601 by analyzing data in the received frame.

Embodiment 8

Figure 43:
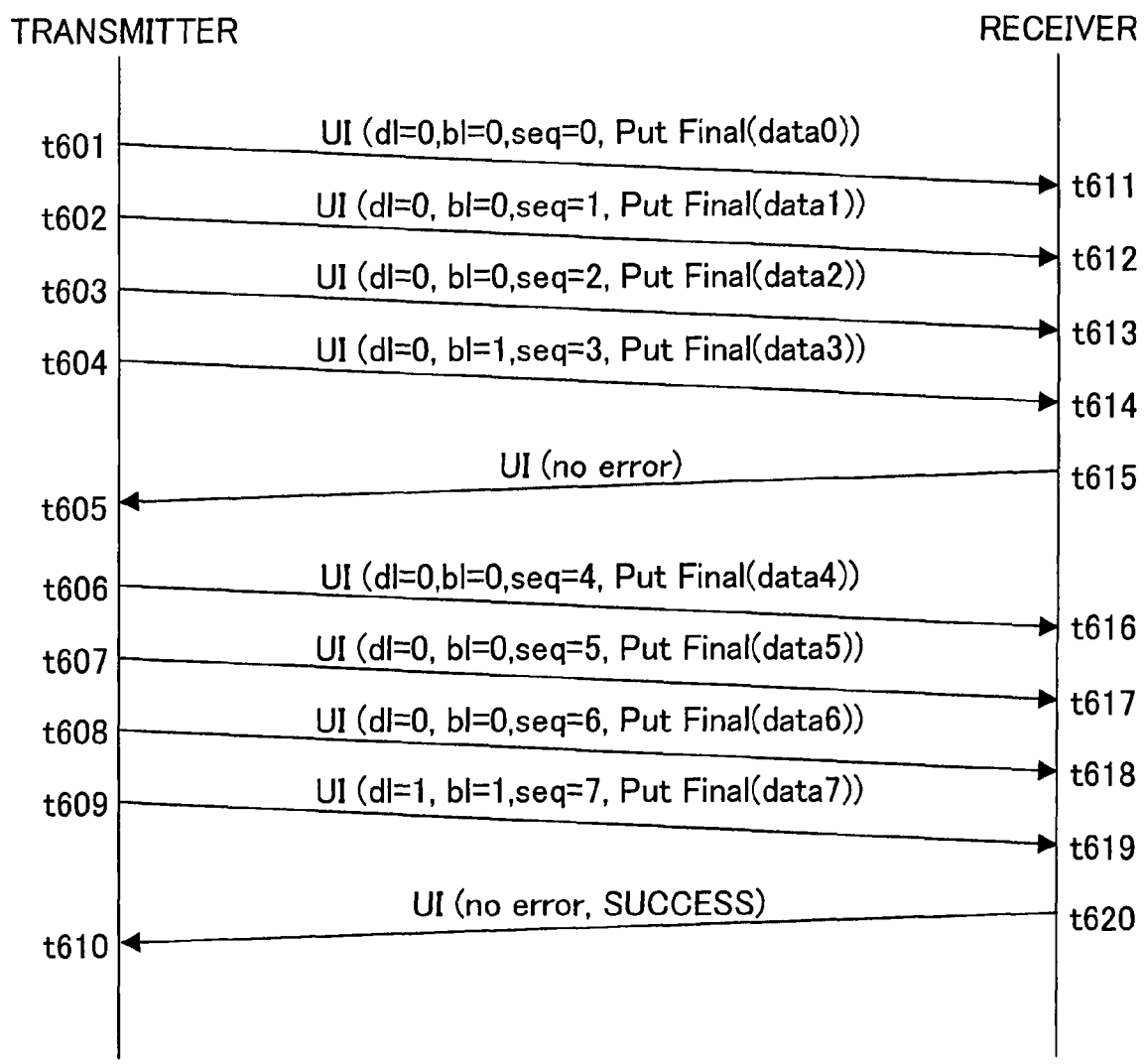
FIG. 43 is a sequence diagram of embodiment 8, in relation to the communication system of the present invention.

The following describes, with reference to FIG. 43, a transfer system (communication system) of transfer data according to an embodiment 8. Note that wordings (inclusive of a member and a function) defined in the other embodiments are used in the same manner in the present embodiment, unless otherwise noted. Note that the sequence of the present embodiment is an additional function which is mountable in the above mentioned transmitter 2001 (FIG. 31), receiver 2101 (FIG. 32), transmitter 2201 (FIG. 34), receiver 2301 (FIG. 37), receiver 2401 (FIG. 38), transmitter 2501 (FIG. 40), and receiver 2601 (FIG. 41).

FIG. 43 is a sequence diagram of the present embodiment.

In the present embodiment, a transmitter and a receiver performs communication, by using a communication scheme which does not limit the window size. In the method, UI (Unnumbered Information) frames according to IrLAP (Infrared Link Access protocol) of IrDA (Infrared Data Association) is used. Furthermore, it is assumed that the transmitter and the receiver both support OBEX (Object Exchange Protocol), and transmit data by performing a PUT operation.

In FIG. 43, the transmission data is arranged in the PUT Final command of OBEX, and frames are transmitted by using UI frames of IrLAP.

The PUT Final Command includes data 0 to data 7. In other words, the PUT Final Command is divided in such a manner that connecting of these data 0 to data 7 will form the PUT Final Command.

Further, a batch transmission data size of the transmitter is a size equals to the size of data 0 to data 3 combined. When the sequence number is 3, a frame t 604 whose batch-transmission-end flag BL is 1 is transmitted. At this point, the transmission frame does not contain the data 7 which is the final data item of the transmission data constituted of the Put Final Command.

When the receiver receives, as the frame t 614, the frame whose batch-transmission-end flag BL is set to 1, the receiver transmits a frame t 615 with its no-error flag being set to indicate "no-error", because no error has been detected in the frames having been received. Further, since the data-end flag of the frame having been received is set to 0 at this point, the transmission frame does not contain a SUCCESS response which means proper reception of the Put Command of the OBEX.

The transmitter receives, as a frame t 605, the frame whose no-error flag indicating "no-error", and recognizes that the proper reception of data items of sequence numbers 0 to 3 which have been transmitted in batch. Then, the transmitter transmits in batch the data 4 to data 7. When transmitting the frame t 609 whose sequence number is 7, the batch-transmission-end flag is set to 1. Further, the frame t 609 whose sequence number is 7 contains the data 7 which is the final data item of the transmission data. Accordingly, the data-end flag DL is set to 1.

The receiver having received, as a frame t 619, the frame whose data-end flag is set to 1 has properly received the frames of sequence numbers 4 to 7. Further, the entire PUT Final command from the transmitter have been also received properly. Therefore, the receiver generates a SUCCESS response meaning the proper reception of the PUT Final command. Further, since the batch-transmission-end flag is set to 1, the no-error flag is set to indicate "no error" and is sent along with the SUCCESS response in the frame t 620.

The transmitter having received, as a frame t 610, the frame whose no-error flag indicates "no error" recognizes proper reception of the frames of sequence numbers 4 to 7 which have been transmitted in batch. Since the SUCCESS response for the Put Final command from the transmitter is contained in the received frame, the transmitter is able to recognize that the Put operation has properly completed.

As described, with the communication method of the present embodiment, the confirmation of communication and data exchanging can be performed without fail between the transmitter and receiver, even by using the UI frames of IrLAP with which the window size is not limited.

Embodiment 9

Figure 44:
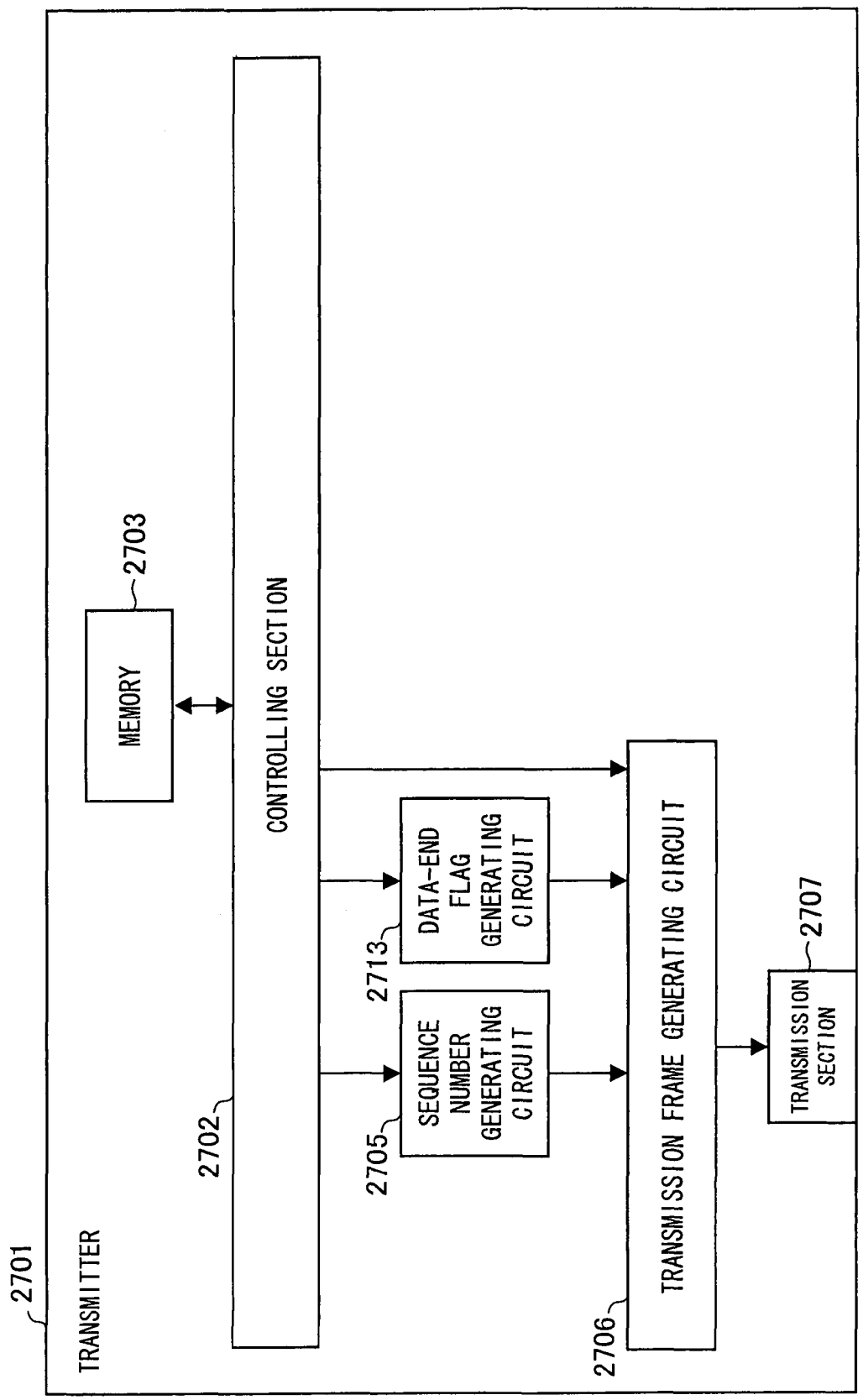
FIG. 44 is a block diagram illustrating a structure of a transmitter of embodiment 9, which is for use in the communication system of the present invention.
Figure 45:
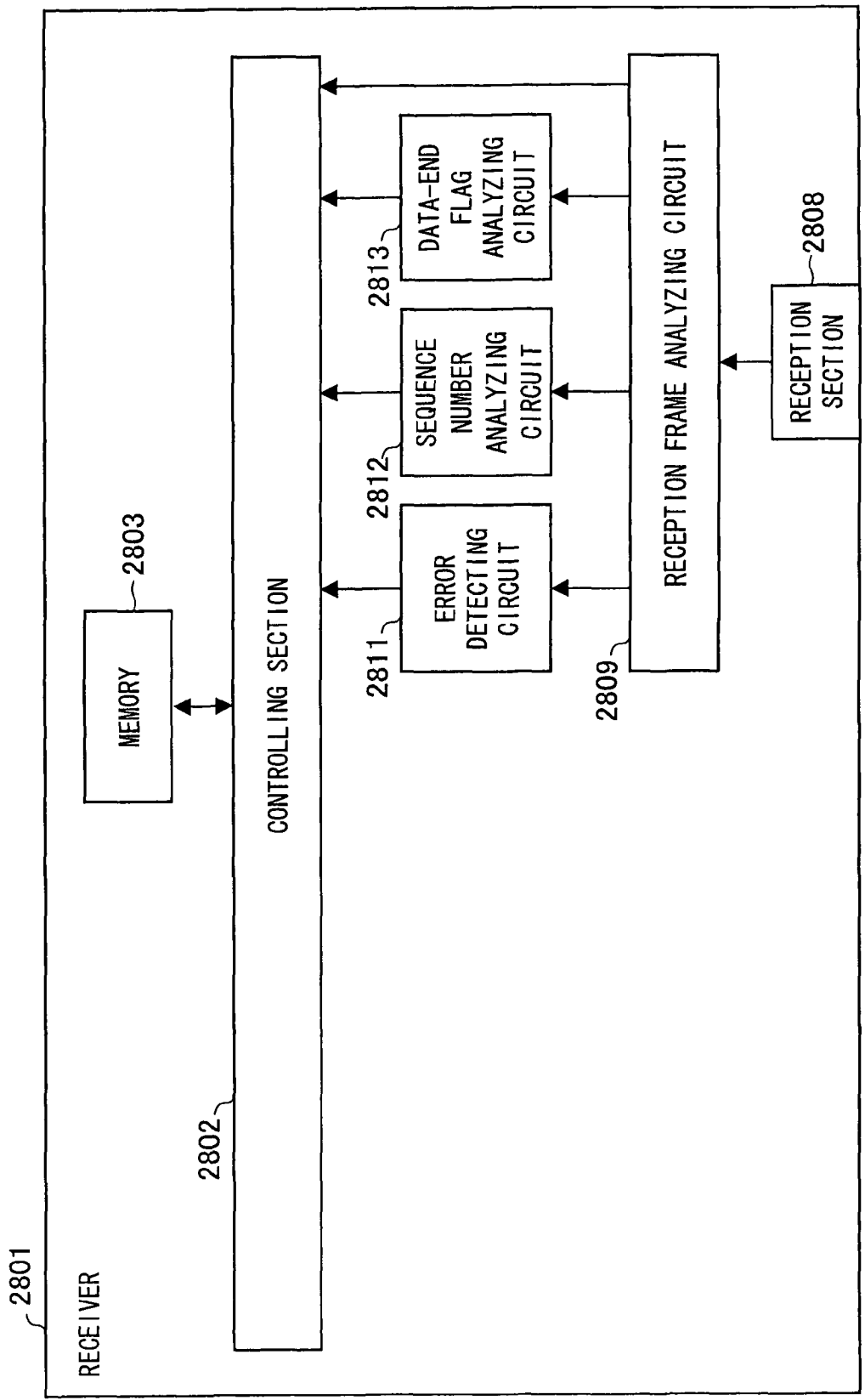
FIG. 45 is a block diagram illustrating a structure of a receiver of embodiment 9, which is for use in the communication system of the present invention.
Figure 46:
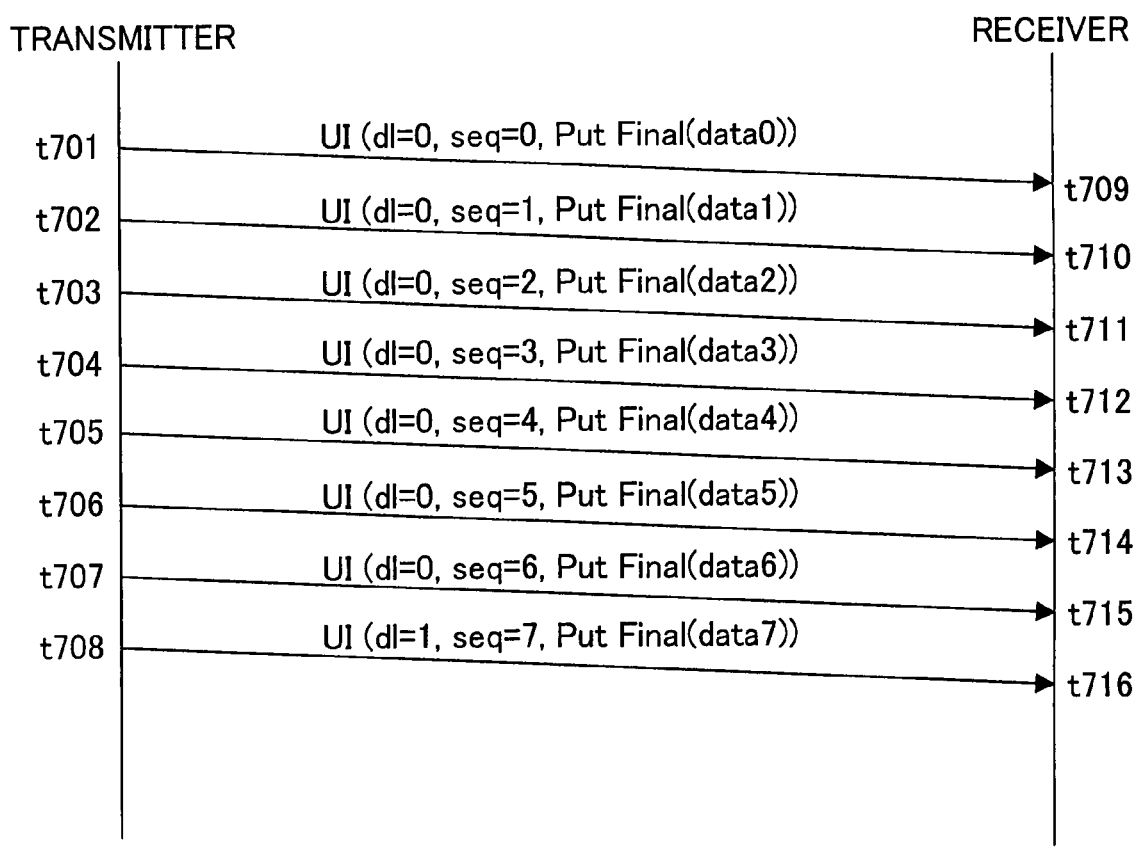
FIG. 46 is a sequence diagram of embodiment 9, in relation to the communication system of the present invention.

The following describes, with reference to FIG. 44 to FIG. 46, a transfer system (communication system) of transfer data according to an embodiment 9. Note that wordings (inclusive of a member and a function) defined in the other embodiments are used in the same manner in the present embodiment, unless otherwise noted.

In the present embodiment, references are made to FIG. 44 which is a block diagram of a transmitter, FIG. 45 which is a block diagram of a receiver, and FIG. 46 which is a sequence diagram of signals.

FIG. 44 is a block diagram of a transmitter 2701 of the present embodiment. Note that the transmitter of FIG. 44 is mere an example, and the transmitter is not limited to this.

Further, each of the constituting circuits may be software or hardware. The constituting members are described hereinbelow.

The transmitter 2701 is a device on the side of transmitting transmission data. The wording "transmission data" here may be text data, image data, or the like; however the transmission data is not limited to these.

As shown in FIG. 44, the transmitter (primary station, client device) 2701 includes a controller (control means) 2702, a memory (storage means) 2703, a sequence number generating circuit (sequence number generating means) 2705, a transmission frame generating circuit (transmission frame generating means) 2706, a transmission section (transmission means) 2707, and a data-end flag generating circuit (data-end flag generating means) 2713.

The controlling section 2702 controls each constituting member of the transmitter 2701.

The memory 2703 stores therein transmission data. This memory 2703 may be, for example, a volatile memory (e.g. SDRAM, etc.) or a nonvolatile memory (e.g. Flash Memory®, HDD, DVD, etc.). Although the memory 2703 is arranged inside the transmitter 2701 according to FIG. 44, the memory 2703 does not necessarily have to be in the transmitter 2701. For example, the memory 2703 may be an external memory connected to the transmitter 2701.

The sequence number generating circuit 2705 is a circuit which increases or decreases the sequence number according to a predetermined rule, and which circuit adds the sequence number to the transmission frame. In the present embodiment, an abbreviated term SEQ which stands for Sequence Number is defined. When SEQ is 1, SEQ indicates that the sequence number is 1. This abbreviation SEQ is used with the same meaning in the sequence diagram of FIG. 46.

If the final data item is contained, the data-end flag generating circuit 2713 generates a data-end flag indicating that the frame contains the final data item, according to a predetermined format. Further, if the final data item is not contained, the data-end flag generating circuit 2713 generates a data-end flag indicating that the frame does not contain the final data item, according to a predetermined format. The generated data-end flag is transferred to the transmission frame generating circuit 2706. In the present embodiment, an abbreviated term DL which stands for Data Last is defined. When the value of DL in a frame is 0, it means that the frame does not contain the final data item of the transmission data. When the value of DL in a frame is 1, it means that the frame contains the final data item of the transmission data. The abbreviation DL is used in the present embodiment. However, the term may be a different expression. Further, it is not necessarily the transmission frame containing the final data item of the transmission data, whose data-end flag is set to a value indicating the end, provided that a certain rule is set between the transmitter 2701 and the receiver 2801. For example, according to a predetermined rule, it is possible to set the data-end flag to the value indicating the end when transmitting a specific non-final data item of the transmission data. In this case, the data-end flag may be a different name. In the present embodiment, however, such a flag is referred to as data-end flag, and DL is used as its abbreviation.

The transmission frame generating circuit 2706 is a circuit which generates a transmission frame of a predetermined format by arranging the data-end flag DL, sequence number SEQ, and data to be transmitted. Note that the present invention adopts a communication scheme which does not limit the window size. Therefore, the transmission frame is generated on a frame format having no limitation to the window format. In the present embodiment, such a frame format is UI (Unnumbered Information) frame of IrLAP (Infrared Link Access Protocol). Also added to the transmission frame is an error detection code for the opposite station to perform an error detection. The error detection code may be CRC (Cyclic Redundancy Check). However, the error detection code is not limited to CRC. It is further possible to add an error correction code.

The transmission section 2707 is a circuit for transmitting the transmission frame having been generated by the transmission frame generating circuit 2706. For example, in a case of using an infrared ray as a communication medium, the transmission section 2007 is an LED (Light Emitting Diode) or LD (Laser Diode). However, the transmission section 2007 is not limited to this. Further, in a case of using other communication medium, a suitable transmission section for the communication medium is adopted.

FIG. 45 is a block diagram of a receiver 2801 of the present embodiment. Note that the transmitter of FIG. 45 is mere an example, and the receiver is not limited to this. Further, each of the constituting circuits may be software or hardware. The constituting members are described hereinbelow.

The receiver 2801 is a device on the side of receiving transmission data from the other device. The wording "transmission data" here may be text data, image data, or the like; however the transmission data is not limited to these.

As shown in FIG. 45, the receiver (secondary station, server device) 2801 includes a controller (control means) 2802, a memory (storage means) 2803, a receiving section (reception means) 2808, a reception frame analyzing circuit (reception frame analyzing means) 2809, an error detecting circuit (error detecting means) 2811, a sequence number analyzing circuit (sequence number analyzing means) 2812, and a data-end flag analyzing circuit (data-end flag analyzing means) 2813.

The controlling section 2802 controls each constituting member of the receiver 2801.

The memory 2803 stores therein reception data. This memory 2803 may be, for example, a volatile memory (e.g. SDRAM, etc.) or a nonvolatile memory (e.g. Flash Memory®, HDD, DVD, etc.). Although the memory 2803 is arranged inside the receiver 2801 according to FIG. 45, the memory 2803 does not necessarily have to be in the receiver 2801. For example, the memory 2803 may be an external memory connected to the receiver 2801.

The receiving section 2808 is a circuit which receives a frame transmitted from the opposite station. For example, in a case of using an infrared ray as a communication medium, the receiving section 2808 is a PD (Photo Diode). However, the receiving section 2808 is not limited to this. Further, in a case of using other communication medium, a suitable receiving section for the communication medium is adopted.

The reception frame analyzing circuit 2809 analyzes a reception frame received by the receiving section 2808. Specifically, the reception frame analyzing circuit 2809 extracts a data-end flag in the reception frame, and transfers the data-end flag to the data-end flag analyzing circuit 2813. The reception frame analyzing circuit 2809 further extracts the sequence number in the reception frame, and transfers the sequence number to the sequence number analyzing circuit 2812. Further, in a case where the received frame contains data, the reception frame analyzing circuit 2809 extracts the data and stores the data in the memory 2803 via the controlling section 2802. When storing data in the memory 2803, the data does not necessarily have to be stored via the controller 2803.

The error detecting circuit 2811 analyzes the code for the error detection, which flag is given to the reception frame, so as to judge if there is an error in the reception frame. Then, the error detecting circuit 2811 notifies the controller of the analysis result. The error detection code may be a cyclic code such as CRC (Cyclic Redundancy Check). However, the error detection code is not limited to this. Further, in a case where an error correction code is given, an error correction is performed.

The sequence number analyzing circuit 2812 analyzes the received sequence numbers which have been in the received frames so as to judge whether the sequence number is increased or decreased according to a predetermined rule, and notifies the controlling section 2802 of the analysis result. For example, if a frame is omitted on the communication path, the sequence number analyzing circuit 2812 deems the omission as an error.

The data-end flag analyzing circuit 2813 analyzes the data-end flag transferred from the reception frame analyzing circuit 2809, and notifies the controlling section 2802 of the analysis result.

Next, a flow of each signal in the present embodiment is described, with reference to FIG. 44, FIG. 45, and sequence diagrams of FIG. 46. It is assumed that the transmitter 2701 and the receiver 2801 both support OBEX (Object Exchange Protocol), and transmit data by performing a PUT operation.

In FIG. 46, the transmission data is arranged in the PUT Final command of OBEX, and frames are transmitted by using UI frames of IrLAP.

The PUT Final Command includes data 0 to data 7. In other words, the PUT Final Command is divided in such a manner that connecting of these data 0 to data 7 will form the PUT Final Command. Further, the data 7 is the final data item of the Put Final command.

In the transmitter 2701, when transmission data is requested within itself or from outside, the controlling section 2702 notifies the sequence number generating circuit 2705 to generate a sequence number. Further, the controlling section 2702 notifies the data-end flag generating circuit 2713 to generate a data-end flag.

The sequence number generating circuit 2705 increases or decreases the sequence number according to a predetermined rule, and transfers the sequence number to the transmission frame generating circuit 2006.

Further, the data-end flag generating circuit 2713 judges whether the transmission frame contains the final data item of the transmission data. If the transmission frame contains the final data item, a data-end flag of a predetermined format is created so as to indicate the end. If the transmission does not contain the final data item, a data-end flag of a predetermined format is created so as to indicate the non-end. The data-end flag thus generated is transferred to the transmission frame generating circuit 2706.

The transmission frame generating circuit 2706 arranges, according to the predetermined format, the data-end flag, the sequence number, and the data, and transmits them via the transmission section 2706.

In FIG. 46, the respective batch-transmission-end flags of frames t 701, t 702, t 703, t 704, t 705, t 706, and t 707 are set to indicate the non-end, and the respective batch-transmission-end flag of the frame t 708 is set to indicate the end. In the present embodiment, the sequence number (SEQ) in each of the frames t 701 to t 708 is increased in increment of 1.

When the receiver 2801 receives frames from the opposite station via the receiving section 2808, the reception frame analyzing circuit 2809 of the receiver 2801 extracts respective parameters of the received frames. The parameters can be, for example, a data-end flag, a sequence number, data or the like. The data-end flag is transferred to the data-end flag analyzing circuit 2813, the sequence number is transferred to the sequence number analyzing circuit 2812. The data is stored in the memory 2803. If necessary, the data is stored in the memory 2803 via the controlling section 2802. Further, at the same time, the error detecting circuit 2811 performs error detection to detect for example a CRC error in the received frames. If the error detection code or the error correction code is a code other than a CRC code, a suitable error detection or error correction for the code adopted is performed.

Further, the data-end flag analyzing circuit 2813 analyzes the data-end flag and notifies the analysis result. In the sequence diagram of FIG. 46, the data-end flag analyzing circuit 2813 notifies the controlling section 2802 that the data-end flag does not indicate the end, when frames of t 701, t 702, t 703, t704, t705, t706 and t 707 are received. When, the frame t 708 is received, the data-end flag analyzing circuit 2813 notifies the controlling section 2802 that the batch-transmission-end flag indicates the end.

Further, the sequence number analyzing circuit 2812 analyzes whether the sequence numbers of the received frames are increased or decreased according to the predetermined rule, and notifies the controlling section 2802 of the analysis result. In the present embodiment, the predetermined rule is that the sequence number is increased in increment of 1 for each frame. In the sequence diagram of FIG. 46, all the 8 frames from the transmitter 2701 have been properly received. Each sequence number of the received frame is increased by 1 from the sequence number of the preceding frame. Since it is agreed between the transmitter 2701 and the receiver 2801 that the sequence number is increased in increment of 1, all the received frames are confirmed to be properly received, and the proper reception of all the frames is notified to the controlling section 2802 of the receiver 2801.

In the controlling section 2802, if the frame containing the data-end flag, and if no error was detected in all the frames having been received, it is possible to start a predetermined operation (e.g. if the reception data is data compressed in the JPEG format, decoding of the JPEG data is started).

Further, the receiver 2801 may be adapted so that, when an error is detected by the error detecting circuit 2811 and the sequence number detection circuit 2812 of the receiver 2801, the subsequent data is not stored in the memory 2103. Doing so allows saving of the power which would have been consumed for storing data received after the error detection.

As described, with the transmitter 2701 and the receiver 2801, it is possible to detect an omission of a frame even in a one-way communication, by adopting a communication scheme in which UI frames of IrLAP is used and therefore window size is not limited. Thus, highly reliable communication is possible. Further, in the one-way communication, the transmitter 2701 does not receive a SUCCESS response to the PUT final command of OBEX. However, data transmission through Put Operation is properly performed even in one-way communication, by setting the controlling section 2702 of the transmitter 2701 so that the Put Operation in one-way communication is ended at the point of completing transmission of Put Final.

Embodiment 10

The following describes, with reference to FIG. 47 to FIG. 51, a transfer system (communication system) of transfer data according to an embodiment 10. Note that wordings (inclusive of a member and a function) defined in the other embodiments are used in the same manner in the present embodiment, unless otherwise noted.

In the present embodiment described is how the size of data to be transmitted in batch is determined. In the communication system of the present invention, a size of data that a transmitter is able to transmit in batch can be determined in a convenient way for data retransmission and for data processing in a receiver. It is possible that an application or the like of the transmitter determine the size of batch transmission data, according to the type of data to be transmitted or conditions of the communication path or the like. Alternatively, it is possible that the receiver transmits to the transmitter the size of the batch transmission data, or information (e.g., Buffer size of the receiver) for determining the size.

Further, it is usually the SMP layer where data is divided. However, the division of the data may be performed in a different layer.

The present embodiment deals with an example of transferring a JPEG image.

Figure 47:
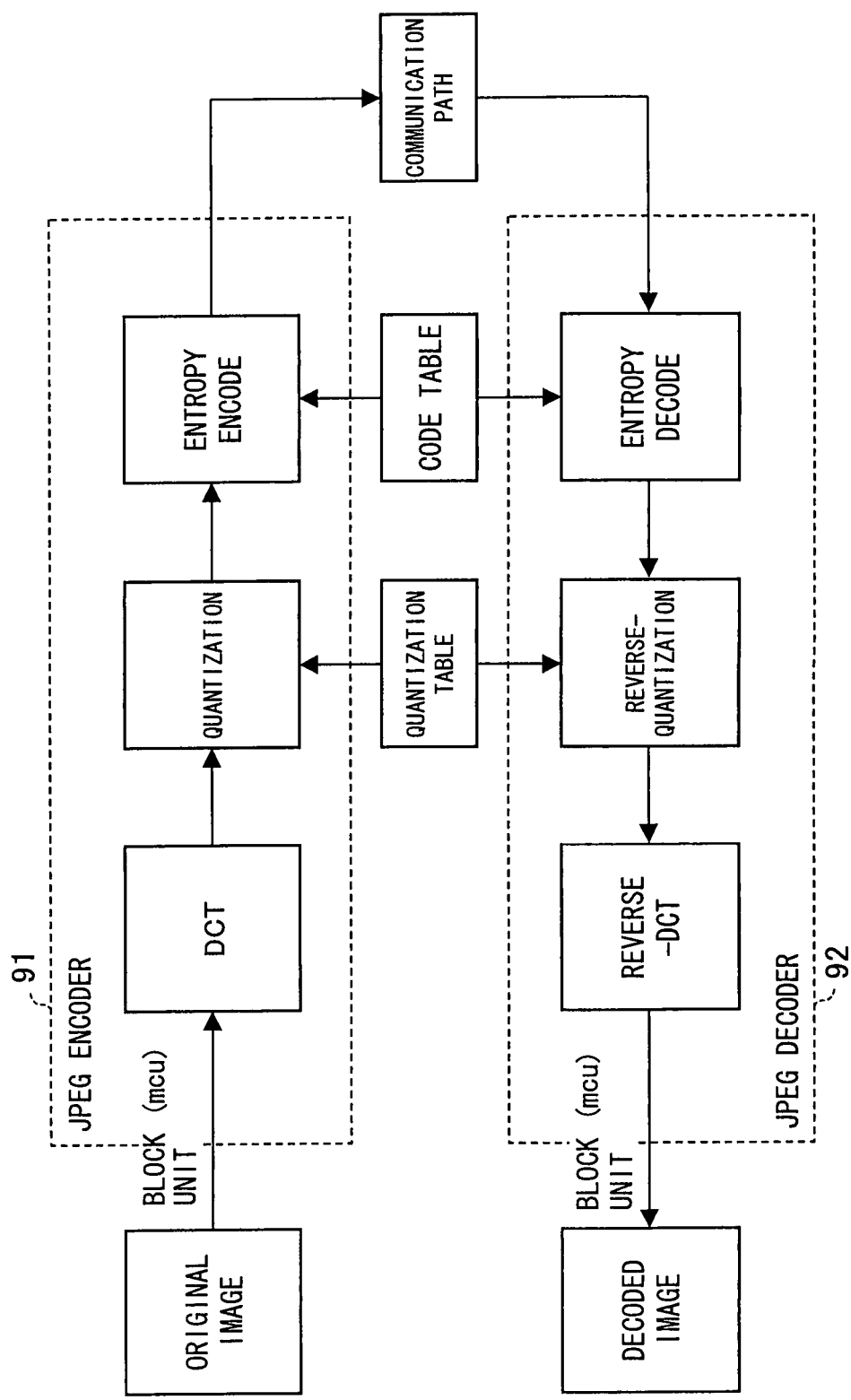
FIG. 47 is a block diagram illustrating a structure of a JPEG encoder and a JPEG decoder.

FIG. 47 is a block diagram showing respective structures of an encoder in the transmitter and a JPEG decoder in a receiver.

As showing in FIG. 47, when transferring a JPEG image, an original image is subjected to DCT conversion in a JPEG encoder 91 of the transmitter, on a block (mcu: minimum coded unit) by block basis. "mcu" is the minimum unit for JPEG conversion, and is classified by the method of compression into the following 4 kinds: 8×8, 8×16, 16×8, and 16×16 (See FIG. 48(*a*) to FIG. 48(*d*)).

In a case of 8×8 (FIG. 48(*a*)), the relation of a brightness component (Y) to chromaticity components (Cb, Cr) is 1:1 in all the pixels. In a case of 8×16 (FIG. 48(*b*)), two Ys (corresponding to 1 and 9 of 8×8), one Cb (an average of 1 and 9 in 8×8), and one Cr (an average of 1 and 9 in 8×8) are in a single vertically-long unit (1). In a case of 16×8 (FIG. 48(*c*)), two Ys (corresponding to 1 and 2 of 8×8), one Cb (an average of 1 and 2 in 8×8), and one Cr (an average of 1 and 2 in 8×8) are in a single horizontally-long unit (1). In a case of 16×16 (FIG. 48(*d*)), four Ys (corresponding to 1, 2, 9 and 10 of 8×8), one Cb (an average of 1, 2, 9 and 16 in 8×8), and one Cr (an average of 1, 2, 9 and 16 in 8×8) are in a single unit (1).

Accordingly, the data compression ratio is the lowest in the case of 8×8. Further, in this case, an image having decoded is close to the original image; however the amount of data is large. This is generally referred to as 4:4;4. On the other hand, the data compression ratio is the highest in the case of 16×16. Since there are many parts that are averaged in this case, it is more likely that a different image from the original image is obtained.

Then, in the DCT conversion, DCT conversion (Discrete Cosine Transform) is performed based on the block by block input. This conversion is multiplication of two-dimensional matrixes, and yields 64 conversion coefficients corresponding to the number of the pixels. The conversion coefficients obtained respectively correspond to frequency components in such a manner that the frequency components becomes lower and lower in the direction of upper left: i.e., the frequency components becomes higher and higher in the direction of lower right. Each pixel in general largely correlates to its adjacent pixel. Therefore, a conversion coefficient corresponding to a higher frequency component less likely occurs.

Next, in quantization, the conversion coefficients are divided by a predetermined quantization table. As described before, in general, the conversion coefficients of higher frequency less likely occurs. Therefore, by enlarging the high frequency portion of the conversion table, almost all the conversion coefficients corresponding to higher frequencies becomes 0 through quantization.

Lastly, as for entropy coding, it is performed based on a predetermined entropy coding table. As described before, the conversion coefficients made 0 by quantization is expressed as consecutive 0s through entropy coding, and compression becomes possible at this point. In other words, JPEG compression of an original image whose frequency component is low (a colors of adjacent pixels are not so different) tends to result in a higher compression efficiency.

An image data thus entropy-coded is transferred to the communication path.

On the other hand, the receiver having received the entropy-coded image data via the communication paths performs JPEG decoding with respect to the image data, by performing an exactly reverse process of the process performed in the transmitter of a JPEG decoder 92.

First, entropy-decoding is performed based on a predetermined entropy decoding table. Then, data resulted from the entropy-decoding is reverse-quantized based on a predetermined reverse-quantization table. Data having been subjected to the reverse-quantization is converted through reverse-DCT conversion into a brightness component Y and chromaticity components Cb and Cr. Further, at this point, an image is restored according to the compression methods of 8×8, 8×16, 16×8, and 16×16, by using the brightness component Y and the averaged chromaticity components Cb and Cr.

As described, in the transmission of a JPEG image, data processing is performed for each block (mcu) as to generation of compressed image and decoding. Further, as to displaying after the decoding, it might be convenient to process each line on which mcus are aligned, or process each frame (1 image). This is because of the following reasons. Namely, a horizontal sync signal for each line, and a vertical sync signal exits for each frame. By renewing a line buffer or frame buffer for each of the sync signals, it is possible to process the renewing-timing of the video memory. This is true in a case of processing moving picture such as MPEG, in which data is processed on a block by block basis.

Next, as specific examples of process in which data is divided and retransmitted, the following describes a case of dividing and retransmitting data on a basis of mcu by mcu basis, a case of dividing and retransmitting data on a line by line basis, and a case of dividing and retransmitting data on a file by file basis.

Figure 49:
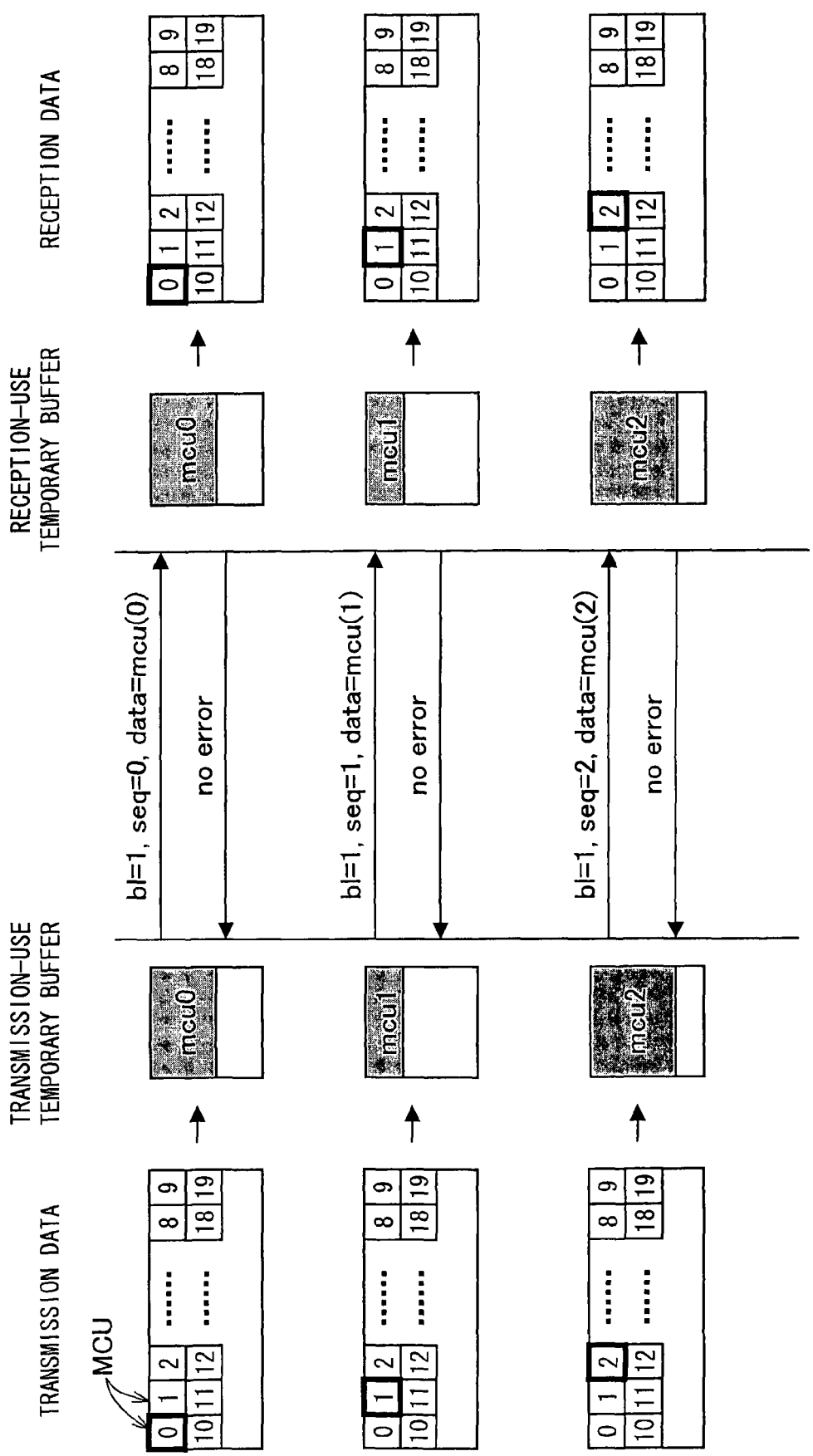
FIG. 49 is an explanatory diagram illustrating division and retransmission processes on an mcu-by-mcu basis in the communication system of the present invention.

FIG. 49 is an explanatory diagram for division and retransmission process performed in a communication system of the present invention, in which process data is divided and retransmitted on the basis of mcu by mcu.

From the transmitter, data having been subjected to the DCT, quantization, and entropy-coding as described above is transmitted on the basis of mcu by mcu. Specifically, data item corresponding to a single mcu is transferred to a transfer-use temporary buffer. After transmission of data from the transmission-use temporary buffer ends, the batch-transmission-end flag is set to 1.

As described, in a case of dividing and retransmitting data on the mcu by mcu basis, the reception-use temporary buffer of only one mcu (usually several tens to several hundreds of bytes) needs to be ensured in the receiver.

As described, in a case of dividing and retransmitting data on the mcu by mcu basis, the reception-use temporary buffer of only one mcu (usually several tens to several hundreds of bytes) needs to be ensured in the receiver. This is advantageous in a case where it is difficult to ensure a temporary memory in a communication device.

Figure 50:
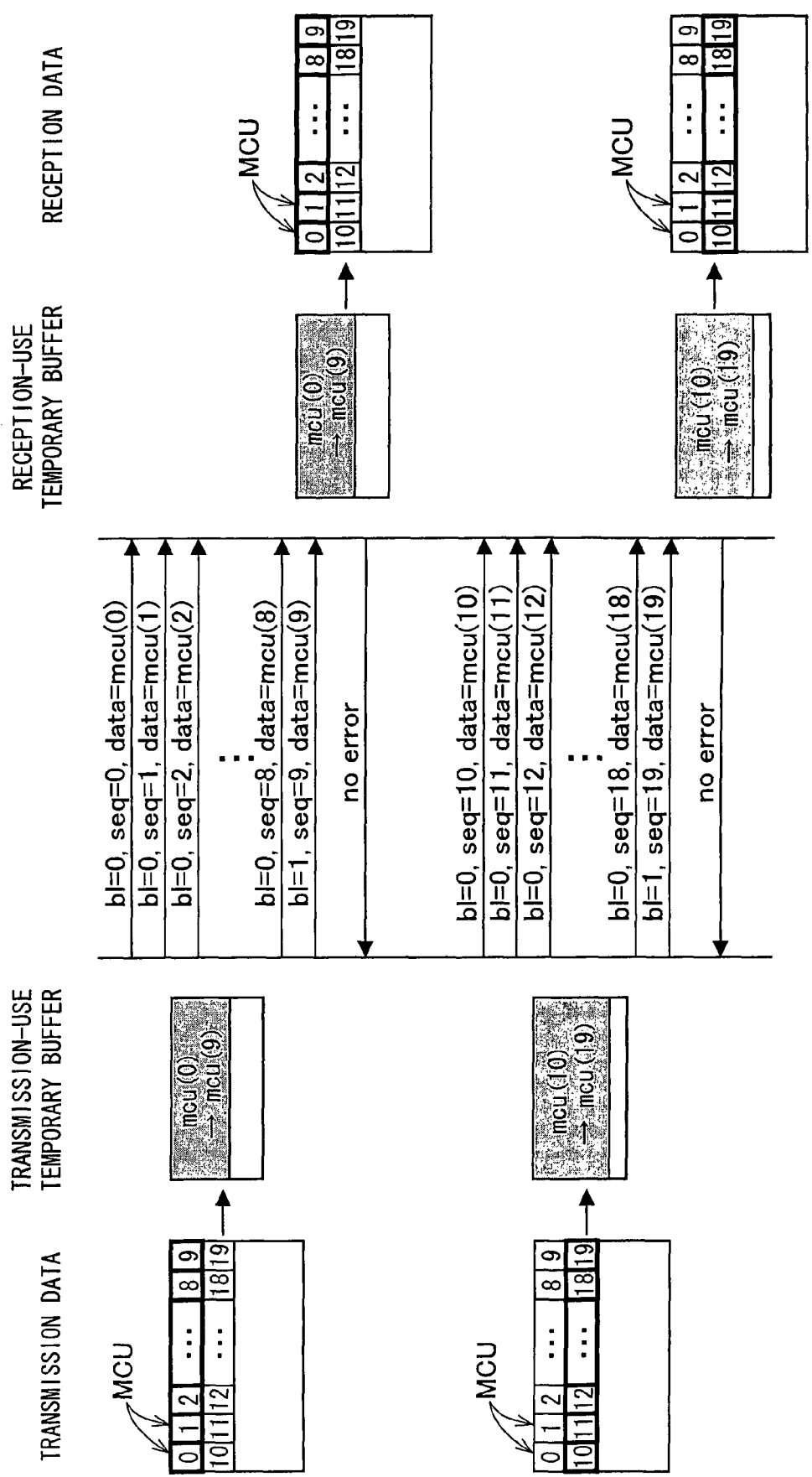
FIG. 50 is an explanatory diagram illustrating division and retransmission processes on a line-by-line basis in the communication system of the present invention.

FIG. 50 is an explanatory diagram for division and retransmission process performed in a communication system of the present invention, in which process data is divided and retransmitted on the line by line basis.

From the transmitter, data corresponding to 1 line (8 lines in the case of 8×8) is transferred to a transmission use temporary buffer, and a batch-transmission-end flag is set to 1 at the point when the transmission of data corresponding to 1 line ends.

Every time the receiver receives a frame whose batch-transmission-end flag is set to 1, data in a reception-use temporary buffer is transferred to an application for example, and is subjected to JPEG decoding in the application.

As described, in the case of dividing and retransmitting data on the line by line basis, data corresponding to one line (8 lines in the case of 8×8) is all presented at the point when the data is transferred to the application. Therefore, it is possible to simplify the process in the case of processing reception data on the line by line basis. The data having been decoded is in the form of line unit. Therefore, when an error occurs, there will be no such a problem that display data is cut off along a line, when the display data is displayed on a display system which displays only portions having no errors. In this case, it is predicted that the transmission-use temporary buffer of the transmitter and the reception-use temporary buffer of the receiver needs to be approximately several kilo to several hundreds of kilo bytes.

Figure 51:
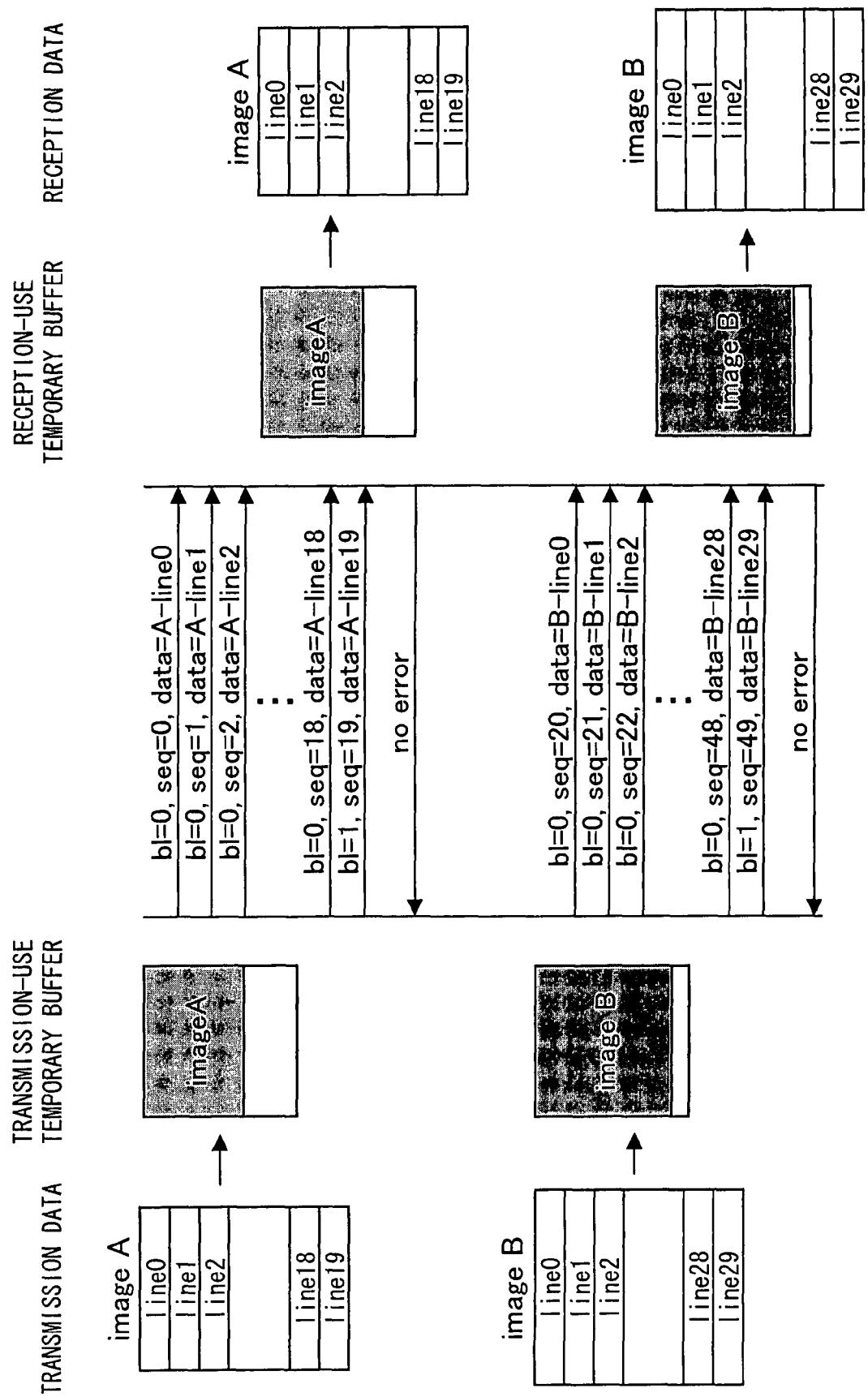
FIG. 51 is an explanatory diagram illustrating division and retransmission processes on a file-by-file basis in the communication system of the present invention.

FIG. 51 is an explanatory diagram for division and retransmission process performed in a communication system of the present invention, in which process data is divided and retransmitted on the file by file basis.

From the transmitter, data corresponding to 1 transmission image is transferred to a transmission-use temporary buffer, and a batch-transmission-end flag is set to 1 at the point when the transmission of data corresponding to 1 image ends.

Every time the receiver receives a frame whose batch-transmission-end flag is set to 1, data in a reception use temporary buffer is transferred to an application for example, and is subjected to JPEG decoding in the application.

As described, in a case of dividing and retransmitting data on the file by file basis, the division and retransmission process is performed for a set of data corresponding to one image. Therefore, in the JPEG decoder of the application, the data is subjected to JPEG decoding on an image by image basis. Therefore, it is easy to perform a process of renewing a display-use frame memory when decoding of one image is completed. In this case, the transmission-use temporary buffer of the transmitter and the reception-use temporary buffer of the receiver are predicted to be approximately several hundreds of kilo bytes to several mega bytes. This is advantageous for a system for processing MPEG or the like in which system static images are successively transmitted. Because, when an error occurs, it is easy to perform for example a process of continuously displaying the previous image in the complete state.

In regard to a period of waiting for a response from the receiver, it is preferable that retransmission be immediately performed in a case where an error occurred in a frame whose batch-transmission-end flag is set to 1. However, even if no error has occurred, there is a case in which a response can not be sent back (e.g. in a case where it is taking a long time to process the reception data in the receiver). In such a case, it is possible to set in the transmitter a long period which is not as long as the time of processing reception data, and to retransmit a frame whose batch-transmission-end flag is set to 1, if no response is replied even after the elapse of the long period.

This ensures the time for receiver to process the data, and makes it possible to perform suitable retransmission process.

Embodiment 11

The following describes a client device (communication device) in a transfer system (communication system) for transfer data according to embodiment 11 of the present invention. Note that wordings (inclusive of a member and a function) defined in the other embodiments are used in the same manner in the present embodiment, unless otherwise noted.

Figure 52:
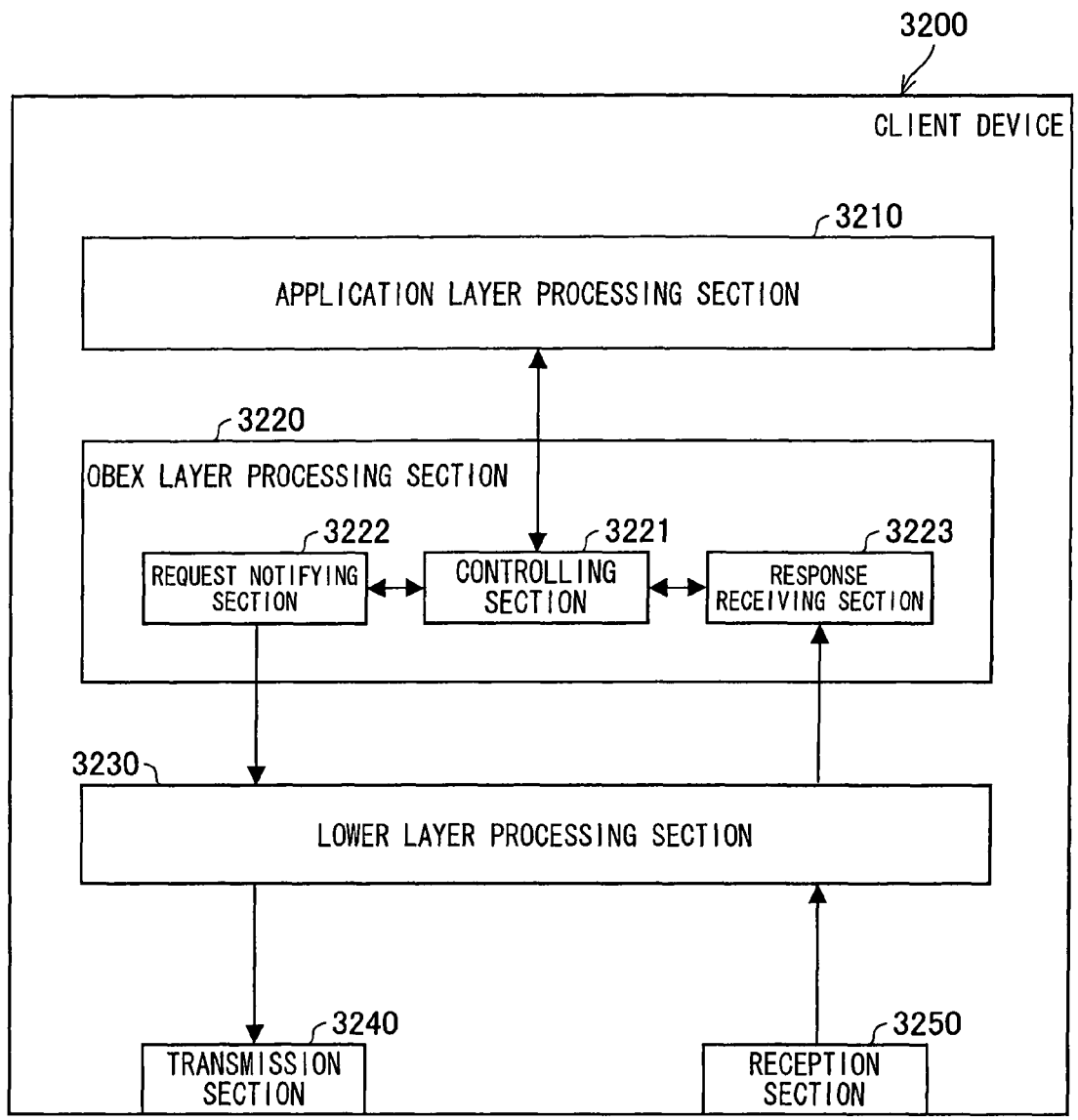
FIG. 52 is a block diagram illustrating a structure of a client device of a conventional communication system.

First, FIG. 52 is a block diagram of a client device which performs communication according to a conventional OBEX protocol.

As shown in FIG. 52, a conventional client device (communication device) 3200 at least includes: an application layer processing section 3210; an OBEX layer processing section (object exchanging layer processing section) 3220; a lower layer processing section 3230; a transmission section 3240; and a receiving section 3250.

The application layer processing section 3210 requests the OBEX layer processing section 3220 to issue a request command, according to a user instruction entered via an operating section (not shown).

The OBEX layer processing section 3220 includes a controlling section 3221, a request notifying section 3222, and a response receiving section 3223.

In response to the request from the application layer processing section 3210, the controlling section 3221 notifies the request notifying section 3222 to generate a request command and to issue a request command to the lower layer. Further, in response to the notification of response command reception result from the response receiving section 3223, the controlling section 3221 notifies the reception result of the response command to the application layer processing section 3210.

In response to the notification from the controlling section 3221 to issue a request command, the request notifying section 3222 generates a request command, and outputs the request command to the lower layer processing section 3230. The response receiving section 3223 receives the response command from the lower layer processing section 3230, and analyzes the response command received. Then, the response receiving section 3223 notifies the controlling section 3221 of the reception of the analysis result and the response command.

The lower layer processing section 3230 receives the response command from the OBEX layer processing section 3220, and adds a relevant header of the lower layer to the response command. Then, the lower layer processing section 3230 sends the response command to the transmitting section 3240. In the meanwhile, the lower layer processing section 3230 receives a request command from the receiving section 3250, and removes a relevant header of the lower layer from the request command. Then, the lower layer processing section 3230 sends the request command to the OBEX layer processing section 3220.

The transmission section 3240 transfers the request command received from the lower layer processing section 3230 to the outside, via an infrared communication path.

The receiving section 3250 receives the response command from the target device (server device) via the infrared communication path, and sends the received response command to the lower layer processing section 3230.

Figure 53:
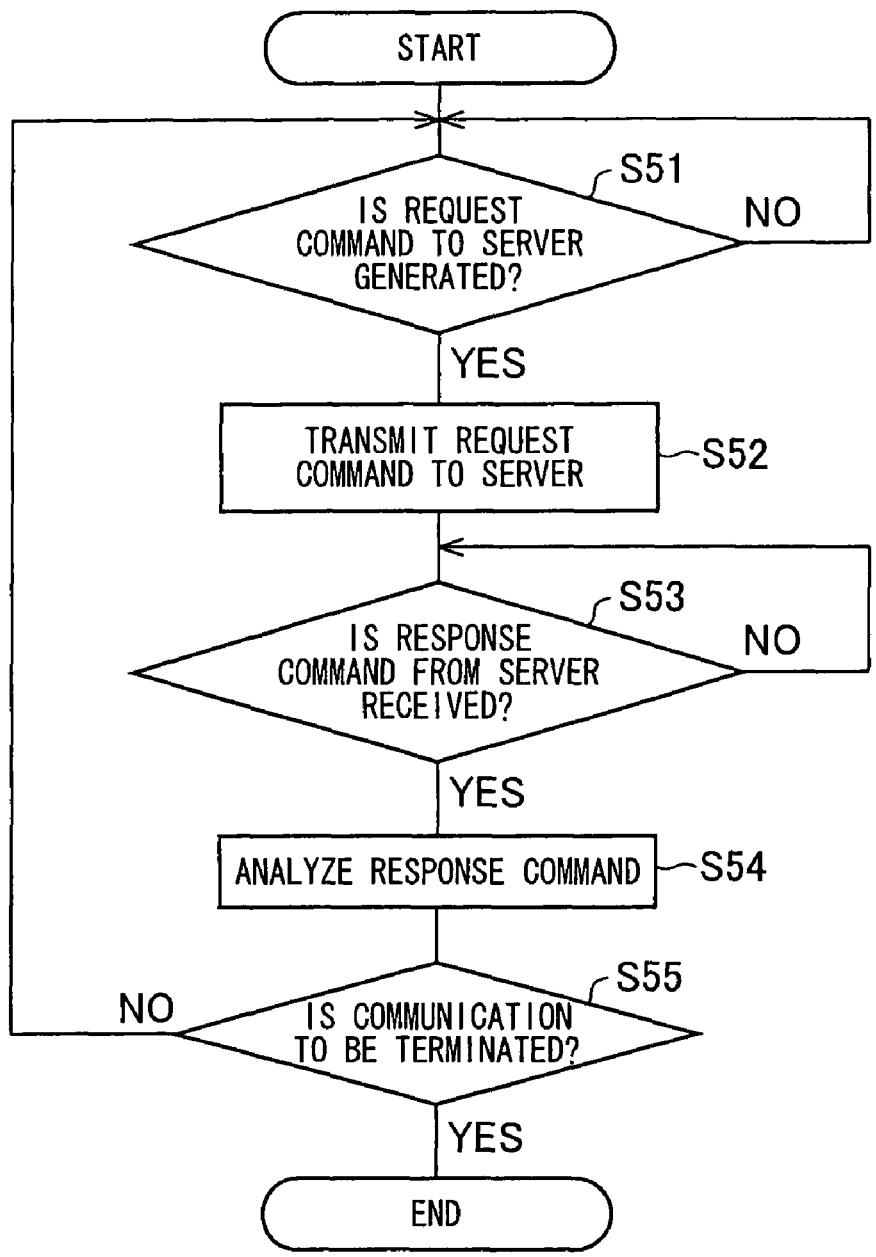
FIG. 53 is a flowchart illustrating an operation of an OBEX client in the conventional communication system.

Next, with reference to FIG. 53, an operation of the controlling section 3221 of the OBEX layer processing section 3220 of the client device 3200 according to the present embodiment is described.

Step S51 is a step in which an application layer processing section 3200 and a control section 3221 of an OBEX layer processing section 3220 in the client device 3200 judge whether or not a request command to be sent to the server device has been generated. In cases where the request command has been generated, the sequence goes to Step S52. On the other hand, in cases where no request command has been generated, the sequence goes to Step S51 again.

Step S52 is a step of transmitting, to the lower layer processing section 3230, the request command that is to be transmitted to the server device. After finishing the transmission, the sequence goes to Step S53.

Step S53 is a step of judging whether or not a response command has been received from the server device via the lower layer processing section 3230. In cases where the response command has been received, the sequence goes to Step S54. On the other hand, in cases where no response command has been received, the sequence goes to Step S53 again.

Step S54 is a step for analyzing the response command having been received. After finishing the analysis, the sequence goes to the Step S55.

Step S55 is a step for judging whether or not the communication is to be disconnected. If the communication is not to be disconnected, the sequence goes to the Step S51 again.

With the above operation, the OBEX layer processing section 3220 of the conventional client device 3200 can carry out communication by (i) issuing a request command, and (ii) analyzing a response command sent in reply to the request command, and (iii) issuing a next request command.

However, the operation of the OBEX layer processing section 3220 of the conventional client device 3200 has such a problem that: until a response command is received from the server device, a next request command cannot be sent.

Figure 54:
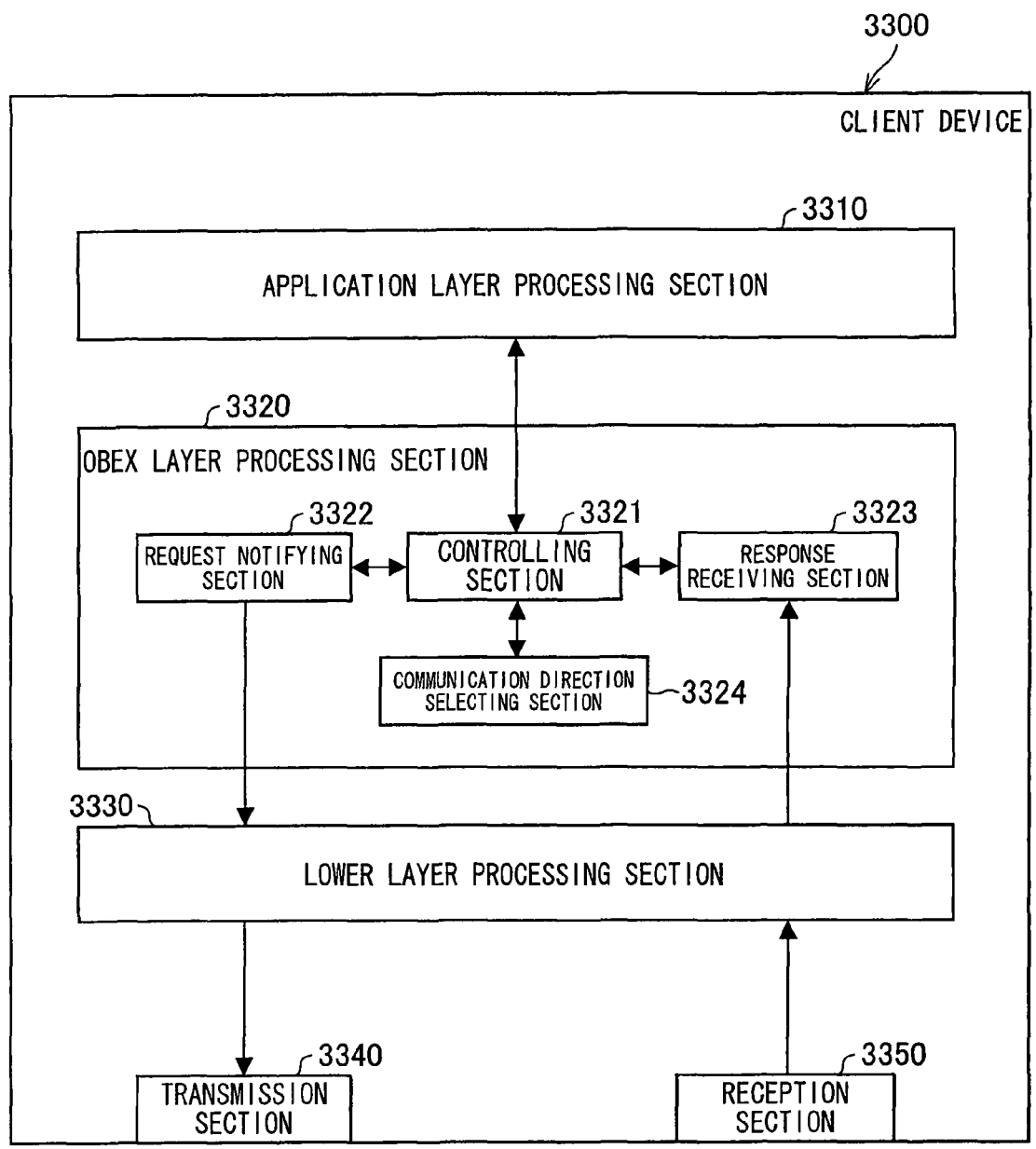
FIG. 54 is a block diagram illustrating a structure of a client device of a communication system of each of embodiments 11 and 12 according to the present invention.
Figure 55:
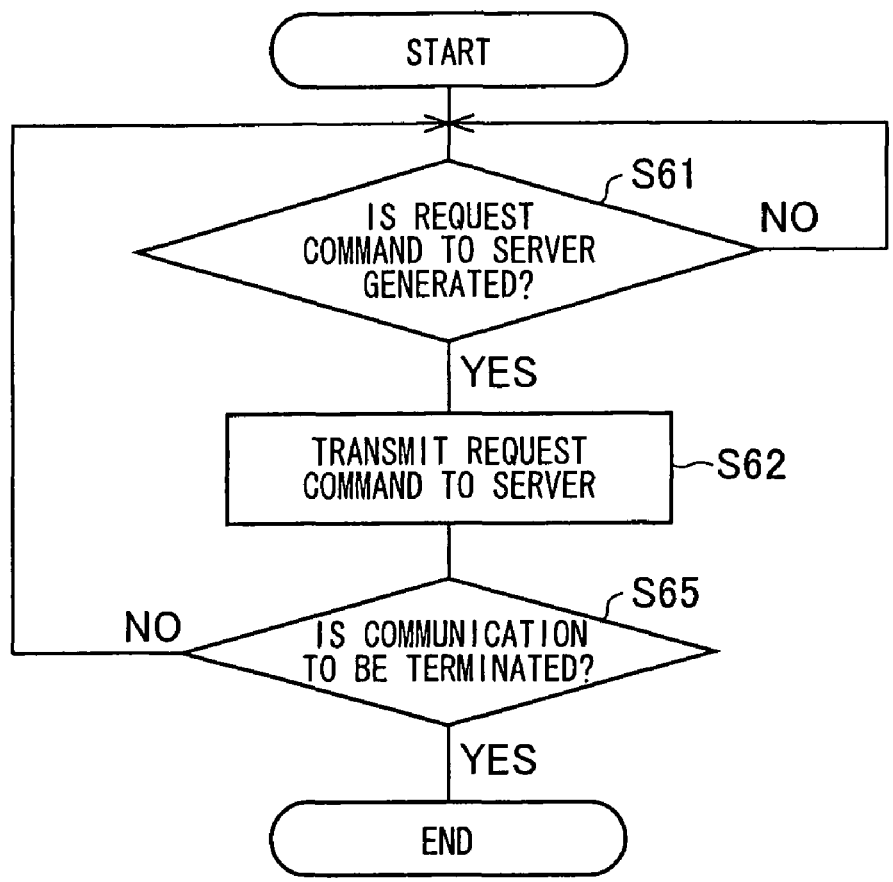
FIG. 55 is a flowchart illustrating an operation of an OBEX layer of a client device of a communication system of embodiment 11.

In order to solve the problem, as shown in a flowchart of FIG. 55, a client device 3300 (FIG. 54) according to the present embodiment is capable of issuing a request command even when no response command is not received from a server device in reply to a previous request command. Details thereof are described as follows.

Step S61 is a step in which an application layer processing section 3310 and a control section 3321 of an OBEX layer processing section 3320 in the client device 3300 judge whether or not a request command to be sent to the server device has been generated. In cases where the request command has been generated, the sequence goes to Step S62. On the other hand, in cases where no request command has been generated, the sequence goes to Step S61 again.

Step S62 is a step of transmitting, to the lower layer processing section 3330, the request command that is to be transmitted to the server device. After finishing the transmission, the sequence goes to Step S65.

Step S65 is a step for judging whether or not the communication is to be disconnected. If the communication is not to be disconnected, the sequence goes to the Step S61 again.

The control section 3321 of the OBEX layer processing section 3320 of the client device 3300 carries out the above operation. With this, in the two-way communication, after receiving a response command from the server device, a next request command is transmitted thereto. On the other hand, in the one-way communication, even though no response command is received from the server device, a next request command can be transmitted.

Here, FIG. 54 is a block diagram illustrating the client device 3300 according to the present embodiment.

The blocks other than a communication direction selecting section 3324 of the OBEX layer processing section (object exchanging layer processing section) 3320 is the same as those of the OBEX layer processing section 3220 of the conventional client device 3200 described with reference to FIG. 52, and the explanation therefor are omitted here.

The communication direction selecting section 3324 has a function of selecting one-way communication or two-way communication. Here, the one-way communication is communication which does not require a response command from the server device in reply to a request command from the client device. If a server device has no transmission section, or if a client device has no receiving section, one-way communication is inevitably selected. Further, the one-way communication is also selected when the client and server devices both have a transmission section and a receiving section, but signals flow only in one direction: i.e., from the client device to the server device. On the other hand, two-way communication is a communication scheme in which a server device transmits a response command in reply to a request command having transmitted from the client server, and the client device transmits the next request command after the response command is analyzed. It is no necessary to send a response command for each of the request commands. The response command to a particular request command is not necessary, provided that the OBEX layers of the client and server devices agrees therebetween on a certain rule.

Figure 56:
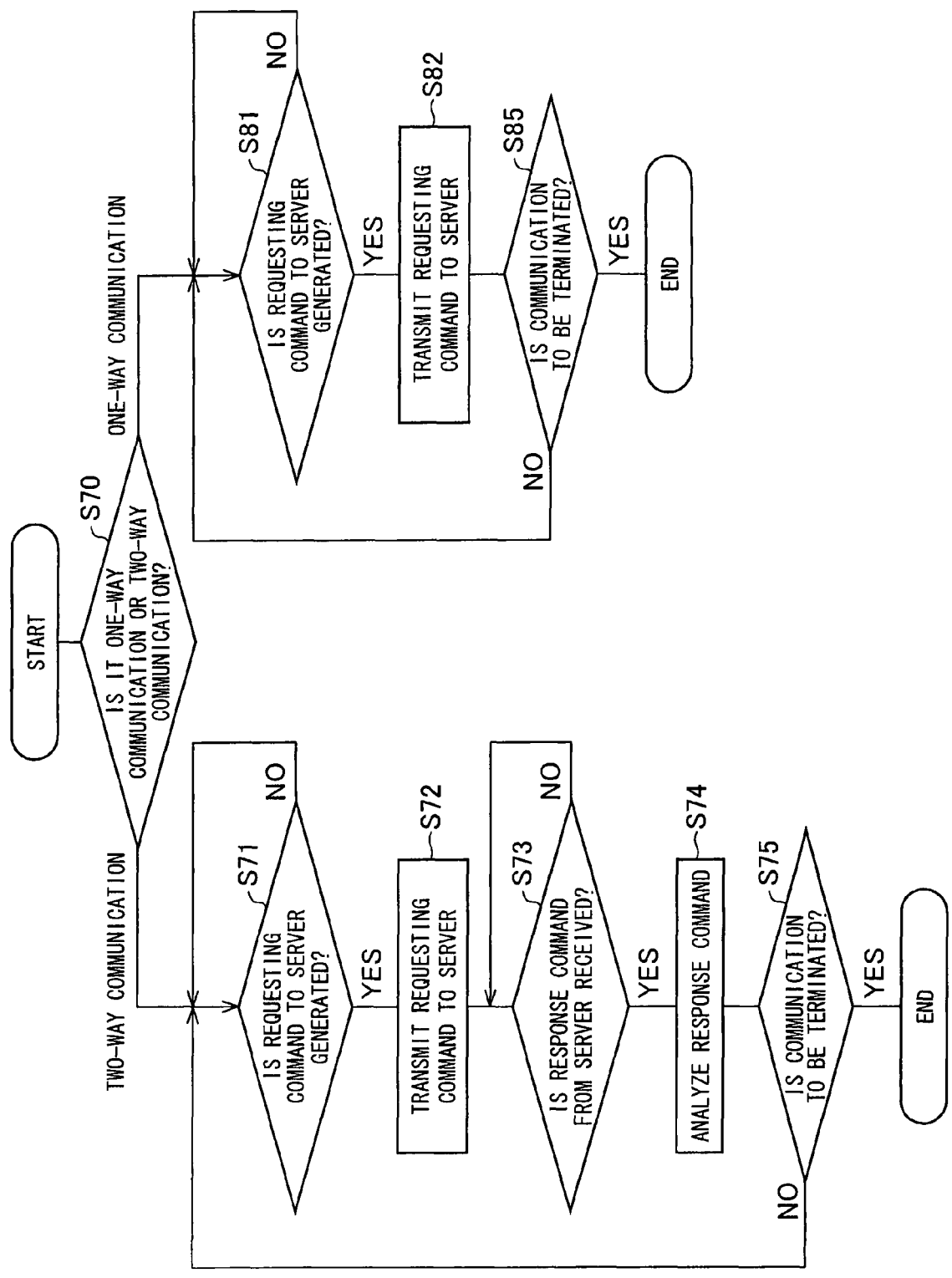
FIG. 56 is a flowchart illustrating another operation of the OBEX layer of the client device of the communication system of embodiment 11 according to the present invention.

Next, with reference to FIG. 56, an operation of the controlling section 3321 of the OBEX layer processing section 3320 of the client device 3300 according to the present embodiment is described.

Step S70 is a step of causing the communication direction selecting section 3324 to select either the two-way communication or the one-way communication. In cases where the two-way communication is selected, the sequence goes to Step S71. In cases where the one-way communication is selected, the sequence goes to Step S81.

Step S71 in the two-way communication is a step in which the application processing section 3310 or the control section 3321 of an OBEX layer processing section 3320 judges whether or not a request command to be sent to the server device has been generated. In cases where the request command has been generated, the sequence goes to Step S72. On the other hand, in cases where no request command has been generated, the sequence goes to Step S71 again.

Step S72 in the two-way communication is a step of transmitting, to the lower layer processing section 3330, the request command to be sent to the server device. After finishing the transmitting, the sequence goes to Step S73.

Step S73 in the two-way communication is a step of judging whether or not a response command has been received from the server device. In cases where the response command has been received, the sequence goes to Step S74. On the other hand, in cases where no response command has been received, the sequence goes to Step S73 again.

Step S74 in the two-way communication is a step of analyzing the response command received from the server device. After finishing the analysis, the sequence goes to Step S75.

Step S75 in the two-way communication is a step of judging whether or not the communication is to be disconnected. In cases where the communication is not to be disconnected, the sequence goes to Step S71 again.

In the meanwhile, Step S81 in the one-way communication is a step in which the application processing section 3310 or the control section 3321 of an OBEX layer processing section 3320 judges whether or not a request command to be sent to the server device has been generated. In cases where the request command has been generated, the sequence goes to Step S82. On the other hand, in cases where no request command has been generated, the sequence goes to Step S81 again.

Step S82 in the one-way communication is a step of transmitting, to the lower layer processing section 3330, the request command to be sent to the server device. After finishing the transmitting, the sequence goes to Step S85.

Step S85 in the one-way communication is a step of judging whether or not the communication is to be disconnected. In cases where the communication is not to be disconnected, the sequence goes to Step S81 again.

The control section 3321 of the OBEX layer processing section 3320 of the client device 3300 carries out the above operation. With this, in the two-way communication, after receiving a response command from the server device, a next request command is transmitted thereto. On the other hand, in the one-way communication, even though no response command is received from the server device, a next request command can be transmitted.

Embodiment 12

The following describes a client device (communication device) in a transfer system (communication system) for transfer data according to embodiment 12 of the present invention. Note that wordings (inclusive of a member and a function) defined in the other embodiments are used in the same manner in the present embodiment, unless otherwise noted.

FIG. 54 is a block diagram of a client device 3300 of the present embodiment. That is, the client device 3300 is essentially the same as that of the foregoing embodiment 11, and the operation of each block other than a controlling section 3321 of an OBEX layer processing section 3320 is also essentially the same. Therefore, the explanation is omitted here.

Figure 57:
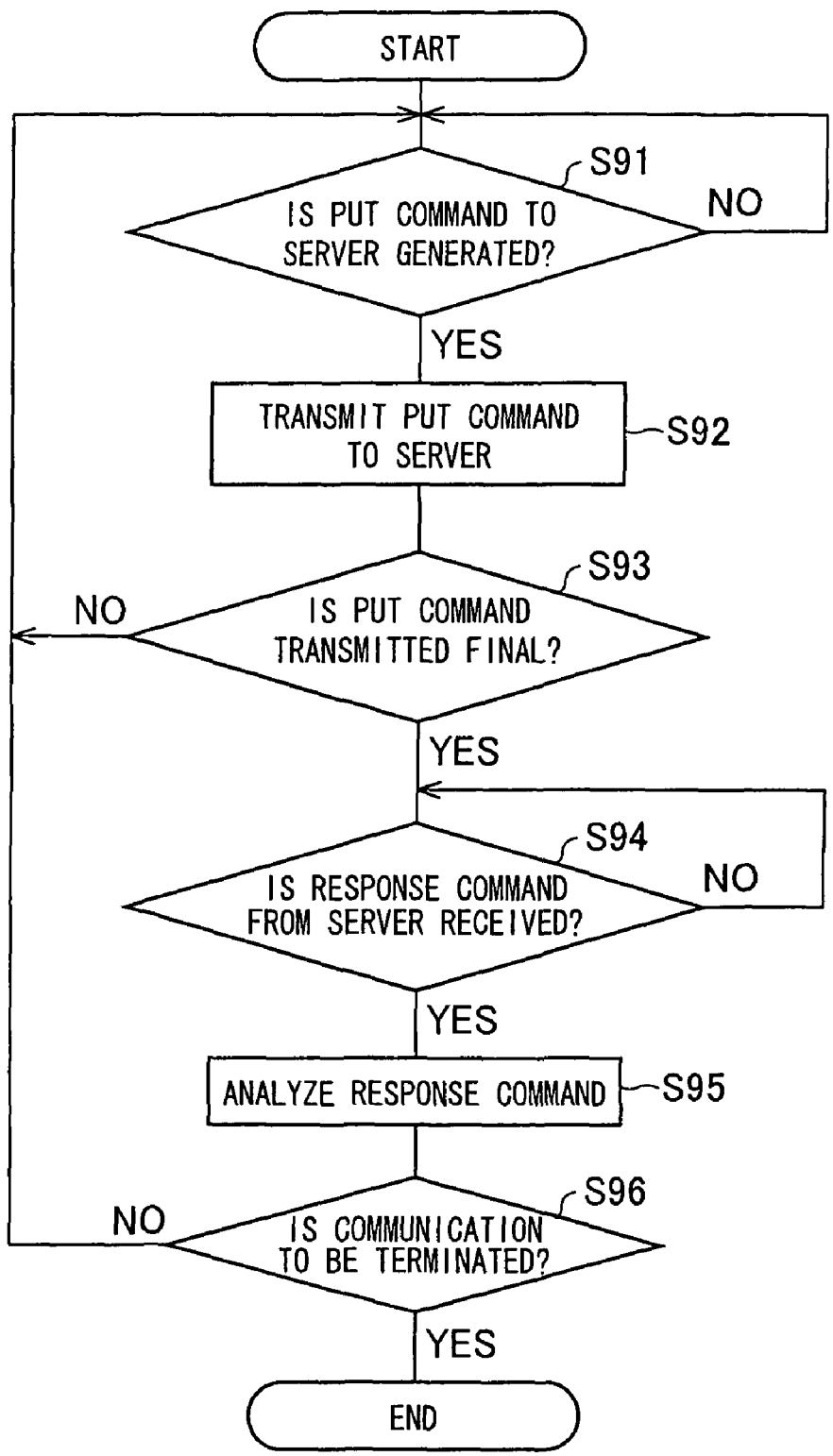
FIG. 57 is a flowchart illustrating an operation of an OBEX layer of a client device of a communication system of embodiment 12.

With reference to FIG. 57, the operation of the controlling section 3321 of the OBEX layer processing section 3320 of the present embodiment is described.

Step S91 in the two-way communication is a step in which the application processing section 3310 or the control section 3321 of an OBEX layer processing section 3320 judges whether or not a request command to be sent to the server device has been generated. In cases where the request command has been generated, the sequence goes to Step S92. On the other hand, in cases where no request command has been generated, the sequence goes to Step S91 again.

Step S92 is a step of transmitting the PUT request command to the server device. After finishing the transmission, the sequence goes to Step S93.

Step S93 is a step of judging whether or not the transmitted PUT request command is the final PUT command. In cases where it is judged that the transmitted PUT request command is the final PUT command, the sequence goes to Step S94. On the other hand, in cases where it is judged that the transmitted PUT request command is not the final PUT command, the sequence goes to Step S91.

Step S94 is a step of judging whether or not a response command has been received from the server device. In cases where it is judged that the response command has been received, the sequence goes to Step S95. In cases where it is judged that no response command has been received, the sequence goes to Step S94 again.

Step S95 is a step of analyzing the response command received from the server device. After the analysis, the sequence goes to Step S96. In the analysis, it is judged whether or not the received response command is a SUCCESS response command for the final PUT request command.

Step S96 is a step for judging whether or not the communication is to be disconnected. If the communication is not to be disconnected, the sequence goes to the Step S91 again.

The control section 3321 of the OBEX layer processing section 3320 of the client device 3300 operates as above. With this, the client device 3300 does not need to wait for a CONTINUE response command for a non-final PUT request command, and can send a next PUT command. This allows increase of efficiency of communication. Further, the client device 3300 checks the SUCCESS response command received from the server device in reply to the final PUT command. This allows the client device 3300 to judge whether or not the data has been normally transmitted to the server device.

Further, by combining the above sequence with the switching between the two-way communication and the one-way communication (see FIG. 56), it is possible to carry out such an operation that: only the SUCCESS response command for the final PUT command is required during the two-way communication, and no response commands are required for all the request commands during the one-way communication. The switching between the two-way communication and the one-way communication is carried out by the communication direction selecting section 3324.

Embodiment 13

The following describes a server device (communication device) in a transfer system (communication system) for transfer data according to embodiment 13 of the present invention. Note that wordings (inclusive of a member and a function) defined in the other embodiments are used in the same manner in the present embodiment, unless otherwise noted.

Figure 58:
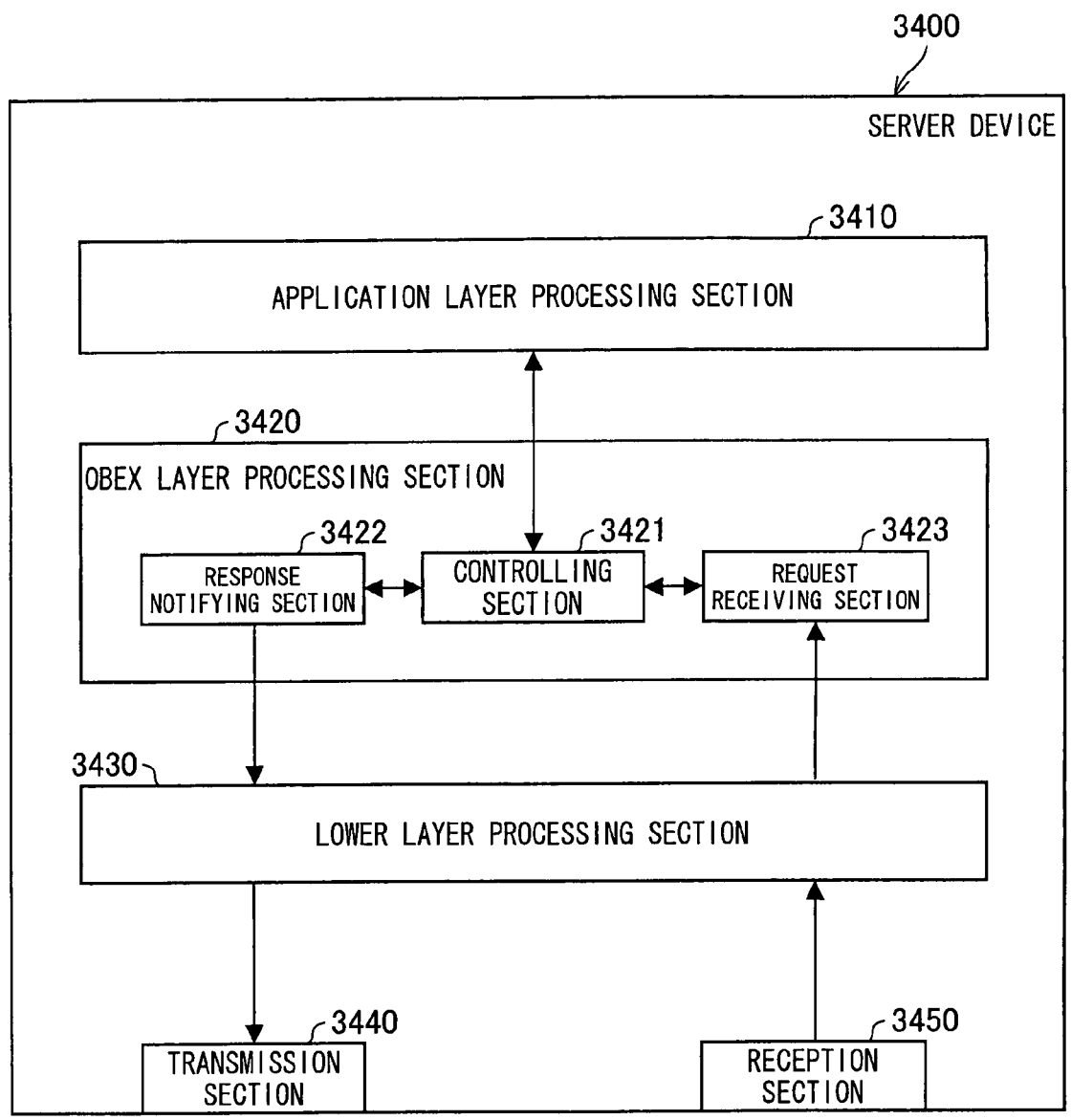
FIG. 58 is a block diagram illustrating a structure of a server device of a conventional communication system.

Firstly, FIG. 58 is a block diagram illustrating a conventional server device using the OBEX protocol.

As shown in FIG. 58, a server device (communication device) 3400 at least includes: an application layer processing section 3410; an OBEX layer processing section (object exchanging layer processing section) 3420; a lower layer processing section 3430; a transmission section 3440; and a receiving section 3450.

In response to a user's instruction inputted via an operation section (not shown), the application layer processing section 3410 requests the OBEX layer processing section 3420 to process the received request command and to issue a response command.

The OBEX layer processing section 3420 includes a controlling section 3421, a request notifying section 3422, and a request analyzing section 3423.

In accordance with the request from the application layer processing section 3410, the control section 3421 notifies the response notifying section 3422 to generate a response command and to issue the response command to the layer below the OBEX layer processing section 3420. Further, when the control section 3421 is notified by the request analyzing section 3423 that a request command has been received, the control section 3421 notifies a request command reception result to the application layer processing section 3410.

When the response notifying section 3422 is notified by the control section 3421 to issue a response command, the response notifying section 3422 generates the response command and sends the generated response command to the lower layer processing section 3430. The request analyzing section 3423 receives a request command from the lower layer processing section 3430, and analyzes the request command thus received. Then, the request analyzing section 3423 notifies the control section 3421 of (i) a result of the command analysis and (ii) the reception of the request command.

The lower layer processing section 3430 renders a relevant header of the lower layer to the request command received from the OBEX layer processing section 3420, and then sends the response command to the transmitting section 3440.

The transmitting section 3440 receives the request command from the lower layer processing section 3430, and transmits the request command to outside via an infrared communication path or the like.

The receiving section 3450 receives a request command from the source device (client device) via the infrared communication path or the like, and sends the request command to the lower layer processing section 3430.

Figure 59:
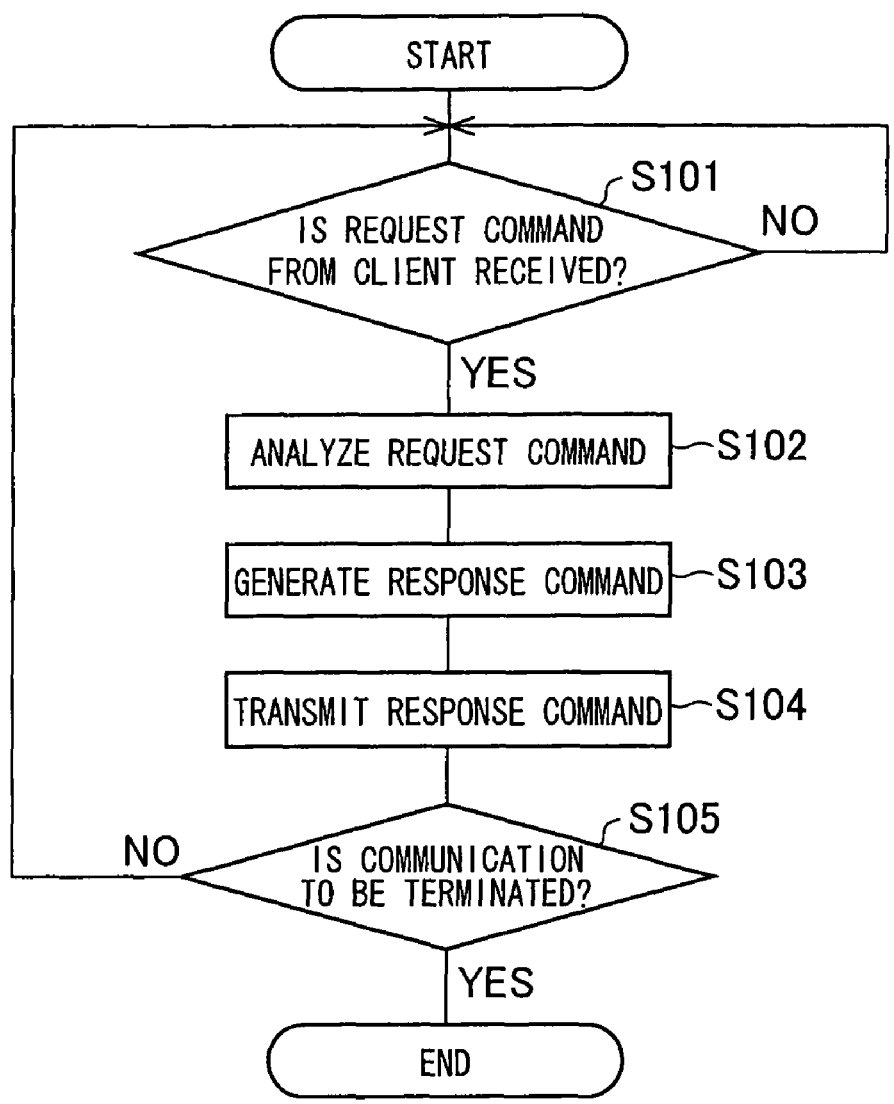
FIG. 59 is a flowchart illustrating an operation of an OBEX server in the conventional communication system.

Next, with reference to a flowchart of FIG. 59, described is an operation of the controlling section 3421 of the OBEX layer processing section 3420 in a conventional OBEX server device 3400 shown in FIG. 58.

Step S101 is a step of judging whether or not a request command has been received from the client device. In cases where it is judged that the request command has been received, the sequence goes to Step S102. On the other hand, in cases where it is judged that no request command has been received, the sequence goes to Step S101 again.

Step S102 is a step of analyzing the request command received from the client device. After the analysis, the sequence goes to Step S103.

Step S103 is a step of preparing a response command to be sent to the client device. After the preparation of the response command, the sequence goes to Step S104.

Step S104 is a step of transmitting the response command to the client device. After the transmission, the sequence goes to Step 105.

Step S105 is a step for judging whether or not the communication is to be disconnected. In cases where the communication is not to be disconnected, the sequence goes to Step S101 again.

The OBEX layer processing section 3420 of the conventional server device 3400 operates as described above, so that it is possible to carry out communication in the following manner: the OBEX layer processing section 3420 receives and analyzes a request command so as to generate a response command for the request command, and transmits the generated response command to the client device.

However, because the OBEX layer processing section 3420 of the conventional server device 3400 generates and transmits a response command in reply to a request command from the client device as such, electric power required for the generation of such a response command is wasted in communication in which no transmission from the server device 3400 is required, such as the one-way communication.

Figure 60:
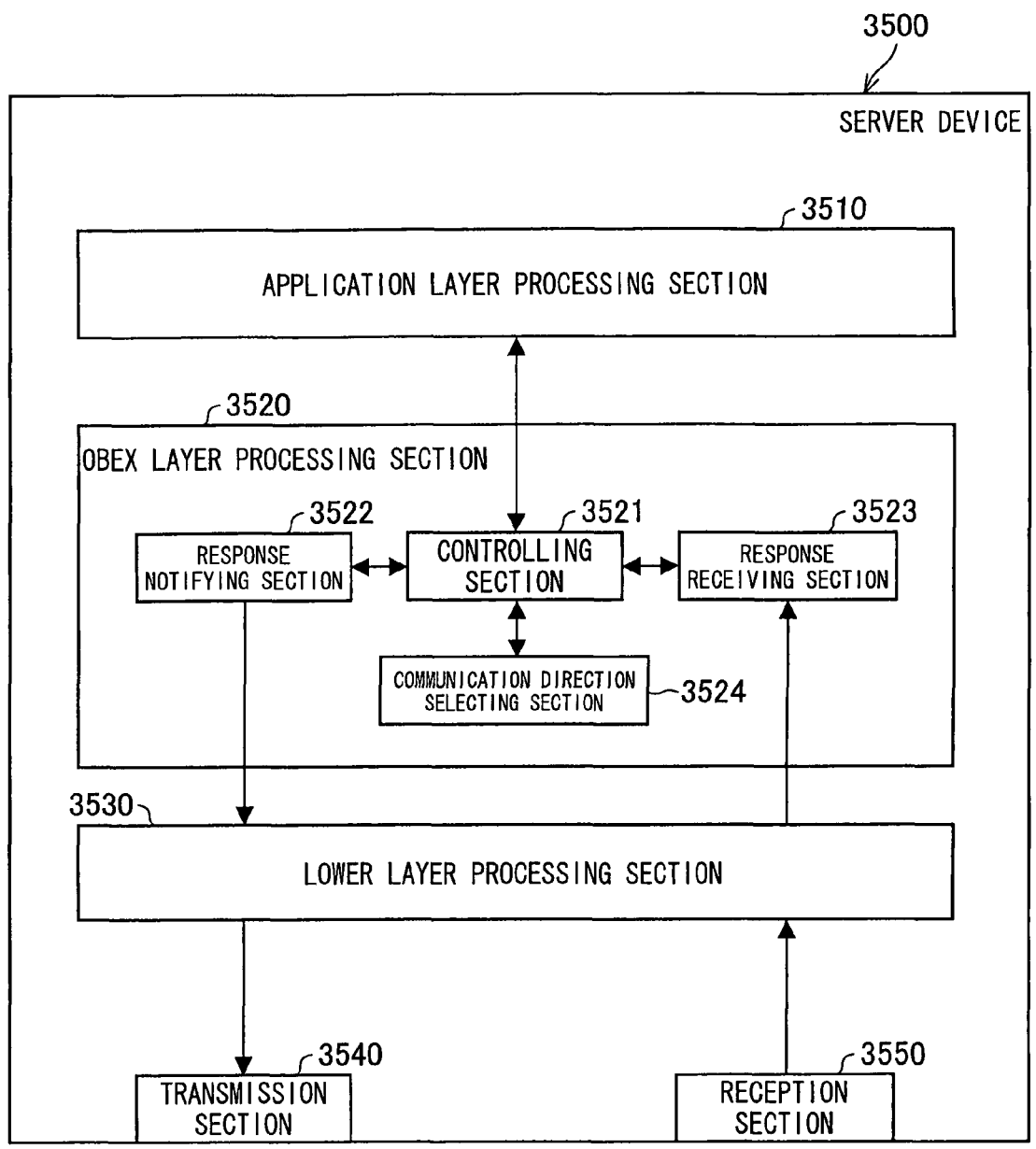
FIG. 60 is a block diagram illustrating another structure of a server device of a communication system of each of embodiments 13 and 14 according to the present invention.
Figure 61:
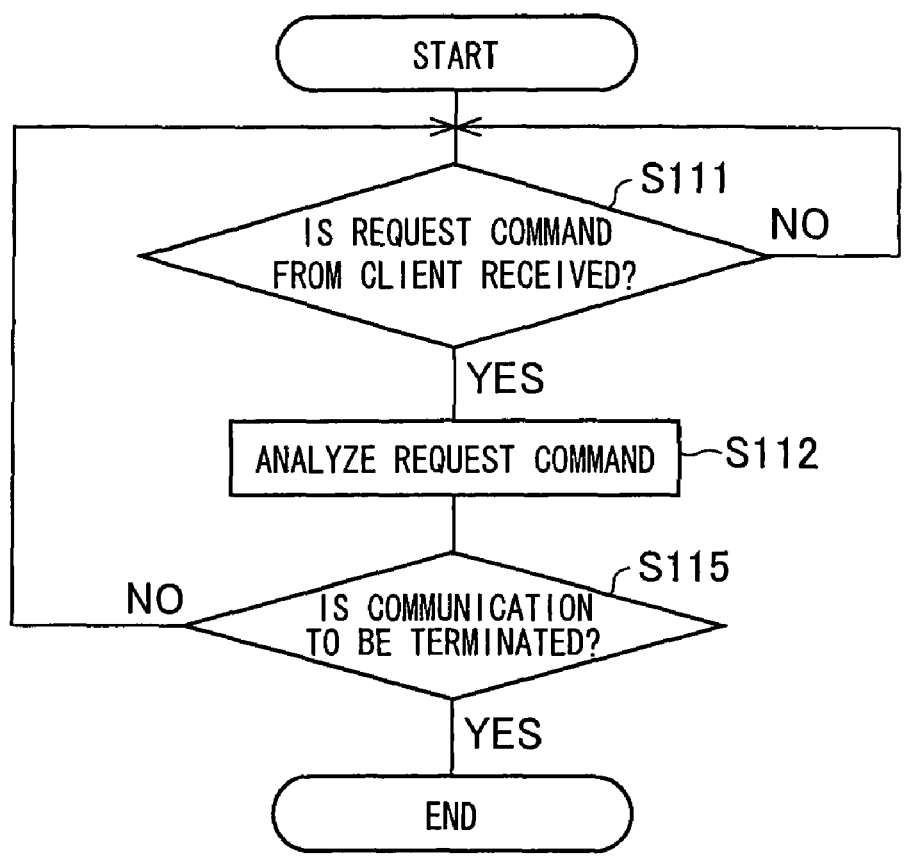
FIG. 61 is a flowchart illustrating an operation of an OBEX layer of a server device of a communication system of embodiment 13.

In order to solve such a problem, a server device 3500 (FIG. 60) of the present embodiment does not generate and transmit any response command to the client device after receiving and analyzing a request command from the client device, but can receive a next request command therefrom as shown in a flowchart of FIG. 61. Details thereof are described as follows.

Step S111 is a step of judging whether or not a request command has been received from the client device. In cases where it is judged that the request command has been received, the sequence goes to Step S112. On the other hand, in cases where it is judged that no request command has been received, the sequence goes to Step S111 again.

Step S112 is a step for analyzing the request command having been received. After the analysis, the sequence goes to Step S115.

Step S115 is a step for judging whether or not the communication is disconnected. In cases where the communication is disconnected, the sequence goes to Step S111 again.

The control section 3521 of the OBEX layer processing section 3520 of the server device 3500 operates as described above, so that no response command is generated and transmitted in reply to a received response command but a next request command can be received.

Here, FIG. 60 is a block diagram illustrating another server device 3500 according to the present embodiment.

The blocks other than a communication direction selecting section 3524 of the OBEX layer processing section (object exchanging layer processing section) 3520 is the same as those of the OBEX layer processing section 3520 of the conventional server device 3400 described with reference to FIG. 58, and the explanation therefor are omitted here.

The communication direction selecting section 3524 has a function of selecting one-way communication or two-way communication. Here, the one-way communication is communication which does not require a response command from the server device in reply to a request command from the client device. If a server device has no transmission section, or if a client device has no receiving section, one-way communication is inevitably selected. Further, the one-way communication is also selected when the client and server devices both have a transmission section and a receiving section, but signals flow only in one direction: i.e., from the client device to the server device. On the other hand, two-way communication is a communication scheme in which a server device transmits a response command in reply to a request command having transmitted from the client server, and the client device transmits the next request command after the response command is analyzed. It is no necessary to send a response command for each of the request commands. The response command to a particular request command is not necessary, provided that the OBEX layers of the client and server devices agrees therebetween on a certain rule.

Figure 62:
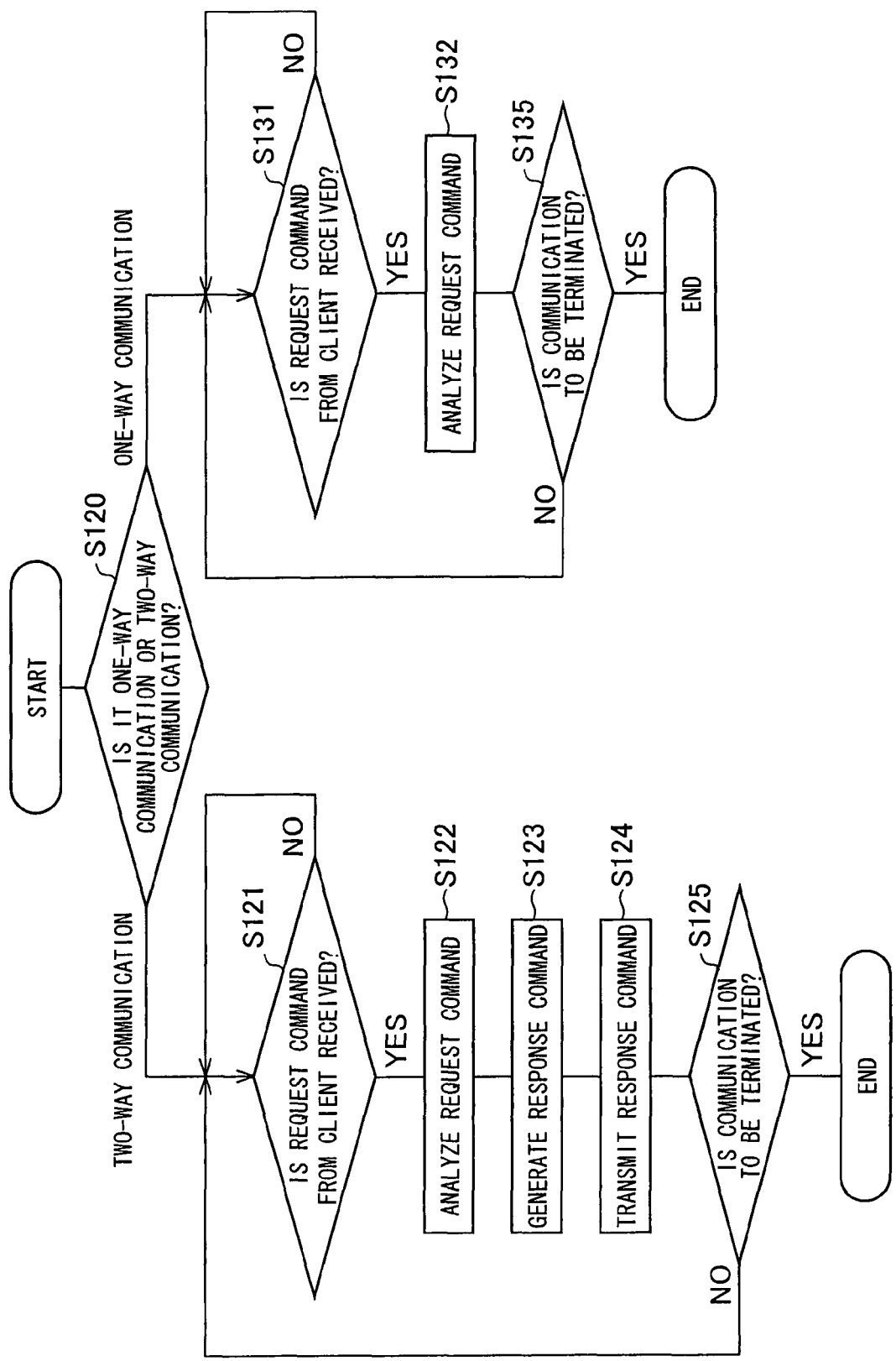
FIG. 62 is a flowchart illustrating another operation of the OBEX layer of the server device of the communication system of embodiment 13.

Next, with reference to FIG. 62, an operation of the controlling section 3521 of the OBEX layer processing section 3520 of the server device 3500 according to the present embodiment is described.

Step S120 is a step of causing the communication direction selecting section 3524 to select either the two-way communication or the one-way communication. In cases where the two-way communication is selected, the sequence goes to Step S121. In cases where the one-way communication is selected, the sequence goes to Step S131.

Step S121 in the two-way communication is a step of judging whether or not a request command has been received from the client device. In cases where it is judged that the request command has been received, the sequence goes to Step S122. On the other hand, in cases where it is judged that no request command has been received, the sequence goes to S121 again.

Step S122 in the two-way communication is a step of analyzing a request command from the client device. After the analysis, the sequence goes to Step S123.

Step S123 in the two-way communication is a step of preparing a response command to the client device. After preparing the response command, the sequence goes to Step S124.

Step S124 in the two-way communication is a step of notifying the lower layer processing section 3530 to transmit the prepared response command to the client device. After finishing the notifying, the sequence goes to Step S125.

Step S125 is a step for judging whether or not the communication is to be disconnected. In cases where the communication is not to be disconnected, the sequence goes to Step S121 again.

In the meanwhile, Step S131 in the one-way communication is a step of judging whether or not a request command has been received from the client device. In cases where it is judged that the request command has been received, the sequence goes to Step S132. On the other hand, in cases where it is judged that no request command has been received, the sequence goes to Step S131 again.

Step S132 is a step of analyzing the request command received from the client device. After the analysis, the sequence goes to Step S135.

Step S135 is a step of judging whether or not the communication is to be disconnected. In cases where it is judged that the communication is not to be disconnected, the sequence goes back to Step S131.

The control section 3521 of the OBEX layer processing section 3520 of the server device 3500 operates as described above. With this, in the two-way communication, a response command is generated and transmitted in reply to a request command from the client device, whereas in the one-way communication, no response command is generated and transmitted even after receiving a request command, but a next request command is received therefrom.

Embodiment 14

The following describes a server device (communication device) in a transfer system (communication system) for transfer data according to embodiment 14 of the present invention. Note that wordings (inclusive of a member and a function) defined in the other embodiments are used in the same manner in the present embodiment, unless otherwise noted.

FIG. 60 is a block diagram of a server device 3500 of the present embodiment. That is, the server device 3500 is essentially the same as that of the foregoing embodiment 13, and the operation of each block other than a controlling section 3521 of an OBEX layer processing section 3520 is also essentially the same. Therefore, the explanation is omitted here.

Figure 63:
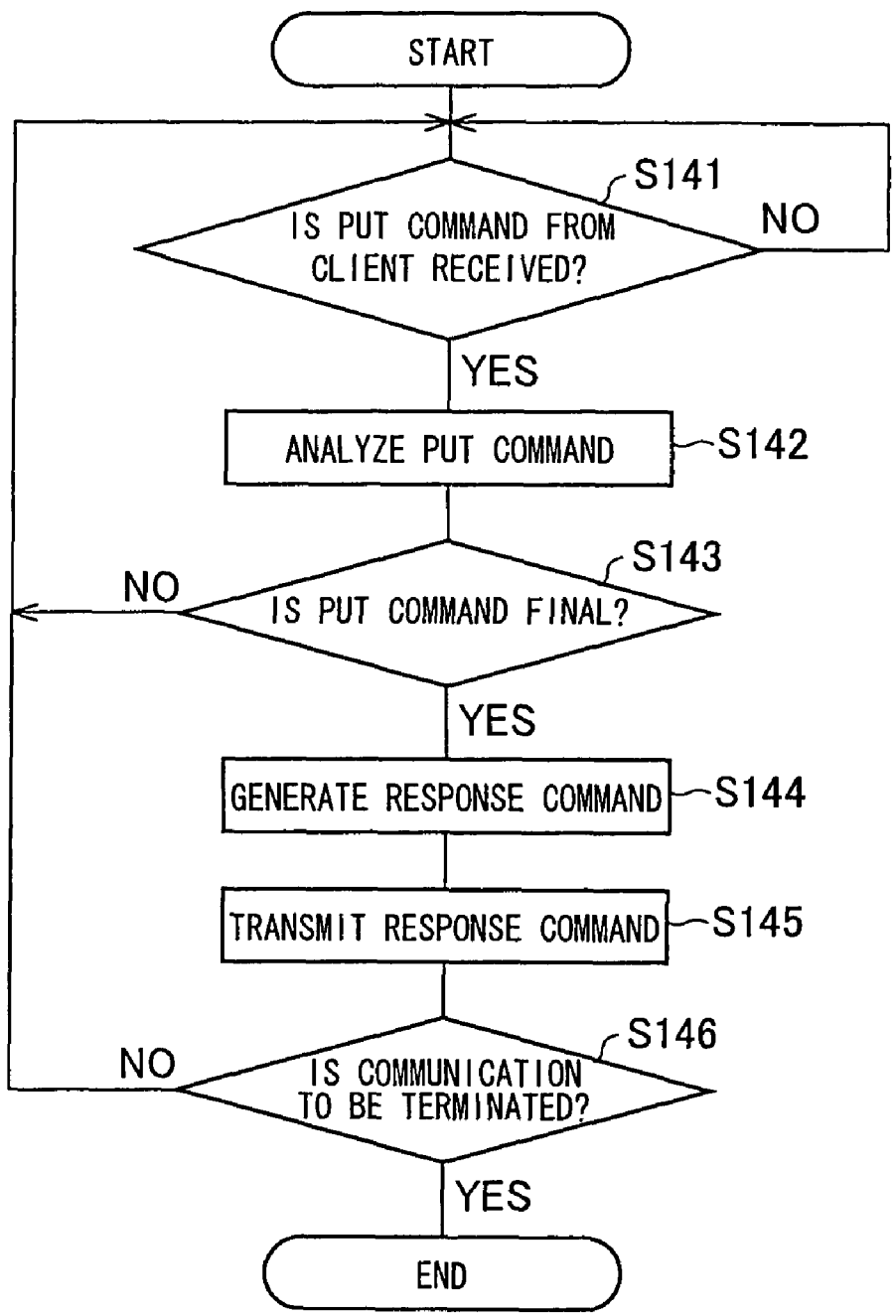
FIG. 63 is a flowchart showing an operation of an OBEX layer of a server device of a communication system according to embodiment 14 of the present invention.

With reference to FIG. 63, the operation of the controlling section 3521 of the OBEX layer processing section 3520 of the present embodiment is described.

Step S141 is a step of judging whether or not a PUT command has been received from the client device. In cases where it is judged that the PUT command has been received, the sequence goes to Step S142. On the other hand, in cases where it is judged that no PUT command has been received, the sequence goes to Step S141 again.

Step S142 is a step of analyzing the received PUT command. After the analysis, the sequence goes to S143.

Step S143 is a step of judging whether the analyzed PUT command is the final one or a non-final one. In cases where it is judged that the analyzed PUT command is the final one, the sequence goes to Step S144. On the other hand, in cases where it is judged that the analyzed PUT command is a non-final one, the sequence goes back to Step S141.

Step S144 is a step of generating a response command to be sent to the client device. After finishing the generation of the response command, the sequence goes to Step S145. In cases where all the PUT commands have normally received from the client device, the response command generated in Step S144 is, e.g., a SUCCESS command. The present embodiment does not mention a response command generated in the other cases.

Step S145 is a step of notifying the lower layer processing section 3530 to transmit the prepared response command to the client device. After finishing the notifying, the sequence goes to Step S146.

Step S146 is a step for judging whether or not the communication is to be disconnected. In cases where the communication is not to be disconnected, the sequence goes to Step S141 again.

The control section 3521 of the OBEX layer processing section 3520 of the server device operates as described above. This makes it possible that: CONTINUE response commands for non-final PUT commands are never generated and transmitted unlike in the conventional OBEX layer processing section, but the SUCCESS command is generated and transmitted in reply to the final PUT request command. Accordingly, efficiency in communication is increased. Further, the SUCCESS response command is transmitted to the client device in reply to the final PUT command as such, so that it is possible to judge whether or not the data transfer to the server device 3500 has been done normally.

Further, by combining the above sequence with the switching between the two-way communication and the one-way communication (see FIG. 62), it is possible to carry out such an operation that: only the SUCCESS response command for the final PUT command is generated and transmitted during the two-way communication, and no response commands are generated and transmitted in reply to all the request commands during the one-way communication. The switching between the two-way communication and the one-way communication is carried out by the communication direction selecting section 3524.

Embodiment 15

The following explains a client device (communication device) of a data transferring system (communication system) according to Embodiment 15 of the present invention, with reference to FIG. 64. Note that wordings (inclusive of a member and a function) defined in the other embodiments are used in the same manner in the present embodiment, unless otherwise noted.

With reference to FIG. 64, communication between mobile phones according to the present embodiment is explained. In the present embodiment, the mobile phones are respectively used for the transmitter and the receiver; however, only either one of the transmitter and the receiver may be a mobile phone. That is, when either one of transmitter and receiver is a mobile phone, the other device may not be a mobile phone as long as data transmission and reception can be carried out therebetween via an infrared ray or the like in accordance with any one of the aforementioned schemes of the present invention.

FIG. 64 illustrates that the mobile phone A transmits data therein to the mobile phone B by using an infrared ray. When the mobile phone B receives the data from the mobile phone A, the mobile phone B stores the received data in either a built-in memory thereof or an external memory connected thereto. Examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

For example, high quality two-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. Then, the sending end performs retransmission as needed according to the response frame from the receiving end (mobile phone B). The receiving end (mobile phone B) on the other hand detects an error, analyzes the sequence number. The receiving end also requests retransmission as needed. In this way, high quality communication is possible.

Further, for example, high quality two-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. The receiving end (mobile phone B) on the other hand detects an error, analyzes the sequence number.

Thus, with the use of UI frames, confirmation with the opposite station needs to be made less frequently than communication using conventional I frames, in which communication window size is limited. Hence, high quality communication with high transfer efficiency is possible.

Particularly, when an SMP is used in the mobile phones, determining of a suitable time-out period of the transmitter for each file transmitted allows provision of a communication path with high communication efficiency at the time of error occurrence can be provided. Specifically, this is achieved by setting a period for waiting for an RS-containing frame which is transmitted in response to a frame with BL being set to 1, so that (I) the period for waiting for an RS-containing frame is long when transmitting data which is expected to take a long time to be processed in the receiver (e.g. a file such as JPEG image or MPEG movie which requires a decoding process), and (II) the period for waiting for an RS-containing frame when transmitting files such as a text file which does not take a long time to be processed in the receiver.

Embodiment 16

The following explains a data transferring system (communication system) according to Embodiment 16 of the present invention, with reference to FIG. 65. Note that wordings (inclusive of a member and a function) defined in the other embodiments are used in the same manner in the present embodiment, unless otherwise noted.

With reference to FIG. 65, the following explains an example of communication between a mobile phone and a display device each according to the present embodiment. In the present embodiment, the mobile phone is used for the transmitter; however, the transmitter does not necessarily have to be a mobile phone as long as data transmission can be carried out via an infrared ray or the like in accordance with any one of the aforementioned schemes of the present invention. Further, the transmitter may be a display device.

FIG. 65 illustrates that a mobile phone A transmits data therein to a display device B (e.g. TVs, monitors, and the like) by using an infrared ray. The display device B performs a suitable process with respect to the data sent from the mobile phone A. For example, in a case where the data from the mobile phone A is image data, the image data is decompressed as needed for a purpose of displaying. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A. Further, the data stored in the mobile phone A may be either (i) data stored in a built-in memory of the mobile phone A or (ii) data stored in an external memory (a non-volatile memory such as an SD card) connected to the mobile phone A.

For example, high quality two-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. Then, the sending end performs retransmission as needed according the response frame from the receiving end (display device B). The receiving end (display device B) on the other hand detects an error, analyzes the sequence number. The receiving end also requests retransmission as needed.

Further, for example, high quality one-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. The receiving end (display device B) on the other hand detects an error, and analyzes the sequence number.

Thus, with the use of UI frames, confirmation with the opposite station needs to be made less frequently than communication using conventional I frames, in which communication window size is limited. Hence, high quality communication with high transfer efficiency is possible.

Particularly, when an SMP is used in the mobile phones, it is possible to set a size of data to be transmitted in batch from the transmitter to a size such that the transmitter is able to transmit in batch a single JPEG image, by setting of reception buffer size, which is notified by the display device when establishing connection, so that the reception buffer size is a size of a JPEG image (approximately several hundreds of KB to several MB).

Thus, for example, it is possible that the display device has two reception buffers, and, when a JPEG image data item is received in a first reception buffer, the display device switches the reception buffer to another reception buffer and receive the subsequent JPEG image in the other reception buffer while decoding the JPEG data stored in the first reception buffer.

Embodiment 17

The following explains a data transferring system (communication system) according to Embodiment 17 of the present invention, with reference to FIG. 66. Note that wordings (inclusive of a member and a function) defined in the other embodiments are used in the same manner in the present embodiment, unless otherwise noted.

With reference to FIG. 66, the following explains an example of communication between a mobile phone and a display device each according to the present embodiment. In the present embodiment, the mobile phone is used for the transmitter; however, the transmitter does not necessarily have to be a mobile phone as long as data transmission can be carried out via an infrared ray or the like in accordance with any one of the aforementioned schemes of the present invention. Further, the transmitter may be a printing device.

As shown in FIG. 66, illustrates that the mobile phone A transmits data therein to the printing device B by using an infrared ray. The printing device B performs a suitable process with respect to the data sent from the mobile phone A. For example, in a case where the data from the mobile phone A is image data, the image data is decompressed as needed for a purpose of displaying. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

For example, high quality two-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. Then, the sending end performs retransmission as needed according the response frame from the receiving end (printing device B). The receiving end (printing device B) on the other hand detects an error, analyzes the sequence number. The receiving end also requests retransmission as needed.

Further, for example, high quality two-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. The receiving end (printing device B) on the other hand detects an error, analyzes the sequence number.

Thus, with the use of UI frames, confirmation with the opposite station needs to be made less frequently than communication using conventional I frames, in which communication window size is limited. Hence, high quality communication with high transfer efficiency is possible.

Particularly, when an SMP is used in the mobile phones, it is possible to set a size of data to be transmitted in batch from the transmitter to a size such that the transmitter is able to transmit in batch a single JPEG image, by setting of reception buffer size, which is notified by the printing device when establishing connection, so that the reception buffer size of the primary station is a size of a JPEG image (approximately several hundreds of KB to several MB).

Thus, for example, it is possible that the printing device has two reception buffers, and, when a JPEG image data item is received in a first reception buffer, the printing device switches the reception buffer to another reception buffer and receive the subsequent JPEG image in the other reception buffer while decoding the JPEG data stored in the first reception buffer. Further, when the printing device is not able to receive the subsequent data item, the printing device is able to notify the transmitter of a pseudo error even no error has occurred, so as to buy sometime by causing the transmitter to perform retransmission.

Embodiment 18

The following explains a data transferring system (communication system) according to Embodiment 18 of the present invention, with reference to FIG. 67. Note that wordings (inclusive of a member and a function) defined in the other embodiments are used in the same manner in the present embodiment, unless otherwise noted.

With reference to FIG. 67, the following explains an example of communication between a mobile phone and a storage device each according to the present embodiment. In the present embodiment, the mobile phone is used for the transmitter; however, the transmitter does not necessarily have to be a mobile phone as long as data transmission can be carried out via an infrared ray or the like in accordance with any one of the aforementioned schemes of the present invention. Further, the transmitter may be a storage device.

As shown in FIG. 67, illustrates that the mobile phone A transmits data therein to the storage device B by using an infrared ray. The storage device B performs a suitable process with respect to the data sent from the mobile phone A. For example, in a case where the data from the mobile phone A is image data, the image data is stored in a built-in memory of the storage device B or in an external memory connected thereto. The built-in memory of the storage device B may be a volatile memory (e.g. SDRAM, etc.) or a nonvolatile memory (e.g. Flash Memory®, HDD, rewritable DVD, etc.), and is not particularly limited as long as the memory is capable of semi-permanently storing data. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

For example, high quality two-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. Then, the sending end performs retransmission as needed according the response frame from the receiving end (storage device B). The receiving end (storage device B) on the other hand detects an error, analyzes the sequence number. The receiving end also requests retransmission as needed.

Further, for example, high quality one-way communication can be performed as follows. Namely, the sending end (mobile phone A) transmits data in the form of UI frames of IrLAP, in accordance with any one of the methods of the foregoing embodiments, so that window size is not limited. To each of the UI frames, a sequence number is given. The receiving end (storage device B) on the other hand detects an error, and analyzes the sequence number.

Thus, with the use of UI frames, confirmation with the opposite station needs to be made less frequently than communication using conventional I frames, in which communication window size is limited. Hence, high quality communication with high transfer efficiency is possible.

Particularly, when an SMP is used in the storage device, it is possible to set a size of data to be transmitted in batch from the transmitter to a size such that the transmitter is able to transmit in batch a single JPEG image, by setting of reception buffer size, which is notified by the display device when establishing connection, so that the reception buffer size is a frame size of MPEG movie (approximately several hundreds of KB to several MB).

Thus, for example, it is possible that the storage device has two reception buffers, and, when a frame data item is received in a first reception buffer, the storage device switches the reception buffer to another reception buffer and receive the subsequent frame image in the other reception buffer while decoding the frame data stored in the first reception buffer.

Embodiment 19

The following describes another embodiment of the present invention with reference to FIG. 68 to FIG. 90. Note that communication protocol explained in the present embodiment is that applied to the foregoing embodiments 1 through 18. Accordingly, wordings defined in the other embodiments are used in the same manner in the present embodiment, unless otherwise noted.

(1) Communication Layers

Figure 68:
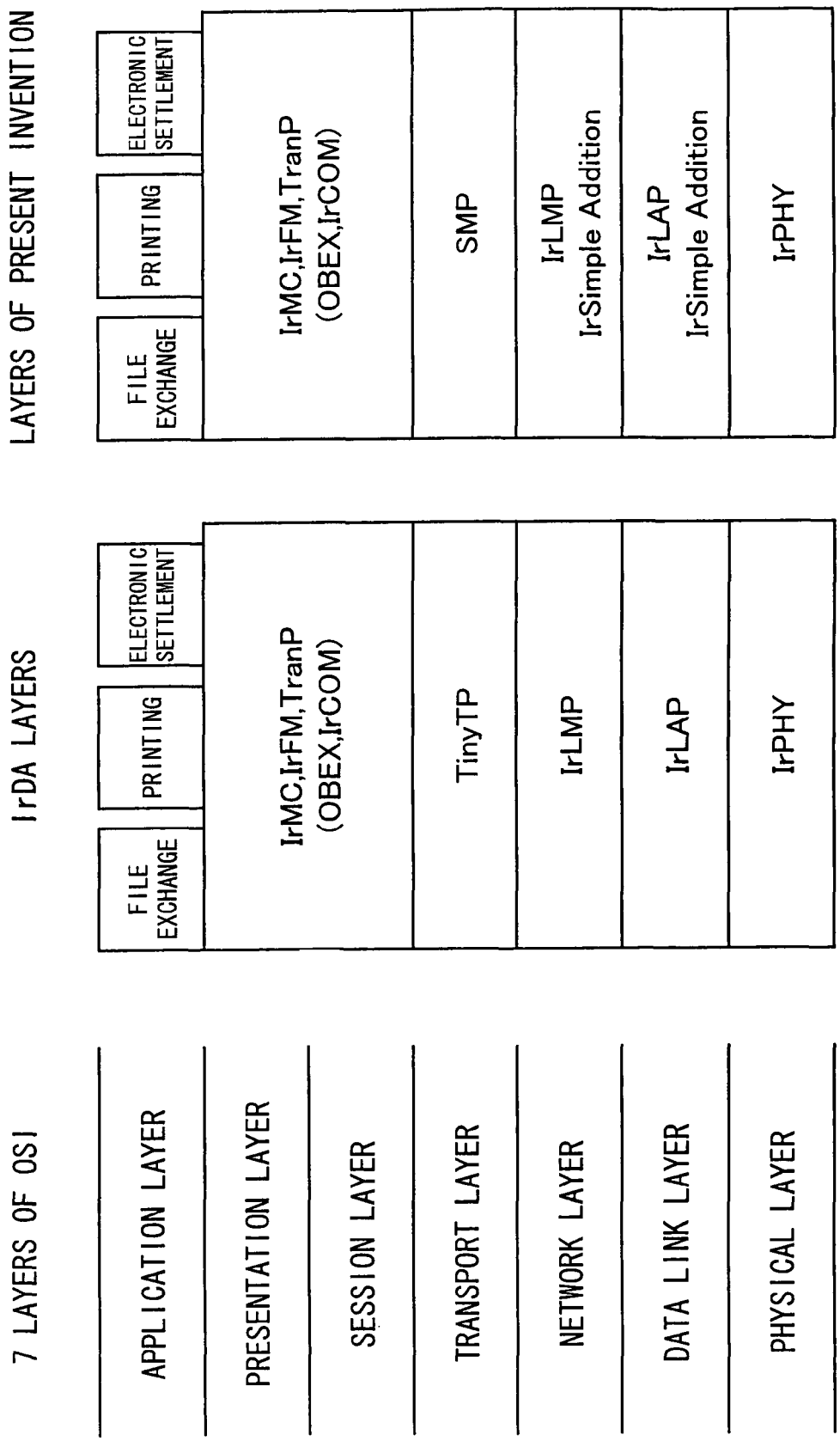
FIG. 68 is a schematic diagram for how the layers in the OSI 7-layer model, the IrDA scheme, and the present invention correspond to each other.

FIG. 68 is a schematic diagram for relationship among the OSI 7-layer model, the IrDA layers, and the layers of the communication system of the present invention.

The communication system according to the present embodiment is divided into communication layers with equivalent functions to those of the layers in the OSI 7-layer model. However, as shown in FIG. 68, the communication system has a six-layer structure in which the session layer and the presentation layer are merged into a single layer.

For ease of explanation, the present embodiment will describe the invention as applied to IrSimple as an example. However, the present invention is by no means limited to IrSimple. IrSimple is an improved version of conventional IrDA.

In the present embodiment, the data link layer, the network layer, the transport layer, and the session/presentation layer may be referred to as LAP, LAMP, SMP, and OBEX, respectively, in accordance with IrSimple. To distinguish between the communication layers in the transmitter and those in the receiver, the layers in the transmitter (primary station) are indicated by "P," and those in the receiver (secondary station) by "S." For example, "LAP(P)" denotes the data link layer in the transmitter.

(2) Sequence between Transmitter and Receiver (2-1) Connection Sequence

[A] Response is Sent

Figure 69:
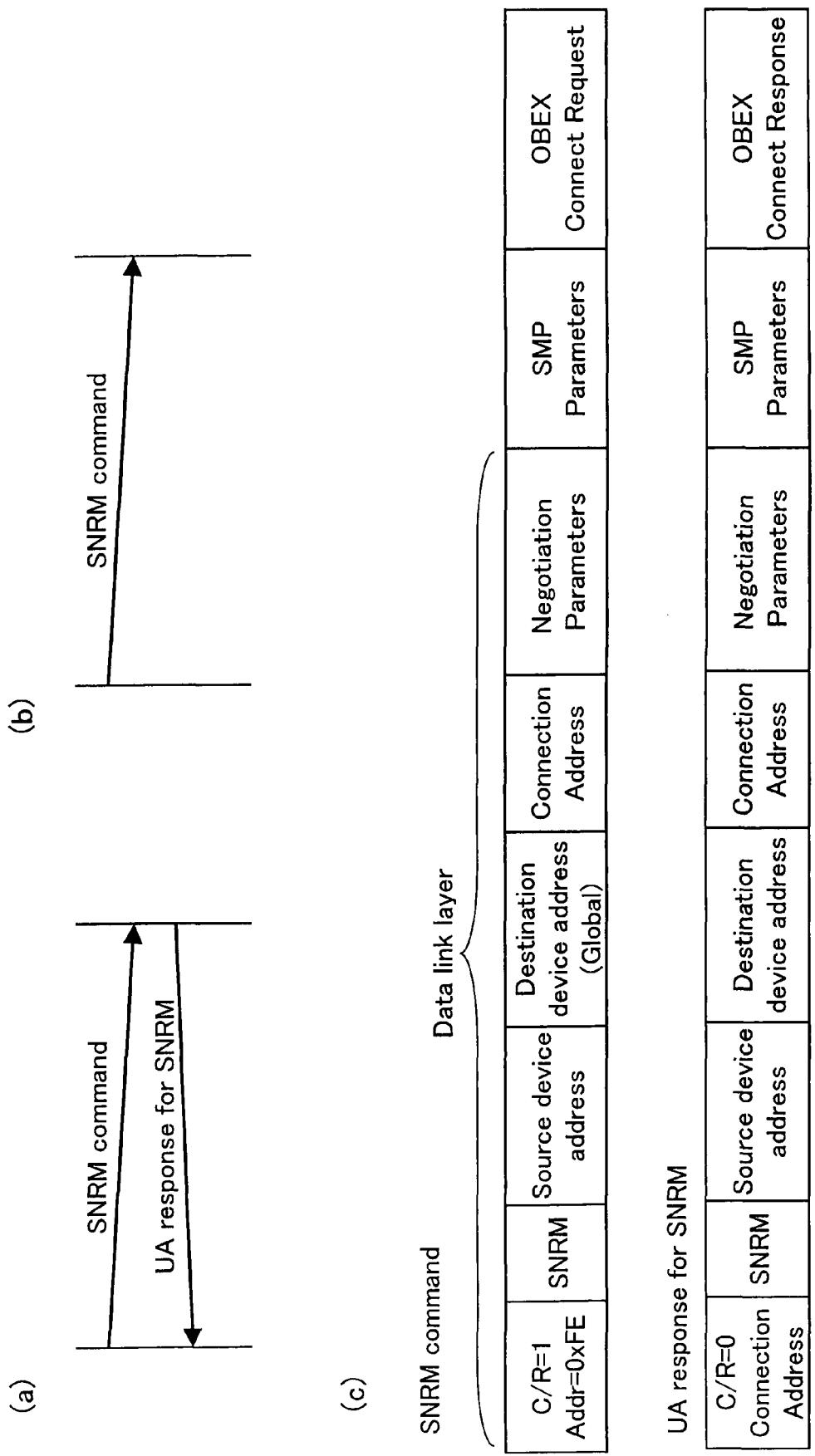
FIG. 69(a) is a sequence diagram for the establishment of a connection in an embodiment of the present invention.
FIG. 69(b) is sequence diagram for the establishment of a connection in an embodiment of the present invention.
FIG. 69(c) is an illustration of packet formats used in the establishment of a connection in an embodiment of the present invention.
Figure 70:
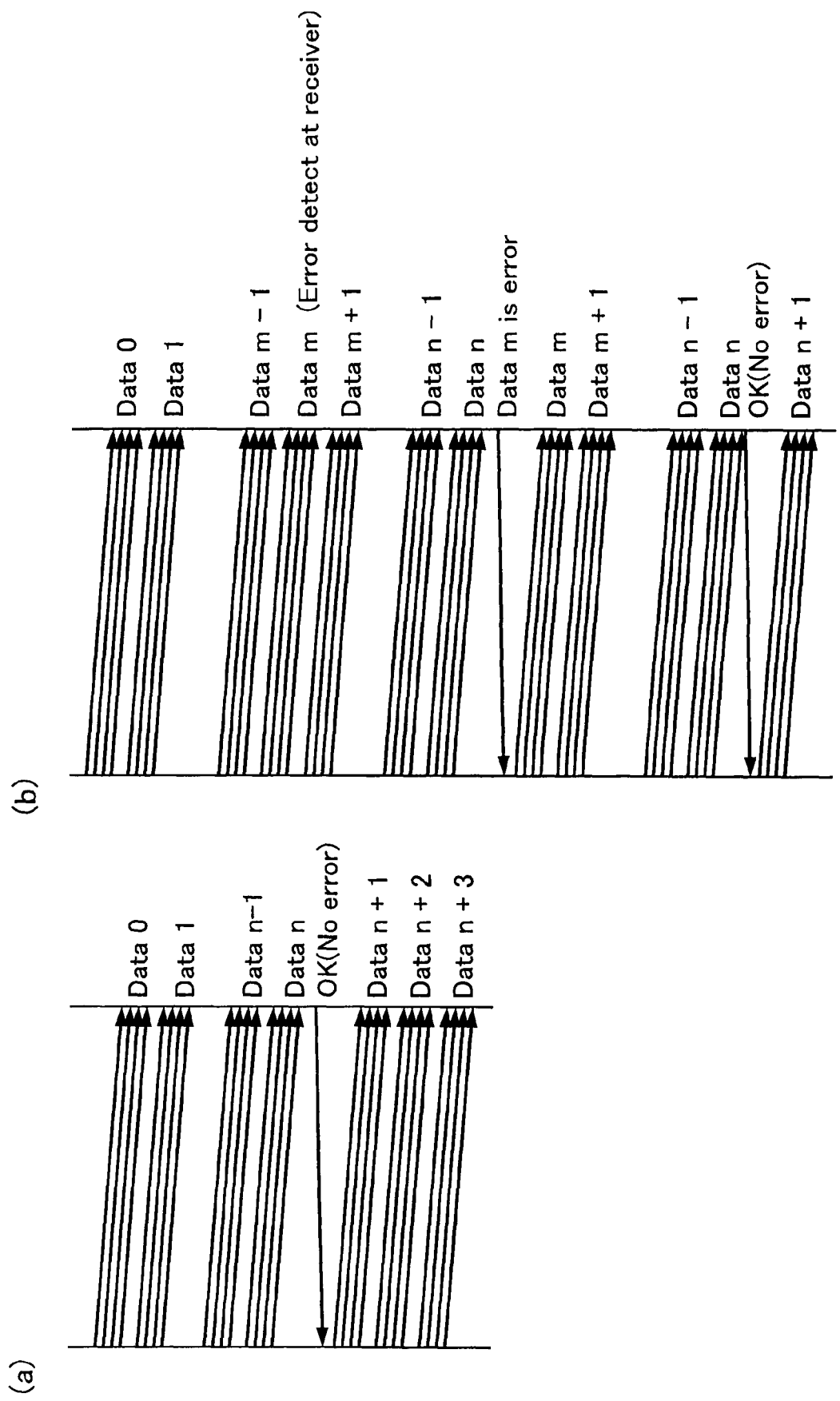
FIG. 70(a) is an illustration of a data exchange sequence in accordance with an embodiment of the present invention.
FIG. 70(b) is an illustration of a data exchange sequence in accordance with an embodiment of the present invention.
Figure 71:
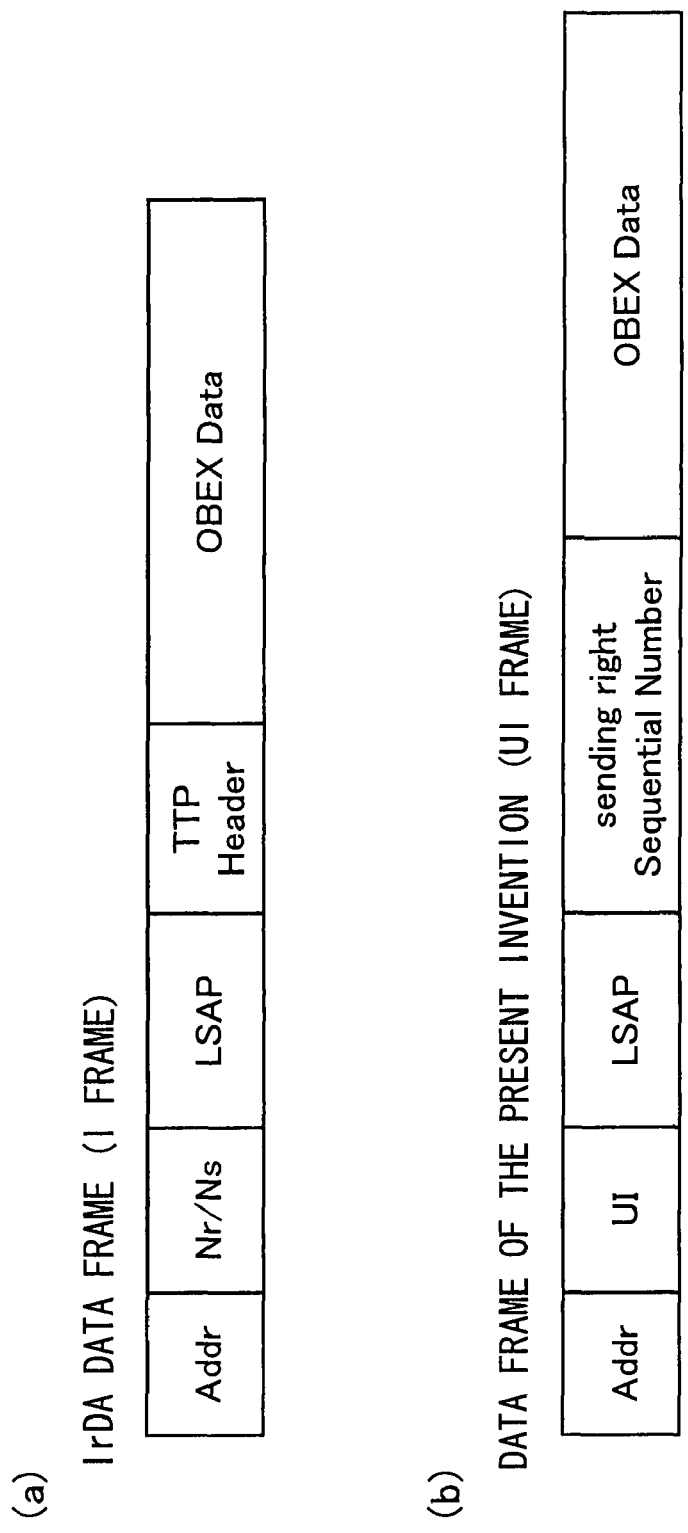
FIG. 71(a) is an illustration of a packet format used in an IrDA data exchange.
FIG. 71(b) is an illustration of a packet format used in a data exchange in accordance with the present invention.
Figure 72:
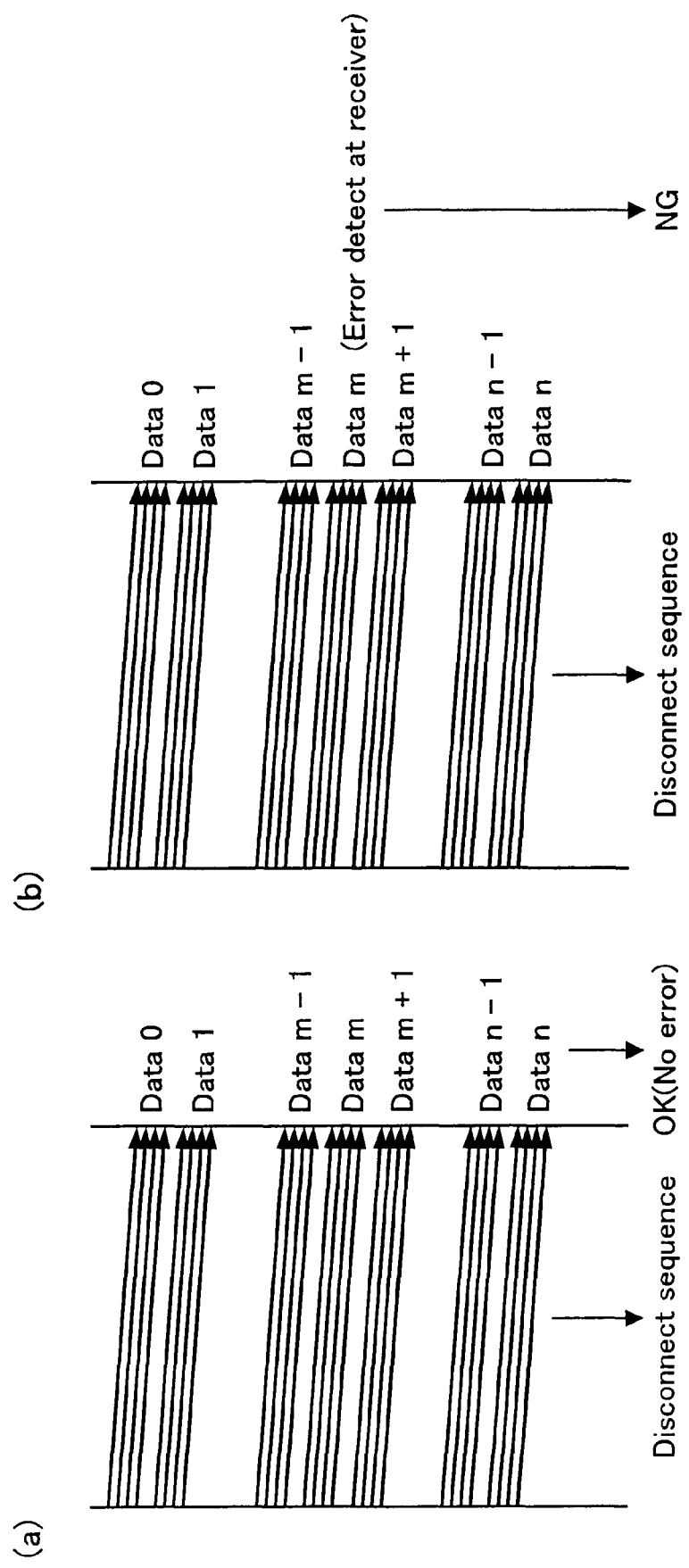
FIG. 72(a) is an illustration of a data exchange sequence in accordance with an embodiment of the present invention.
FIG. 72(b) is an illustration of a data exchange sequence in accordance with an embodiment of the present invention.

FIG. 69(*a*) is a sequence diagram showing a connection sequence according to the present embodiment (response is sent). FIG. 69(*c*) is an illustration of the structure of communication data used in the connection sequence of the present embodiment (response is sent).

In the present embodiment (response is sent), a global address is used for the destination device address of an SNRM command, thereby giving a searching function to the SNRM command (SNRM command in FIG. 69(*c*)).

Furthermore in the present embodiment (response is sent), the SNRM command, which is a connection packet for the data link layer, and the UA response contain parameters and commands required in the connection of the upper layers, such as the network layer, the transport layer, the session layer, and the presentation layer. Accordingly, the present embodiment uses only one connection packet, rather than several as required in conventional IrDA, to connect all of the upper layers. Thus, the present embodiment carries out the search and connection sequence with a single pair of packets, rather than a plurality of packets as required in conventional cases.

[B] No Response is Sent

FIG. 69(*b*) is a sequence diagram showing a connection sequence according to the present embodiment (no response is sent). FIG. 69(*c*) is an illustration of the structure of communication data used in the connection sequence of the present embodiment (no response is sent). Note that in the present embodiment (no response is sent), the UA response (UA response for SNRM in FIG. 69(c)) is not required.

A communication mode which involves no response from the receiver may be selected depending on the user, application, or data type. When such a method is selected, the SNRM command alone can complete both search and connection as shown in FIG. 38(b).

The connection sequence of the present embodiment, as explained above, reduces the time required to make a connection by handling all connection requests for the plural communication layers at the same time, and therefore can easily recover from a disconnection of the communication path. In view of this, the connection sequence is particularly suitable for wireless communication in which the communication path is easily cut off (e.g. infrared communication). Note that the connection sequence is effective also with other wireless and wired communication, including IEEE 802.11 and Bluetooth.

The present embodiment will describe an example in which all the communication layers are connected by a single round of communication. The present invention is not limited to such cases. For example, the present invention may be arranged so that one communication layer is connected first, and the remaining two or more communication layers are connected thereafter. Alternatively, a connection for one communication layer may be established through plural rounds of communication. For example, given that two rounds of communication are required to establish a connection for the network layer, the connection of the data link layer and the first of the two rounds of communication for the connection of the network layer may be handled by one connection request, and the second round of communication for the connection of the network layer and the connection of the transport layer may be handed by one connection request.

(2-2) Data Exchange Sequence

[A] Response is Sent

FIGS. 70(a), 70(b) are sequence diagrams each showing a data exchange sequence according to the present embodiment (response is sent). FIG. 70(a) is an illustration of the structure of communication data used in the data exchange sequence of the present embodiment (response is sent).

In the present embodiment (response is sent), a response from a lower layer/upper layer is not transmitted for each data, thereby reducing the number of responses as many as possible. Then, a response is sent as to presence of an error after a large amount of data is transmitted.

In data communication, the transmitter uses (i) a flag for asking the receiver if there is any problem in the sequence of packet number or in the data received and (ii) a packet constituted of plural data items created by dividing the data according to the packet size.

As shown in FIG. 70(a), the transmitter transmits a predetermined number of packets, and then transmits a packet in which the flag is on. If the receiver on the other end has detected no error since the start of receiving the data or since a previous response sent in reply to a packet in which the flag is on, the receiver notifies the transmitter of proper transmission. If an error is detected, the receiver ignores the data items after the missed packet, and only confirms the flag. When it is confirmed that the flag is on, the receiver informs the transmitter of the packet number of the packet which ahs not been received due to the error.

When the transmitter is notified of a proper transmission from the receiver, the transmitter continues to transmit a next packet. When it is notified of an error, the transmitter retransmits the packets, starting with the packet which was not properly received and ending with the packet bearing the turned-on flag.

With this, the interval between packets is reduced, thereby efficiently performing transmission.

As shown in FIG. 70(a), the present embodiment (response is sent) uses an UI frame (FIG. 71(b)). Therefore, the data link layer (LAP layer) is incapable of recognizing missing of packets, and the missing is detected by the transport layer.

In the UI frame, the data for the transport layer contains the sequential number, a flag for confirming the data, a flag for informing as to whether the packet is the final packet of the data, and a flag for checking if there is any problem in the received data. The data transmission is carried out using these flags.

[B] No Response is Sent

FIGS. 72(a), 72(b) are sequence diagrams each showing a data exchange sequence according to the present embodiment (no response is sent). FIG. 72(b) is an illustration of the structure of communication data used in the data exchange sequence of the present embodiment (no response is sent).

In the present embodiment (no response is sent), if no response from the receiver is needed, only the completeness of data is confirmed. Therefore, the transmitter puts a sequential number on each packet, and transmits all the data at once.

The receiver only confirms whether there is any error in the transmission. When all the packets (data) are properly received, the proper completion of data is perceived in the receiver, and the next operation is carried out, which is display, printing, storing, etc. of the received data. On the other hand, when an error is detected, the error is perceived in the receiver, and a different operation is carried out, which is error indication to the user, stand-by for the next data, etc.

Note that the present embodiment (no response is sent) also uses the UI frame (FIG. 71(b)) shown in FIG. 72(b).

(2-3) Disconnection Sequence

[A] Response is Sent

FIG. 73(a) is a sequence diagram showing a disconnection sequence of the present embodiment (response is sent). FIG. 73(c) is an illustration of the structure of communication data used in the disconnection sequence of the present embodiment (response is sent).

As shown in FIG. 73(c), in the present embodiment (response is sent), the DISC command and the UA response contain the parameters and commands required for a disconnection of the upper layers. such as the network layer, the transport layer, the session layer, and the presentation layer.

In this way, the present embodiment carries out a disconnection sequence with a single pair of packets, rather than a plurality of packets as required in conventional cases.

[B] No Response is Sent

FIG. 73(b) is a sequence diagram showing a disconnection sequence according to the present embodiment (no response is sent). FIG. 73(c) is an illustration of the structure of communication data used in the disconnection sequence of the present embodiment (response is sent). Note that in the present embodiment (no response is sent), the UA response (UA response in FIG. 73(c)) is not required.

As shown in FIG. 73(b), in the present embodiment (no response is sent), when the connection is established without requiring a response from the receiver, the DISC command alone can complete both search and disconnection.

(3) Sequence in Transmitter and Sequence in Receiver

In FIGS. 74 to 90, for ease of explanation, the data link layer, the network layer, the transport layer, and the session/presentation layer may be referred to as LAP, LAMP, TTP or SMP, and OBEX, respectively. To distinguish between the communication layers in the transmitter and those in the receiver, the layers in the transmitter are indicated by "P," and those in the receiver by "S." For example, "LAP(P)" denotes the data link layer in the transmitter.

(3-1) Connection Sequence

[A] Response is Sent

Figure 74:
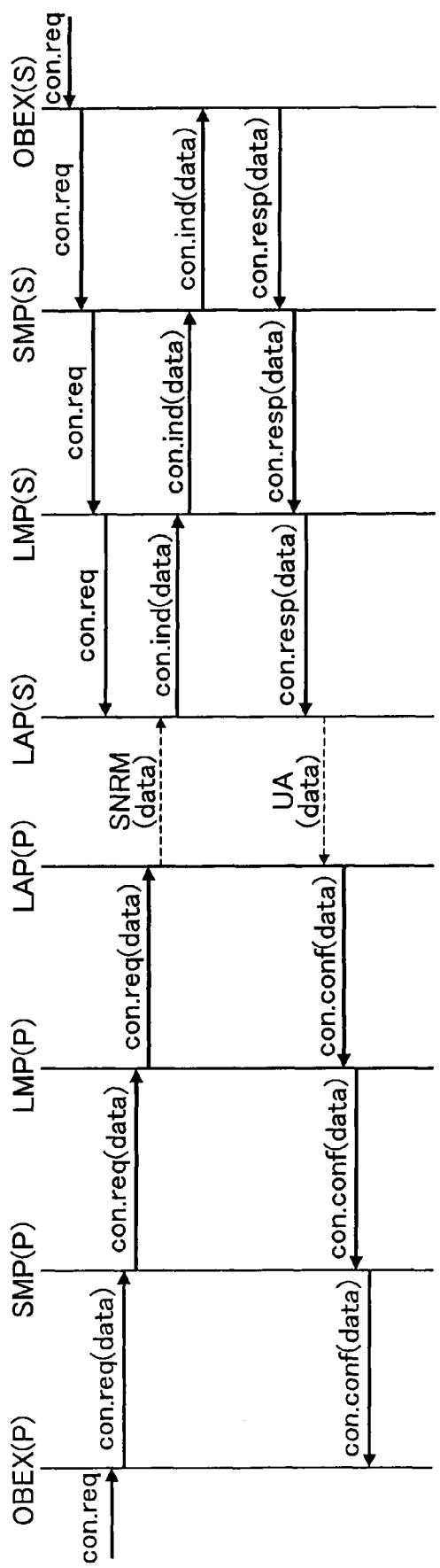
FIG. 74 is a sequence diagram showing a flow of functions (commands and messages) and packets between layers for a connection sequence in accordance with an embodiment of the present invention.

FIG. 74 is a sequence diagram showing a connection sequence of the present embodiment (response is sent). FIGS. 75(a), 75(b) are illustrations of the structure of communication data used in the connection sequence of the present embodiment (response is sent).

As shown in FIG. 74, in the present embodiment (response is sent), the transmitter and the receiver first carry out preparation for a connection. Then, the transmitter passes on the request from the upper layer to the lower layers, and then transmits the request as a single packet (SNRM). Meanwhile, the receiver receives the SNRM packet, and passes on the notification of the successful establishment of a connection to the upper layers, and then passes on a response from the OBEX(S) from the upper to the lower layer, and transmits the response as a single packet (UA). The transmitter is notified of the establishment of the connection through the reception of UA, and passes on the notification (Connect.confirm) from lower to upper layers.

The following will separately describe the sequence in the transmitter and the sequence in the receiver.

First, the communication layers in the transmitter will be described.

When a connection request is transmitted from the application to the OBEX(P), the OBEX(P) emits a connection request function (Primitive), in which data contains a connection request command to the lower layer (SMP(P)). Furthermore, when a connection confirmation function is transmitted from the SMP(P) to the OBEX(P), the OBEX(P) checks a response for an OBEX connection which is contained in the data. When the response tells that the connection has been properly done ("Success"), the OBEX(P) finishes the connecting operation.

The SMP(P) receives the connection request function from the OBEX(P), and adds a parameters required for communication with the SMP(S) of the receiver to the data, and emits the connection request function to the lower layer (LMP(P)). When a connection confirmation function is transmitted from the LMP(P) to the SMP(P), the SMP(S) extracts a parameter generated by the SMP(S) of the receiver from the data of the function, and checks the value, and then finishes the negotiation with the SMP(S). Further, the SMP(P) removes the parameter of the SMP(S) from the data of the connection confirmation function, and transmits the resulting data to the OBEX(P) as the connection confirmation function.

The LMP(P) receives the connection request function from the SMP(P), and immediately adds parameter(s) required for communication with the LMP(S) of the receiver to the data of the connection request function from the SMP(P), and emits the connection request function to the lower layer (LAP(P)). When a connection confirmation function is transmitted from the LAP(P) to the LMP(P), the LMP(P) extracts parameter(s) generated by the LMP(S) of the receiver from the data of the function, and checks the value, and then finishes the negotiation with the LMP(S). Further, the LMP(P) removes the parameter(s) of the LMP(S) from the data of the connection confirmation function, and transmits the resulting data to the SMP(P) as the connection confirmation function.

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of the connection parameter(s) for LMP is not required.

The LAP(P) receives the connection request function from the LMP(P), and immediately adds parameter(s) required for communication with the LAP(S) of the receiver to the data of connection request function from the LMP(P), and emits the SNRM command to the physical layer of the receiver. When the UA response is transmitted from the physical layer of the receiver to the LAP(P), the LAP(P) extracts the parameter(s) generated by the LAP(S) of the receiver from the data of the UA response, and checks the value, and then finishes the negotiation with the LAP(S). Further, the LAP(P) removes the parameter(s) of LAP(S) from the data of the UA response, and transmits the resulting data to the LMP(P) as the connection confirmation function.

Next, the communication layers in the receiver will be described.

The OBEX(S) receives the connection request function from the application, and stands by for the next reception. When a connection notification function (Indication) is transmitted from the lower layer (SMP(S)), the OBEX(S) checks a command for OBEX connection which is contained in the data. When the command indicates that the connection has been properly done, the OBEX(S) emits a response "Success" as a connection response function (Response) to the SMP(S), and finishes the connection operation.

The SMP(S) receives the connection request function from the OBEX(S), and stands by for the next reception. When the connection notification function is transmitted from the lower layer (SMP(S)), the SMP(S) extracts the parameter(s) generated by the SMP(P) of the transmitter from the data of the function, and creates parameter(s) for response, and emits the connection request function containing the data thus created by removing the parameter(s) of the SMP(P) from the data of the function, to the OBEX(S), and then stands by for a connection response function which comes from the OBEX(S). Further, when the connection response function is transmitted from the OBEX(S), the SMP(S) adds the parameter(s) of the response to the data of the connection response function of the OBEX(S), emits the connection response function to the LMP(S), and finishes the negotiation for the SMP layer.

The LMP(S) receives the connection request function from the SMP(S), and stands by for the next reception. When the connection notification function is transmitted from the lower layer (LAP(S)), the LMP(S) extracts the parameter(s) generated by the LMP(P) of the transmitter from the data of the function, and creates parameter(s) for response, and emits the connection request function containing the data thus created by removing the parameter(s) of the LMP(P) from the data of the function, to the SMP(S), and then stands by for a connection response function which comes from the SMP(S). Further, when the connection response function is transmitted from the SMP(S), the LMP(S) adds the parameter(s) of the response, to the data of connection response function of the SMP(S), emits the connection response function to the LAP(S), and finishes the negotiation for the LMP layer.

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for LMP is not required.

The LAP(S) receives the connection request function from the LMP(S), and stands by for the next reception. When the SNRM command is transmitted from the physical layer to the LAP(S), the LAP(S) extracts parameter(s) generated by the LAP(P) of the transmitter from the data of the SNRM command, and creates parameter(s) for response after transmitting the connection request function, containing the data thus created by removing the parameter(s) of LAP(P) from the data of the SNRM command, to the LMP(S), and then stands by for a connection response function which comes from the LMP(S). Further, when the connection response function is transmitted from the LMP(S), the LAP(S) adds the parameter(s) of the response to the data of the connection response function of the LMP(S), emits the UA response to the physical layer, and finishes the negotiation for the LAP layer.

[B] No Response is Sent

Figure 76:
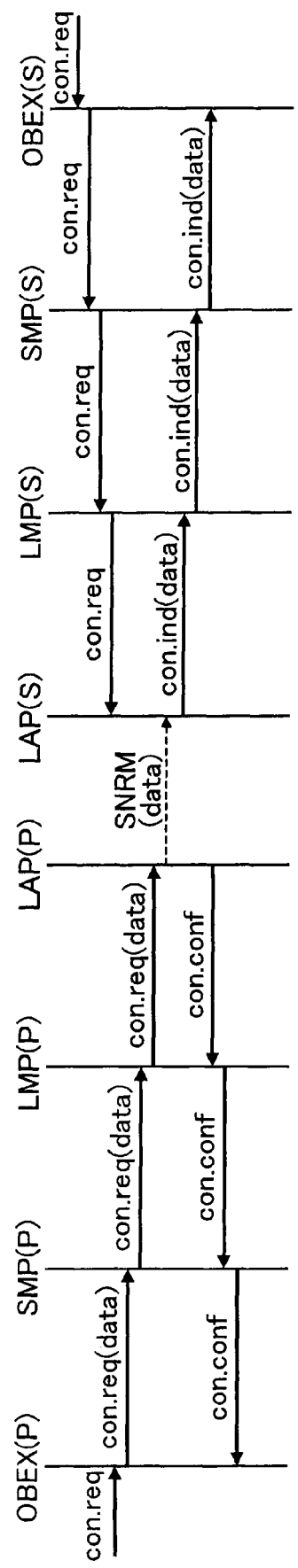
FIG. 76 is a sequence diagram showing a flow of functions (commands and messages) and packets between layers for a connection sequence in accordance with an embodiment of the present invention.

FIG. 76 is a sequence diagram showing a connection sequence according to the present embodiment (no response is sent). FIG. 75(a) is an illustration of the structure of communication data used in the connection sequence according to the present embodiment (no response is sent).

As shown in FIG. 76, in the present embodiment (no response is sent), the transmitter and the receiver first carry out preparation for a connection. Then, the transmitter passes on the request from the upper layer to the lower layers, and then transmits the request as a single packet (SNRM). Having transmitted the SNRM packet, the transmitter passes on the notification of completion of a connection (Connect.confirm) from the LAP(P) to the upper layers. Meanwhile, the receiver receives the SNRM packet, and passes on the notification of completion of a connection from the lower to the upper layer. The connection is regarded completed when the notification of completion of a connection is received by the OBEX(S).

The following will describe the sequence in the transmitter and the sequence in the receiver.

First, the communication layers in the transmitter will be described.

When a connection request is transmitted from the application to the OBEX(P), the OBEX(P) immediately emits a connection request function (Primitive), in which data contains a connection request command, to the lower layer (SMP (P)). Further, when a connection confirmation function is transmitted from the SMP(P) to the OBEX(P), the OBEX(P) finishes the connecting operation.

The SMP(P) receives the connection request function from the OBEX(P), and immediately adds parameter(s) required for communication with the SMP(S) of the receiver to the data of the connection request function of the OBEX(P), and emits the connection request function to the lower layer (LMP (P)). When a connection confirmation function is transmitted from the LMP(P) to the SMP(P), the SMP(P) regards that the procedure has been done with the transmitted parameter(s), and finishes the negotiation for the SMP layer. Then, the SMP(P) transmits the connection confirmation function to the OBEX(P).

The LMP(P) receives the connection request function from the SMP(P), and immediately adds parameters required for communication with the LMP(S) of the receiver to the data of the connection request function from the SMP(P), and emits the connection request function to the lower layer (LAP(P)). When a connection confirmation function is transmitted from the LAP(P) to the LMP(P), the LMP(P) regards that the procedure has been done with the transmitted parameter(s), and finishes the negotiation for the LMP layer. Then the LMP(P) transmits the connection confirmation function to the SMP(P).

Note that in general operation, an LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP(P) receives the connection request function from the LMP(P), and immediately adds parameter(s) required for communication with the LAP(S) of the receiver to the data of the connection request function from the LMP(P), and emits the SNRM command to the physical layer of the receiver. Transmitting the SNRM command, the LAP(P) regards that the procedure has been done with the transmitted parameter(s), and finishes the negotiation for the LAP layer. Then the LAP(P) transmits the connection confirmation function to the LMP(P).

Next, the communication layers in the receiver will be described.

The OBEX(S) receives the connection request function from the application, and stands by for the next reception. When a connection notification function (Indication) is transmitted from the lower layer (SMP(S)) to the OBEX(S), the OBEX(S) checks a command for OBEX connection which is contained in the data. When the command indicates that the connection has been properly done, the OBEX(S) finishes the connecting operation.

The SMP(S) receives the connection request function from the OBEX(S), and stands by for the next reception. When the connection notification function is transmitted from the lower layer (SMP(S)), the SMP(S) extracts parameter(s) generated by the SMP(P) of the transmitter from the data of the function, and finishes negotiation by using the parameter(s). Then the SMP(S) emits the connection request function containing the data thus created by removing the parameter(s) of SMP(P) from the data of the function, to the OBEX(S).

The LMP(S) receives the connection request function from the SMP(S), and stands by for the next reception. When the connection notification function is transmitted from the lower layer (LAP(S)), the LMP(S) extracts parameter(s) generated by the LMP(P) of the transmitter from the data of the function, and finishes negotiation by using the parameter(s). Then the LMP(S) emits connection request function containing the data thus created by removing the parameter(s) of the LMP(P) from the data of the function, to the SMP(S).

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for the LMP is not required.

The LAP(S) receives the connection request function from the LMP(S), and stands by for the next reception. When the SNRM command is transmitted from the physical layer, the LAP(S) extracts parameter(s) generated by the LAP(P) of the transmitter from the data of the SNRM command, and finishes negotiation by using the parameter(s). Then the LAP(S) emits the connection request function containing the data thus created by removing the parameter(s) of LAP(P) from the data of the function, to the LMP(S).

(3-2) Data Exchange Sequence

[A] Response is Sent

Figure 77:
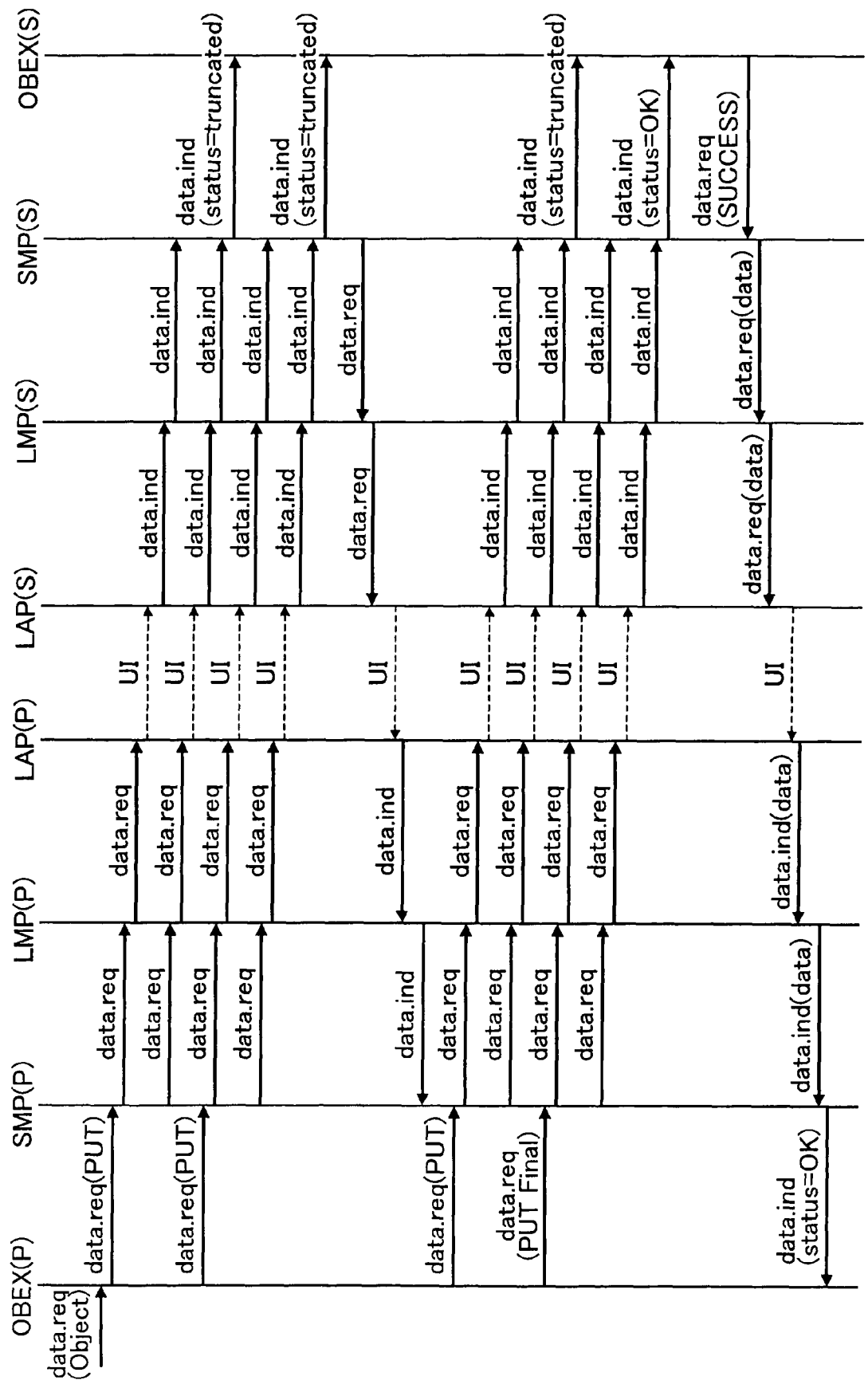
FIG. 77 is a sequence diagram showing a flow of functions (commands and messages) and packets between layers for a data exchange in accordance with an embodiment of the present invention.
Figure 78:
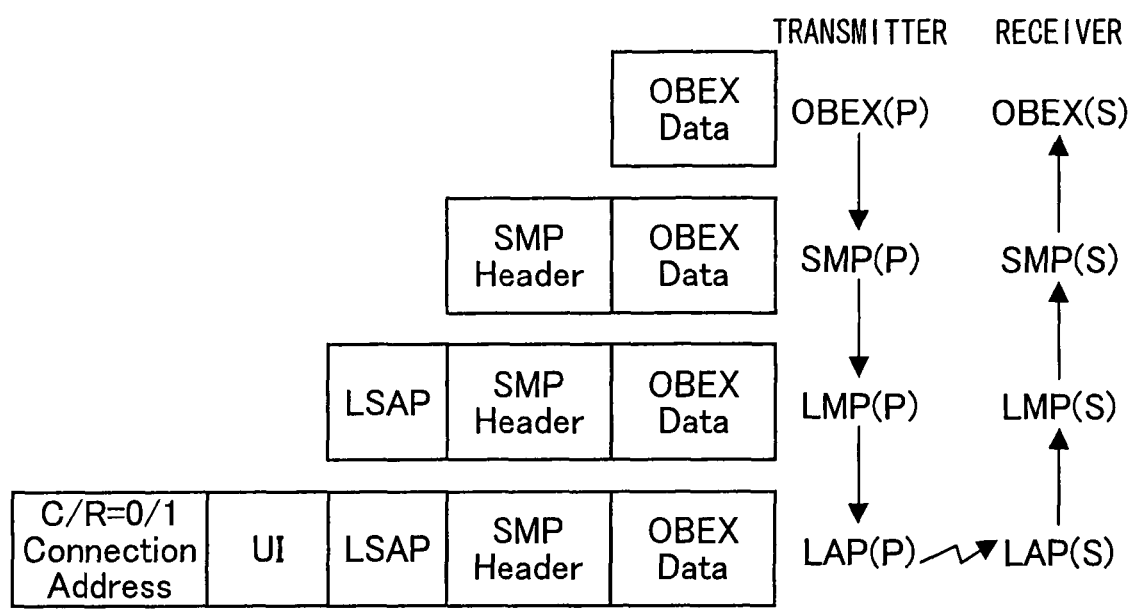
FIG. 78 is an illustration of changes of data in functions between the layers in FIGS. 77 and 79 for a data exchange in accordance with an embodiment of the present invention.

FIG. 77 is a sequence diagram showing a data exchange sequence according to the present embodiment (response is sent). FIG. 78 is an illustration of the structure of communication data used in the data exchange sequence of the present embodiment (response is sent).

As shown in FIG. 77, in the present embodiment (response is sent), the transmitter generates a PUT command, which is propagated through the lower layers to be transmitted as a UI frame (FIG. 71(b)).

Obtaining the data, the receiver propagates a notification from lower to upper layers. At this time, the SMP(S) notifies the upper layer OBEX(S) of continuity of data (status=truncated).

After transmitting a predetermined number of packets, the transmitter transmits a packet in which the flag for confirming proper data transmission is on. The receiver receives the data with the flag on, and checks if the transmission has been done properly. If an error is detected, the SMP(S) informs the transmitter of the packet number which has not been received due to the error.

if no error is detected, the transmitter outputs the next packets. If an error is detected, the transmitter retransmits the packets having been suspended after the error.

The transmitter puts an ON-flag in the final data, the flag indicating that this is the final data. Meanwhile, the SMP(S) notifies the OBEX(S) that all data items have been received (status=OK), and stands by for a response from the OBEX(S). The response generated from the OBEX(S) is propagated to the lower layers, and is outputted as a UI frame.

if the response is "Success," the transmitter finishes the operation in a general way.

The following will separately describe the sequence in the transmitter and the sequence in the receiver.

In the transmitter, the OBEX(P) outputs a PUT command to the lower layers as a data transmission function. However, if the SMP(P) is capable of transmission without a response ("Continue" in general) with respect to a PUT command, except for the PUT Final (final PUT), the OBEX(P) outputs the next command. In the case of a command other than the PUT Final or the PUT command, the operation is suspended to wait for the data notification function from the lower layer, and the command is finished after checking the response in the data.

The data transmission function denotes a function (Data Request) for requesting the lower layer to transmit data. Further, the data notification function denotes a function (Data Indicate) serving as a notification of data reception from the lower layer.

In the receiver, the OBEX(S) receives data from the lower layer with the data notification function. However, the OBEX(S) does not send back a response to PUT commands other than the PUT Final command, and sends back, as a response, a data transmission function to commands other than the PUT Final command or PUT command.

The following will describe a header, etc. of the data transmission functions and the data notification functions in the upper and lower layers. These data items are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the other device about data reception condition, an argument indicating the end of data, an argument indicating necessity of transmission of OBEX response to the SMP of the other device, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP(P) of the transmitter modifies the data transmission function from the OBEX(P), into a data transmission function suitable for the LMP(P), and emits the data transmission function with a predetermined amount of data. After that, the SMP(P) sets "true" for the argument for asking the receiver about data reception condition, and transmits the data transmission function. The SMP(P) then stands by for the data notification function from the LMP(P).

The SMP(P) analyzes the SMP header in the data notification function sent from the LMP(S), and confirms if the transmission has been done properly, by referring to the argument indicating whether the received data was a complete set of data items. Having been confirmed that the transmission has been done properly, the SMP is turned into a state allowing transmission to the OBEX(P), that is, it is ready to send the next data. In this state, the SMP(P), is capable of receiving data from the OBEX(P).

On the other hand, when the SMP(P) has found out, according to the argument indicating whether the received data was a complete set of data items, that the transmission has not been done properly, the SMP(P) regenerates data sequence from the unsent data transmission function to the argument set to "true" for asking the receiver about data reception condition. The SMP(P) repeats the regeneration predetermined times, or until the all data of the data transmission function is received in the receiver.

Further, when the SMP(P) receives from OBEX(P) the data transmission function with an argument indicating the end of data, which is set to "true," the SMP(P) sets "true" for the argument indicating the end of data, or for the argument indicating necessity of response from OBEX(S) in the data of transmission function to the LMP(P), and sends this new transmission function to the LMP(P).

On the other hand, when the SMP(S) of the receiver receives from the LMP(S) the data notification function in which either the argument indicating the end of data or the argument indicating necessity of transmission of OBEX(S) response to the other end is set to "true," the SMP(S) removes the header of the SMP(S) from the data notification function before transmitting the function to the OBEX(S).

Further, when the SMP(S) receives the data notification function from the LMP(S), the SMP(S) analyzes the SMP header in the data in the data notification function, and checks the sequential number. If the SMP(S) confirms that the receiver has received all data items until the header in which the argument for asking the receiver about data reception condition is "true," the SMP(S) creates a SMP header by modifying the argument indicating whether the received data was a complete set of data items into an appropriate format for indicating that the received data was a complete set of data items. With this data, the SMP(S) transmits the data transmission function to the LMP(S).

On the other hand, when the SMP(S) found out that there was a problem in data reception in the receiver, the SMP(S) infers the number of SMP header not transmitted and stores the number. For example, when the data items 0, 1, 2, 3, 5 are received, obviously the fifth number should be "4," but "4" is missing. That is, the number of data not received is "4." After this, the SMP(S) only checks if the argument for asking the receiver about data reception condition is set to "true" in the SMP header, and stops output of the data notification function to the OBEX(S).

When the SMP(S) receives the data notification function in which the argument for asking the receiver about data reception condition is "true," the SMP(S) creates a SMP header by modifying the argument indicating whether the received data was a complete set of data items into an appropriate format for indicating that the received data was not a complete set of data items, and inserting the number of the SMP header not properly received into the field for the sequential number. With this data, the SMP(S) transmits the data transmission function to the LMP(S).

Further, when the SMP(S) receives the data notification function in which either the argument indicating the end of data or an argument indicating necessity of transmission of OBEX(S) response to the other end is "true," the SMP(S) transmits the data notification function to the OBEX(S), and stands by for a data transmission request from the OBEX(S).

When the SMP(S) receives a data transmission request from the OBEX(S), the SMP(S) creates a SMP header by modifying argument indicating whether the received data was a complete set of data items into an appropriate format for indicating that the received data was a complete set of data items. The SMP(S) adds the SMP header to the data transmission function from the OBEX(S), and sends the resulting data to the LMP(S). Note that, since the notification to the OBEX(S) stops in case of error, the SMP(S) stands by only when the transmission is properly completed.

When the LMP receives the data transmission request function from the upper layer, the LMP adds a LMP header to the data of the data transmission request function, and adds the data to the data transmission function, and transmits the function to the LAP. Further, when the LMP receives the data notification function from the LAP, the LMP removes the LMP header from the data of the function and provides the resulting data in the data notification function, and transmits the function to the SMP.

Note that, when the connection is established by connecting the layers one by one, the LMP is not required. In this case, the LMP header includes LSAP having a connectionless value.

When the LAP receives the data transmission request function from the LMP, the LAP adds a LAP header to the data of the data transmission request function, and incorporates this data into a UI frame, and transmits the UI frame to the physical layer. Further, when the LAP receives the data reception notification from the physical layer, the LAP removes the LAP header from the data of the UI frame and incorporates the resulting data into the data notification function, and transmits the function to the LMP. Note that in the present embodiment, the LAP header contains a connection address and a UI indicator.

[B] No Response is Sent

Figure 79:
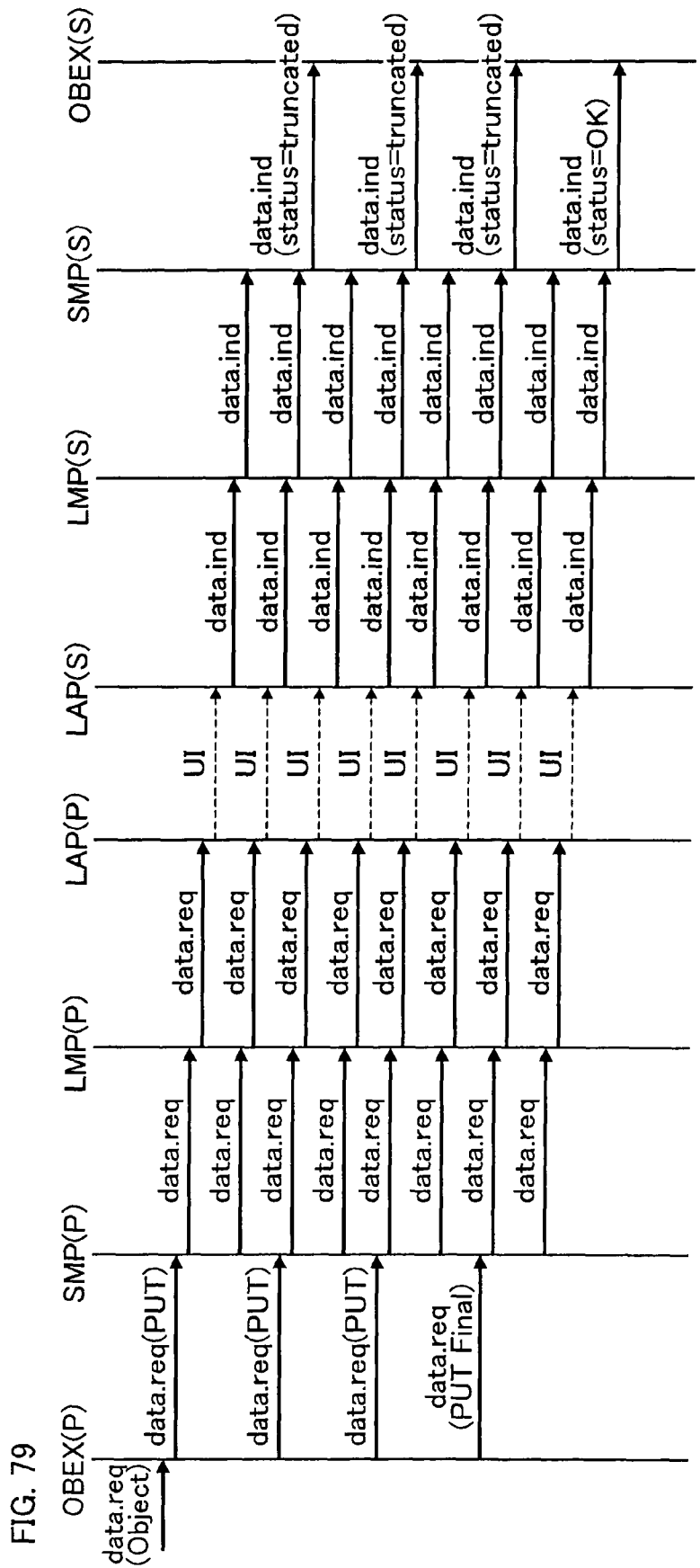
FIG. 79 is a sequence diagram showing a flow of functions (commands and messages) and packets between layers for a data exchange in accordance with an embodiment of the present invention.

FIG. 79 is a sequence diagram showing a data exchange sequence according to the present embodiment (no response is sent). FIG. 78 is an illustration of the structure of communication data used in the data exchange sequence according to the present embodiment (no response is sent).

As shown in FIG. 79, in the present embodiment (no response is sent), the transmitter generates a PUT command, and the PUT command is propagated through the lower layers, and is outputted as a UI frame.

Obtaining the data, the receiver propagates a notification from lower to upper layers. At this time, the SMP(S) notifies the upper layer OBEX(S) of continuity of data (status=truncated).

The transmitter puts an ON-flag in the final data, the flag indicating that this is the final data. Meanwhile, the receiver confirms the ON-flag of the SMP(S), and notifies the OBEX(S) that all data items have been received (status OK), and then finishes data exchange sequence.

The following will separately describe the sequence in the transmitter and the sequence in the receiver.

In the transmitter, the OBEX(P) outputs a PUT command to the lower layers as a data transmission function. However, the OBEX(P) is capable of finishing a command without a response with respect to each command. Then, the OBEX(P) outputs the next command if transmission is allowed in the SMP(P).

In the receiver, the OBEX(S) receives the data notification function from the lower layer. However, the OBEX(S) does not send back a response for each command, only receiving data.

The following will describe a header, etc. of the data transmission functions and the data notification functions in the upper and lower layers. These data items are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the other device about data reception condition, an argument indicating the end of data, an argument indicating necessity of transmission of OBEX response to the SMP of the other device, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this time, the data notification function may be outputted for each data notification function coming from the lower layer, or for a predetermined set of those.

The SMP(P) of the transmitter modifies the data transmission function from OBEX(P), into a data transmission function suitable for the LMP(P). When the SMP(P) receives from the OBEX(P) a data transmission function in which the argument for asking the receiver about data reception condition is set to "false," the SMP(P) adds the SMP header to the data, and transmits the data to the LMP(P). On the other hand, when the SMP(P) of the receiver receives from the OBEX(P) a data transmission function in which the argument indicating the end of data is set to "true," the SMP(P) sets "true" for the argument indicating the end of data, or for the argument indicating necessity of transmission of OBEX(S) response in the transmission function to the LMP(P), and sends this new transmission function to the LMP(S).

Further, when the SMP(S) receives the data notification function from the lower layer, the SMP(S) analyzes the SMP header in the data in the data notification function, and checks the sequential number. If the SMP(S) confirms that the reception has been done normally, the SMP(S) transmits the data transmission function to the LMP(S).

On the other hand, when the SMP(S) found out that there was a problem in data reception in the receiver, the SMP(S) notifies the OBEX(S) of the error. For example, when the data items 0, 1, 2, 3, 5 are received, obviously the fifth number should be "4," but "4" is missing.

After that, the SMP(S) stands by for a function with a SMP header in which the argument indicating the end of data or the argument indicating necessity of transmission of OBEX(S) response to the receiver and is set to "true." The SMP(S) stops data notification to the OBEX(S) until it receives either the "true" data notification function (however no notification is sent to the OBEX(S)), receives a disconnection notification function, or does not carry out the data notification to the OBEX(S) until a certain time period has been elapsed.

When the LMP(P) of the transmitter receives a data transmission request function from the SMP(S), the LMP(P) adds the LMP header to the data of the function. The LMP(P) then transmits the data transmission request function containing the created data to the LAP(P).

When the LMP(S) of the receiver receives the data notification function from the LAP(S), the LMP(S) removes the LMP header from the data of the data notification function, and provides the data to the data notification function, and transmits the function to the SMP(S).

Note that when the connection is established by connecting the layers one by one, the LMP is not required. In this case, a connectionless value is used as the fixed value of LSAP in the LMP header.

When the LAP(P) of the transmitter receives the data transmission request function from the LMP(P), the LAP(P) adds a LAP header to the data of the data transmission request function, and incorporates this data into a UI frame, and transmits the UI frame to the physical layer.

Further, when the LAP(S) of the receiver receives the data reception notification from the physical layer, the LAP(S) removes the LAP header from the data of the UI frame and incorporates the resulting data into the data notification function, and transmits the function to the LMP(S). Note that, in the present embodiment, the LAP header contains a connection address and a UI indicator.

(3-3) Disconnection Sequence

[A] Response is Sent

Figure 80:
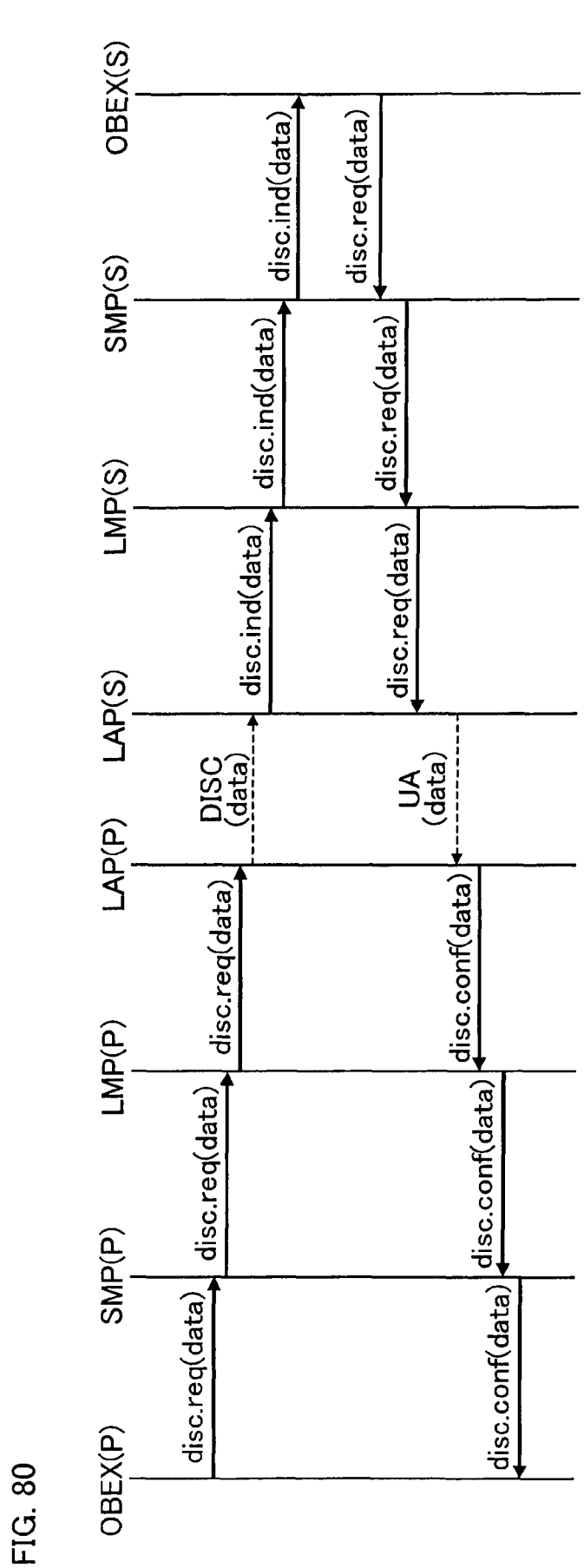
FIG. 80 is a sequence diagram showing a flow of functions (commands and messages) and packets between layers for a disconnection sequence in accordance with an embodiment of the present invention.

FIG. 80 is a sequence diagram showing a disconnection sequence according to the present embodiment (response is sent). FIGS. 81(*a*), 81(*b*) are illustrations of the structure of communication data used in the disconnection sequence of the present embodiment (response is sent).

As shown in FIG. 80, in the present embodiment (response is sent), the disconnection command of the transmitter is propagated from upper to lower layers, and a DISC command is generated. Meanwhile, the receiver receives the DISC command, and passes on the command from lower to upper layers, and then passes on a response from upper to lower layers, and a UA response is generated. The notification of reception of the UA response is passed on from lower to upper layers of the transmitter, and the sequence is completed.

The following will separately describe the sequence in the transmitter and the sequence in the receiver.

First, the communication layers in the transmitter will be described.

When a disconnection request is transmitted from the application to the OBEX(P), the OBEX(P) immediately emits a disconnection request function (Primitive), which contains a disconnection request command, to the lower layer (SMP(P)). Further, when a disconnection confirmation function is transmitted from the SMP(P) to the OBEX(P), the OBEX(P) checks a response for OBEX disconnection which is contained in the data. When the response tells that the disconnection has been properly done ("Success"), the OBEX(P) finishes the disconnecting operation.

The SMP(P) receives the disconnection request function from the OBEX(P), and immediately adds parameter(s) required for communication with the SMP(S) of the receiver to the data, and emits the disconnection request function to the lower layer (LMP(P)). When a disconnection confirmation function is transmitted from LMP(P) to the SMP(P), the SMP(P) extracts parameter(s) generated by the SMP(S) of the receiver from the data of the function, and checks the value, and then finishes the disconnection process with the SMP(S). Further, the SMP(P) removes the parameter(s) of the SMP(S) from the data of the disconnection confirmation function, and transmits the resulting data to the OBEX(P) as the disconnection confirmation function. It however should be noted that there is normally no parameter to be added to the disconnection request function in the SMP(P).

The LMP(P) receives the disconnection request function from the SMP(P), and immediately adds parameter(s) required for communication with the LMP(S) of the receiver to the data of the disconnection request function from the SMP(P), and emits the disconnection request function to the lower layer (LAP(P)). When a disconnection confirmation function is transmitted from the LAP(P) to the LMP(P), the LMP(P) extracts parameter(s) generated by the LMP(S) of the receiver from the data of the function, and checks the value, and then finishes the disconnecting operation with the LMP(S). Further, the LMP(P) removes the parameter(s) of the LMP(S) from the data of the disconnection confirmation function, and transmits the resulting data to the SMP(P) as the disconnection confirmation function. It however should be noted that there is normally no parameter to be added to the disconnection request function in the LMP(P).

The LAP(P) receives the disconnection request function from the LMP(P), and immediately adds parameter(s) required for communication with the LAP(S) of the receiver to the data of the disconnection request function form the LMP(P), and emits the DISC command to the physical layer of the receiver. When the UA response is transmitted from the physical layer of the receiver to the LAP(P), the LAP(P) extracts parameter(s) generated by the LAP(S) of the receiver from the data of the UA response, and checks the value, and then disconnects from the LAP(S). Further, the LAP(P) removes the parameter(s) of LAP(S) from the data of the UA response, and transmits the resulting data to the LMP(P) as the disconnection confirmation function. It however should be noted that there is normally no parameter to be added to the disconnection request function in the LAP(P).

Next, the communication layers in the receiver will be described.

When a disconnection notification function (Indication) is transmitted from the lower layer (SMP(S)), the OBEX(S) checks a command for OBEX disconnection which is contained in the data. When the command indicates that the disconnection has been properly done, the OBEX(S) emits a response called "Success" as a disconnection response function to the SMP(S), and finishes the disconnecting operation.

When the disconnection notification function is transmitted from the lower layer (SMP(S)), the SMP(S) extracts parameter(s) generated by the SMP(P) of the transmitter from the data of the function, and creates parameter(s) for response, and emits the disconnection request function containing the data thus created by removing the parameter(s) of the SMP(P) from the data of the function, to the OBEX(S), and then stands by for a disconnection response function which comes from the OBEX(S). Further, when the disconnection response function is transmitted from the OBEX(S), the SMP(S) adds the parameter(s) of the response to the data of the disconnection response function of the OBEX(S), emits the disconnection response function to the LMP(S), and finishes the disconnection in the SMP layer. It however should be noted that there is normally no parameter to be added to the disconnection request function in the SMP(S).

When the disconnection notification function is transmitted from the lower layer (LAP(S)), the LMP(S) extracts parameter(s) generated by the LMP(P) of the transmitter from the data of the function, and creates parameter(s) for response, and emits the disconnection request function containing the data thus created by removing the parameter(s) of the LMP(P) from the data of the function, to the SMP(S), and then stands by for a disconnection response function which comes from the SMP(S). Further, when the disconnection response function is transmitted from the SMP(S), the LMP(S) adds the parameter(s) of the response to the data of the disconnection response function of the SMP(S), emits the disconnection response function to the LAP(S), and finishes the disconnection in the LMP layer. It however should be noted that there is normally no parameter to be added to the disconnection request function in the LMP(S).

When the DISC command is transmitted from the physical layer, the LAP(S) extracts parameter(s) generated by the LAP(P) of the transmitter from the data of the DISC command, and creates parameter(s) for response after transmitting the disconnection request function, containing the data thus created by removing the parameter(s) of LAP(P) from the data of the DISC command, to the LMP(S), and then stands by for a disconnection response function which comes from the LMP(S). Further, when the disconnection response function is transmitted from the LMP(S), the LAP(S) adds the parameter(s) of the response to the data of the disconnection response function of the LMP(S), emits the UA response to the physical layer, and finishes the disconnection process in the LAP layer. It however should be noted that there is normally no parameter to be added to the disconnection request function in the LAP(S).

[B] No Response is Sent

Figure 82:
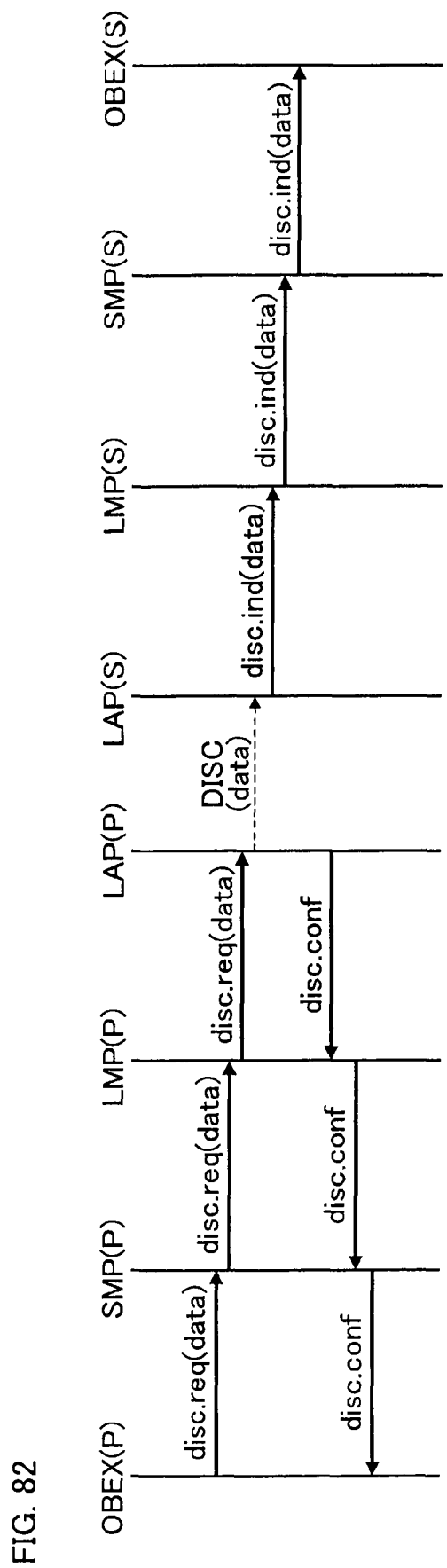
FIG. 82 is a sequence diagram showing a flow of functions (commands and messages) and packets between layers for a disconnection sequence in accordance with an embodiment of the present invention.

FIG. 82 is a sequence diagram showing a disconnection sequence according to the present embodiment (no response is sent). FIG. 81(a) is an illustration of the structure of communication data used in the disconnection sequence of the present embodiment (no response is sent).

As shown in FIG. 82, in the present embodiment (no response is sent), the disconnection command of the transmitter is propagated from upper to lower layers, and a DISC command is generated. In the transmitter, the disconnection operation is completed at this point. Meanwhile, the receiver receives the DISC command, and passes on the DISC command from lower to upper layers. When the DISC command is passed onto the OBEX layer, the disconnection sequence is completed.

The following will describe the sequence in the transmitter and the sequence in the receiver.

First, the communication layers in the transmitter will be described.

When a disconnection request is transmitted from the application to the OBEX(P), the OBEX(P) immediately emits a disconnection request function (Primitive), which contains a disconnection request command, to the lower layer (SMP(P)). Further, when a disconnection confirmation function is transmitted from SMP(P) to the OBEX(P), the OBEX(P) finishes the disconnecting operation.

The SMP(P) receives the disconnection request function from the OBEX(P), and immediately adds parameter(s) required for communication with the SMP(S) of the receiver to the data of the disconnection request function from the OBEX(P), and emits the disconnection request function to the lower layer (LMP(P)). When a disconnection confirmation function is transmitted from the LMP(P) to the SMP(P), the SMP(P) regards the disconnection as being completed with the transmitted parameter(s) and finishes the disconnection in the SMP layer. Further, the SMP(P) transmits the disconnection confirmation function to the OBEX(P). It however should be noted that there is normally no parameter to be added to the disconnection request function in the SMP(P).

The LMP(P) receives the disconnection request function from the SMP(P), and immediately adds parameter(s) required for communication with the LMP(S) of the receiver to the data of the disconnection request function from the SMP(P), and emits the disconnection request function to the lower layer (LAP(P)). When a disconnection confirmation function is transmitted from the LAP(P) to the LMP(P), the LMP(P) regards the disconnection as being completed with the transmitted parameter(s) and finishes the disconnection in the LMP layer. Further, the LMP(P) transmits the disconnection confirmation function to the SMP(P). It however should be noted that there is normally no parameter to be added to the disconnection request function in the LMP(P).

The LAP(P) receives the disconnection request function from the LMP(P) and immediately adds parameter(s) required for communication with the LAP(S) of the receiver to the data of the disconnection request function from the LMP(P), and emits the DISC command to the physical layer of the receiver. When a DISC command is outputted, the LAP(P) regards the disconnection as being completed with the transmitted parameter(s) and finishes the disconnection process in the LAP layer. Further, the LAP(P) transmits the disconnection confirmation function to the LMP(P). It however should be noted that there is normally no parameter to be added to the disconnection request function in the LAP(P).

Next, the communication layers in the receiver will be described.

When a disconnection notification function (Indication) is transmitted from the lower layer (SMP(S)), the OBEX(S) checks a command for OBEX disconnection which is contained in the data. When the command indicates that the disconnection has been properly done, the OBEX(S) finishes the disconnecting operation.

When the disconnection notification function is transmitted from the lower layer (SMP(S)), the SMP(S) extracts parameter(s) generated by the SMP(P) of the transmitter from the data of the function, and completes the disconnection with the parameter(s). Further, the SMP(S) removes the SMP(P) parameter(s) from the data of the disconnection notification function, incorporates the resulting data into a disconnection request function, and sends it to the OBEX(S). It however should be noted that there is normally no parameter to be added to the disconnect request function in the SMP(S).

When the disconnection notification function is transmitted from the lower layer (LAP(S)), the LMP(S) extracts parameter(s) generated by the LMP(P) of the transmitter from the data of the function, and finishes the disconnection with the parameter(s). Further, the LMP(S) removes the parameter(s) of LMP(P) from the data of the function, incorporating the data into a disconnection request function, and sends it the SMP(S). It however should be noted that there is normally no parameter to be added to the disconnection request function in the LMP(S).

When the DISC command is transmitted from the physical layer, the LAP(S) extracts parameter(s) generated by the LAP (P) of the transmitter from the data of the DISC command, and completes disconnection with the parameter(s). Further, the LAP(S) removes the parameter(s) of LAP(P) from the data of the DISC command, and incorporates the resulting data to the disconnection request function and then emits the function to the LMP(S). It however should be noted that there is normally no parameter to be added to the disconnection request function in the LAP(S).

(4) Selection as to Whether or Not a Response is to be Sent

With reference to FIGS. 83 to 90, the following will describe a flow of data and parameter(s) between the communication layers in the transmitter and the receiver.

In the present embodiment, the communication layers LAP, LMP, SMP, OBEX in the transmitter and the receiver each have a connection request function, a connection notification function, a connection response function, and a connection confirmation function. These functions are used for access to the LAP layer from the upper layer (i.e., LMP layer).

For the functions, Data (hereinafter, referred to simply as data), Requested-QoS, or Returned-QoS may be specify as arguments. As mentioned earlier, the data is set up in each communication layer.

Meanwhile, QoS notifies the upper layer, including OBEX, of the negotiation parameter(s), such as the baud rate determined in the LAP, and a result of negotiation. Note that conventional IrDA schemes also use QoS.

For example, when the application or the OBEX(P) of the transmitter emits a QoS having a parameter indicating that a response is required or is not required, it is propagated through the lower layers and reaches the LAP(P). Then, the LAP(P) uses the value of the QoS as the value of the negotiation parameter(s) (Ack Less Connect), and transmits the parameter(s) to the receiver.

Consequently, the communication layers of the transmitter and those of the receiver are operated depending on whether or not the application or the OBEX(P) of the transmitter requires a response, thereby enabling connection both in a two-way manner and in a one-way manner.

FIGS. 83 to 87 are illustrations of a flow of data and parameter(s) between the communication layers in the connection sequence (FIG. 74) according to the present embodiment (response is sent). Note that the QoS parameter(s) between OBEX-SMP, between SMP-LMP, between LMP-LAP may be identical or different. They are identified by the added symbols –a, –b, and –c in the figures.

Figure 83:
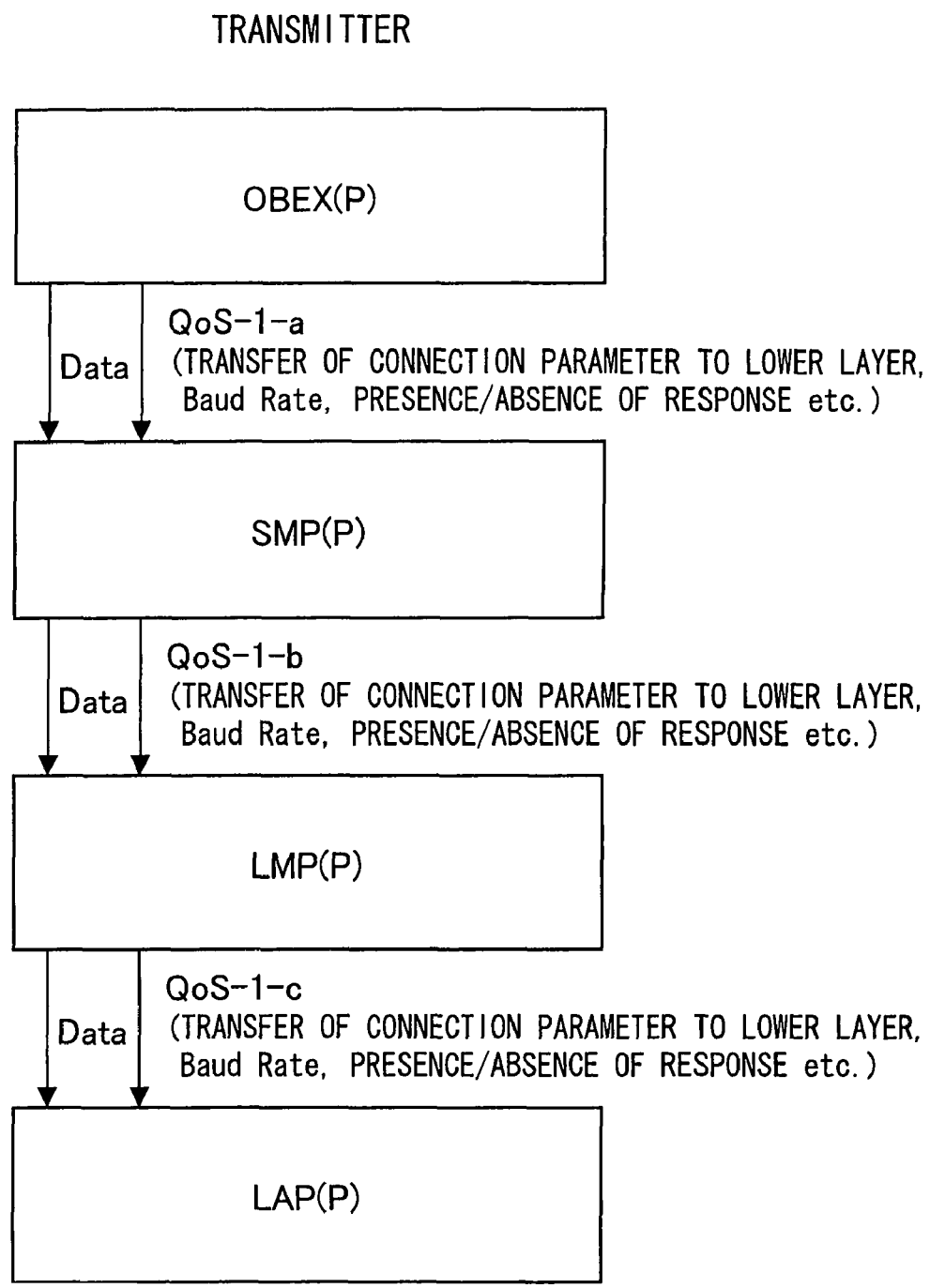
FIG. 83 is a schematic diagram for the data and connection parameters of a connection request function being passed between layers in a primary station in accordance with an embodiment of the present invention.

In the transmitter, as shown in FIG. 83, the data to be transmitted to the receiver and the data of QoS-1 (QoS requested by the transmitter) are propagated through upper to lower layers by con.req(data) (FIG. 74).

Figure 84:
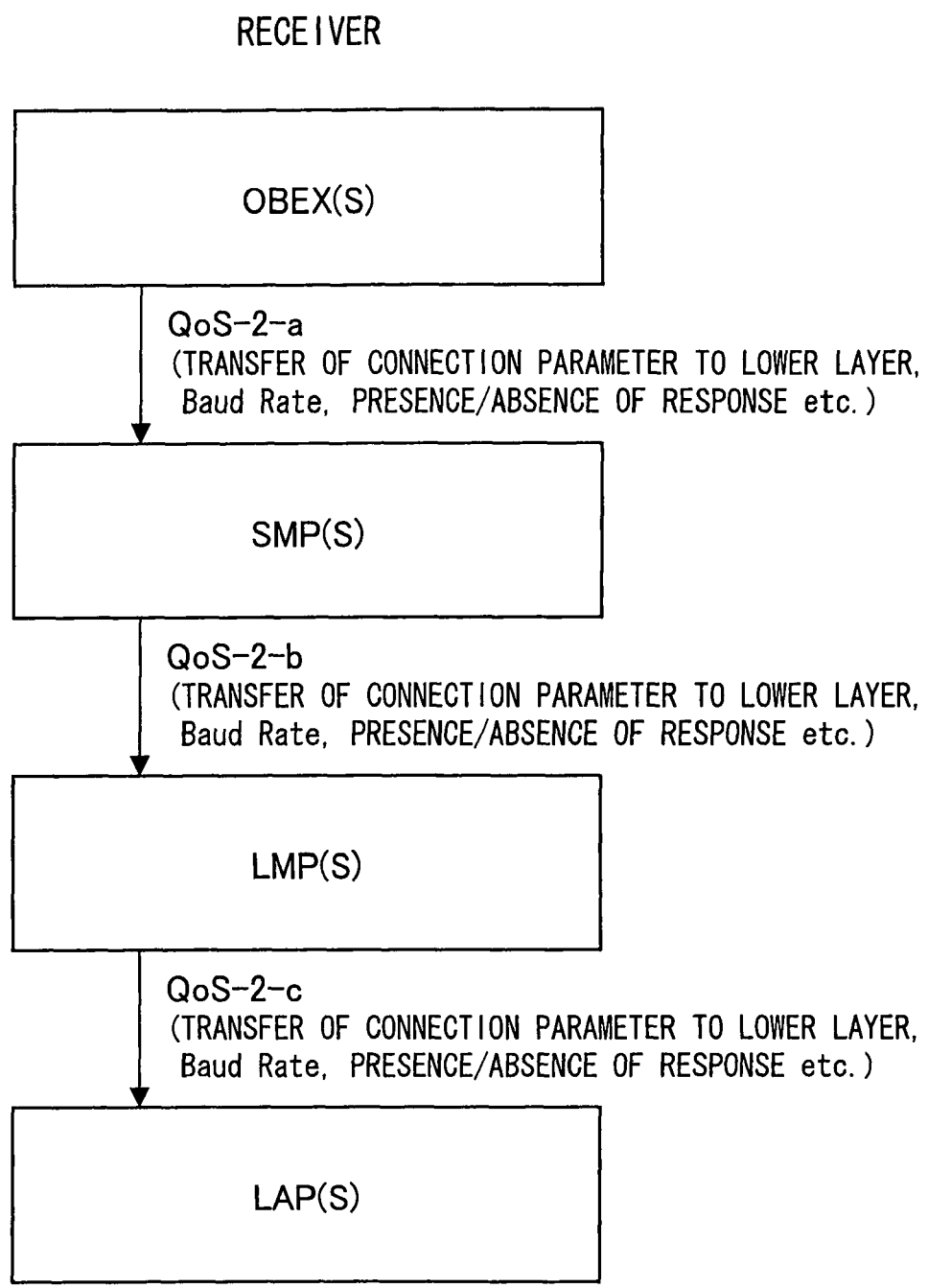
FIG. 84 is a schematic diagram for the connection parameters of a connection request function being passed between layers in a secondary station in accordance with an embodiment of the present invention.

Meanwhile, in the receiver, as shown in FIG. 84, only the data of QoS-2 (QoS requested by the receiver) is propagated through upper to lower layers by the con.req.

Figure 85:
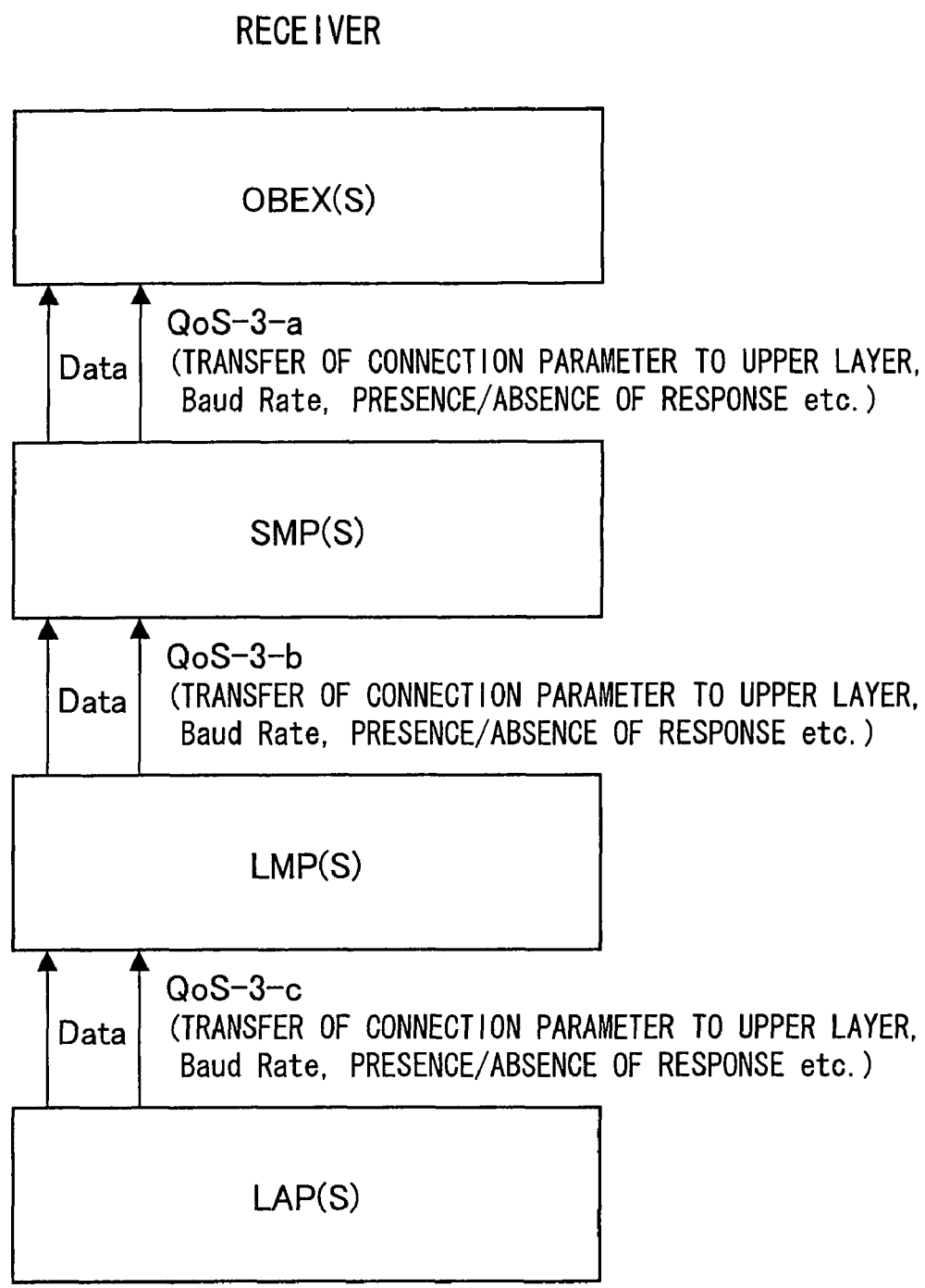
FIG. 85 is a schematic diagram for the data and connection parameters of a connection confirmation function being passed between layers in a primary station and the data and connection parameters of a connection notification function being passed between layers in a secondary station in accordance with an embodiment of the present invention.

Thereafter, in the receiver, the QoS-1 of the transmitter and the QoS-2 of the receiver are compared at the time of receiving the SNRM command in the LAP(S), thereby creating common negotiation parameter(s) QoS-3. Then, as shown in FIG. 85, the LAP(S) passes on the QoS-3 and the data from the transmitter to the upper layers by con.ind(data). The upper layers each store the QoS-3 and hold it as connection parameter(s) to establish a connection.

Figure 86:
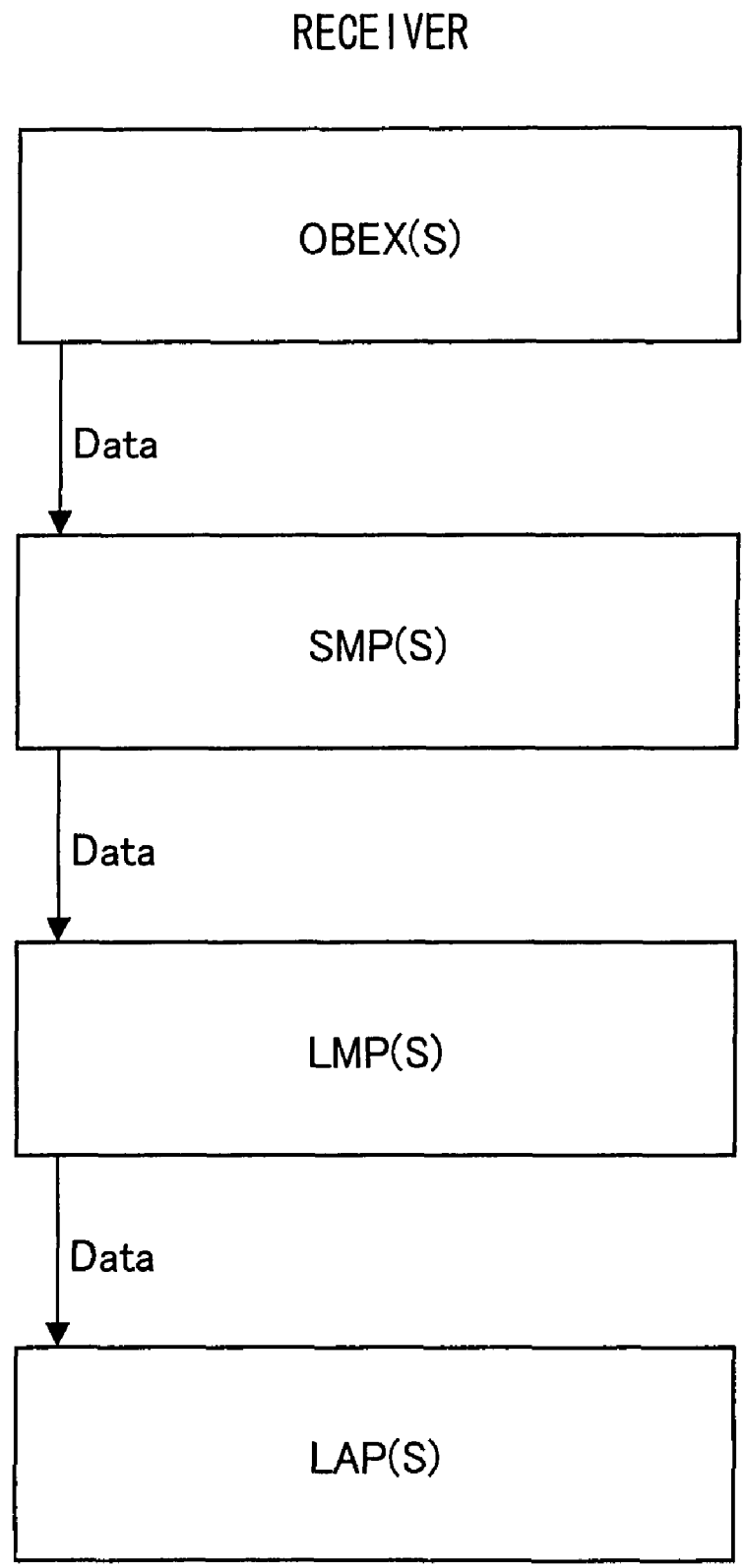
FIG. 86 is a schematic diagram for the data of a connection response function being passed between layers in a secondary station in accordance with an embodiment of the present invention.

In the receiver, QoS is not required in propagation of con.resp(data). Therefore, as shown in FIG. 86, only data is propagated from upper to lower layers by the con.resp(data). Then, when the LAP(S) receives the con.resp(data), the QoS-3 is incorporated into the UA response, and the UA response is transmitted.

Figure 87:
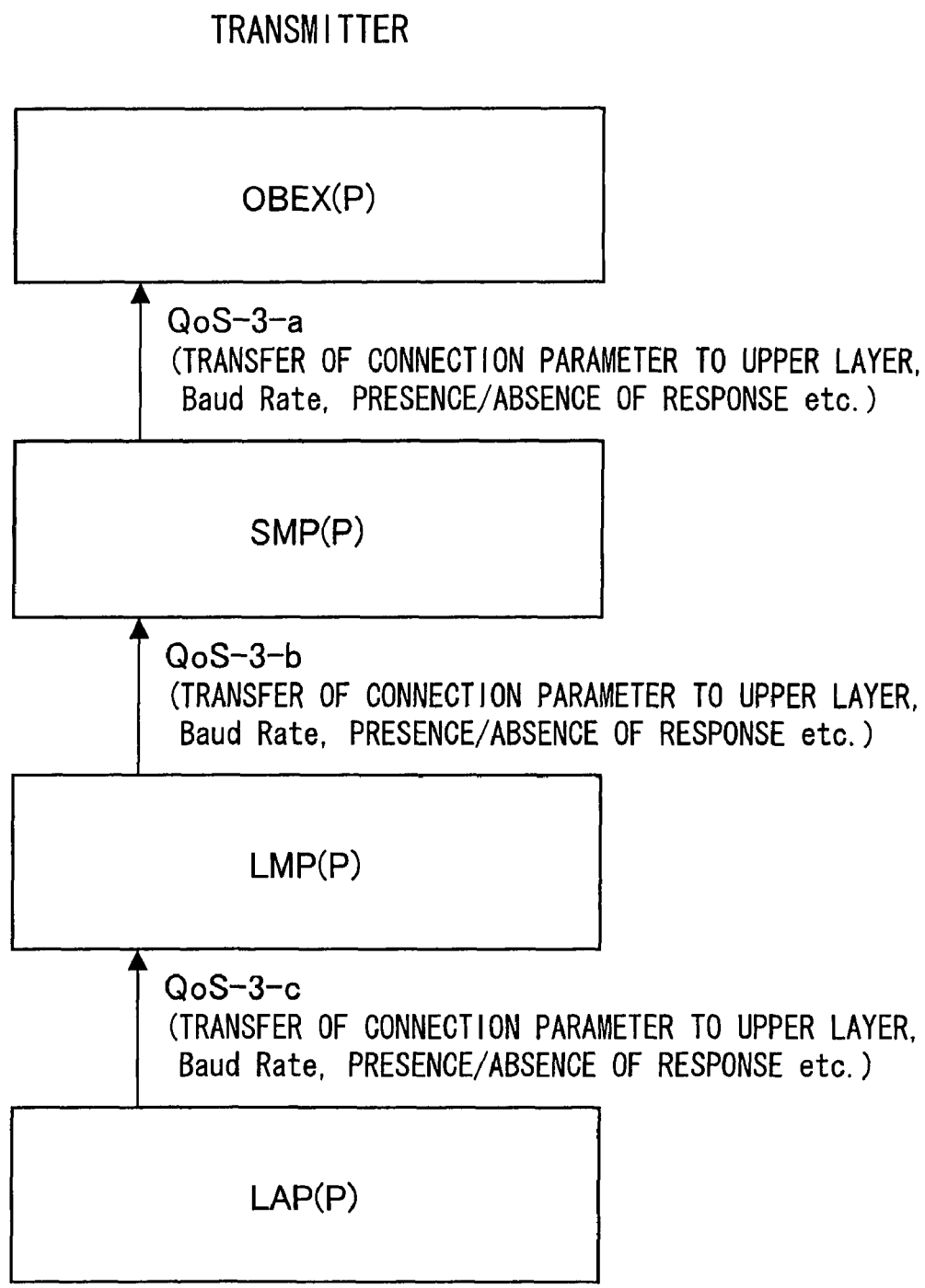
FIG. 87 is a schematic diagram for the connection parameters of a connection confirmation function being passed between layers in a primary station in accordance with an embodiment of the present invention.

In the transmitter, the LAP(P) receives the UA response and stores the QoS-3 as negotiation parameter(s). Then, as shown in FIG. 87, the LAP(P) passes on the QoS-3 and the data from the receiver to the upper layers by con.conf(data). The communication layers each store the QoS-3 and hold it as connection parameter(s) to establish a connection.

In the present embodiment, as a QoS of con.req, for example, "Requested-QoS: Baud-Rate+Max-Turn-Around-Time+Disconnect-Threshold+DataSize+Ack less connection+Min-Packet-Interval" is used. Further, as a QoS of Con.ind,con.conf, "Resultant-QoS: Baud-Rate+Disconnect-Threshold+DataSize+Ack less connection (indication primitive only)" is used.

The following will describe a flow of data and parameter(s) between the communication layers in the connection sequence (FIG. 76) according to the present embodiment (no response is sent).

In the transmitter, as shown in FIG. 83, the data to be transmitted to the receiver and the data of QoS-1 (QoS requested by the transmitter) are propagated through upper to lower layers by con.req(data) (FIG. 76).

Then, the LAP(P) of the transmitter stores the QoS-1 as QoS-3. Further, as shown in FIG. 87, the LAP(P) passes on the QoS-3 to the upper layers by con.conf. The communication layers each store the QoS-3 and hold it as connection parameter(s) for the established connection.

Meanwhile, in the receiver, only data of QoS-2 (QoS requested by the receiver) is propagated from upper to lower layers by the con.req, as shown in FIG. 84.

Thereafter, in the receiver, the QoS-1 of the transmitter is determined as QoS-3 at the time of receiving a SNRM command in the LAP(S). Note that when the combination of the parameter(s) of QoS-2 and the QoS-1 is not adequate, the SNRM command cannot be received.

Then, as shown in FIG. 85, the LAP(S) passes on the QoS-3 and the data from the transmitter, to the upper layers by con.ind(data). The upper layers each store the QoS-3 and hold it as connection parameter(s) to establish a connection.

In this manner, QoS-1 and QoS-2 are controlled by the application in the upper layer (application), thereby selecting whether or not a response is to be sent.

The selection as to whether or not a response is to be sent is carried out according to, e.g., a file type of the file to be transmitted, application, and a user selection.

Specifically, for example, consider a case where the selection is carried out according to a type of file. In the case of multimedia-related file, it is possible to select whether or not a response is to be sent. In the case of data that the user would like to confirm its reception such as a file of a telephone book, email, schedule, it is automatically selected that a response is to be sent. Further, consider a case where the selection is carried out according to application. In the case of a slide show, it is automatically selected that no response is to be sent, for example. Further, consider a case where the selection is carried out according to user selection. In this case, the user selects, from a displayed menu, whether or not a response is to be sent, for example.

Figure 88:
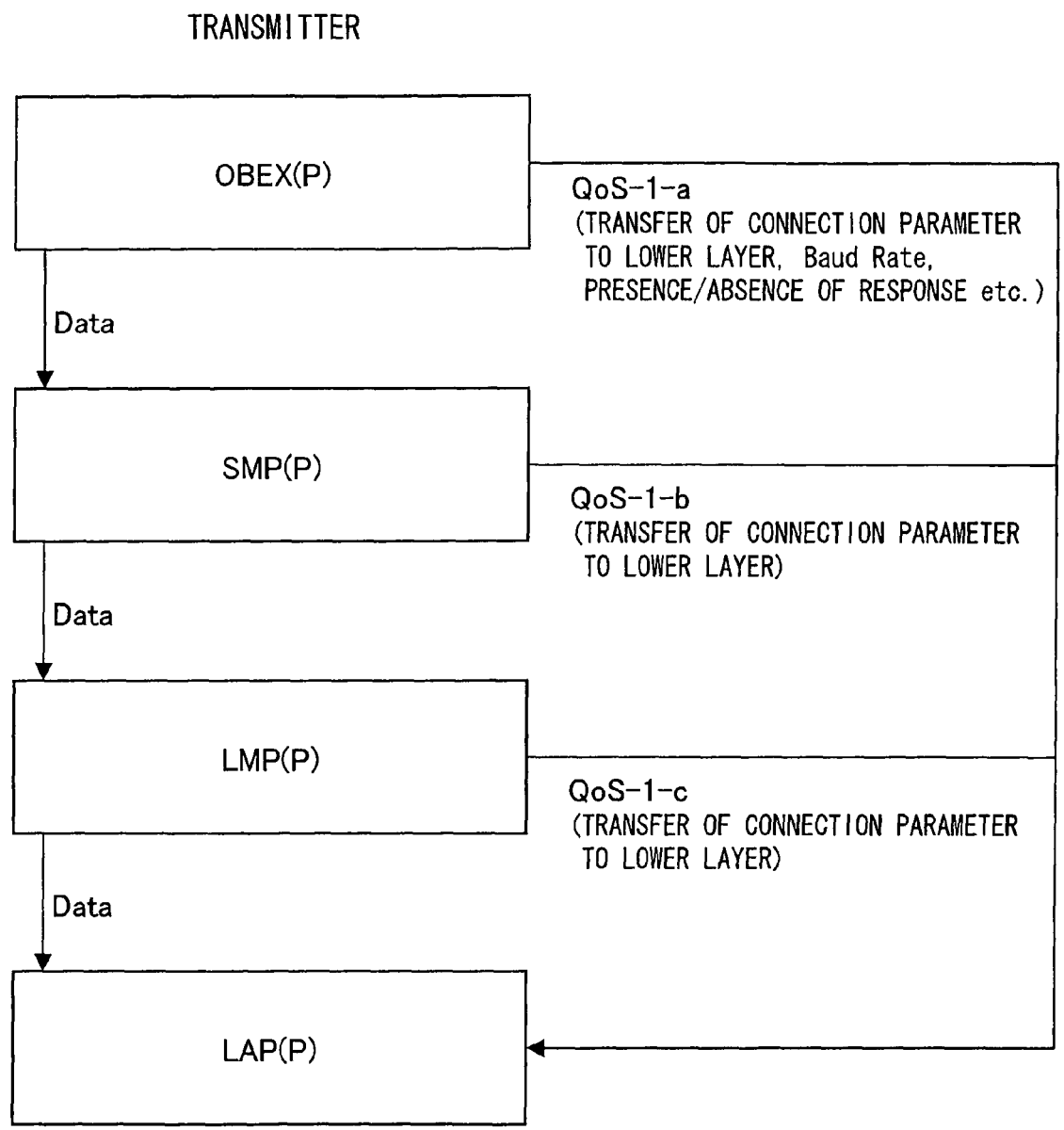
FIG. 88 is a variation of an embodiment, a schematic diagram for the data and connection parameters of a connection request function being passed between layers in a primary station in a case where the connection parameters are shared by the layers.
Figure 89:
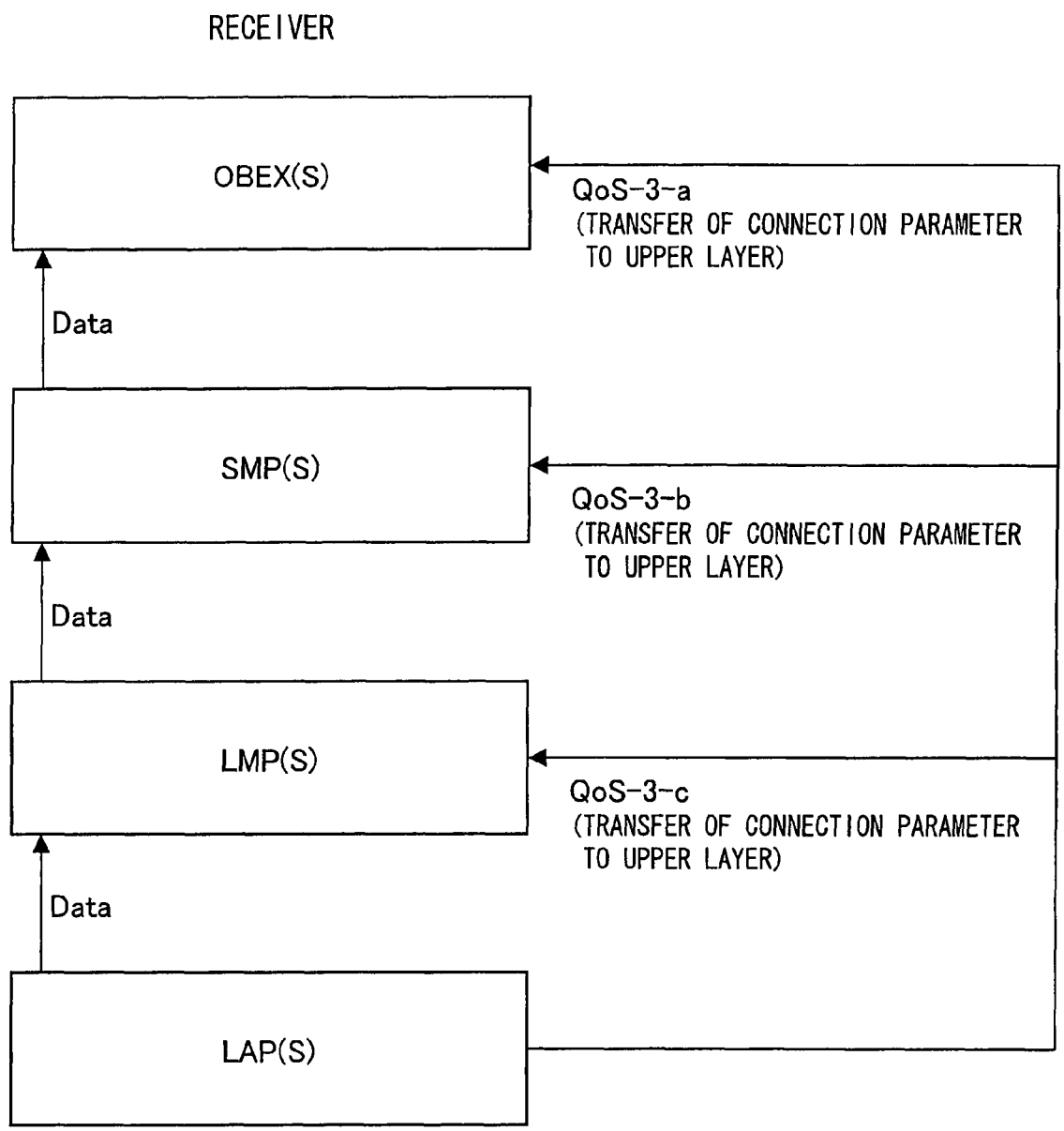
FIG. 89 is a variation of an embodiment, a schematic diagram for the data and connection parameters of a connection notification function being passed between layers in a secondary station in a case where the connection parameters are shared by the layers.
Figure 90:
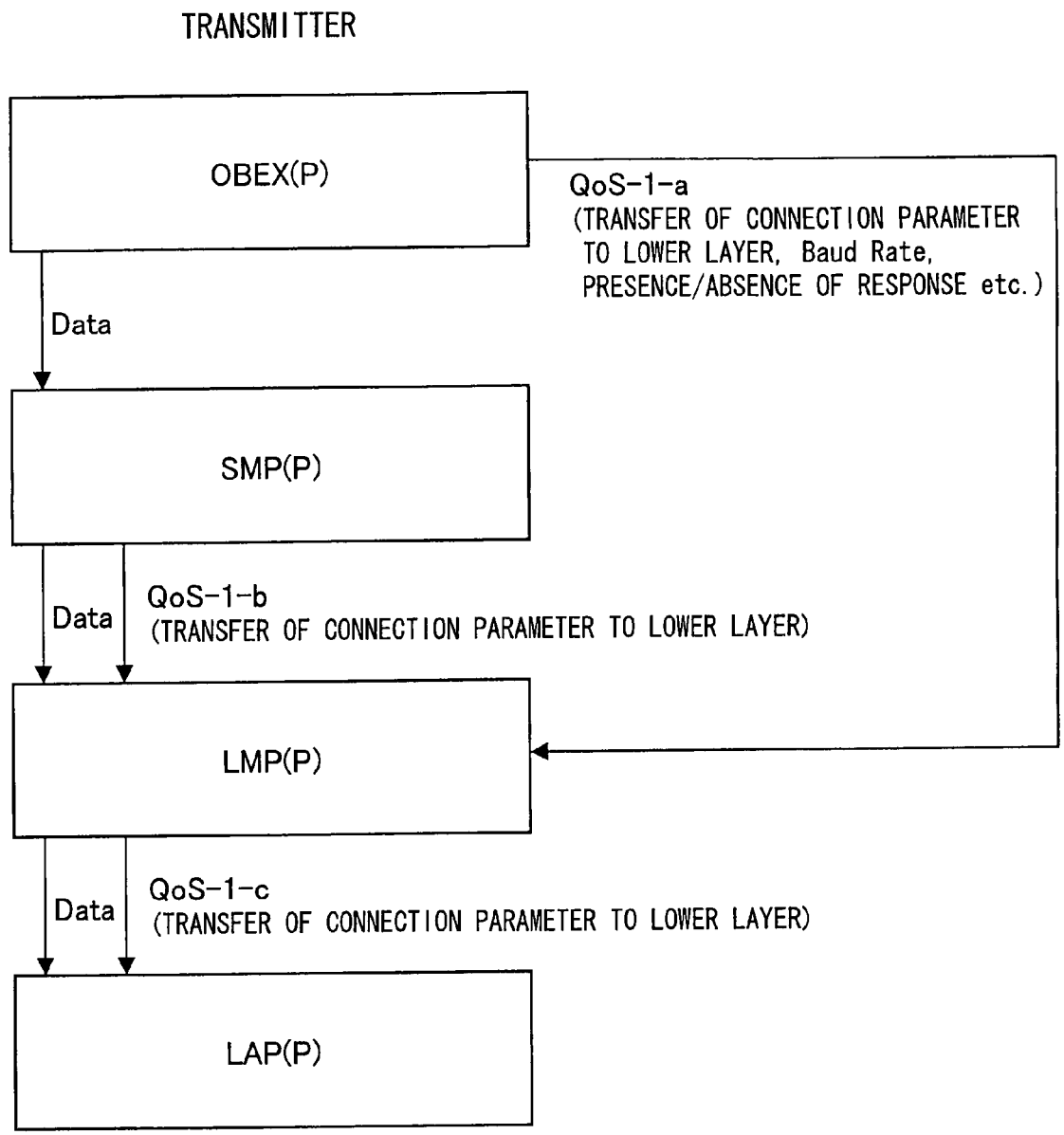
FIG. 90 is a variation of an embodiment, a schematic diagram for the data and connection parameters of a connection request function being passed between layers in a primary station in a case where the layers separately pass the connection parameters to the lower layers.

FIGS. 88 through 90 are illustrations showing alternative flows of data and parameter(s) between the communication layers in a connection sequence according to the present embodiment.

In the transmitter, when the first SNRM command includes information of all the communication layers (FIG. 74), the data and parameter(s) may be directly transmitted to the LAP layer from each communication layer, instead of relaying those from one communication layer to the other (FIG. 83). This direct transmission to the LAP layer is shown in FIG. 88.

On the other hand, as shown in FIG. 89, the receiver may be arranged so that all of the data and the parameter(s) contained in the SNRM command are extracted, and are transmitted directly from the LAP layer to the respective corresponding communication layers.

Further, as shown in FIG. 90, the transmitter may be arranged so that the data and parameter(s) for the OBEX(P), the SMP(P), and the LMP(P) are unified in the LMP(P), and the parameter(s) of the LAP(P) is added to the unified data and parameter(s) in the LAP(P), thereby generating a SNRM command.

In each of the above mentioned embodiments, the transmitter (primary station) may be: a mobile phone, a PDA (Personal Digital Assistants), a digital camera, a personal computer, or the like. Furthermore, the receiver (secondary station) may be: a mobile phone, a TV, an audiovisual device, a storage device such as a DVD recorder and a HDD recorder, a printer, an electronic device such as a personal computer, or the like.

The blocks of the transmitter (primary station) or the receiver (secondary station) may be configured by hardware (communication circuit) or provided by software as executed by an arithmetic processing device (e.g. CPU) as follows.

The transmitter or receiver includes a CPU (central processing unit) and memory devices (memory media). The CPU executes instructions in control programs realizing the functions. The memory devices may be a ROM (read only memory) which contains programs, a RAM (random access memory) to which the programs are loaded, or a memory containing the programs and various data.

The objective of the present invention can also be achieved by mounting to the transmitter or receiver a computer-readable storage medium containing communication program code (executable program, intermediate code program, or source program) for the transmitter or receiver, which is software realizing the aforementioned functions in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The transmitter or receiver may be arranged to be connectable to a communication network so that the program code may be delivered over the communication network. The communication network is not limited in any particular manner, and may be, for example, the Internet, an intranet, extranet, LAN, ISDN, VAN, CATV communication network, virtual dedicated network (virtual private network), telephone line network, mobile communication network, or satellite communication network. Further, the present invention can be realized by a series of data signals which represent the aforesaid program code, and which are electrically transmitted, and which are embedded in a carrier wave.

As described, a communication device of the present invention which performs batched data transmission, without transferring a transmission right, according to a communication scheme which does not limit the number of frames transmittable at once, includes: transmission frame generating means for generating transmission frames by dividing batch-transmission data to be transmitted in batch; sequence number generating means for giving a sequence number to each of the transmission frames; batch-transmission-end flag generating means for setting, in a final transmission frame of the batch-transmission data, a batch-transmission-end flag which indicates that the frame is the final transmission frame of the batch-transmission data; and transmission means for transmitting the transmission frames.

Further, a communication method of the present invention is a communication method which performs batched data transmission, without transferring a transmission right, according to a communication scheme which does not limit the number of frames transmittable at once, said method including the steps of: (A) generating transmission frames by dividing batch-transmission data to be transmitted in batch; (B) giving a sequence number to each of the transmission frames; (C) setting, in a final transmission frame of the batch-transmission data, a batch-transmission-end flag which indicates that the frame is the final transmission frame of the batch-transmission data; and (D) transmitting the transmission frames.

Further, the communication device further includes: reception frame analyzing means for extracting, from a reception frame having been received, a no-error flag and a sequence number; no-error flag analyzing means for analyzing the no-error flag, so as to judge presence/absence of an error; and control means for retransmitting, when the no-error flag indicates a presence of an error, a transmission frame corresponding to the sequence number.

Further, a communication device of the present invention which performs batched data reception without receiving a transmission right, according to a communication scheme which does not limit the number of frames transmittable at once, includes: sequence number analyzing means for analyzing a sequence number contained in each reception frame, so as to judge whether or not there is an error in the sequence numbers; transmission frame generating means for generating a transmission frame containing a no-error flag set to indicate that an error is found and the sequence number of the error-frame, if (a) the batch-transmission-end flag in a frame having been received indicates that the received frame is the final one of transmission frames into which batched-transmission data has been divided and which have been transmitted in batch from the transmitter, and (b) said sequence number analyzing means has detected an error in any of frames having been received; transmission means for transmitting the transmission frame.

Further, a communication method of the present invention is a communication method which performs batched data reception, without receiving a transmission right, according to a communication scheme which does not limit the number of frames transmittable at once, said method including the steps of: (A) analyzing a sequence number contained in each reception frame for judging whether or not there is an error in the sequence numbers; (B) generating a transmission frame containing a no-error flag set to indicate that an error is found and the sequence number of the error-frame, if (a) the batch-transmission-end flag in a frame having been received indicates that the received frame is the final one of transmission frames into which batched-transmission data has been divided and which have been transmitted in batch from the transmitter, and (b) said sequence number analyzing means has detected an error in any of frames having been received; and (C) transmitting the transmission frames.

Further, a communication system of the present invention includes: the above described communication device serving as a transmitter; and the above described communication device serving as a receiver.

In the above described structure and method, the following operations are performed, when transmitting data in batch without transferring the transmission right according to the communication scheme which does not limit the number of frames transmittable at once. Namely, the transmitter generates transmission frames by dividing batch-transmission data, and adds a sequence number to each of the transmission frames. Further, the batch-transmission-end flag which indicates that the frame is the final transmission frame of the batch transmission data is set in the final transmission frame of the batch-transmission data. Then, the transmission frames are transmitted. On the other hand, the receiver analyzes the sequence numbers contained in the reception frames so as to judge whether or not there is an error of the sequence numbers. If an error is found in the reception frames, the receiver generates a transmission frame and transmits the transmission frame to the transmitter. The transmission frame contains a no-error flag set to indicate that an error is found, and the sequence number of ??the error-frame??. When the transmitter receives from the receiver the frame containing the sequence number of the frame received when error has occurred, the transmitter retransmits the transmission frame which corresponds to the sequence number.

Here, the receiver does not transmit the transmission frame containing the sequence number of ??the error-frame??, until the reception of the final transmission frame amongst the transmission frames which are the transmitter-divided batch-transmission data is confirmed with reference to the batch-transmission-end flag contained in the reception frames. In short, notification of error is performed for each set of batch transmission data.

Thus, since detection of an omitted frame or the like and retransmission are possible even with the communication scheme which does not limit the number of frames that can be received or transmitted at once (window size), highly reliable communication is possible. Further, notification of error performed for each set of batch transmission data allows efficient data transmission.

Further, the communication device of the present invention further includes: data-end flag generating means for setting a data-end flag, wherein, when a set of transmission data is transmitted as plural batch-transmission data items which are obtained by dividing the set of transmission data, said data-end flag generating means sets the data-end flag of a final transmission frame of the set of transmission data to indicate that the frame is the final transmission frame of the set of transmission data.

The structure allows notification of the end of the transmission data to the receiver. Therefore, for example, the receiver is able to efficiently start processing of data in its reception buffer.

Further, the communication device of the present invention is adapted so that the communication scheme is such that communication is performed by using UI (Unnumbered Information) frames according to IrLAP (Infrared Link Access Protocol).

The structure allows UI frames of IrLAP to be adopted as a communication scheme which does not limit the number of frames receivable or transmittable at once (window size). In short, retransmission using UI frames of IrLAP is possible.

Further, the communication device of the present invention is adapted so that the transmission frames include a final PUT command of OBEX (Object Exchange Protocol) or at least a part of non-final PUT command of OBEX (Object Exchange Protocol).

The structure allows high quality retransmission with high transfer efficiency using PUT commands of OBEX is possible.

Further, the communication device of the present invention is adapted so that said transmission frame includes a part of or an entire SUCCESS response of OBEX (Object Exchange Protocol).

The structure allows transmission of a SUCCESS response of OBEX, in a case where the transmitter performs data transmission using PUT commands of OBEX. Thus, communication through a PUT operation of OBEX is possible.

A communication device of the present invention which performs batched data reception, without receiving a transmission right, according to a communication scheme which does not limit the number of frames transmittable at once, including: error detecting means for judging whether or not there is an error in reception frames; transmission frame generating means for generating a transmission frame containing a no-error flag set to indicate presence or absence of an error, according to whether or not said error detection means has detected an error in a frame having been received, if the batch-transmission-end flag in a frame having been received indicates that the received frame is the final one of transmission frames into which batched-transmission data has been divided and which have been transmitted in batch from the transmitter; and transmission means for transmitting the transmission frame.

The structure allows notification of presence/absence of an error to the transmitter. Thus, the transmitter is able to perform retransmission in response to the notification.

Thus, since detection of an omitted frame or the like and retransmission are possible even with the communication scheme which does not limit the number of frames that can be received or transmitted at once (window size), highly reliable communication is possible. Further, notification of error performed for each set of batch transmission data allows efficient data transmission.

Further, a communication device of the present invention which transmits an object according to OBEX (Object Exchange Protocol) which is a protocol for exchanging an object, includes: an OBEX layer processing section for, after transmission of an OBEX command, transmitting a subsequent OBEX command without receiving an OBEX response from a receiver.

Further, a communication method of the present invention which performs batched data reception, according to a communication scheme which does not limit the number of frames transmittable at once, said method including the step of: after transmission of an OBEX command, transmitting a subsequent OBEX command without receiving an OBEX response from a receiver.

With the above described structure and method, the transmitter is able to transmit a subsequent OBEX command, even if an OBEX response from the receiver is not received. Thus, transmission an object according to OBEX is possible even if (i) the receiver does not transmit a response command in reply to the request command from the transmitter, or (ii) the receiver does not have transmission function. In short, one-way communication according to OBEX is realized.

Further, a communication device of the present invention which transmits an object according to OBEX (Object Exchange Protocol) which is a protocol for exchanging an object, includes: an OBEX layer processing section which transmits, only after transmission of a non-final PUT command of OBEX, a subsequent non-final PUT command or a final PUT command of OBEX without receiving an OBEX response from a receiver.

Further, a communication method of the present invention, in which an object is transmitted according to OBEX (Object Exchange Protocol) which is a protocol for exchanging an object, is such that, transmitting a subsequent non-final PUT command or a final PUT command of OBEX, without receiving an OBEX response from a receiver, only after transmission of a non-final PUT command of OBEX.

The above described structure and method, in which a response to non-final PUT command (i.e. CONTINUE response command) is omitted, allow efficient data transmission.

Further, a communication device of the present invention which receives an object from a transmitter, according to OBEX (Object Exchange protocol) which is a protocol for exchanging an object, includes: an OBEX layer processing section which does not transmit an OBEX response, after receiving an OBEX command.

Further, a communication method of the present invention, in which an object is received from a transmitter according to OBEX (Object Exchange Protocol) which is a protocol for exchanging an object, is adapted sot that after reception of an OBEX command, not transmitting an OBEX response.

With the above described structure and method, it is possible to control the receiver so that the receiver does not generate an unnecessary response command, if the transmitter is able to transmit a subsequent OBEX command without receiving an OBEX response from the receiver. Thus, one-way communication according to OBEX is realized.

Further, a communication device of the present invention which receives an object from a transmitter, according to OBEX (Object Exchange protocol) which is a protocol for exchanging an object, includes an OBEX layer processing section which transmits an OBEX response when receiving a final PUT command, but not when receiving a non-final PUT command of OBEX.

Further, a communication method of the present invention in which an object is received from a transmitter according to OBEX (Object Exchange Protocol) which is a protocol for exchanging an object, includes the step of: transmitting an OBEX response when a final PUT command of OBEX is received, but not when a non-final PUT command of OBEX is received.

The above described structure and method, in which a response to non-final PUT command (i.e. CONTINUE response command) is omitted, allow efficient data transmission.

Note that the communication device may be realized by a computer. In this case, the present invention encompasses (i) a communication program of the communication device, which program realizes the communication device by causing a computer to operate as the sections of the communication device, and (ii) a computer-readable recording medium storing the communication program.

Further, the communication device may be realized by a communication circuit functioning as the sections of the communication device.

The communication device is suitable for application in mobile phones which incorporates the communication device for communication. According to such a mobile phone, communication can be carried out with high quality and/or high transfer efficiency.

Further, the communication device is suitable for a display device that carries out display in accordance with data received by the communication device. According to such a display device, communication can be carried out with high-quality and/or high transfer efficiency.

The communication device is suitable for application in printing devices which print from the data received by the communication device. According to such printing devices, communication can be carried out with high-quality and/or high transfer efficiency.

Further, the communication device is suitable for a recording device storing data received by the communication device. According to such a recording device, communication can be carried out with high-quality and/or high transfer efficiency.

Further, the present invention may be structured as follows.

[Primary Station]

(1. Transmission of UI Frame of LAP Layer from Primary Station, with Sequence Number and BL Flag Added to the UI Frame)

A communication device [1] of the present invention is a communication device which transmits in batch data of a certain size, without transferring a transmission right, according to a communication scheme which does not limit a window size (the number of frames transmittable or receivable at once), the device including: a circuit which generates a transmission frame in which a sequence number, a flag indicating the end of batch transmission data, and transmission data are added; and a circuit which transmits the transmission frames, wherein, during data transmission, the sequence number is increased or decreased in increment or decrement of a predetermined value, until the transmission is performed with the flag indicating the end of batch-transmission data being set to a value indicating the end of the data.

With the structure, highly reliable communication is possible, as a communication device having received the frames is able to detect an omission of a frame, even in the case of communication scheme which does not limit the window size.

(2. Retransmission of Entire Data in Response to a Retransmission Request from Secondary Station)

A communication device [2] of the present invention is the communication device [1] which is adapted so that the entire data is retransmitted from the beginning if the no-error flag in a frame received from the opposite station indicates that an error is found.

This structure allows retransmission if the opposite station is requesting retransmission due to an error.

(3. Setting of Sequence Number to 0 when Retransmitting Entire Data)

A communication device [3] of the present invention is the communication device [2] which is adapted so that, in the retransmission, the sequence number is set to an initial value according to a predetermined rule at the time of transmitting the first frame.

The structure allows the communication device having received the frames to know that the retransmission is performed from the beginning.

(4. Retransmission can be Performed Only Once)

A communication device [4] of the present invention is the communication device [2] which is adapted so that the retransmission can be performed only once.

The structure allows reduction of power to be consumed for performing retransmission via a poor quality communication path.

(5. The Number of Time Retransmission that can be Performed is Limited.)

A communication device [5] of the present invention is the communication device [2] which is adapted so that the retransmission can be performed a predetermined number of times or less.

The structure allows more efficient reduction of power consumption, as the number of times retransmission can be performed can be changed depending on the quality of the communication path.

(6. Retransmission Starting from the Sequence Number Requested by the Secondary Station)

A communication device [6] of the present invention is the communication device [1] which is adapted so that when the no-error flag of a frame received from the opposite station indicates that an error is found, retransmission is performed starting from a frame amongst those having been transmitted, which frame corresponds to the sequence number in the frame received.

The structure allows retransmission of frames starting from the sequence number requested by the opposite station, thus contributing to improvement of transferring efficiency at the time of error.

(7. Retransmission Starting from the Sequence Number Requested by the Secondary Station (Sequence Number Reverted))

A communication device [7] of the present invention is the communication device [6] which is adapted so that, when transmitting the first frame in the retransmission, the sequence number is set to that of a frame received immediately before.

The structure allows the opposite station to know the position of data where the retransmission is started.

(8. Retransmission Performed from the Sequence Number Designated by the Secondary Station can be Performed Only Once)

A communication device [8] of the present invention is the communication device [6] which is adapted so that the retransmission can be performed only once.

The structure allows reduction of power to be consumed for performing retransmission via a poor quality communication path.

(9. Retransmission Performed from the Sequence Number Designated by the Secondary Station can be Performed a Limited Number of Times)

A communication device [9] of the present invention is the communication device [6] which is adapted so that the retransmission can be performed a predetermined number of times or less.

The structure allows more efficient reduction of power consumption, as the number of times retransmission can be performed can be changed depending on the quality of the communication path.

(10. Transmission of a Frame with its Sequence Number Incremented if No Retransmission is Requested by the Secondary Station.)

A communication device [10] of the present invention is the communication device [1] which is adapted so that, when the no-error flag in a frame received from the opposite station indicates that no error is found, transmission is performed with the sequence number increased from that of the previously-transmitted frame by a predetermined value.

The structure allows transmission of data, if retransmission is not requested by the opposite station.

(11. A Data Size of Unit at Which BL is Set to 1 is Determined According to the Buffer Size)

A communication device [11] of the present invention is the communication device [1] which is adapted so that: a batch-receivable data size of the opposite station, which has been received at the time of establishing connection is retained; and frames are transmitted with the flag for indicating the end of the batch-transmission data set to indicate the end of the data so that the total data size of the transmission data in the transmission frames is not more than the data size having been received at the time of establishing the connection from the opposite station.

With the structure, it is possible to prevent an over run error caused by the buffer of the receiving end overflowing.

(12. Block Size is Set to Default Value when No Parameter is Received.)

A communication device [12] of the present invention is the communication device [11] which is adapted so that, if the batch-receivable data size of the opposite station is not received at the time of establishing connection, frames are transmitted with the flag for indicating the end of the batch-transmission data set to indicate the end of the data so that the total data size of the transmission data in the transmission frames is not more than a predetermined value.

With the structure, it is not necessary to notify the reception buffer to the opposite station at the time of establishing connection, provided that the default value is agreed with the opposite station, and that communication with the opposite station can be performed with the default value.

(13. In Case of Time Out after the Primary Station Transmits a Frame with its BL Set to 1, the Previously-Transmitted Transmission Frame is Retransmitted.)

A communication device [13] of the present invention is the communication device [1] which is adapted so that: the communication device [13] particularly includes a timer; and only the previously-transmitted frame is retransmitted if no frame is received from the opposite station for a predetermined time after transmission of a frame with its flag for indicating the end of the batch-transmission data being set to indicate the end of the data.

With the structure, it is possible to perform retransmission when a frame containing the flag indicating the end of the batch-transmission data is not properly received by the opposite station.

(14. Retransmission of a Frame with its BL Set to 1 From the Primary Station can be Performed Only Once.)

A communication device [14] of the present invention is the communication device [13] which is adapted so that the retransmission can be performed only once.

The structure allows reduction of power to be consumed for performing retransmission via a poor quality communication path.

(15. The Retransmission of a Frame with its BL Set to 1 from the Primary Station can be Performed a Limited Number of Times.)

A communication device [15] of the present invention is the communication device [13] which is adapted so that the retransmission can be performed a predetermined number of times or less.

The structure allows more efficient reduction of power consumption, as the number of times retransmission can be performed can be changed depending on the quality of the communication path.

(16. BL is Set to 1 in All the Frame when Transmitted from the Primary Station.)

A communication device [16] of the present invention is the communication device [1] which is adapted so that all the frames are transmitted with their flags, each for indicating the end of the batch-transmission data, set to indicate the end of data.

With the structure, the transmission buffer needed for retransmission can be kept small.

(17. The Primary Station Sets a Flag to Indicate the End of Data from the Upper Layer.)

A communication device [17] of the present invention is the communication device [1] which is adapted so that the communication device [17] particularly includes a circuit for setting a flag indicating the end of transmission data; and that, when transmitting the last item of the transmission data, the transmission is performed with the flag indicating the end of the transmission data set to indicate the end of data.

The structure allows the opposite station to know the end of the transmission data.

(18. The Primary Station Performs Two-Way Communication Using UI Frames of IrDA)

A communication device [18] of the present invention is any one of the communication devices [1] to [17] which is adapted so that the communication scheme which does not limit the window size is communication using UI frames of IrLAP (Infrared Link Access Protocol).

The structure allows retransmission using UI frames of the IrLAP.

(19. The Primary Station Transmits UI Frames of Lap Layer with Sequence Numbers, in One-Way Communication.)

A communication device [19] of the present invention performing communication using UI frames of IrLAP (Infrared Link Access Protocol) in which communication no response is needed from the opposite station, includes: a circuit for generating transmission frames by giving a sequence number to each of the UI frames; and a circuit which transmits the transmission frames, wherein, during data transmission, the sequence number is increased or decreased in increment or decrement of a predetermined value.

With the structure, detection of an omission of reception frames is possible even in a case of one-way communication using UI frames of IrDA, thus contributing to improvement of communication quality.

(20. The Primary Station Transmits UI Frames with Sequence Numbers and DL Flags, in One-Way Communication.)

A communication device [20] of the present invention is the communication device [19] which is adapted so that the communication device particularly includes a circuit which generates a flag indicating the end of transmission data; and the flag indicating the end of the transmission data is set at the time of performing transmission.

The structure allows the receiving end to perform a desirable process, when receiving the flag indicating the end of the transmission data.

(21. The Data Transmitted from the Primary Station is a PUT Command of OBEX.)

A communication device [21] of the present invention is any one of the communication devices [1] to [20] which is adapted so that the transmission data contains a part of or the entire Put (final or non-final) command of the OBEX(Object Exchange Protocol). The structure allows communication using PUT commands of OBEX.

[Secondary Station]

(22. The Secondary Station Notifies the Primary Station of Presence/Absence of an Error, when Receiving a Frame Whose BL is Set to 1.)

A communication device [22] of the present invention is a communication device which receives a certain size of data in batch, without having a transmission right transferred thereto, by using a communication scheme which does not limit the window size (the number of frames that can be transmitted or received at once), the device including: an error detecting circuit for judging whether or not there is an error in reception frames; a circuit for storing, in reception buffer, data contained in the reception frames; a circuit for processing the data in the reception buffer; a circuit for discriminating a flag indicating the end of batched-transmission data; a circuit for generating a transmission frame to which a no-error flag is added; and a circuit for transmitting the transmission frame, wherein, when the flag in a frame received during the data transmission, which flag is for indicating the end of the batched-transmission data, is indicating the end of the data, a frame is generated and transmitted with a no-error flag set to indicate that no error is found if no error has been detected in the frames having been received, and a frame is generated and transmitted with a no-error flag indicating that an error is found if an error has been detected.

The structure allows notification of presence/absence of an error to the opposite station. The opposite station is able to perform retransmission in response to the notification.

(23. The Secondary Station Notifies the Primary Station of Presence/Absence of an Error and the Sequence Number of an Error-Frame in a Case of an Error, when the Secondary Station Receives a Frame with its BL Set to 1.)

A communication device [23] of the present invention is a communication device which receives a certain size of data in batch, without having a transmission right transferred thereto, by using a communication scheme which does not limit the window size (the number of frames that can be transmitted or received at once), the device including: an error detecting circuit for judging whether or not there is an error in reception frames; a circuit for calculating a sequence number that should be received; a circuit for comparing the sequence number that should be received and a sequence number received; a circuit for storing, in reception buffer, data contained in the reception frames; a circuit for processing the data in the reception buffer; a circuit for retaining the sequence number of an ??error-frame??; a circuit for discriminating a flag indicating the end of batched-transmission data; a circuit for generating a transmission frame to which a no-error flag, said circuit adding to the transmission frame, along with the no-error flag, the sequence number of the ??error-frame?? if there is an error; and a circuit for transmitting the transmission frame, wherein, when the flag in a frame received during the data transmission, which flag is for indicating the end of the batched-transmission data, is indicating the end of the data, a frame is generated and transmitted with a no-error flag set to indicate that no error is found if the error detecting circuit and the sequence number comparing circuit detect no error in the frames having been received, and a frame containing the sequence number of the first error-frame is generated and transmitted with a no-error flag indicating that an error is found if the error detecting circuit and the sequence number comparing circuit detect an error.

The structure allows notification of presence/absence of an error to the opposite station. It is further possible to notify of the sequence number that needs to be retransmitted, thus allowing efficient retransmission.

(24. The Secondary Station does not Process Data in a Reception Frame, when Receiving a Frame after an Error is Detected.)

A communication device [24] of the present invention is the communication device [22] or [23] which is adapted so that, if the error detecting circuit and the sequence number comparing circuit detect an error, data in reception frames is not stored in the reception buffer at least until a frame whose flag for indicating the end of the batch-transmission data is indicating the end of data is received.

With the structure, it is possible to save the power which would have been consumed for processing data during a period from the occurrence of an error to the point of requesting retransmission to the opposite station.

(25. The Secondary Station can Request Retransmission Only Once.)

A communication device [25] of the present invention is the communication device [22] or [23] which is adapted so that, if the error detecting circuit and the sequence number comparing circuit detect an error in reception frames, a frame with its no-error flag set to indicate that error is found is transmitted only once.

The structure allows reduction of power to be consumed for performing retransmission via a poor quality communication path.

(26. The Secondary Station can Request Retransmission a Predetermined Number of Times.)

A communication device [26] of the present invention is the communication device [22] or [23] which is adapted so that, if the error detecting circuit and the sequence number comparing circuit detect an error in reception frames, a frame with its no-error flag set to indicate that error is found is transmitted a predetermined number of times or less.

The structure allows more efficient reduction of power consumption, as the number of times retransmission can be performed can be changed depending on the quality of the communication path.

(27. The Secondary Station Requests Retransmission Always Starting from 0.)

A communication device [27] of the present invention is the communication device [23] which is adapted so that, at the time of transmitting the frame with its no-error flag set to indicate that an error is found, the frame is transmitted with the sequence number being always set to an initial value of a predetermined rule.

In the structure, the communication device [27] requests retransmission in a case where an error is detected, always starting from the beginning of the data. Thus, it is not necessary to manage the sequence number of an error-frame. This allows simplification of the circuit.

(28. The Secondary Station Notifies its Buffer Size to the Primary Station, at the Time of Establishing Connection.)

A communication device [28] of the present invention is the communication device [22] or [23] which is adapted so that buffer size thereof is added to a frame and transmitted at the time of establishing connection.

With the structure, notification of the reception buffer size to the opposite station is possible. It is possible to prevent a problem that the adjustment of the size of data to be transmitted in batch, which adjustment performed in the opposite station, causing an overrun error by overflowing the reception buffer.

(29. In a Case where the Secondary Station Continuously Receives a Frame with their BLs Set to 1 and Whose Sequence Number is the Same as that of the Last Frame, the Secondary Station Recognizes the Frame as an Error and does not Process the Frame.)

A communication device [29] of the present invention is the communication device [23] which is adapted so that, if the flag of a reception frame for indicating the end of batch-transmission data is indicating the end of the data, and if the sequence number of the reception frame is the same as that of the previously-received frame whose flag for indicating the end of batch-transmission data is indicating the end of the data, the sequence number comparing circuit recognizes the reception frame as an error and does not process the reception frame.

Thus, in a case where a frame from a station is not properly received by an opposite station due to an error, and the opposite station retransmits a frame as the result of the failure, the station recognizes the retransmitted frame as an error and does not process the retransmitted frame.

(30. The Secondary Station, when Receiving a Retransmitted Packet Whose BL is Set to 1, Does Not Store in the Reception Buffer the Data Contained in the Frame.)

A communication device [30] of the present invention is the communication device [29] which is adapted so that, if the flag of a reception frame for indicating the end of batch-transmission data is indicating the end of the data, and if the sequence number of the reception frame is the same as that of the previously-received frame whose flag for indicating the end of batch-transmission data is indicating the end of the data, the data in the reception frame is not stored in the reception buffer.

Thus, in a case where a frame from a station is not properly received by an opposite station due to an error, and the opposite station retransmits a frame as the result of the failure, data contained in the retransmitted frame is kept from being stored in a reception buffer of the station for the second time.

(31. The Secondary Station, when Receiving a Retransmitted Packet Whose BL is Set to 1, Retransmits the Previously-Transmitted Frame.)

A communication device [31] of the present invention is the communication device [29] which is adapted so that, if the flag of a reception frame for indicating the end of batch-transmission data is indicating the end of the data, and if the sequence number of the reception frame is the same as that of the previously-received frame whose flag for indicating the end of batch-transmission data is indicating the end of the data, the previously-transmitted frame is retransmitted.

The structure allows retransmission in a case where a frame transmitted to an opposite station is not properly received by the opposite station due to an error.

(32. When a Frame with its DL Set to 1, the Secondary Station Notifies that Data from the Upper Layer of the Opposite Station has Ended.)

A communication device [32] of the present invention is the communication device [22] or [23] which is adapted so that: the communication device [32] particularly includes a circuit for discriminating a flag for indicating the end of data from the opposite station; and, when the flag in a reception frame for indicating the end of data from the opposite station is indicating the end of data, the communication device [32] notifies that to its data processing section for processing data in the reception buffer.

With the structure, a station is able to notify its reception data processing section of an end of transmission data from the opposite station.

(33. The Secondary Station, when Receiving a Frame with its DL Set to 1, Transmits Data from the Upper Layer of the Secondary Station)

A communication device [33] of the present invention is the communication device [32] which is adapted so that, when the flag in a reception frame for indicating the end of data from the opposite station is indicating the end of data, the communication device [33] notifies that to its data processing section for processing data in the reception buffer, and then the communication device [33] transmits data.

The structure allows transmission of response data in reply to the reception data.

(34. The Secondary Station Transmits a Success Response.)

A communication device [34] of the present invention is the communication device [33] which is adapted so that data from the communication device [34] includes a part of or the entire SUCCESS response of OBEX (Object Exchange Protocol).

Thus, a station is able to transmit a SUCCESS response of OBEX, when an opposite station performs transmission by using PUT command by using PUT command of OBEX. Accordingly, communication by means of a PUT operation of OBEX is possible.

(35. When Data from an Upper Layer of the Secondary Station is Transmitted, the Secondary Station Transmits a No-Error Flag Along with the Data.)

A communication device [35] of the present invention is the communication device [33] which is adapted so that, particularly when transmitting data of its own, a no-error flag is transmitted along with the data.

Thus, a station is able to combine the following into a single frame: a frame to notify an opposite station that no error is found; with response data of the station. This improves efficient use of a band.

(36. The Secondary Station Performs Two-Way Communication Using UI Frames, According to IrDA.)

A communication device [36] of the present invention is any one of the communication devices [22] to [35] which is adapted so that the communication scheme which does not limit the window size is communication using UI frames according to IrLAP (Infrared Link Access Protocol).

The structure allows retransmission using UI frames of IrLAP.

(37. The Secondary Station Receives Data (Checks the Sequence Numbers) in One-Way Communication.)

A communication device [37] of the present invention performing communication using UI frames of IrLAP (Infrared Link Access Protocol), in which communication a response is not transmitted to the opposite station, includes: an error detecting circuit for discriminating whether or not there is an error in reception frames; a circuit for calculating sequence number that should be received; a circuit for comparing the sequence number that should be received and a sequence number received; a circuit for storing, in reception buffer, data contained in the reception frames; and a circuit for processing the data in the reception buffer, wherein, at the time transmitting data, if the error detecting circuit and the sequence number comparing circuit detect no error in the reception frames, the data reception is judged as to be properly completed and an intended process is performed. If the error detecting circuit and the sequence number comparing circuit detect an error in the reception frames, the data reception is judged as to be failed and an intended process is performed.

With the structure, an omission of a frame can be detected, even in one-way communication using UI frames of IrLAP, by checking the sequence numbers of frames.

(38. The Secondary Station, During One-Way Reception, Recognizes the End of Data by Using a DL Analyzing Circuit.)

A communication device [38] of the present invention is the communication device [37] which is adapted so that the communication device [38] particularly includes a circuit for discriminating a flag indicating the end of data from an opposite station; and, when the flag indicating the end of data from the opposite station is indicating the end of data, the communication device [38] notifies that the flag indicates the end of the data to the data processing section for processing data in the reception buffer of the communication device [38].

With the structure, the receiving end is able to recognize the end of the reception data, even if the reception end does not have information regarding the length of the entire data transmitted from the sending end.

(39. The Secondary Station, when an Error is Detected During One-Way Reception, does not Perform Data Processing with Respect to Data in Frames Received after the Detection.)

A communication device [39] of the present invention is the communication device [37] which is adapted so that, if the error detecting circuit and the sequence number comparing circuit detect an error, data in reception frames is not stored in the reception buffer at least until a frame whose flag for indicating the end of the batch-transmission data is indicating the end of data is received.

With the structure, it is possible to avoid performing the process of storing data when an error is detected. Thus, reduction of power consumption is possible.

(40. Communication Circuit)

A communication circuit [40] of the present invention is a communication circuit by which communication using any one of the foregoing communication devices [1] to [39] is realized.

The structure can be build into other communication devices.

(41. Program)

A communication program [41] of the present invention is a communication program by which communication using any one of the foregoing communication devices [1] to [39] is realized.

The structure can be build into other communication devices.

(42. Storage Medium)

A storage medium [42] of the present invention stores therein the communication program [41], and is a computer-readable storage medium.

With the structure, the present invention can be executed by reading into a memory the program stored in the storage medium, and running the program.

(43. Mobile Phone)

A mobile phone [43] of the present invention is a mobile phone by which communication using any one of the foregoing communication devices [1] to [39] is realized.

With the structure, any one of the above mentioned communication scheme using a mobile phone is realized. Thus, a high-quality communication is possible.

(44. Display Device)

A display device [44] of the present invention is a display device by which communication using any one of the foregoing communication devices [1] to [39] is realized.

With the structure, any one of the above mentioned communication scheme using a display device is realized. Thus, a high-quality communication is possible.

(45. Printing Device)

A printing device [45] of the present invention is a printing device by which communication using any one of the foregoing communication devices [1] to [39] is realized.

With the structure, any one of the above mentioned communication scheme using a printing device is realized. Thus, a high-quality communication is possible.

(46. Recording Device)

A Recording device [46] of the present invention is a mobile phone by which communication using any one of the foregoing communication devices [1] to [39] is realized.

With the structure, any one of the above mentioned communication scheme using a printing device is realized. Thus, a high-quality communication is possible.

(47. A Communication Method by which No Response Needs to be Transmitted from the OBEX Layer)

Further, another communication method according to the present invention is a communication method for transmitting an object to a station by using an object exchange use protocol, OBEX (Object Exchange protocol), wherein: OBEX commands are transmitted one after another even though no OBEX responses are received.

(48. A Communication Method by which No Response Needs to be Transmitted During One-Way Transmission)

The above communication method according to the present invention may be arranged such that: (i) two-way communication in which an OBEX response from the station is required especially after the transmission of each of the OBEX commands and (ii) one-way communication in which no OBEX response does not need to be received from the station are switched therebetween, and while the one-way communication is selected, the OBEX commands are transmitted one after another even though no OBEX responses are received.

(49. A Communication Device in which No Response Needs to be Transmitted from the OBEX Layer)

Another communication device according to the present invention includes an OBEX layer processing section that is able to transmit an object to a station by using an object exchange use protocol, OBEX (Object Exchange protocol), wherein: OBEX commands are transmitted one after another even though no OBEX responses are received.

(50. A Communication Device in which No Response Needs to be Transmitted During One-Way Communication)

The above communication device according to the present invention further includes a communication method switching section for switching between (i) two-way communication in which an OBEX response from the station is required especially after the transmission of each of the OBEX commands and (ii) one-way communication in which no OBEX response does not need to be received from the station, wherein: while the communication method switching section selects the one-way communication, the OBEX commands are generated and transmitted one after another even though no OBEX responses are received from the other station.

According to the above method and structure, even in cases where, e.g., the client device cannot receive a response command from the server in reply to a request command sent from the client device in the one-way communication using OBEX, object transmission using OBEX can be carried out. Further, the two-way communication can be carried out such that a response from the server is confirmed, whereas the one-way communication can be carried out without any response therefrom. As such, the two-way communication and the one-way communication are realized with the same OBEX protocol.

(51. A Communication Method by which No Response Needs to be Transmitted in Reply to a Non-Final Put Command)

Another communication method according to the present invention is a communication method for transmitting an object to a station by using an object exchange use protocol, OBEX (Object Exchange protocol), wherein: non-final PUT commands complying with OBEX are transmitted one after another even though no OBEX responses are received from the station.

(52. A Communication Device in which No Response Command Needs to be Transmitted in Reply to a Non-Final PUT Command)

Another communication device according to the present invention includes an OBEX layer processing section that is able to transmit an object to a station by using an object exchange use protocol, OBEX (Object Exchange protocol), wherein: only after generating and transmitting a non-final PUT command complying with OBEX, the OBEX layer processing section generates and transmits either a next non-final PUT command complying with OBEX or a final PUT command even though no OBEX response is received from the station.

The above method and structure make it possible to realize object exchange in which CONTINUE response commands for the aforementioned PUT commands are not required.

(53. A Communication Method in which No Response is Transmitted from the OBEX Layer)

Another communication method according to the present invention is a communication method for receiving an object from a station by using an object exchange use protocol, OBEX (Object Exchange protocol), wherein: no OBEX response is always transmitted in reply to an OBEX command sent from the station.

(54. A Communication Method by which No Response is Transmitted from the OBEX Layer During One-Way Reception)

Further, the above communication method according to the present invention may be arranged such that: (i) two-way communication in which an OBEX response from the station is required especially after the transmission of each of the OBEX commands and (ii) one-way communication in which no OBEX response does not need to be received from the station are switched therebetween, and while the one-way communication is selected, the OBEX response is not always transmitted in response to the reception of the OBEX command.

(55. A Communication Device in which No Response is Transmitted from the OBEX Layer)

Further, another communication device according to the present invention includes an OBEX layer processing section that is able to receive an object from a station by using an object exchange use protocol, OBEX (Object Exchange protocol), wherein: the OBEX layer processing section does not always transmit an OBEX response upon reception of an OBEX command.

(56. A Communication Device in which No Response is Transmitted from the OBEX Layer During One-way Reception)

The above communication device according to the present invention further includes a communication method switching section for switching between (i) two-way communication in which an OBEX response from the station is required especially after reception of the OBEX command and (ii)

one-way communication in which no OBEX response does not need to be received from the station, wherein: while the communication method switching section selects the one-way communication, the OBEX response is not always transmitted to the station in response to the reception of the OBEX command.

According to the above method and structure, for example, in the one-way communication using OBEX, in cases where the client device does not require the server device to transmit a response command in reply to a request command from the client device, it is possible to carry out such control that unnecessary response commands are not generated and transmitted. Further, in the two-way communication, the response command is transmitted to the client device, so that the client device can check the communication. On the other hand, in the one-way communication, no unnecessary response command is generated and transmitted to the client device. As such, the two-way communication and the one-way communication can be realized with the same OBEX protocol.

(57. A Communication Method by which a Response is not Made to a Non-Final Put Command)

Further, another communication method according to the present invention is a communication method for receiving an object from a station by using an object exchange use protocol, OBEX (Object Exchange protocol), wherein: no OBEX responses are transmitted in reply to non-final PUT commands each complying with OBEX, and an OBEX response is transmitted in reply to a final PUT command.

(58. A Communication Device in which No Response is Made to a Non-Final PUT Command)

Further, another communication device according to the present invention includes an OBEX layer processing section that is able to receive an object from a station by using an object exchange use protocol, OBEX (Object Exchange protocol), wherein: the OBEX layer processing section does not transmit an OBEX response in reply to a non-final PUT command complying with OBEX, but generates and transmits an OBEX response in reply to a final PUT command.

According to the above method and structure, it is possible to carry out such control that only CONTINUE response commands for non-final PUT commands each transmitted from the client device are not generated and transmitted. This improves efficiency of communication band.

Further, the present invention may be configured as follows.

A communication system of the present invention is a communication system which performs data communication on a frame by frame basis between a primary station and a secondary station, by dividing communication data into plural non-limited frames, the system adapted so that: the primary station adds, to each of the non-limited frames, a sequence number and a flag for indicating whether to transfer a transmission right, and performs data transmission in the form of the non-limited frames; and, when the flag for indicating whether to transfer the transmission right in a reception frame from the primary station indicates that the transmission right is transferred, the secondary station notifies the primary station of a communication result which indicates whether there is an omission of a frame in the frames having been received.

An example of the non-limited frames is UI frames (Unnumbered Information) which are used in a communication scheme adopting an infrared ray, which scheme is in compliance with, for example, IrDA communication scheme. The UI frames can be continuously transmitted within a maximum turn-around period during which frames are continuously transmitted. The number of transmission frames is not limited.

With the structure, retransmission of an error-frame or an omitted frame is possible, even in communication using non-limited frames by which a window size is not limited. Thus, it is possible to improve communication efficiency.

Further, the secondary station is adapted so as to also notify the sequence number of the error frame or the omitted frame, when notifying the communication result to the primary station.

With the structure, the primary station does not have to retransmit all the frames. Therefore, it is possible to reduce the overhead and power consumption in the communication.

Further, the primary station is adapted so that, when the secondary station notifies of an error or an omission of a frame, the primary station retransmits the error frame or the omitted frame and the subsequent frames.

With the structure, the primary station does not have to retransmit all the frames. Therefore, it is possible to reduce the overhead and power consumption in the communication.

Further, the primary station is adapted so as to retransmit (i) the frame whose sequence number corresponding to that of the error frame or the omitted frame and (ii) the subsequent frames, only once.

With the structure, the primary station performs retransmission of frames only once. Therefore, it is possible to reduce the power consumed for retransmission.

Further, the secondary station is adapted so that, when an error or an omission of frame is detected, the secondary station stops performing receiving process with respect to the frames following the error frame or the omitted frame.

With the structure, the secondary station does not receive frames following the error frame or the omitted frame. Therefore, it is not necessary to receive frames which do not need to be received. Hence, power consumption can be reduced.

Further, the secondary station is adapted so as to receive, amongst frames having retransmitted from the primary station, a necessary frame corresponding to the error frame or the omitted frame.

With the structure, the secondary station does not need to receive an unnecessary frame. Hence, power consumption can be reduced.

Further, the communication system is adapted so that: each of (i) a connection requesting frame from the primary station and (ii) a connection response frame from the secondary station is given a field for indicating the number of frames the respective stations can receive at once, and is exchanged at the time of establishing connection; an optimum number of frames is calculated in each station by referring to the received information regarding the number of frames that the opposite station can receive at once; and the transmission right is transferred according to the calculated optimum number of the frames.

With this configuration, the transmission right is transferred without an exception at every certain number of frames supported by both of the primary station and the secondary station. Therefore, it is possible to exchange frames according to the respective memory capacities of the both stations.

Further, a communication system of the present invention is a communication system which performs data communication on a basis of frame by frame between primary and secondary stations, adapted so that: the primary and secondary stations performs communication using a communication protocol having a hierarchy structure; the primary station adds, to each of non-limited frames, a sequence number of the frame and a flag for indicating whether to transfer a transmission right, in a particular communication protocol layer constituting the hierarchy structure; and, when it is recognized, in a particular communication protocol layer constituting the hierarchy structure, that the flag for indicating whether to transfer the transmission right in a frame received from the primary station indicates that the transmission right is transferred, the secondary station notifies the primary station of a communication result which indicates whether or not there is an error or an omission in frames having been received.

With the structure, it is possible to perform retransmission, even in communication using non-limited frames by which a window size is not limited, and no modification is necessary for already-existing layers, except for the above-mentioned particular communication protocol layer.

Further, the secondary station is adapted so that, if an error or an omission of a frame is detected in the particular communication protocol layer, the sequence number of the error frame or the omitted frame is notified to the primary station along with the communication result.

With the structure, it is possible to reduce the power consumption of the primary station and the over head in the communication. Further, no modification is necessary for already-existing layers, except for the above-mentioned particular communication protocol layer.

Further, the primary station is adapted so that, when the particular communication protocol layer thereof receives the notification of an error or an omission of a frame from the secondary station, the primary station retransmits the error frame or the omitted frame notified by the secondary station and the subsequent frames.

With the structure, it is possible to reduce the power consumption of the primary station and the overhead in the communication. Further, no modification is necessary for already-existing layers, except for the above-mentioned particular communication protocol layer.

Further, the primary station is adapted so that, when the particular communication protocol layer thereof receives the notification of an error or an omission of a frame from the secondary station, the primary station performs the retransmission of the frames only once.

With the structure, power consumption accompanied with the transmission is reduced, and no modification is necessary for already-existing layers, except for the above-mentioned particular communication protocol layer.

Further, the secondary station is adapted so that, when an error or an omission of a frame is detected in the particular communication protocol layer, the secondary station stops performing receiving process with respect to the frames following the error frame or the omitted frame.

With the structure, the secondary station does not have to unnecessarily receive frames, and therefore reduction of power consumption is possible. Further, no modification is necessary for already-existing layers, except for the above-mentioned particular communication protocol layer.

Further, the secondary station is adapted so that, in the particular communication protocol layer, a necessary frame corresponding to the error frame or the omitted frame amongst frames having retransmitted from the primary station is received.

With the structure, the secondary station does not need to receive an unnecessary frame. Hence, power consumption can be reduced. Further, no modification is necessary for already-existing layers, except for the above-mentioned particular communication protocol layer.

Further, the communication system is adapted so that: in the particular communication protocol layer, each of (i) a connection requesting frame from the primary station and (ii) a connection response frame from the secondary station is given a field for indicating the number of frames the respective stations can receive at once, and is exchanged at the time of establishing connection; an optimum number of frames is calculated in each station by referring to the received information regarding the number of frames that the opposite station can receive at once; and the transmission right is transferred according to the calculated optimum number of the frames.

With this configuration, it is possible to exchange frames according to the respective memory capacities of the both stations. Further, no modification is necessary for already-existing layers, except for the above-mentioned particular communication protocol layer.

Further, in the particular communication protocol layer of the primary station, each of the non-limited frames is transmitted with a flag indicating whether or not the upper layer is requesting a response frame to the transmission frame. In the particular communication protocol layer of the secondary station, if the flag, in the frame received from the primary station, for indicating whether or not the upper layer of the primary station is requesting a response frame to the transmission frame is indicating that the response frame is requested, the particular communication protocol layer notifies the upper layer that a response frame is requested. When the upper layer completes the preparation for response frame, the particular communication protocol layer generates a response frame by adding information regarding whether or not there is an error or an omission in the frames having been received. The response frame is then transmitted.

With the structure, exchanging of a requesting frame and a response frame between a communication protocol layers which are above the particular communication protocol layers performing retransmission control.

Further, in the particular communication protocol layer of the primary station, each of the non-limited frames is transmitted with a flag indicating whether or not the upper layer is requesting a response frame to the transmission frame. In the particular communication protocol layer of the secondary station, if the flag, in the frame received from the primary station, for indicating whether or not the upper layer of the primary station is requesting a response frame to the transmission frame is indicating that the response frame is requested, the particular communication protocol layer notifies the upper layer that a response frame is requested. Then, a response frame for notifying whether or not there is an error or an omission in the frames having been received is transmitted in advance, after which a response frame from the upper layer is again transmitted when the upper layer completes preparation of the response frame.

With the structure, the particular communication protocol layer of the primary station is able to receive a response frame of the particular communication protocol layer level of the secondary station (i.e. a response frame without a response frame from the upper layer), before a reception frame is prepared and transmitted in reply from the upper layer of the particular communication protocol layer of the secondary station. Thus, the particular communication protocol layer of the primary station is able to know whether or not the secondary station has properly received the frames, before the response frame from the upper layer is received. This allows preparation of the next data transmission or the like in advance.

Further, a transmitter of the present invention is a transmitter by which communication data is divided into plural non-limited frames, and is transmitted in the form of the frames, the transmitter including: sequence number adding means for adding a sequence number to each of the non-limited frames; and transmission right transferring flag adding means for adding, to each of the non-limited frames, a flag indicating whether to transfer a transmission right.

Further, a communication method of the present invention is a communication method for a transmitter by which communication data is divided into plural non-limited frames, and is transmitted in the form of the frames, the method including: a sequence number adding step for adding a sequence number to each of the non-limited frames; and a transmission right transfer flag adding step for adding, to each of the non-limited frames, a flag indicating whether to transfer a transmission right.

With the structure, it is possible to receive from the receiver a frame indicating whether or not there is an error or an omission of a frame, even in communication using non-limited frames by which a window size is not limited. Thus, it is possible to perform retransmission of an error non-limited frame or an omitted non-limited frame.

Further, a receiver of the present invention is a receiver which receives communication data from the transmitter, the receiver including: response frame generating means for generating a response frame indicating whether or not there is an error or an omission in frames having been received, the response frame generating means generating the response frame when a flag, in a frame received from the transmitter, for indicating whether or not a transmission right is transferred indicates that the transmission right is transferred; and transmission means for transmitting to the transmitter the response frame generated by the response frame generating means.

Further, a communication method of the present invention is a communication method for a receiver which receives communication data from the transmitter, the method including the steps of: a response frame generating step for generating a response frame indicating whether or not there is an error or an omission in frames having been received, the response frame being generated when a flag, in a frame received from the transmitter, for indicating whether or not a transmission right is transferred indicates that the transmission right is transferred; and a transmission step for transmitting to the transmitter the response frame generated by the response frame generating means.

With the structure, it is possible to transmit a frame indicating whether or not there is an error or an omission of a frame, even in reception of non-limited frames by which a window size is not limited. Thus, it is possible to perform retransmission of an error non-limited frame.

Further, a communication program which causes the primary station of the communication system of the present invention to operate is a computer program which causes a computer to execute the data communication processes performed in the primary station.

With the structure, it is possible to operate the primary station of the communication system by executing the data communication processes performed in the primary station.

Further, a communication program which causes the secondary station of the communication system of the present invention to operate is a computer program which causes a computer to execute the data communication processes performed in the secondary station.

With the structure, it is possible to operate the secondary station of the communication system by executing the data communication processes performed in the secondary station.

Further, a storage medium of the present invention is a computer-readable storage medium which stores therein the communication program for causing the primary station of the communication system to operate, or the communication program for causing the secondary station of the communication system to operate.

With the structure, the data communication processes performed in the primary station or the secondary station can be performed on a computer, by reading out the computer program having read out from the storage medium.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

Each of a communication system, transmitter, receiver, communication method, communication program, and storage medium of the present invention allows highly reliable data transmission and reduction of time required for data transmission. Thus, for example, the transmission function of the communication system of the present invention is applicable to mobile phones, PDAs, personal computers, or the like. On the other hand, for example, the reception function of the communication system of the present invention is applicable to mobile phones, TVs, AV devices, printers, recording devices such as DVD recorders and HDD recorders, and personal computers. Further, the communication system of the present invention is applicable to infrared communication in compliance with IrDA.

The invention claimed is:

1. A communication device performs batched data transmission, according to a communication scheme which does not limit the number of frames transmittable at once, comprising:
    transmission frame generating means for generating transmission frames by dividing batch-transmission data to be transmitted in batch;
    sequence number generating means for giving a sequence number to each of the transmission frames;
    batch transmission final flag generating means for setting, in a final transmission frame of the batch-transmission data, a batch transmission final flag which indicates that the frame is the final transmission frame of the batch-transmission data; and
    transmission means for transmitting the transmission frames.

2. The communication device as set forth in claim 1, further comprising:
    reception frame analyzing means for extracting, from a reception frame having been received, a no-error flag and a sequence number;
    no-error flag analyzing means for analyzing the no-error flag, so as to judge presence/absence of an error; and
    control means for retransmitting, when the no-error flag indicates a presence of an error, a transmission frame corresponding to the sequence number.

3. The communication device as set forth in claim 1 or 2, further comprising:
data-end flag generating means for setting a data-end flag, wherein, when a set of transmission data is transmitted as a single batch-transmission data item, or as plural batch-transmission data items which are obtained by dividing the set of transmission data, said data-end flag generating means sets the data-end flag of a final transmission frame of a final-batch-transmission data item of the set of transmission data to indicate that the frame is the final transmission frame of the set of transmission data.

4. The communication device as set forth in claim 1, wherein:
said communication scheme is such that communication is performed by using UI (Unnumbered Information) frames according to IrLAP (Infrared Link Access Protocol).

5. The communication device as set forth in claim 1, wherein:
said transmission frames include a final PUT command of OBEX (Object Exchange Protocol) or at least a part of non-final PUT command of OBEX (Object Exchange Protocol).

6. A communication device which performs batched data reception, according to a communication scheme which does not limit the number of frames transmittable at once, comprising:
sequence number analyzing means for analyzing a sequence number contained in each reception frame, so as to judge whether or not there is an error in the sequence numbers;
transmission frame generating means for generating a transmission frame containing a no-error flag set to indicate that an error is found and the sequence number of the error-frame, if (a) the batch transmission final flag in a frame having been received indicates that the received frame is the final one of transmission frames into which batched-transmission data has been divided and which have been transmitted in batch from the transmitter, and (b) said sequence number analyzing means has detected an error in any of frames having been received;
transmission means for transmitting the transmission frame.

7. The communication device as set forth in claim 6, wherein:
said transmission frame includes a part of or an entire SUCCESS response of OBEX (Object Exchange Protocol).

8. A communication device which performs batched data reception, according to a communication scheme which does not limit the number of frames transmittable at once, comprising:
error detection means for judging whether or not there is an error in reception frames;
transmission frame generating means for generating a transmission frame containing a no-error flag set to indicate presence or absence of an error, according to whether or not said error detection means has detected an error in a frame having been received, if the batch transmission final flag in a frame having been received indicates that the received frame is the final one of transmission frames into which batched-transmission data has been divided and which have been transmitted in batch from the transmitter; and
transmission means for transmitting the transmission frame.

9. The communication device as set forth in claim 6 or 8, wherein:
said communication scheme is such that communication is performed by using UI (Unnumbered Information) frames according to IrLAP (Infrared Link Access Protocol).

10. A communication device which performs batched data transmission according to a communication scheme which does not limit the number of frames transmittable at once, said communication device performing the batched data transmission, comprising:
transmission frame generating means for generating transmission frames by dividing batch-transmission data to be transmitted in batch;
sequence number generating means for giving a sequence number to each of the transmission frames;
transmission means for transmitting the transmission frames; and
an OBEX layer processing section for, after transmission of an OBEX command, transmitting a subsequent OBEX command without receiving an OBEX response from a receiver, the OBEX command being a command of OBEX (Object Exchange Protocol) which is a protocol for exchanging an object.

11. A communication device which performs batched data reception according to a communication scheme which does not limit the number of frames transmittable at once, comprising:
sequence number analyzing means for analyzing a sequence number contained in each reception frame, so as to judge whether or not there is an error in the sequence numbers;
transmission frame generating means for generating, in a case where said sequence number analyzing means detects an error in reception frames having been received, a transmission frame containing a no-error flag set to indicate that an error is found and the sequence number of the error-frame;
transmission means for transmitting the transmission frame; and
an OBEX layer processing section which does not transmit an OBEX response, after receiving an OBEX command of OBEX (Object Exchange protocol) which is a protocol for exchanging an object.

12. A non-transitory computer-readable medium storing a communication program for operating a communication device as set forth in claim 1, 6, or 8, said communication program, when executed by a computer, causes the computer to function as each of the above mentioned sections.

* * * * *